(12) United States Patent
Gleeson et al.

(10) Patent No.: US 10,955,956 B2
(45) Date of Patent: Mar. 23, 2021

(54) DEVICES, METHODS, AND GRAPHICAL USER INTERFACES FOR INTERACTION WITH AN INTENSITY-SENSITIVE INPUT REGION

(71) Applicant: Apple Inc., Cupertino, CA (US)

(72) Inventors: Brian T. Gleeson, Mountain View, CA (US); Brigit E. Lamberson, San Francisco, CA (US); Camille Moussette, Los Gatos, CA (US); Madeleine S. Cordier, San Francisco, CA (US); Megan A. McClain, San Francisco, CA (US); Michael J. Beyhs, San Francisco, CA (US); Thayne M. Miller, San Jose, CA (US); Jacob L. Matlick, San Francisco, CA (US); Jean-Pierre M. Mouilleseaux, San Francisco, CA (US); Peter C. Tsoi, San Jose, CA (US); David H. Bloom, San Francisco, CA (US); Miao He, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/403,329

(22) Filed: May 3, 2019

(65) Prior Publication Data

US 2019/0339804 A1    Nov. 7, 2019

Related U.S. Application Data

(60) Provisional application No. 62/668,187, filed on May 7, 2018.

(51) Int. Cl.
*G06F 3/041* (2006.01)
*G06F 3/01* (2006.01)

(52) U.S. Cl.
CPC ............ *G06F 3/0414* (2013.01); *G06F 3/016* (2013.01); *G06F 2203/04101* (2013.01); *G06F 2203/04105* (2013.01)

(58) Field of Classification Search
CPC ............. G06F 3/04886; G06F 3/03547; G06F 3/0414; G06F 3/044; G06F 3/0488;
(Continued)

(56) References Cited

U.S. PATENT DOCUMENTS 9,082,269 B2    7/2015   Olsson et al.
2010/0156818 A1   6/2010   Burrough et al.
(Continued)

FOREIGN PATENT DOCUMENTS

WO    WO 2007/103631 A2    9/2007

OTHER PUBLICATIONS

Pediredla, "Understanding 3D Touch From a Development Perspective", http://blog.hedgehoglab.com/understanding-3d-touch-develepment, Feb. 8, 2016, 10 pages.
(Continued)

*Primary Examiner* — Di Xiao
(74) *Attorney, Agent, or Firm* — Morgan, Lewis & Bockius LLP

(57) ABSTRACT

An electronic device includes a display and an input region separate from the display. The device detects a first portion of a first input on the input region. In response to detecting the first portion of the first input: if the first portion of the first input meets first criteria that do not require a characteristic intensity of the first input to increase above a first intensity threshold in order to be met, the device displays a precursor object of a user interface object that includes one or more selectable options. While displaying the precursor object, a second portion of the first input is detected on the input region, wherein an intensity of the first input increases
(Continued)

above the first intensity threshold. In response to detecting the increase in intensity, the device reveals the user interface object by an amount that varies with a current intensity of the first input.

48 Claims, 147 Drawing Sheets

(58) Field of Classification Search
CPC .. G06F 3/04883; G06F 3/016; G06F 3/03543; G06F 2203/04105; G06F 3/017; G06F 3/038; G06F 3/0416; G06F 3/0418; G06F 3/0485; G06F 3/02; G06F 3/0202; G06F 3/0237; G06F 3/0346; G06F 3/045; G06F 1/163; G06F 2203/0384; G06F 3/0304; G06F 3/0312; G06F 3/0338; G06F 3/0362; G06F 21/32; G06F 2203/04107; G06F 2209/509; G06F 3/023; G06F 3/03545; G06F 3/048; G06F 3/0481; G06F 3/04847; G06F 3/0489; G06F 9/4812; G06F 9/4843; G06F 9/52; G06F 9/524; G06F 1/1626; G06F 1/1632; G06F 1/1637; G06F 1/1643; G06F 1/1658
See application file for complete search history.

(56) References Cited

U.S. PATENT DOCUMENTS

| | | | |
|---|---|---|---|
| 2012/0023524 A1* | 1/2012 | Suk | H04N 21/42222 725/43 |
| 2014/0049521 A1 | 2/2014 | Gil et al. | |
| 2015/0020109 A1* | 1/2015 | Higa | H04N 21/4312 725/47 |
| 2015/0058723 A1 | 2/2015 | Cieplinski et al. | |
| 2015/0062052 A1 | 3/2015 | Bernstein et al. | |
| 2015/0067495 A1 | 3/2015 | Bernstein et al. | |
| 2015/0067496 A1 | 3/2015 | Missig et al. | |
| 2015/0067497 A1 | 3/2015 | Cieplinski et al. | |
| 2015/0067513 A1 | 3/2015 | Zambetti et al. | |
| 2015/0067519 A1 | 3/2015 | Missig et al. | |
| 2015/0067559 A1 | 3/2015 | Missig et al. | |
| 2015/0067560 A1 | 3/2015 | Cieplinski et al. | |
| 2015/0067563 A1 | 3/2015 | Bernstein et al. | |
| 2015/0067596 A1 | 3/2015 | Brown et al. | |
| 2015/0067601 A1 | 3/2015 | Bernstein et al. | |
| 2015/0067602 A1 | 3/2015 | Bernstein et al. | |
| 2015/0067605 A1 | 3/2015 | Zambetti et al. | |
| 2015/0135109 A1 | 5/2015 | Zambetti et al. | |
| 2015/0138126 A1 | 5/2015 | Westerman | |
| 2015/0138155 A1 | 5/2015 | Bernstein et al. | |
| 2015/0143273 A1 | 5/2015 | Bernstein et al. | |
| 2015/0149899 A1 | 5/2015 | Bernstein et al. | |
| 2015/0149964 A1 | 5/2015 | Bernstein et al. | |
| 2015/0149967 A1 | 5/2015 | Bernstein et al. | |
| 2015/0153929 A1 | 6/2015 | Bernstein et al. | |
| 2015/0378519 A1 | 12/2015 | Brown et al. | |
| 2016/0004427 A1 | 1/2016 | Zambetti et al. | |
| 2016/0004428 A1 | 1/2016 | Bernstein et al. | |
| 2016/0004429 A1 | 1/2016 | Bernstein et al. | |
| 2016/0004430 A1 | 1/2016 | Missig et al. | |
| 2016/0004431 A1 | 1/2016 | Bernstein et al. | |
| 2016/0004432 A1 | 1/2016 | Bernstein et al. | |
| 2016/0011771 A1 | 1/2016 | Cieplinski | |
| 2016/0041750 A1 | 2/2016 | Cieplinski et al. | |
| 2016/0210025 A1 | 7/2016 | Bernstein et al. | |
| 2016/0225568 A1* | 8/2016 | Chen | H03K 17/964 |
| 2016/0259413 A1 | 9/2016 | Anzures et al. | |
| 2016/0259497 A1 | 9/2016 | Foss et al. | |
| 2016/0259498 A1 | 9/2016 | Foss et al. | |
| 2016/0259499 A1 | 9/2016 | Kocienda et al. | |
| 2016/0259518 A1 | 9/2016 | King et al. | |
| 2016/0259519 A1 | 9/2016 | Foss et al. | |
| 2016/0259527 A1 | 9/2016 | Kocienda et al. | |
| 2016/0259528 A1 | 9/2016 | Foss et al. | |
| 2016/0291770 A1* | 10/2016 | Kocienda | G06F 3/0488 |
| 2017/0046024 A1* | 2/2017 | Dascola | G06F 3/04845 |
| 2017/0046025 A1 | 2/2017 | Dascola et al. | |
| 2017/0075520 A1 | 3/2017 | Bauer et al. | |
| 2017/0075562 A1 | 3/2017 | Bauer et al. | |
| 2017/0075563 A1 | 3/2017 | Bauer et al. | |
| 2017/0212673 A1 | 7/2017 | Bernstein et al. | |
| 2017/0357317 A1 | 12/2017 | Chaudhri et al. | |
| 2017/0357319 A1 | 12/2017 | Chaudhri et al. | |
| 2017/0357320 A1 | 12/2017 | Chaudhri et al. | |
| 2017/0357358 A1 | 12/2017 | Teutschler et al. | |
| 2018/0024681 A1 | 1/2018 | Bernstein et al. | |
| 2018/0039368 A1 | 2/2018 | Choi et al. | |
| 2018/0059809 A1* | 3/2018 | McClendon | G06F 3/0412 |
| 2018/0067554 A1 | 3/2018 | Chaudhri et al. | |
| 2018/0067555 A1 | 3/2018 | Chaudhri et al. | |
| 2018/0067622 A1 | 3/2018 | Chaudhri et al. | |
| 2018/0188920 A1 | 7/2018 | Bernstein et al. | |
| 2018/0275862 A1 | 9/2018 | Khoe et al. | |
| 2018/0364883 A1 | 12/2018 | Khoe et al. | |
| 2018/0364904 A1 | 12/2018 | Bernstein et al. | |
| 2019/0018562 A1 | 1/2019 | Bernstein et al. | |
| 2019/0042075 A1 | 2/2019 | Bernstein et al. | |
| 2019/0042078 A1 | 2/2019 | Bernstein et al. | |
| 2019/0050055 A1 | 2/2019 | Chaudhri et al. | |
| 2019/0065043 A1 | 2/2019 | Zambetti et al. | |
| 2019/0065240 A1* | 2/2019 | Kong | G06F 3/0481 |
| 2019/0073003 A1* | 3/2019 | Xu | G06F 1/1616 |
| 2019/0138189 A1 | 5/2019 | Missig | |
| 2019/0146643 A1 | 5/2019 | Foss et al. | |
| 2019/0163358 A1 | 5/2019 | Dascola et al. | |
| 2019/0171354 A1 | 6/2019 | Dascola et al. | |

OTHER PUBLICATIONS

Invitation to Pay Additional Fees, dated Oct. 7, 2019, received in International Patent Application No. PCT/US2019/031078, which corresponds with U.S. Appl. No. 16/403,329, 30 pages.
International Search Report and Written Opinion, dated Dec. 2, 2019, received in International Patent Application No. PCT/US2019/031078, which corresponds with U.S. Appl. No. 16/403,329, 32 pages.

* cited by examiner

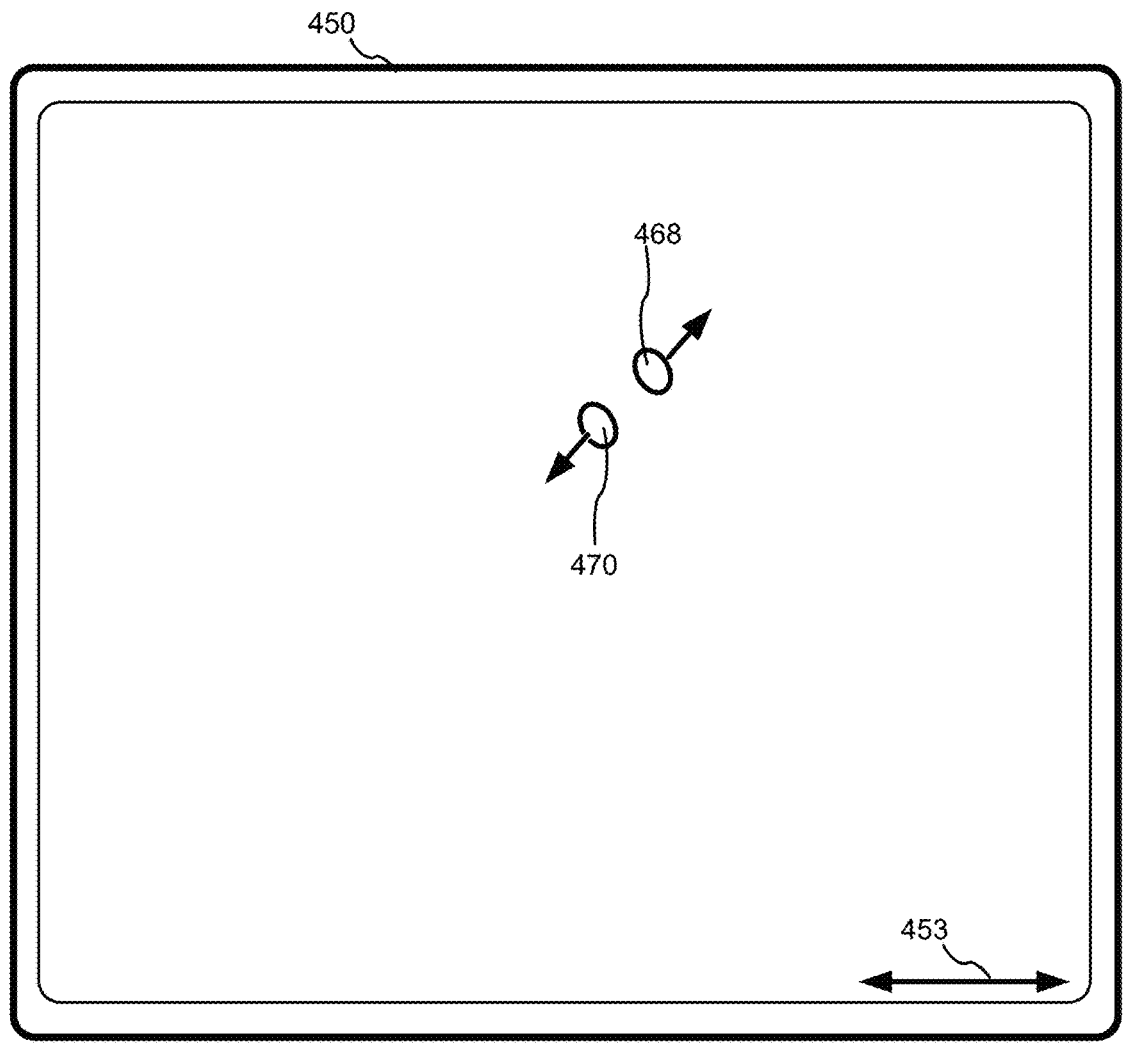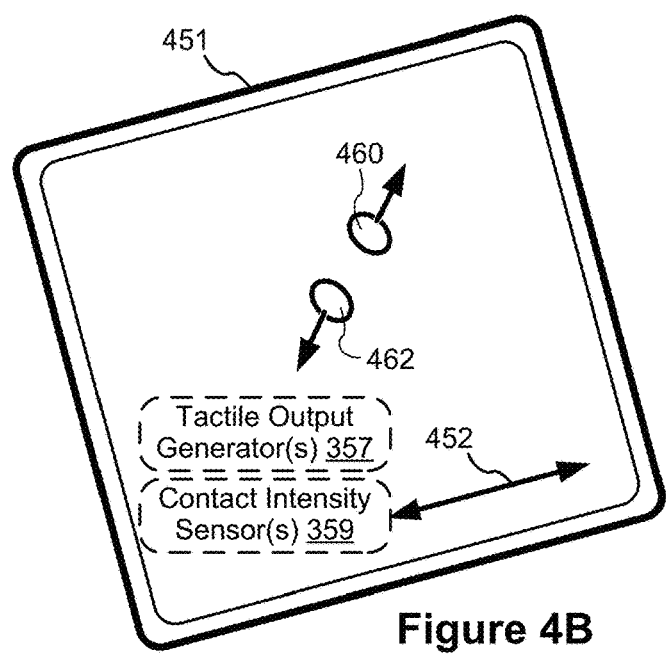
Figure 4B

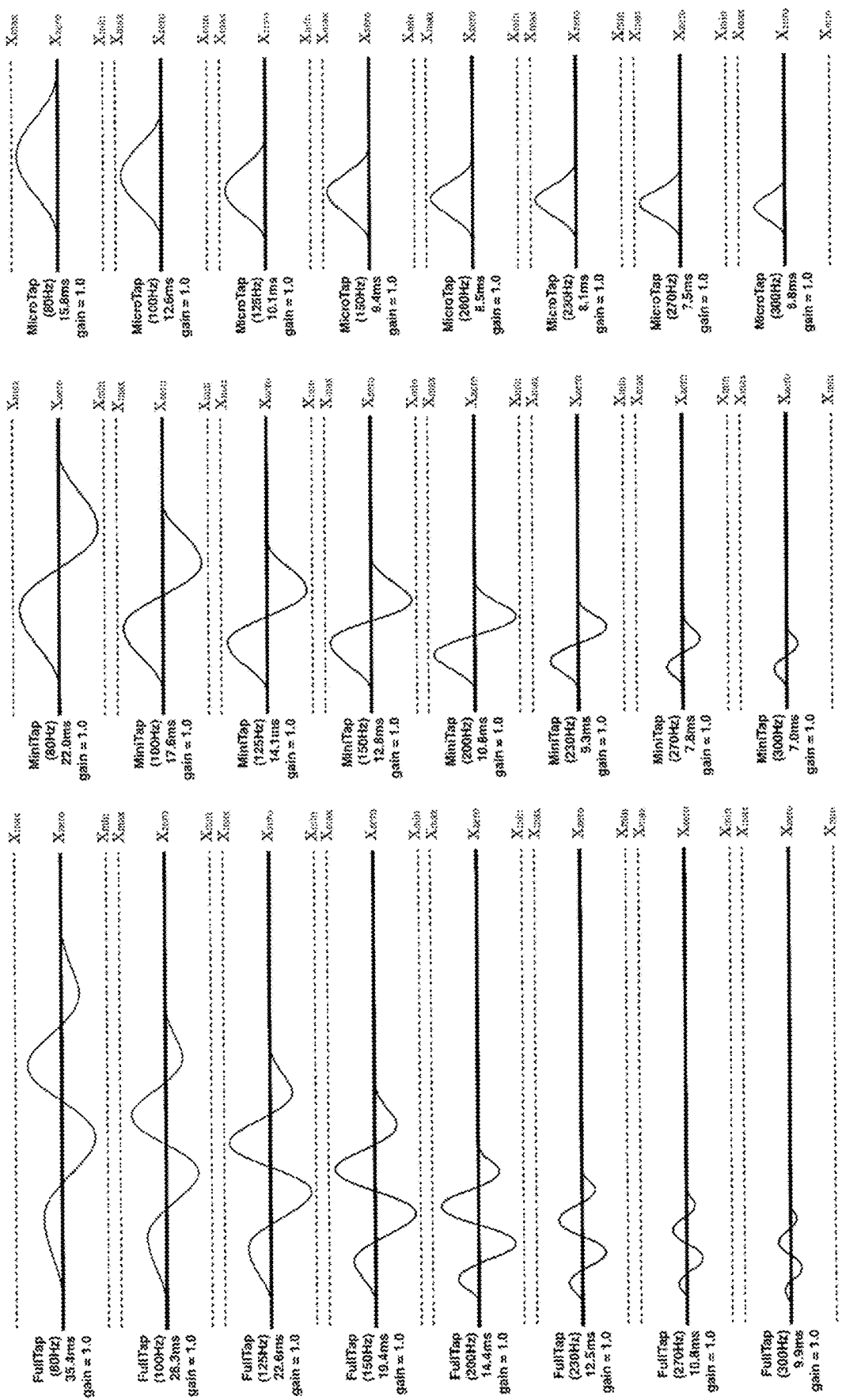
Figure 4F1

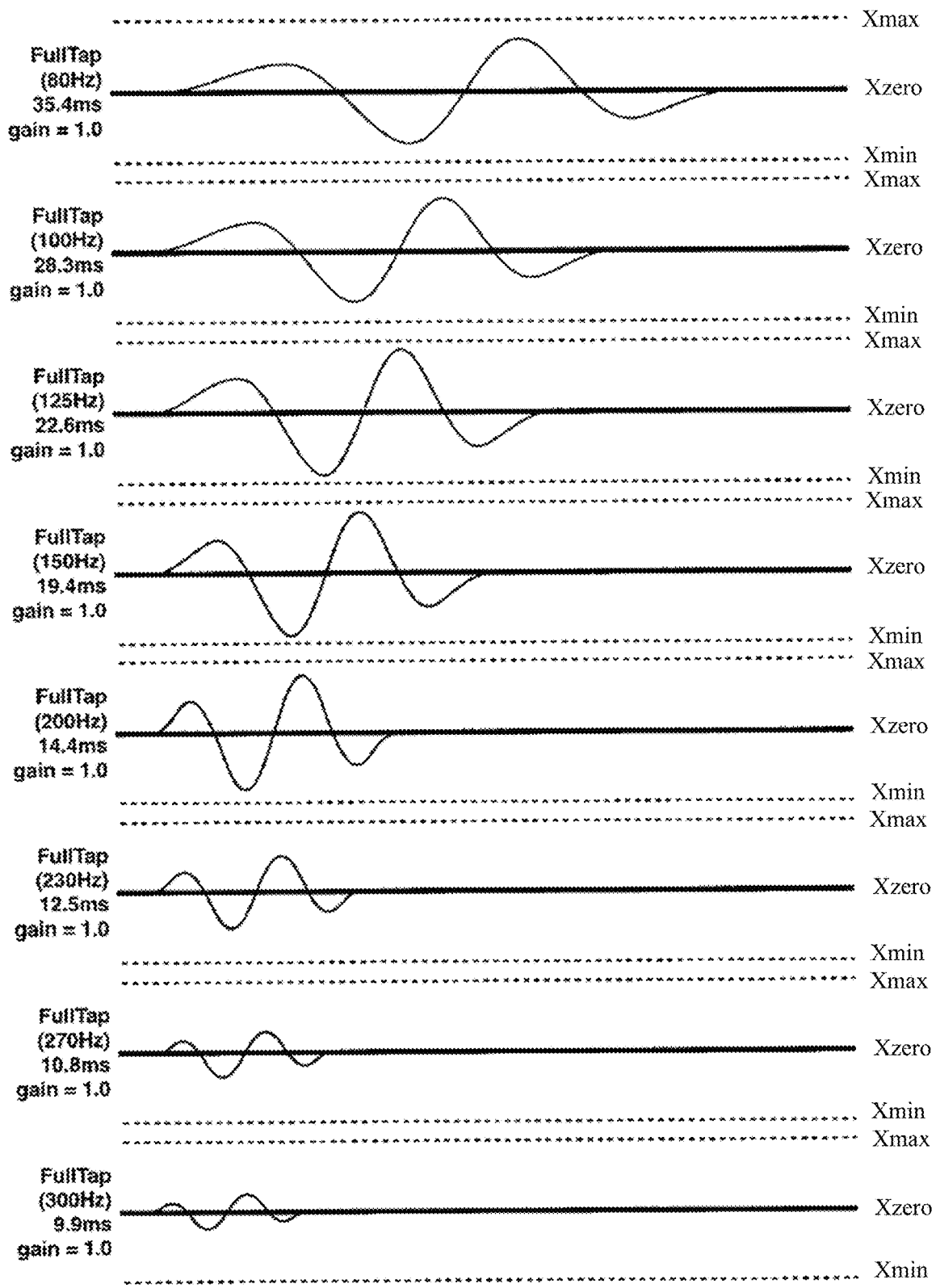
Figure 4F2

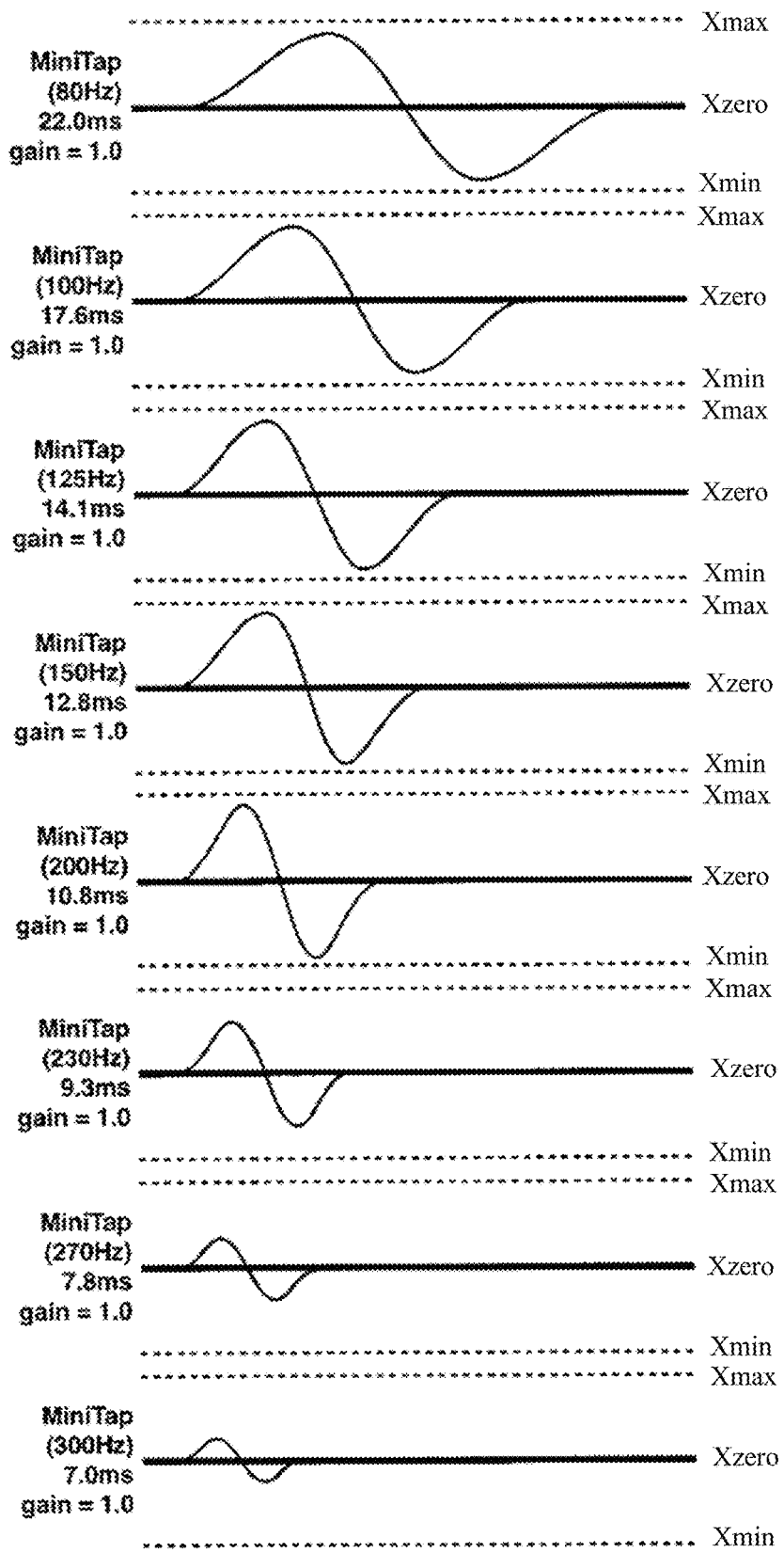
Figure 4F3

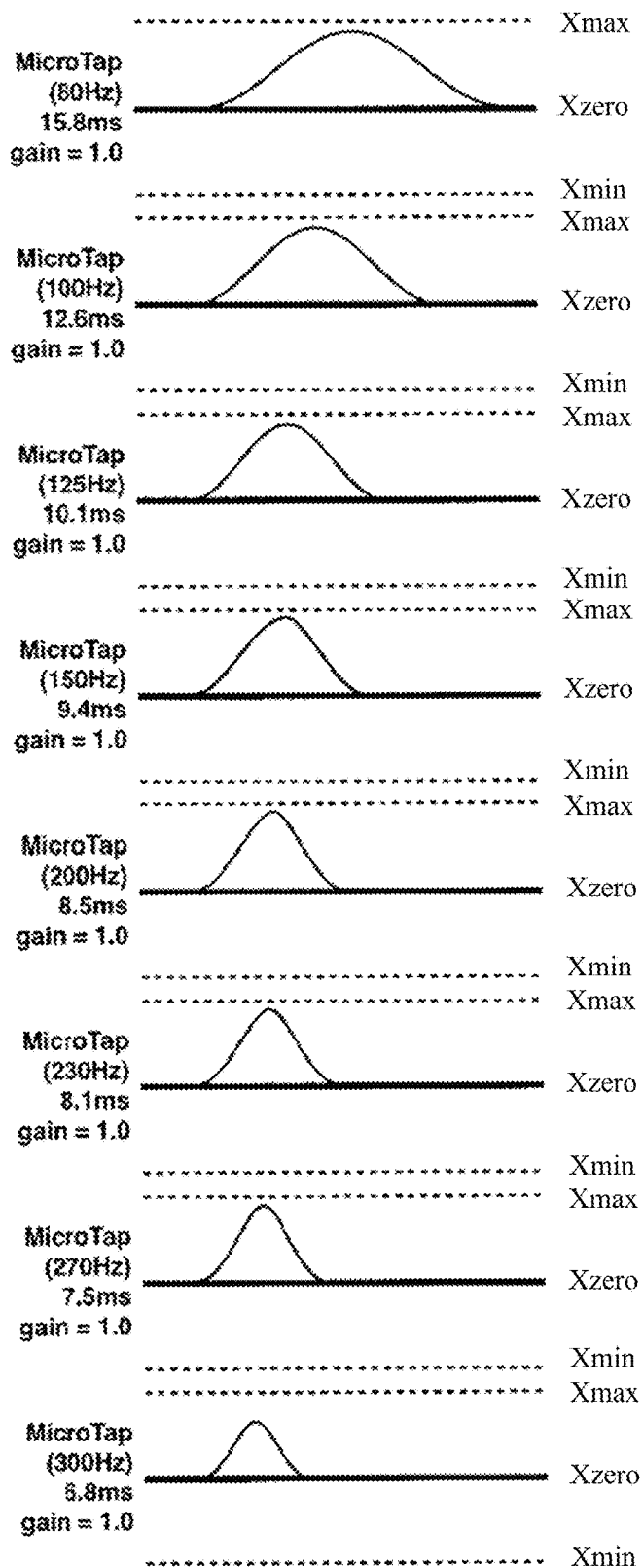
Figure 4F4

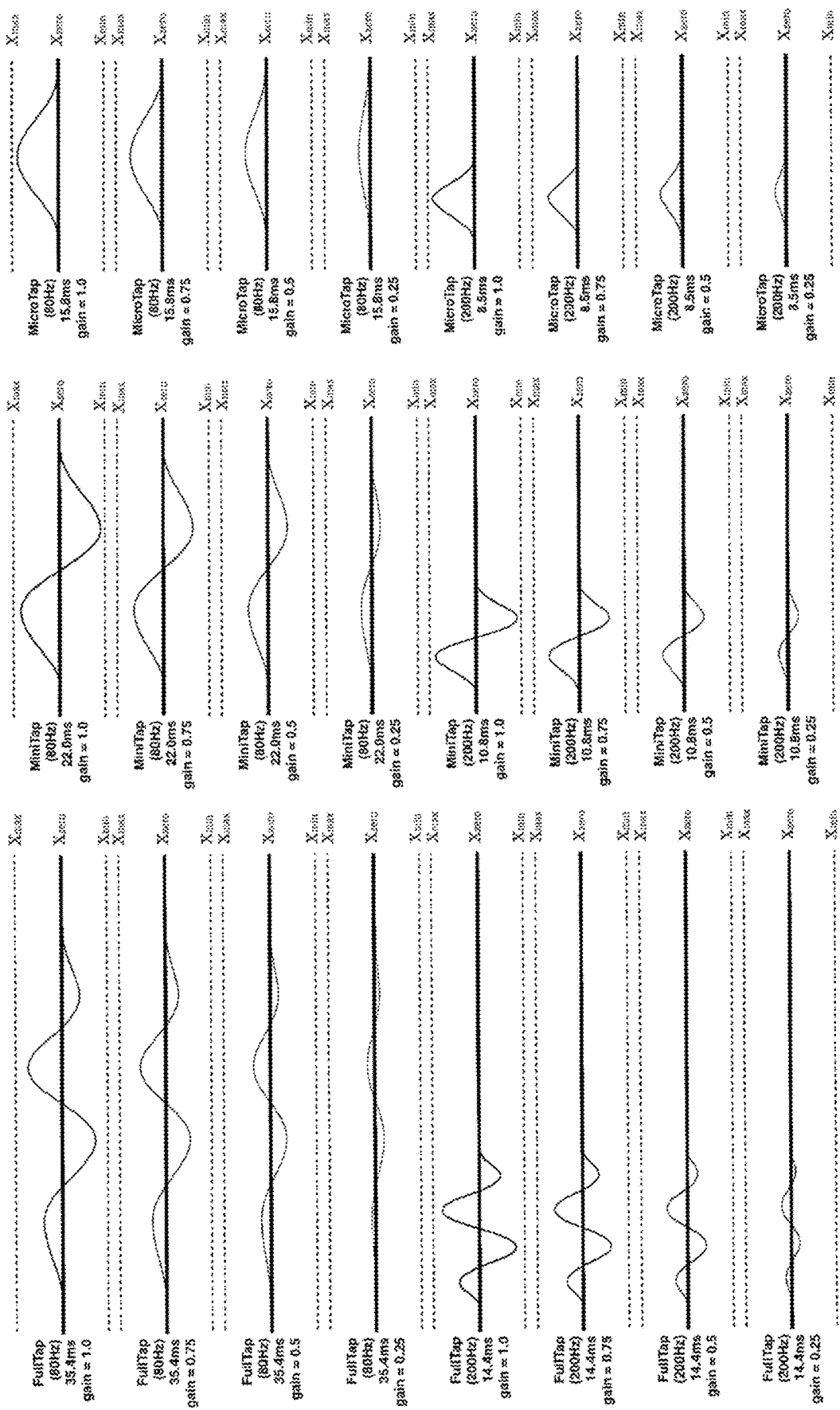
Figure 4G1

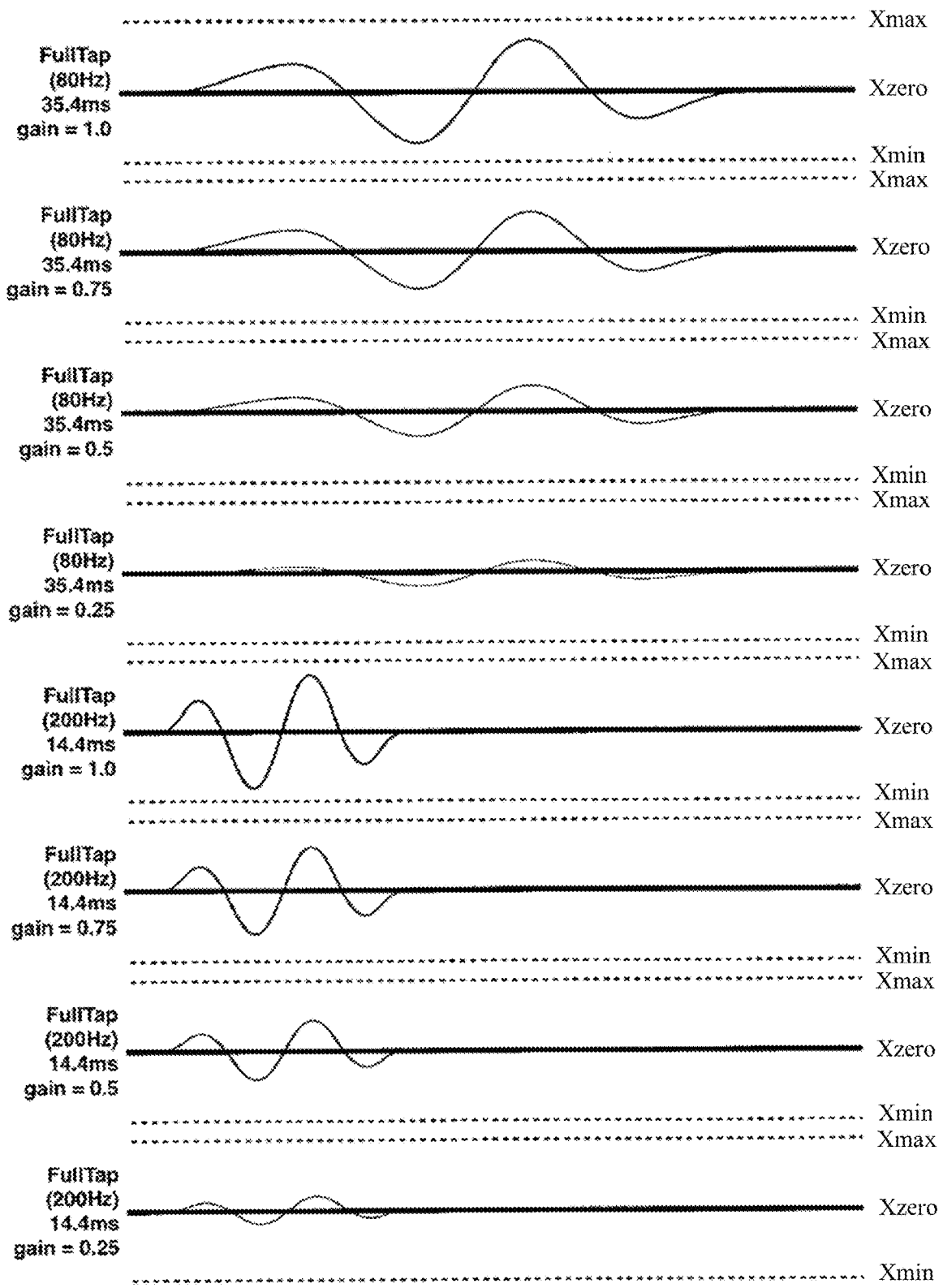
Figure 4G2

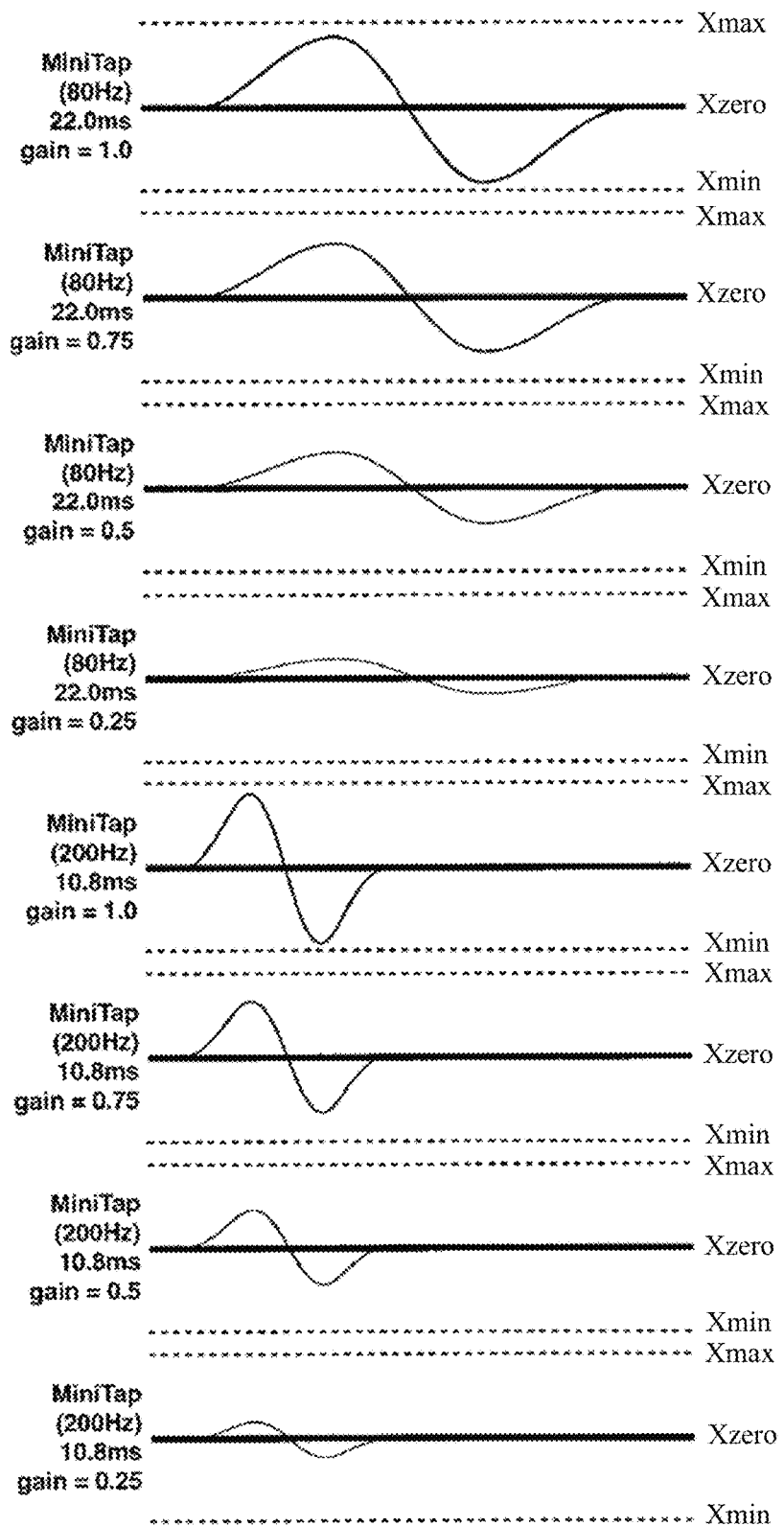
Figure 4G3

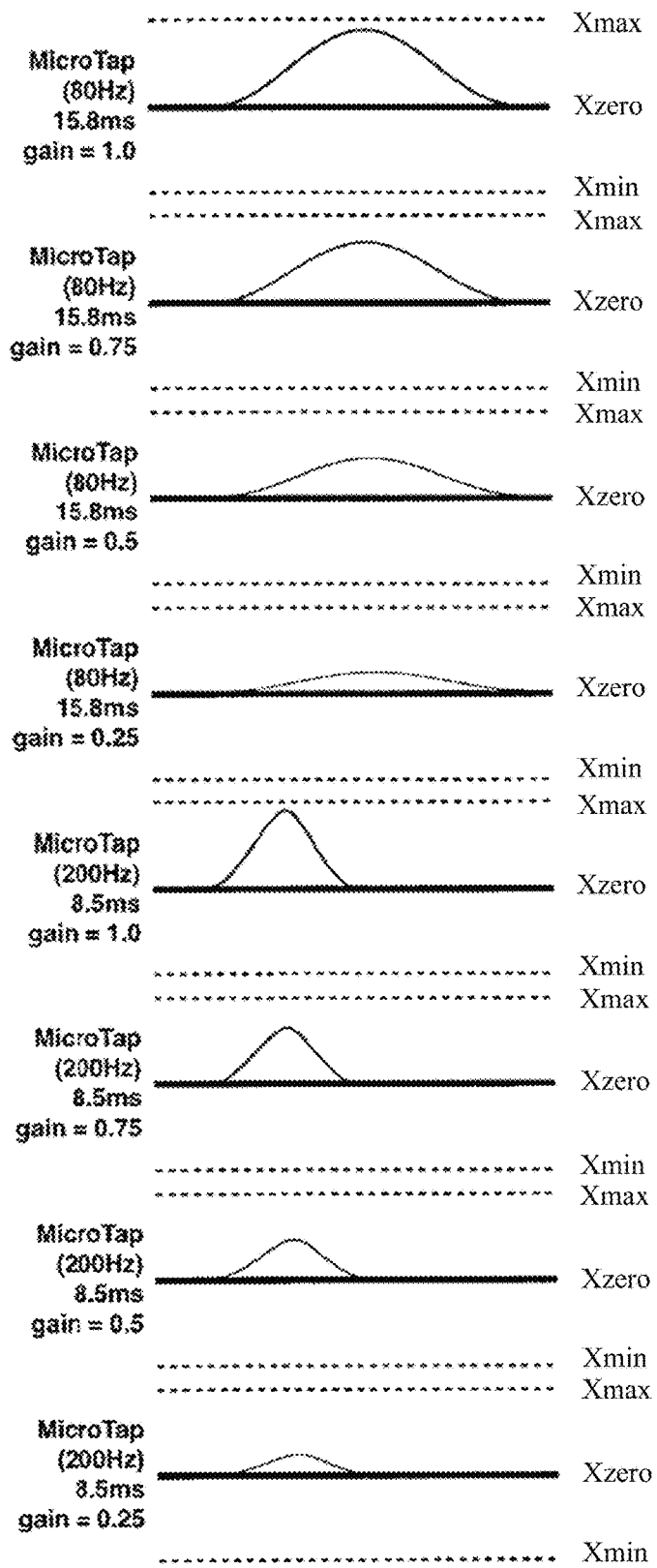
Figure 4G4

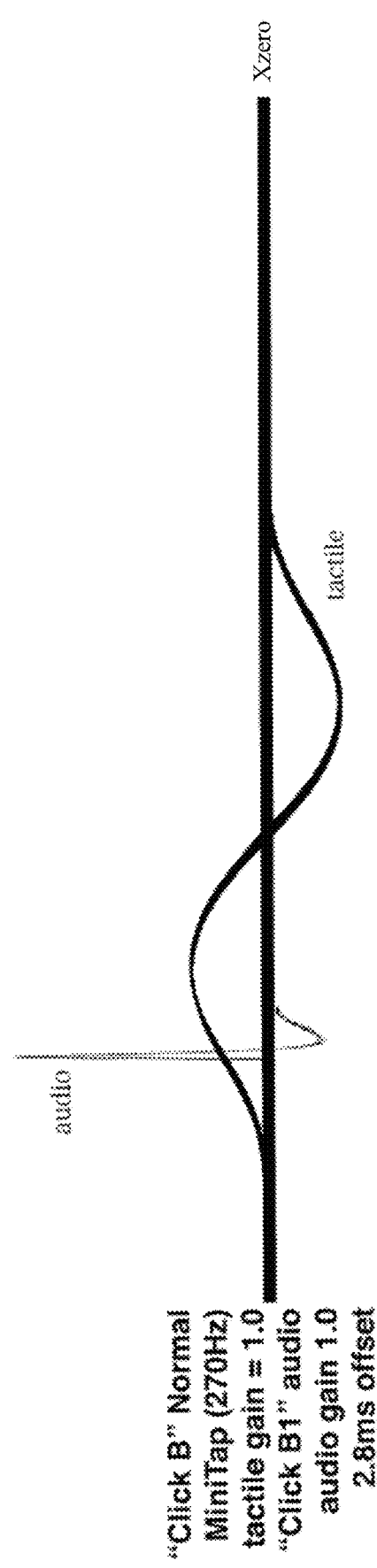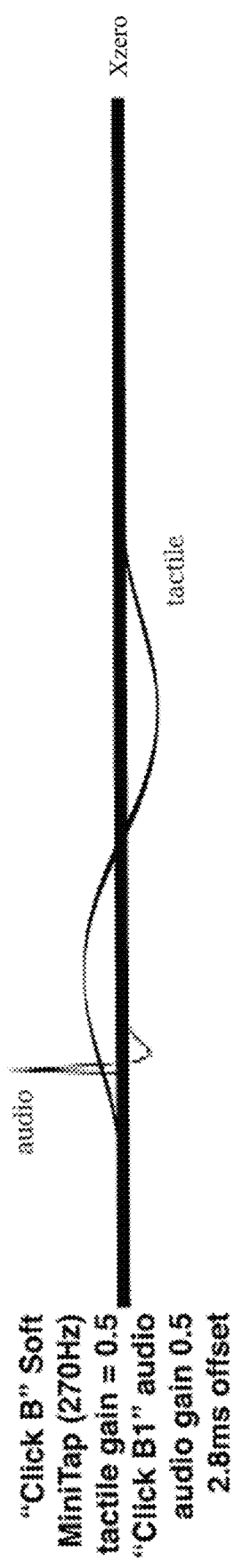
Figure 4N

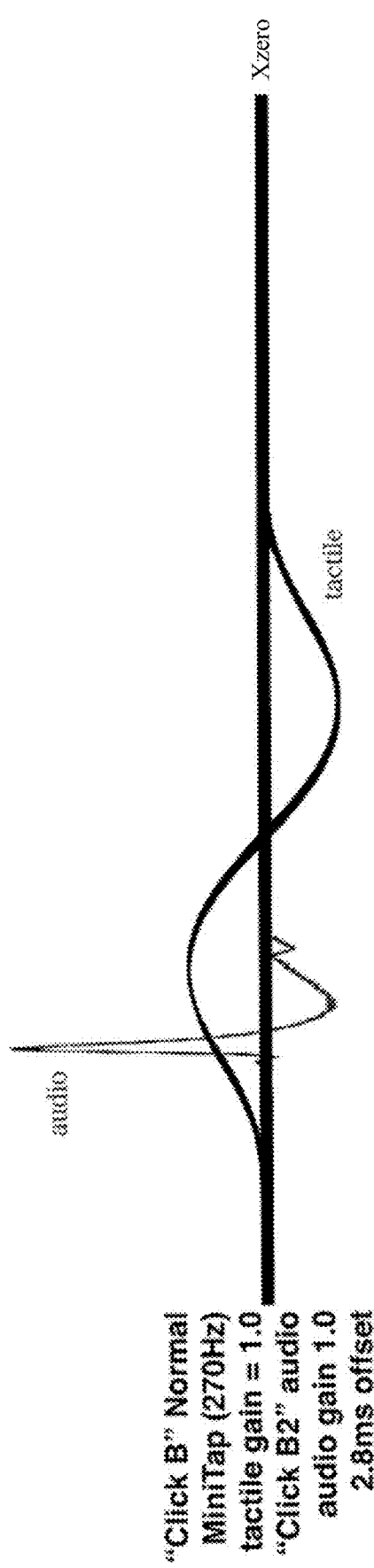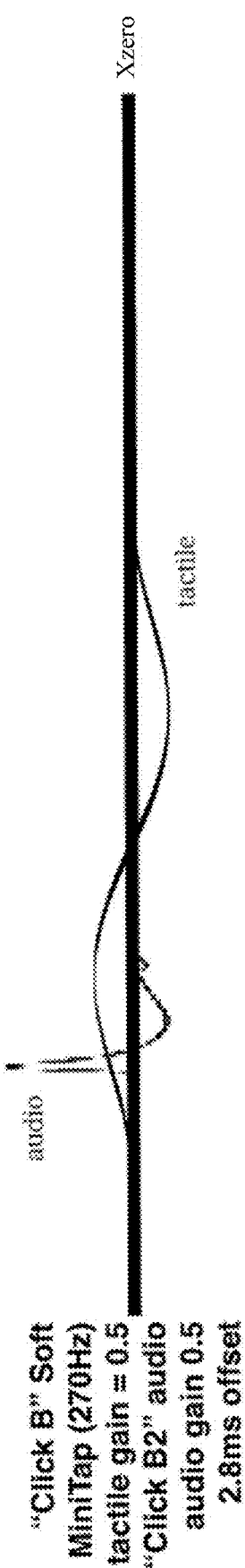
Figure 4O

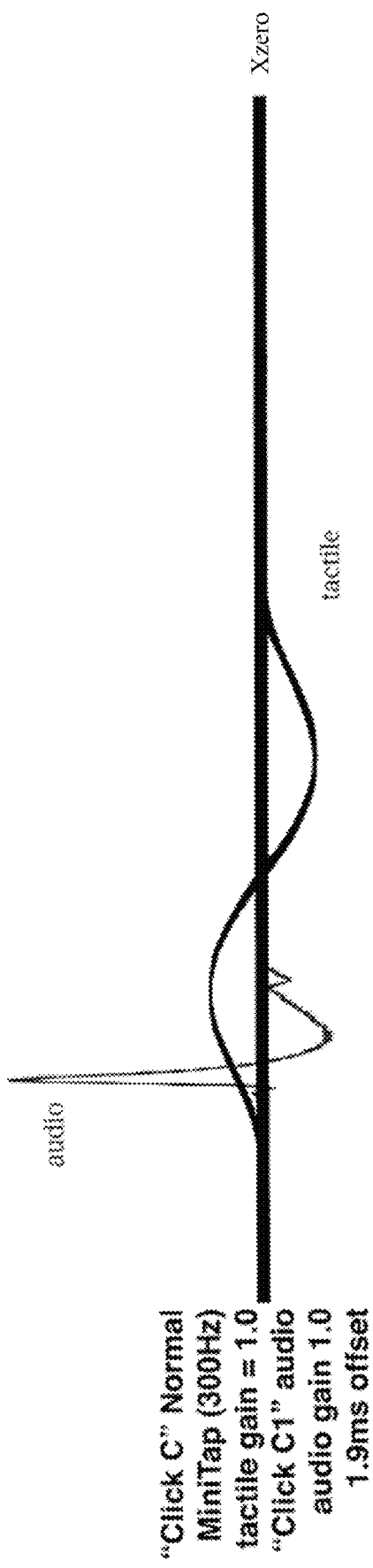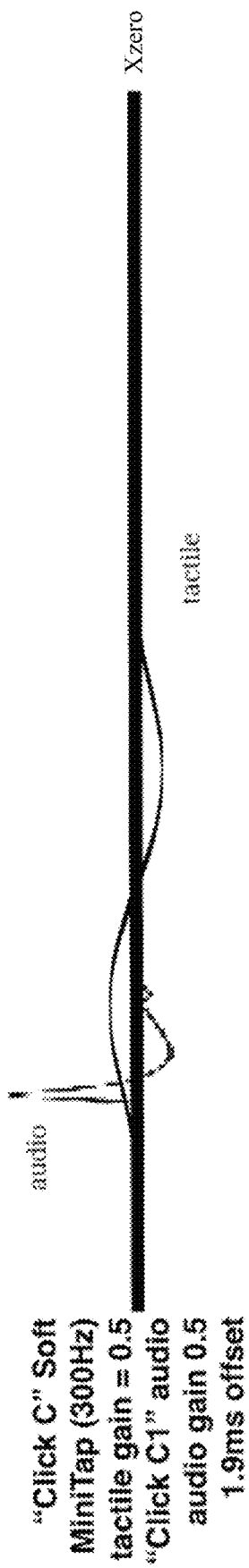
Figure 4P

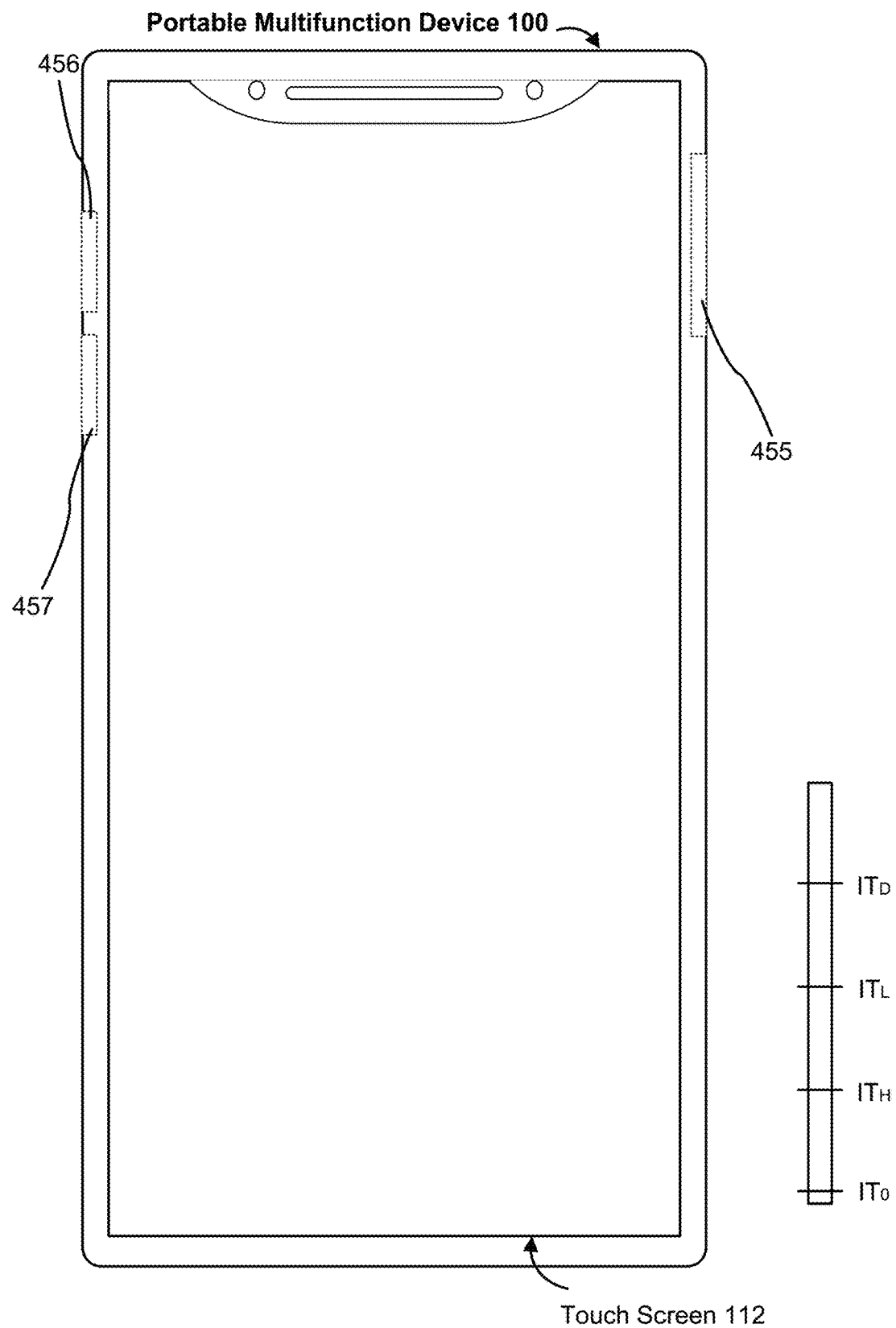
Figure 5A1

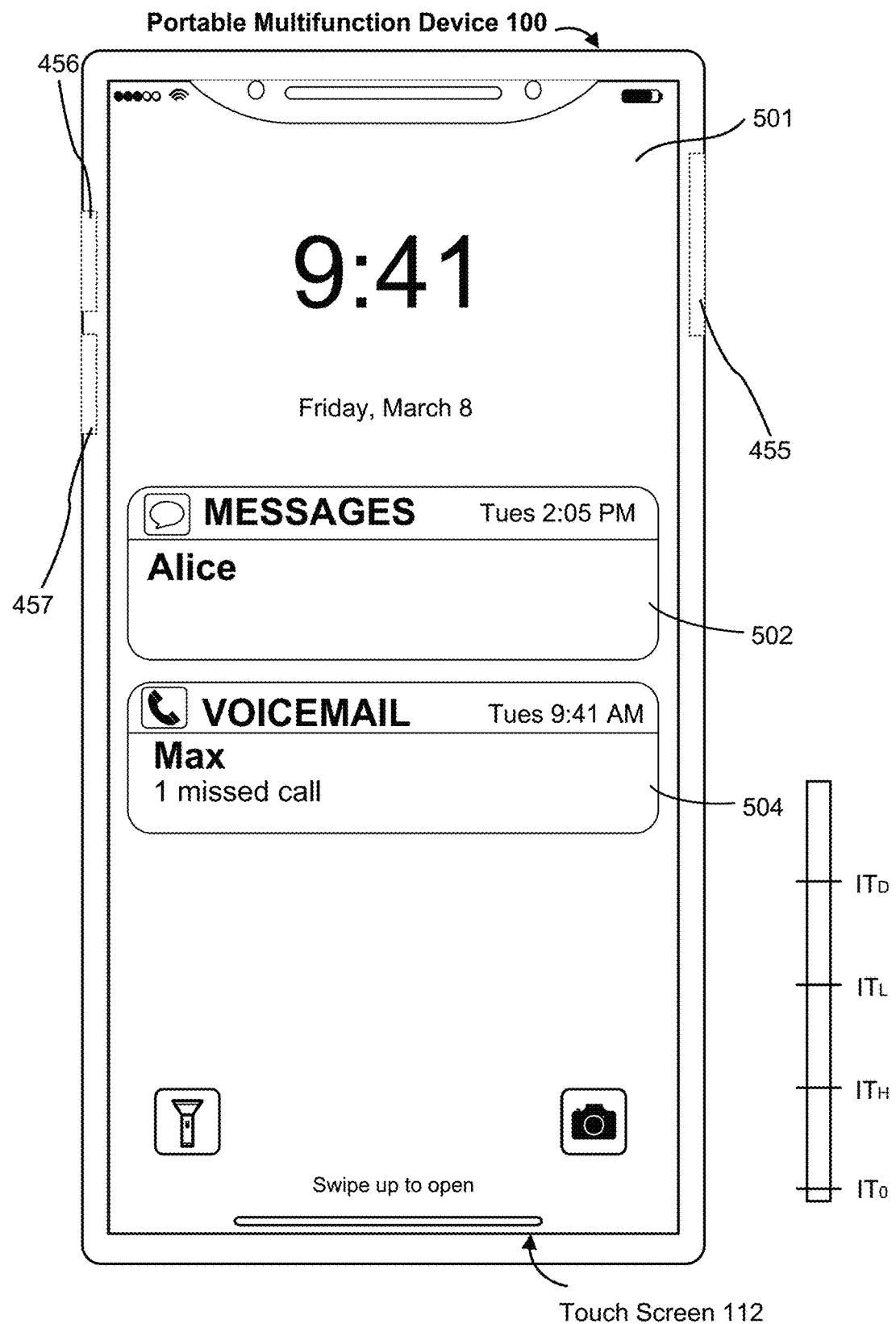
Figure 5A2

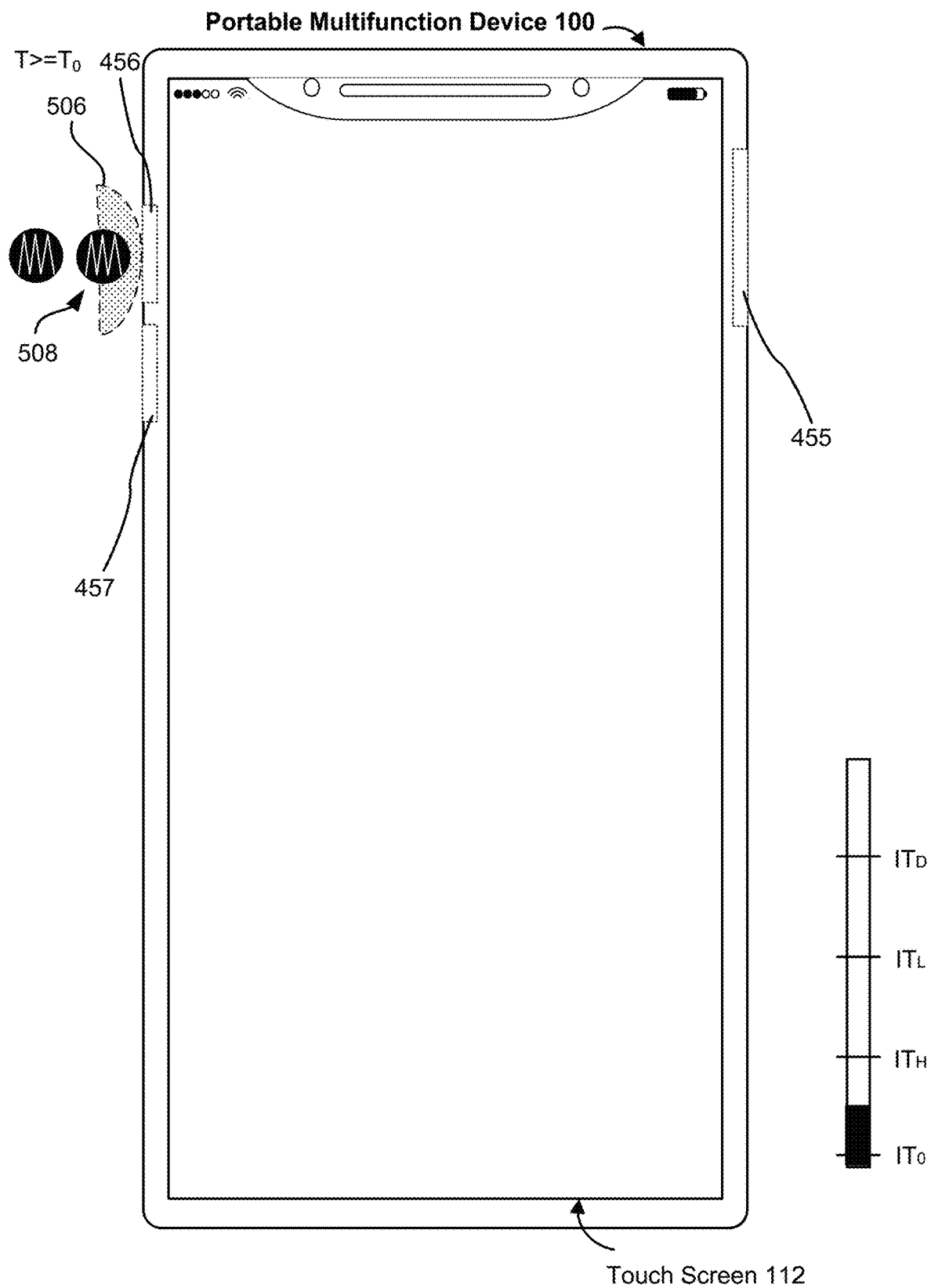
Figure 5A3

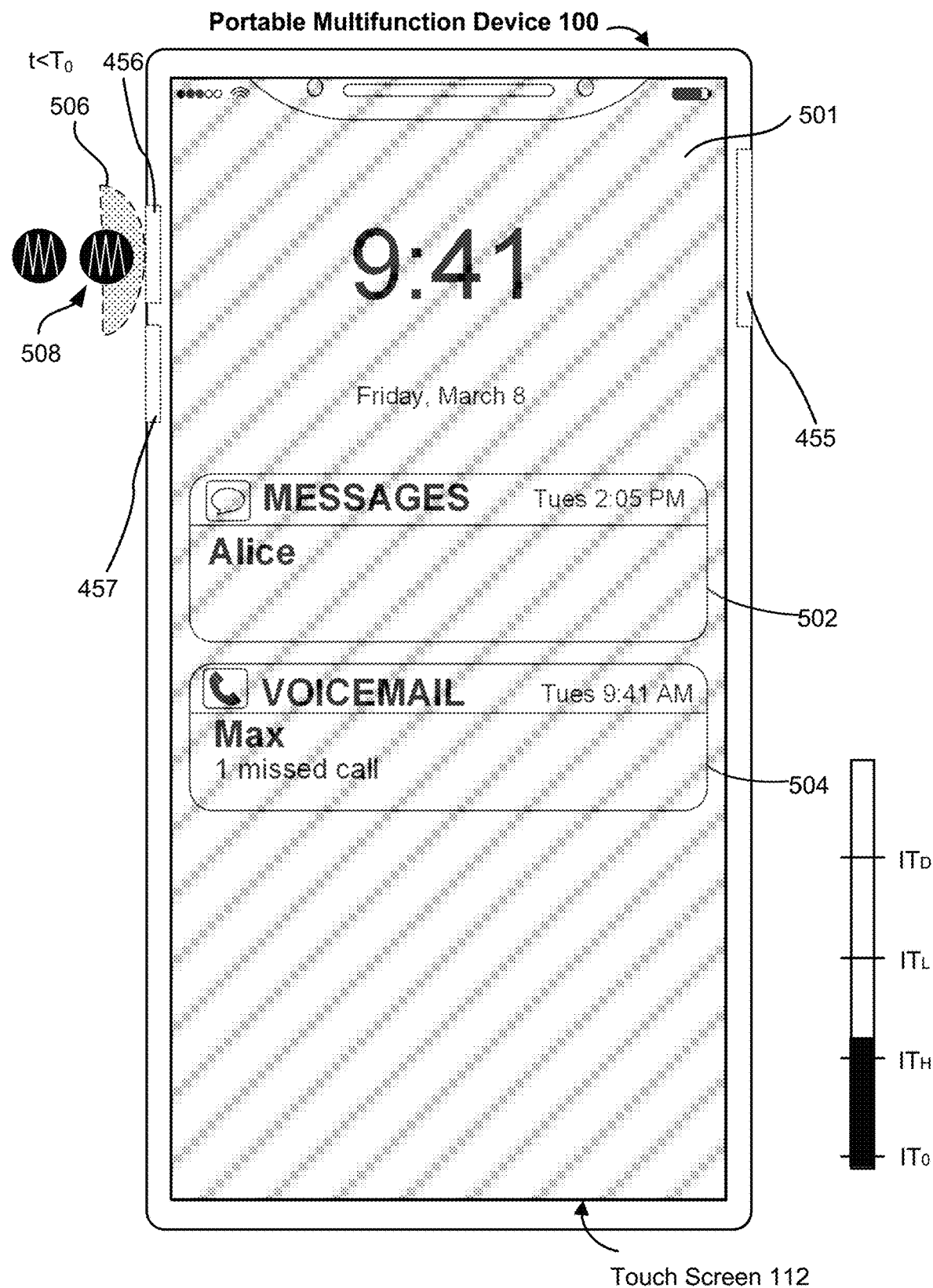
Figure 5A4

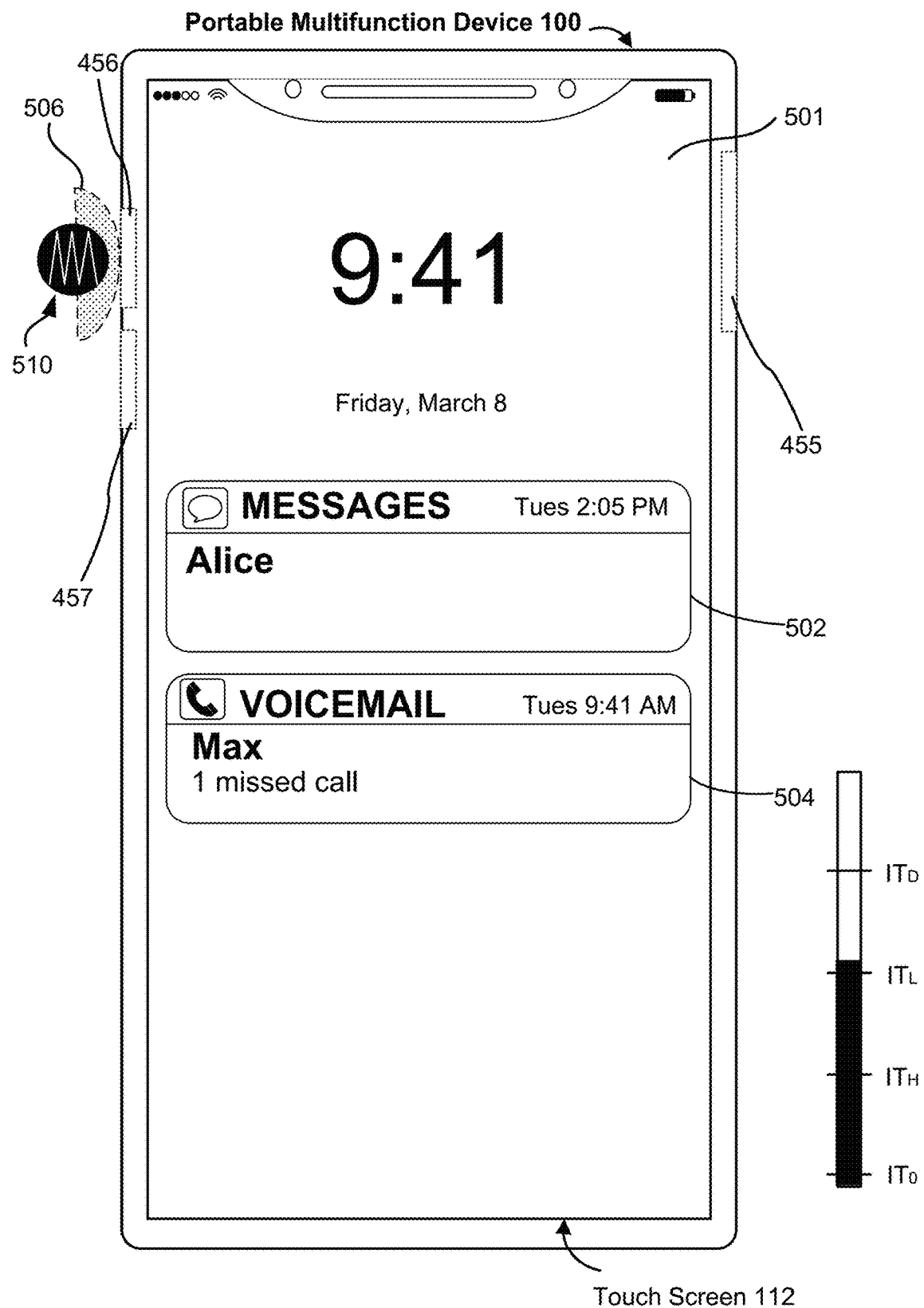
Figure 5A5

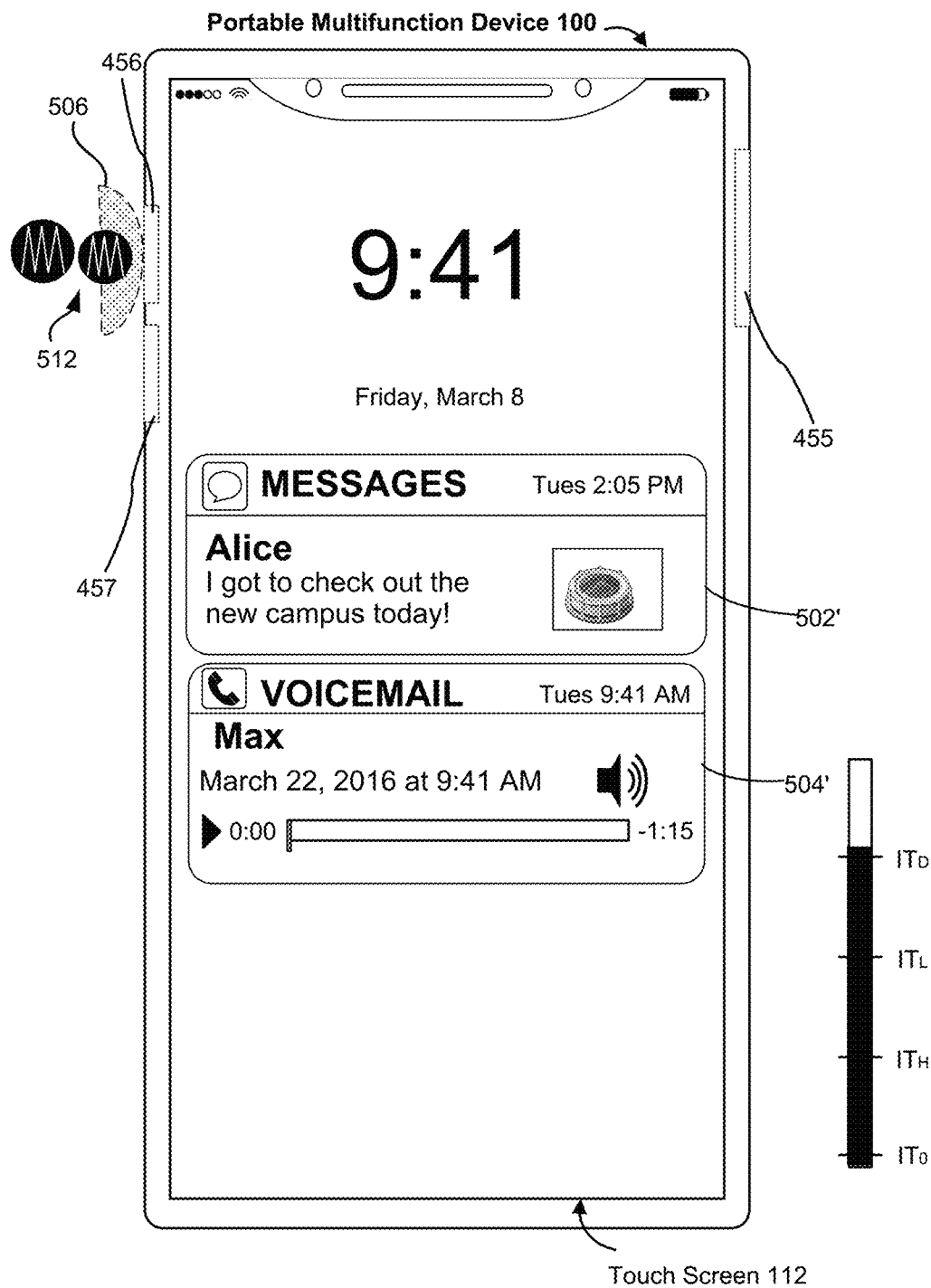
Figure 5A6

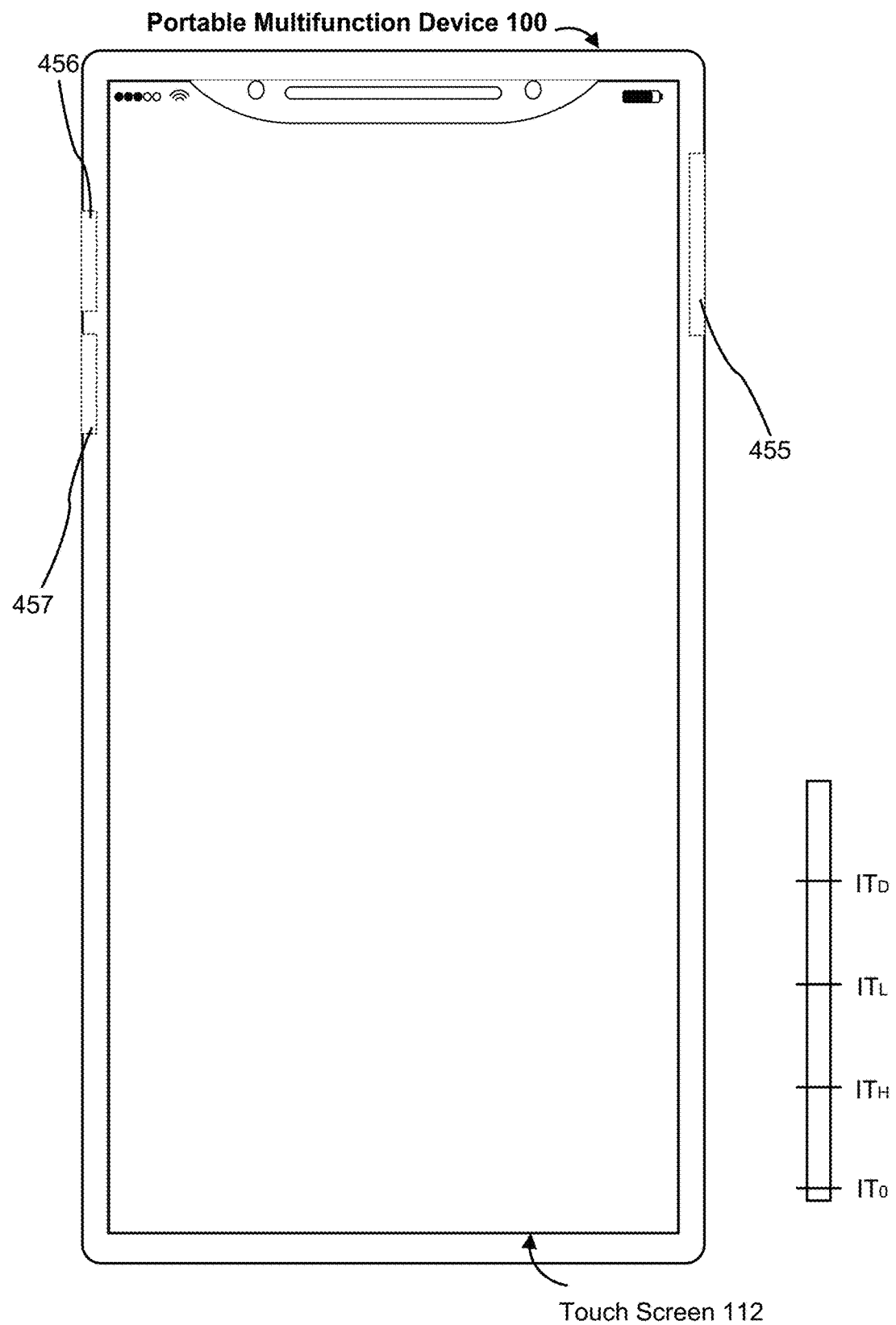
Figure 5A7

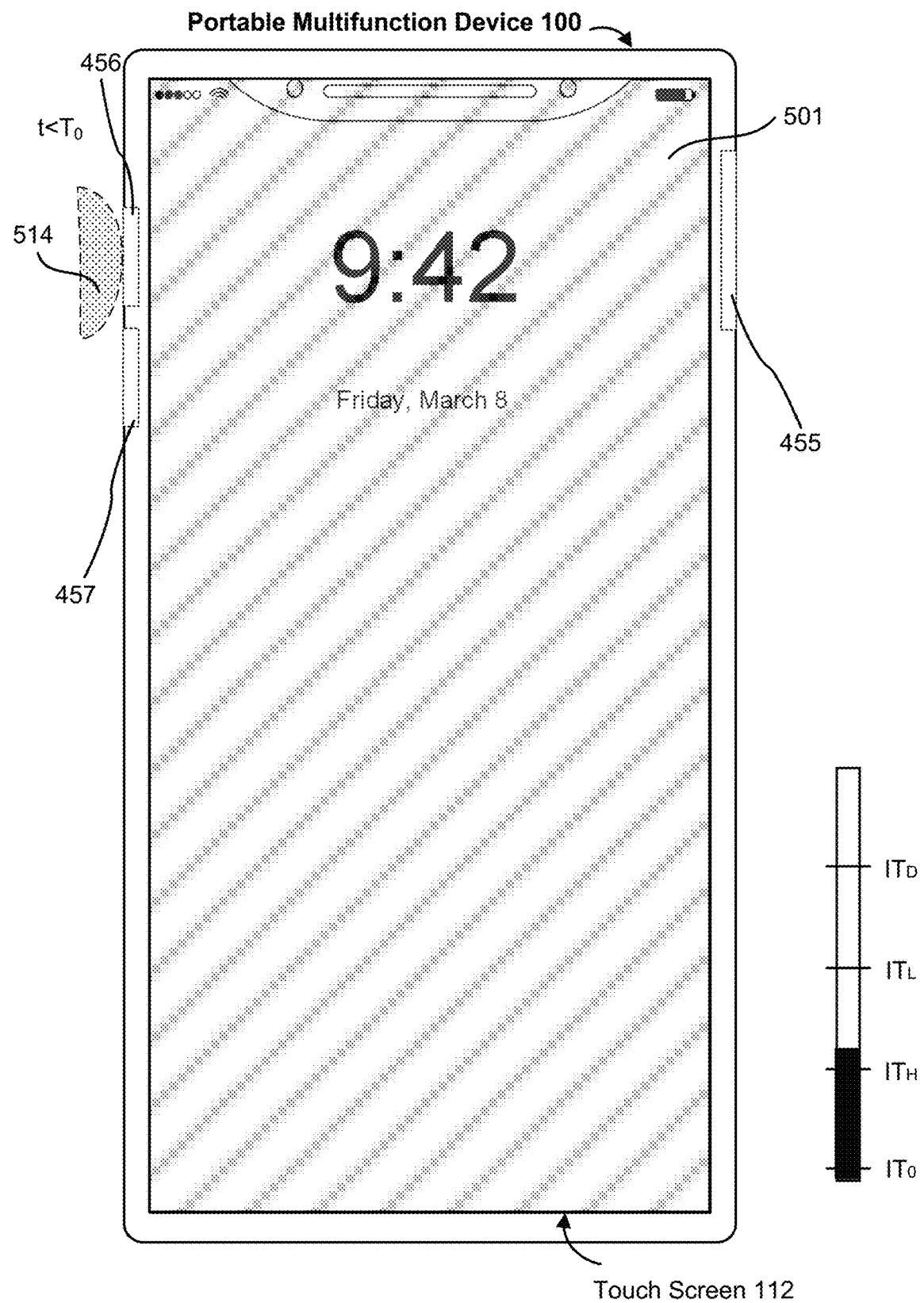
Figure 5A8

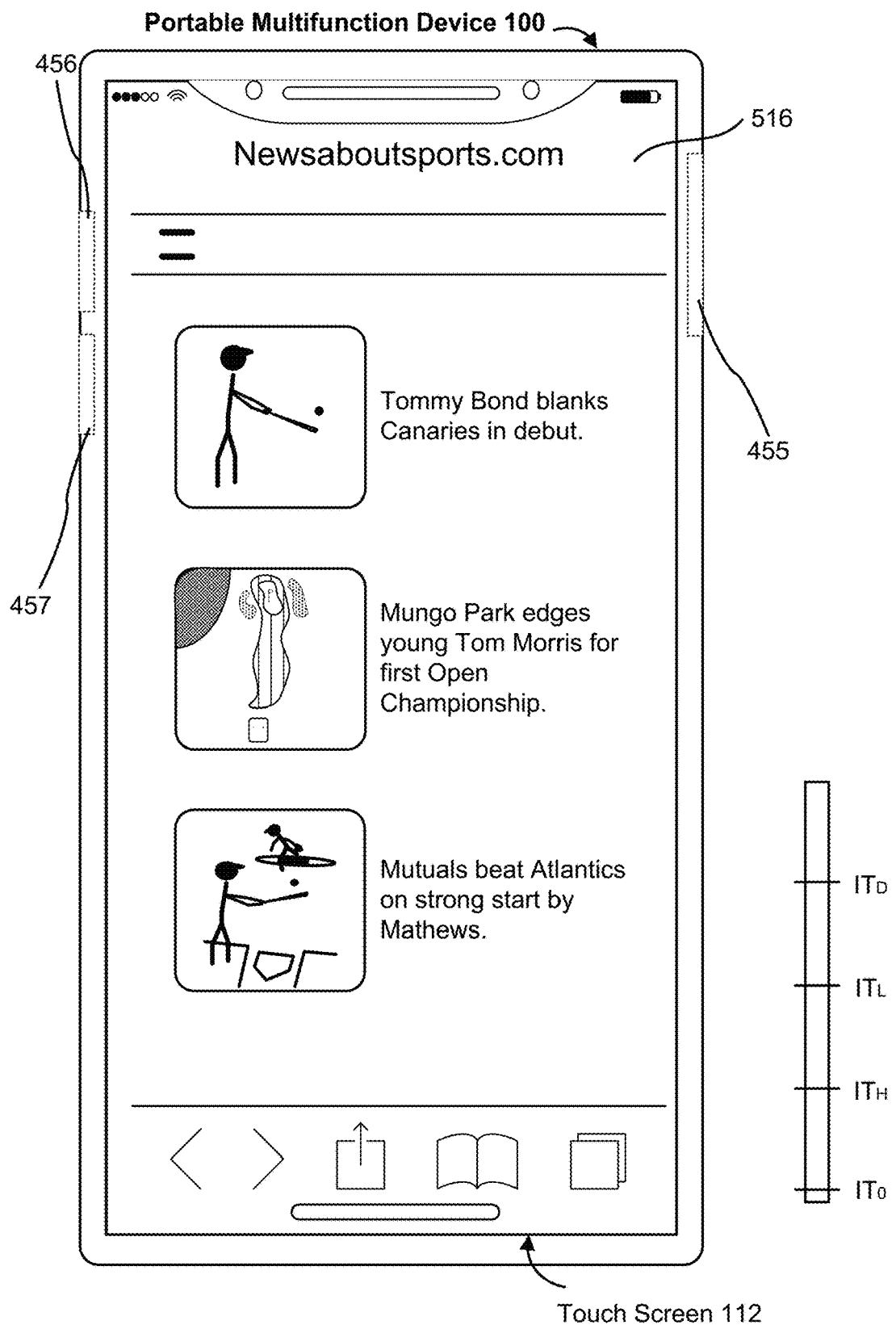
Figure 5B1

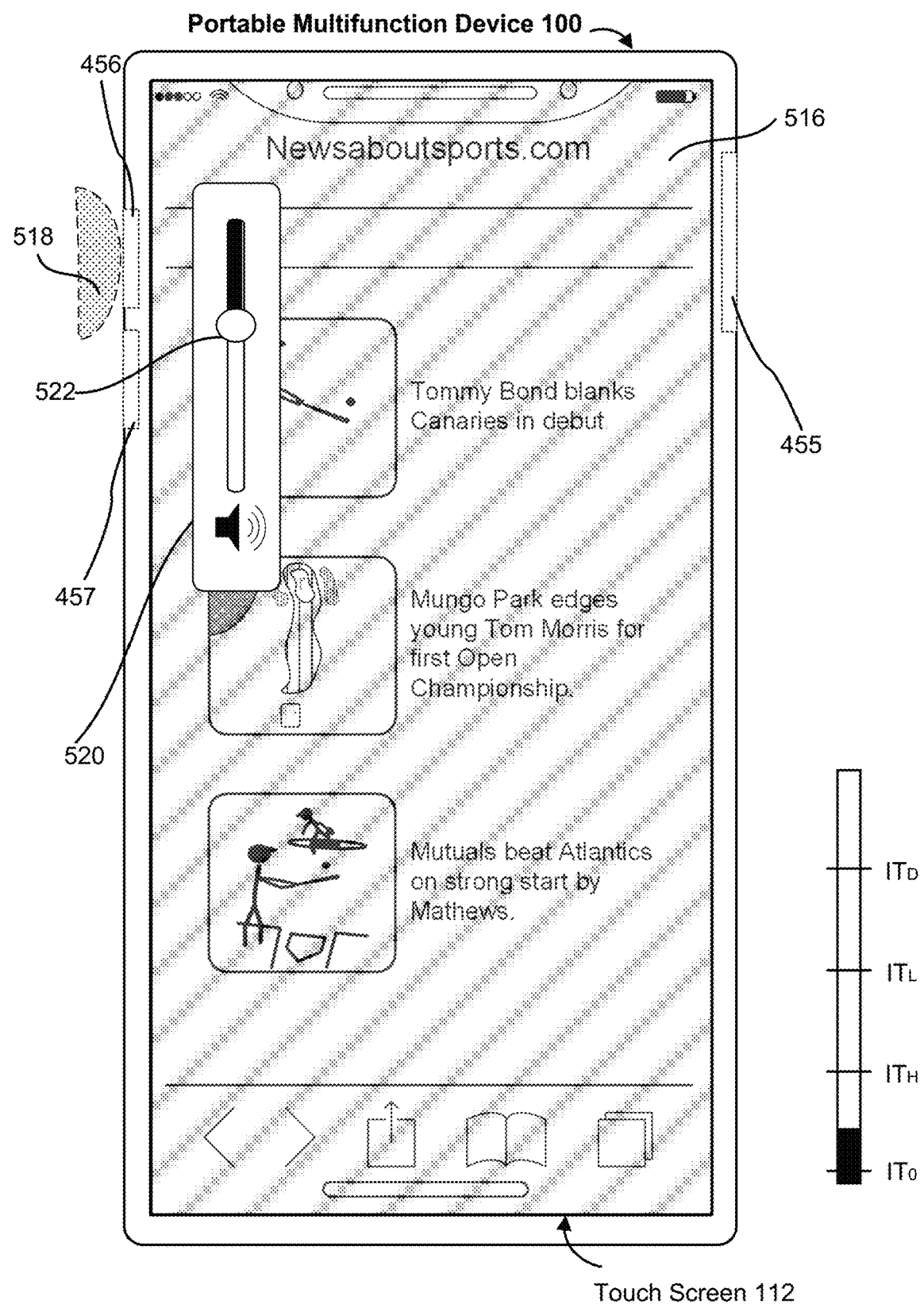
Figure 5B2

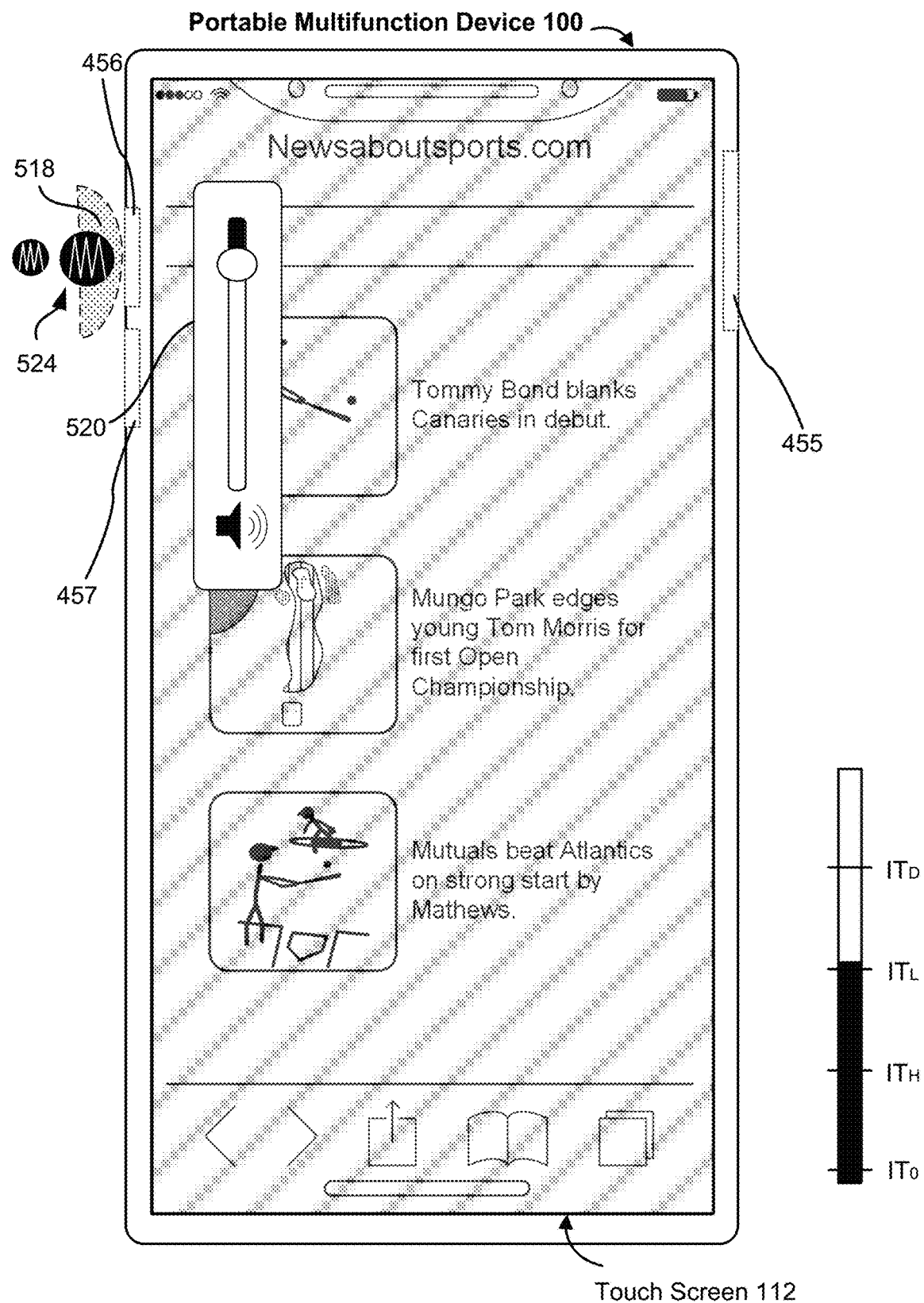
Figure 5B3

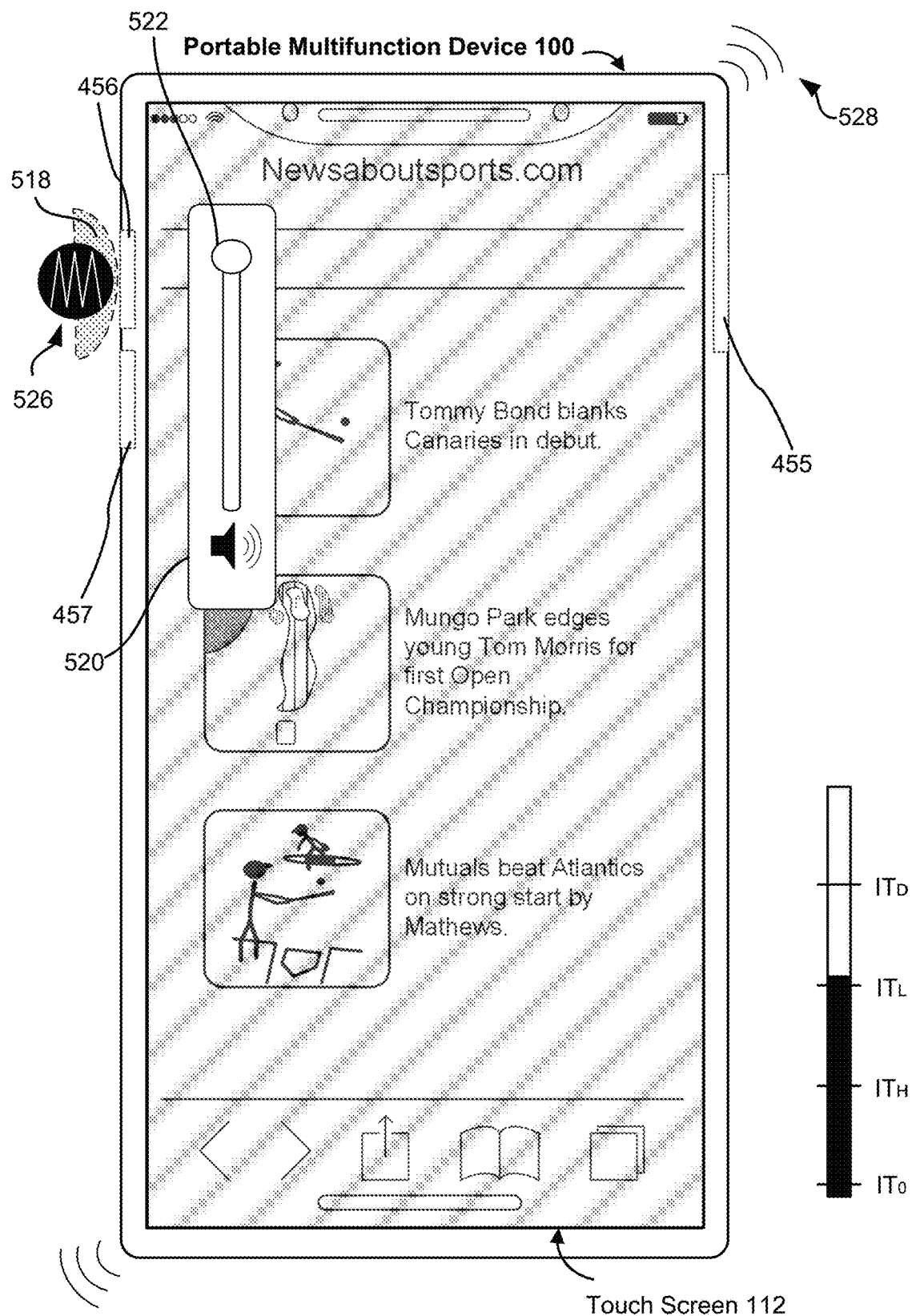
Figure 5B4

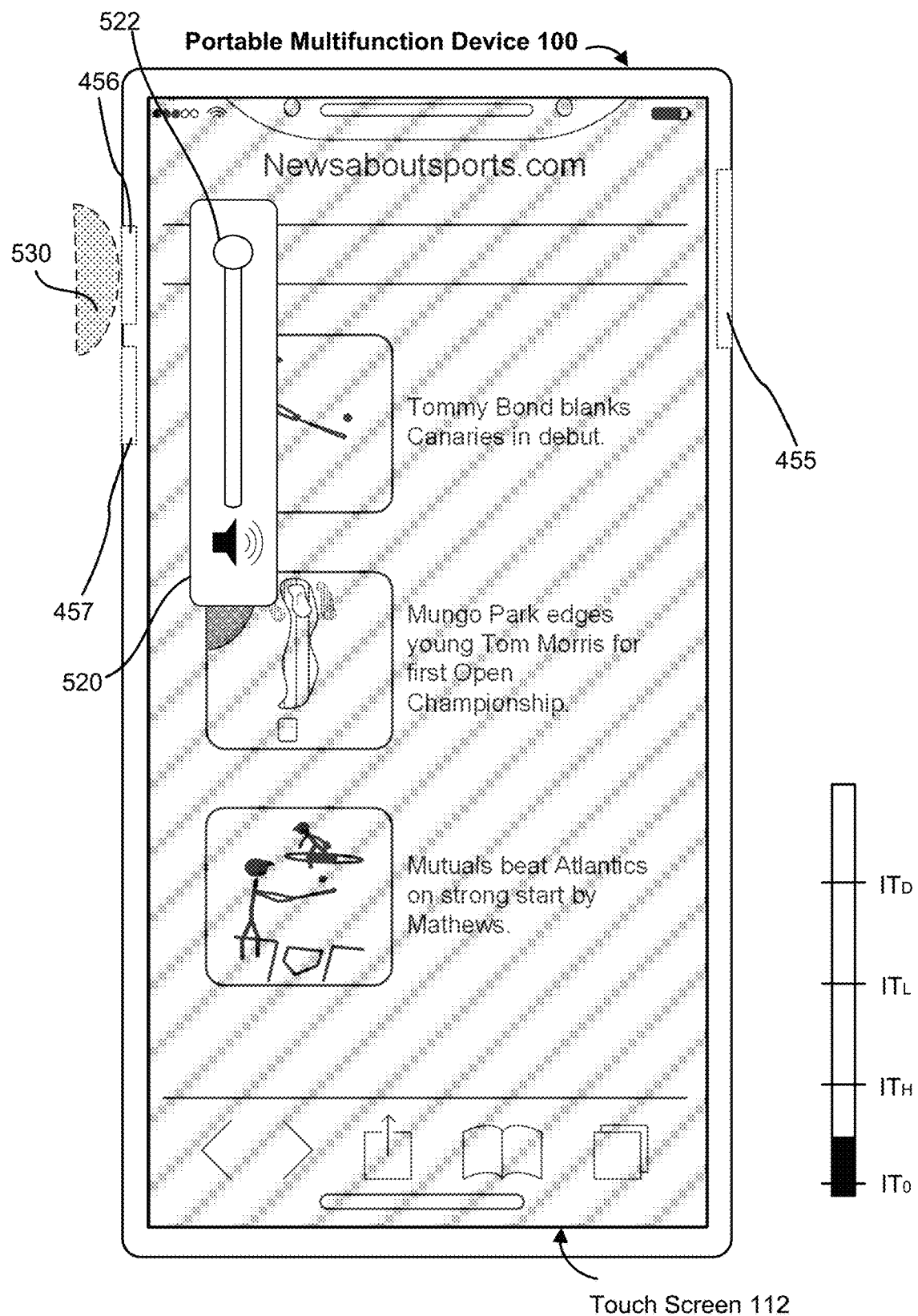
Figure 5B5

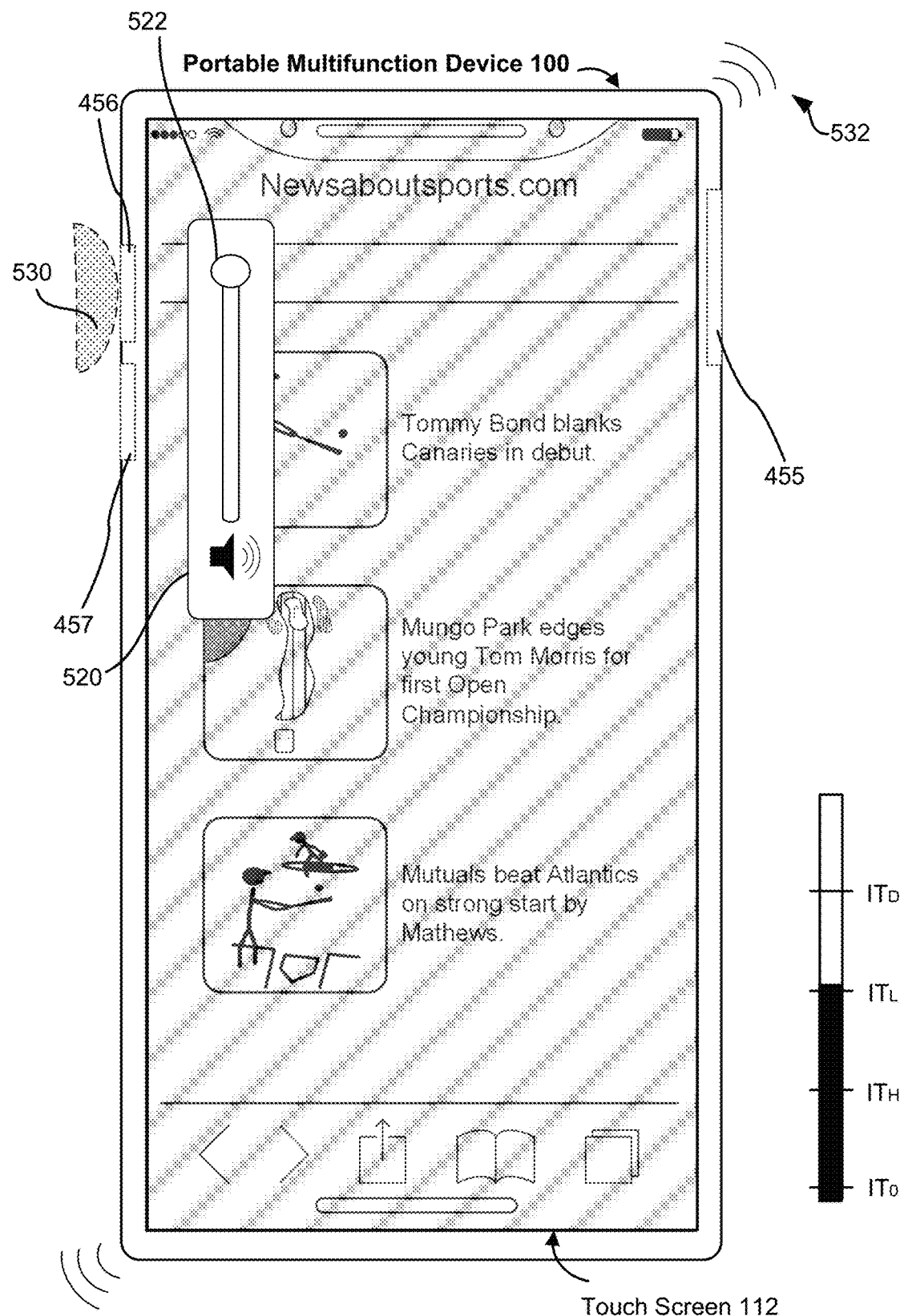
Figure 5B6

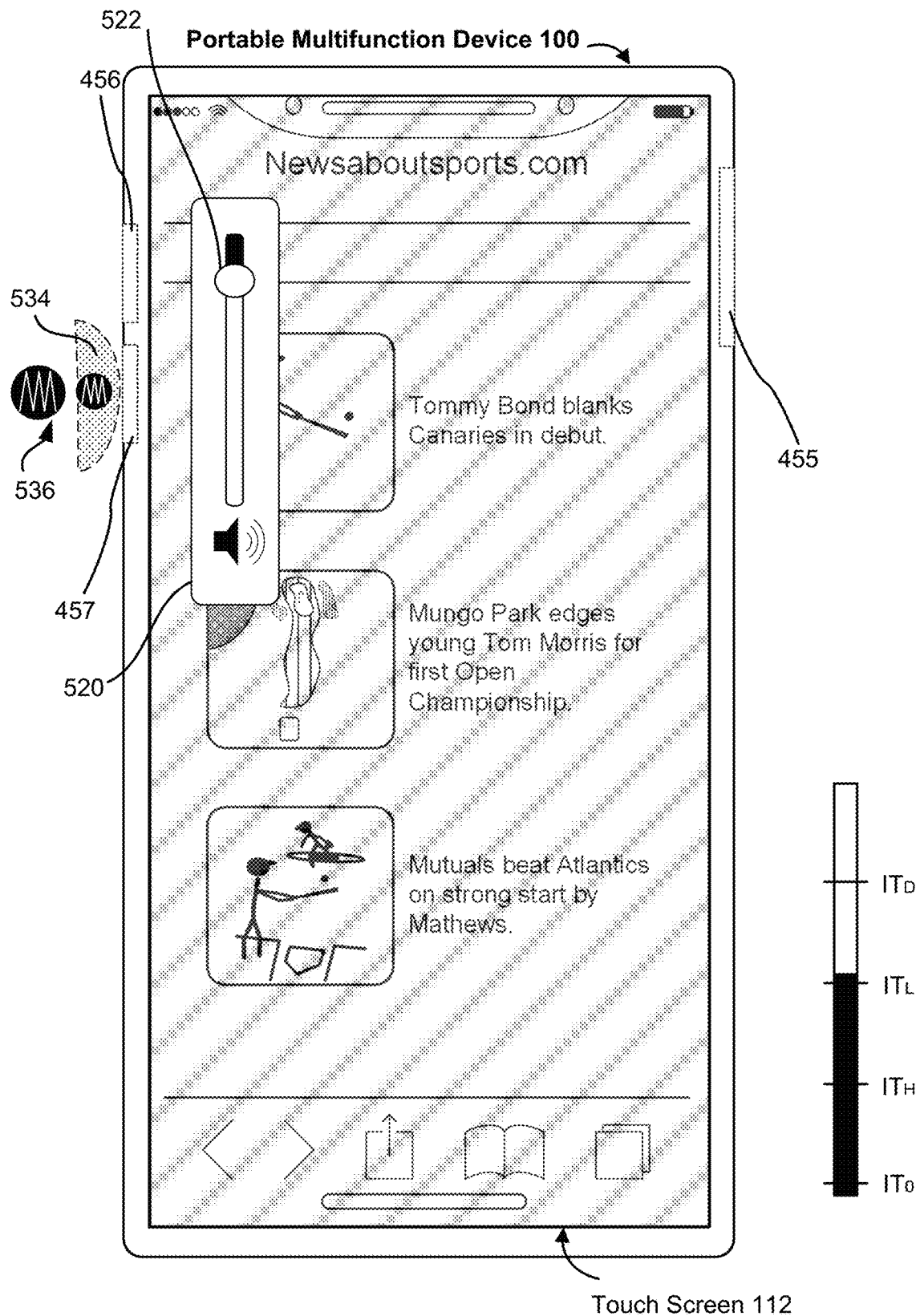
Figure 5B7

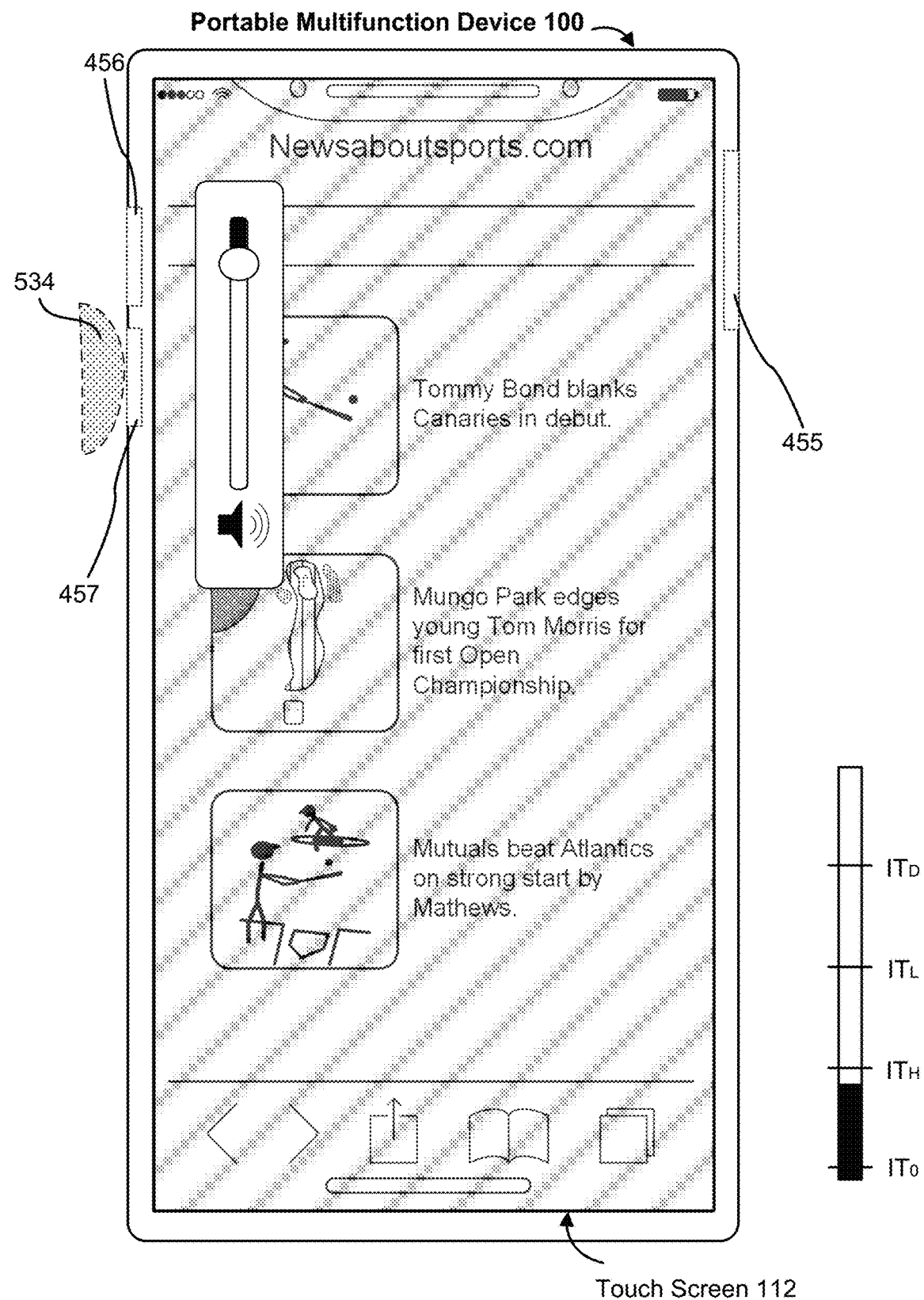
Figure 5B8

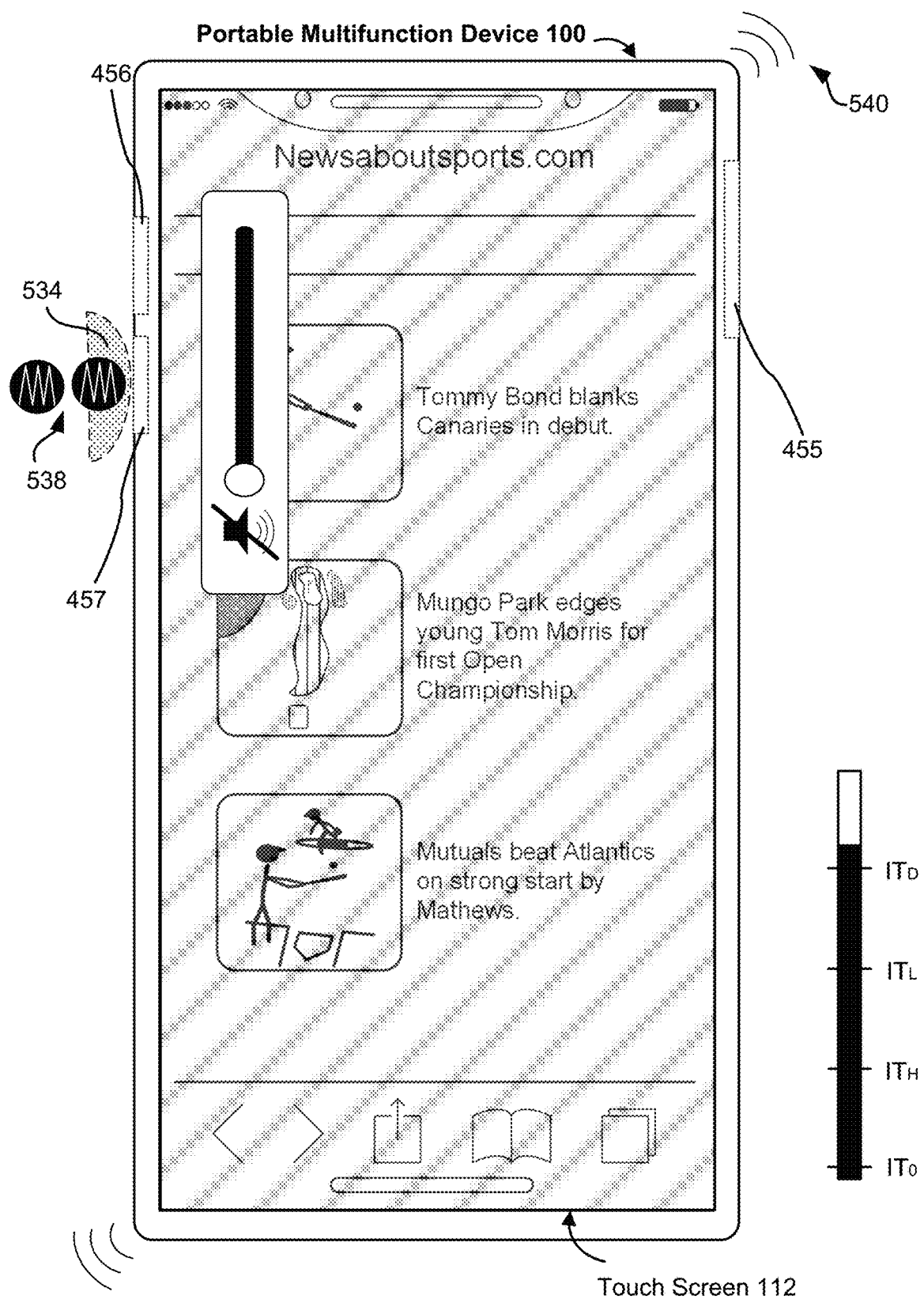
Figure 5B9

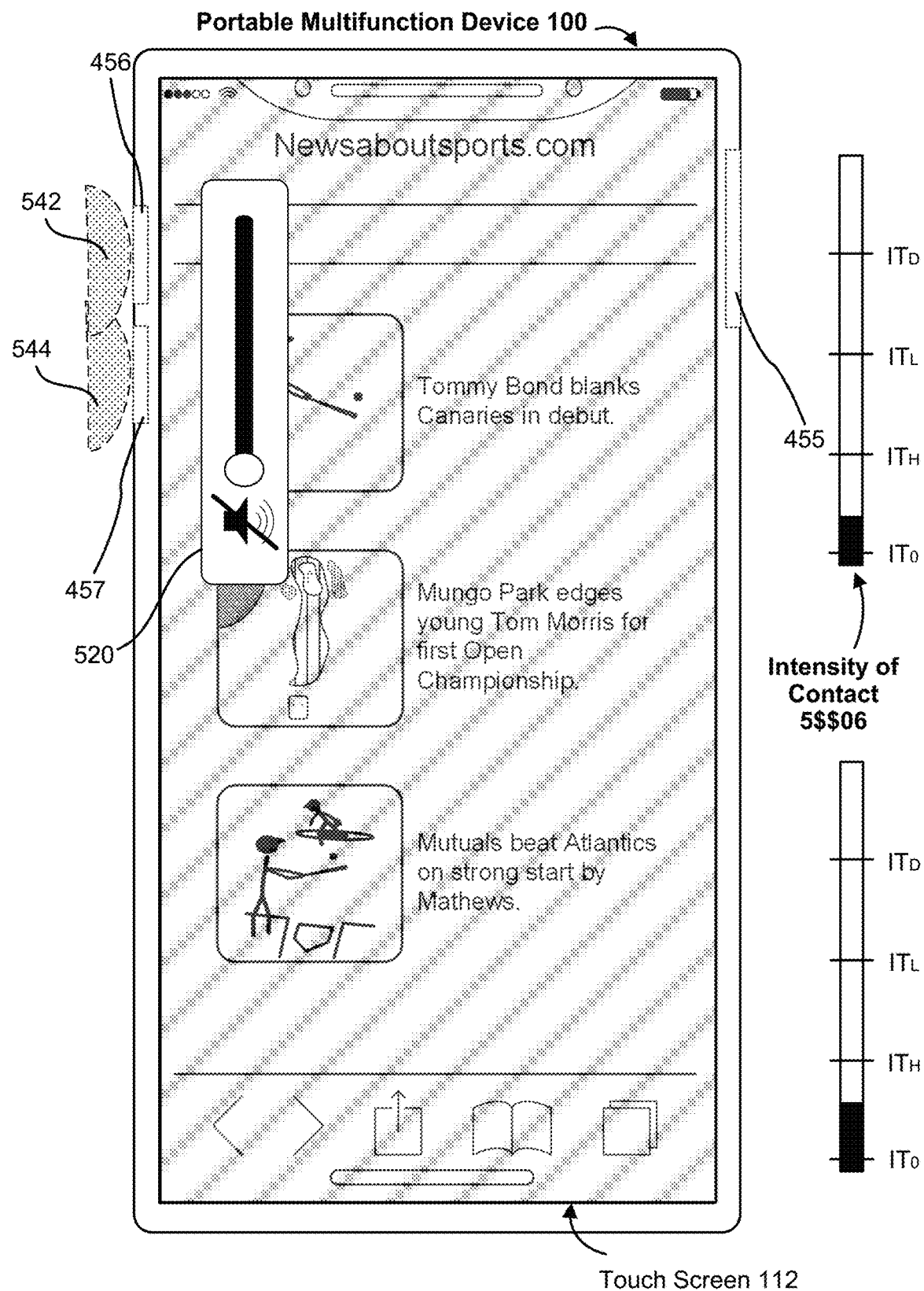
Figure 5B10

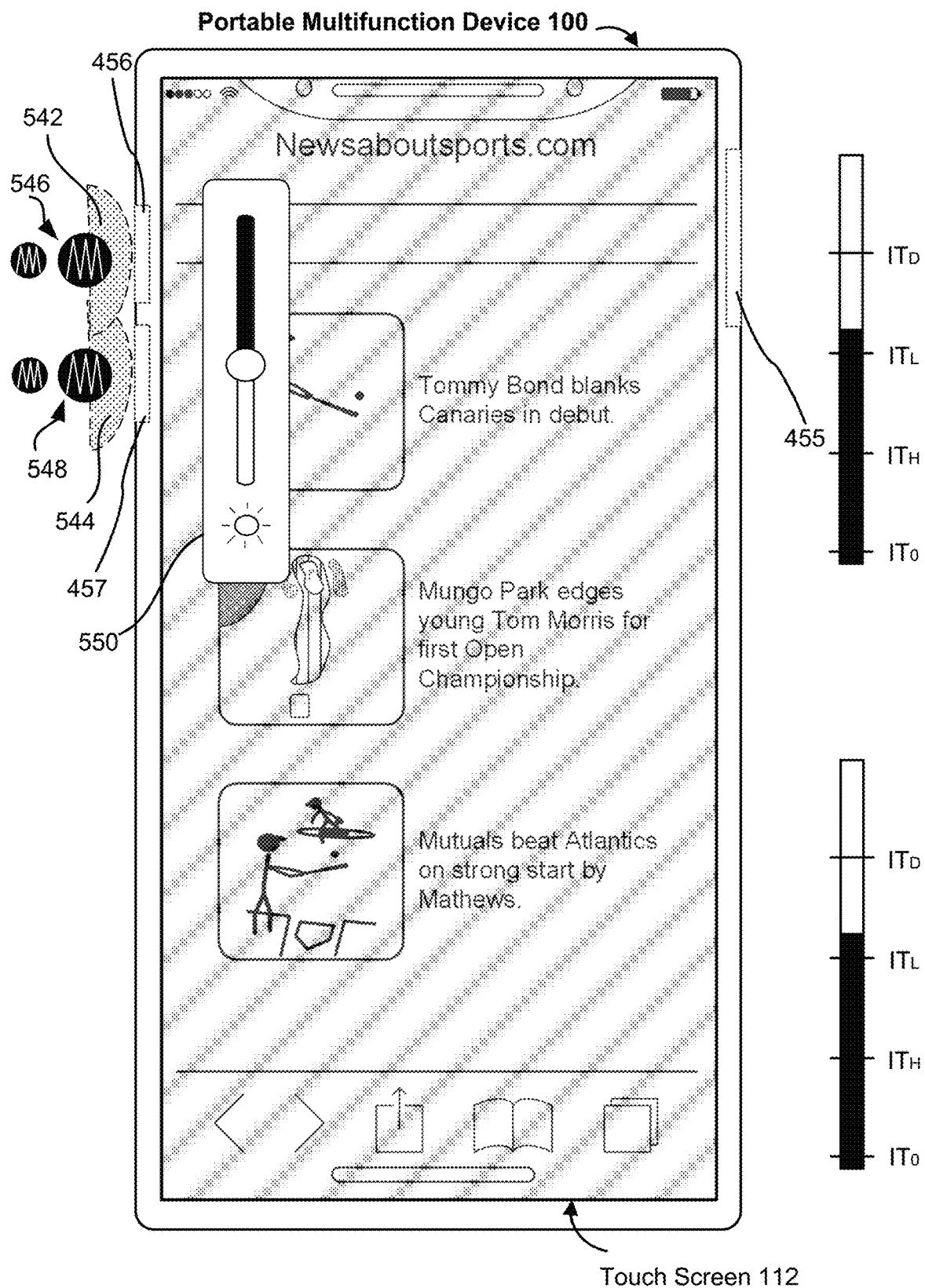
Figure 5B11

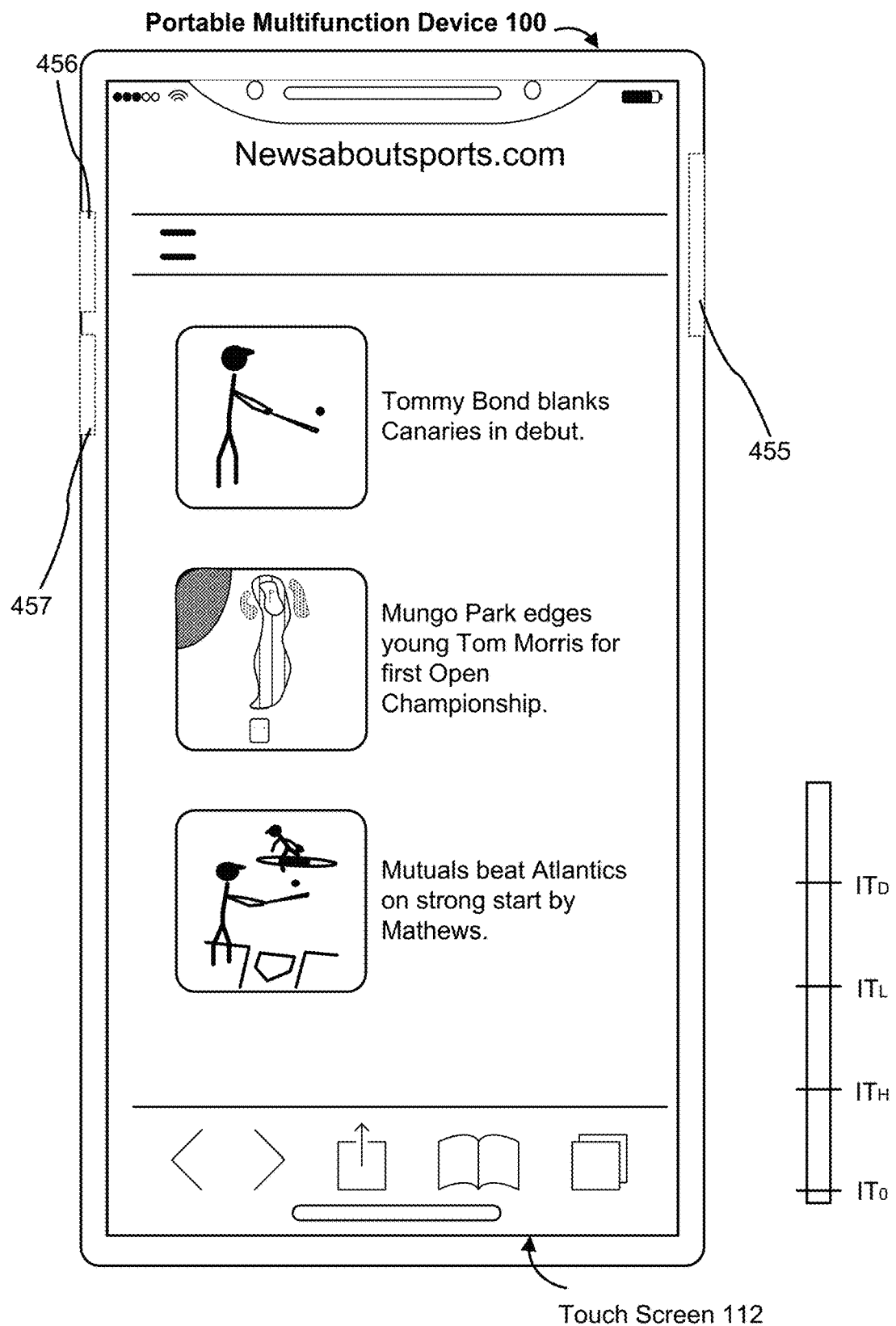
Figure 5C1

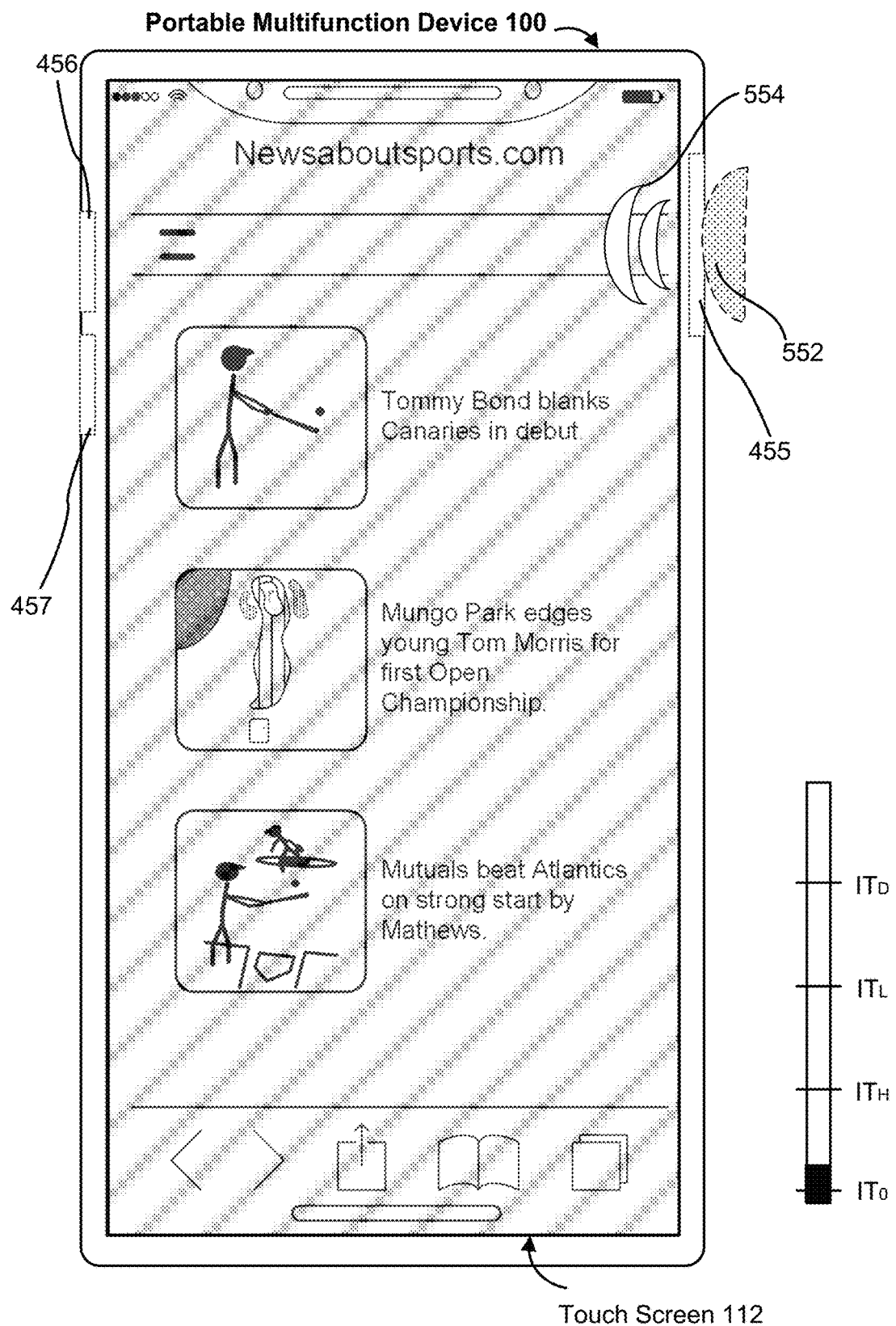
Figure 5C2

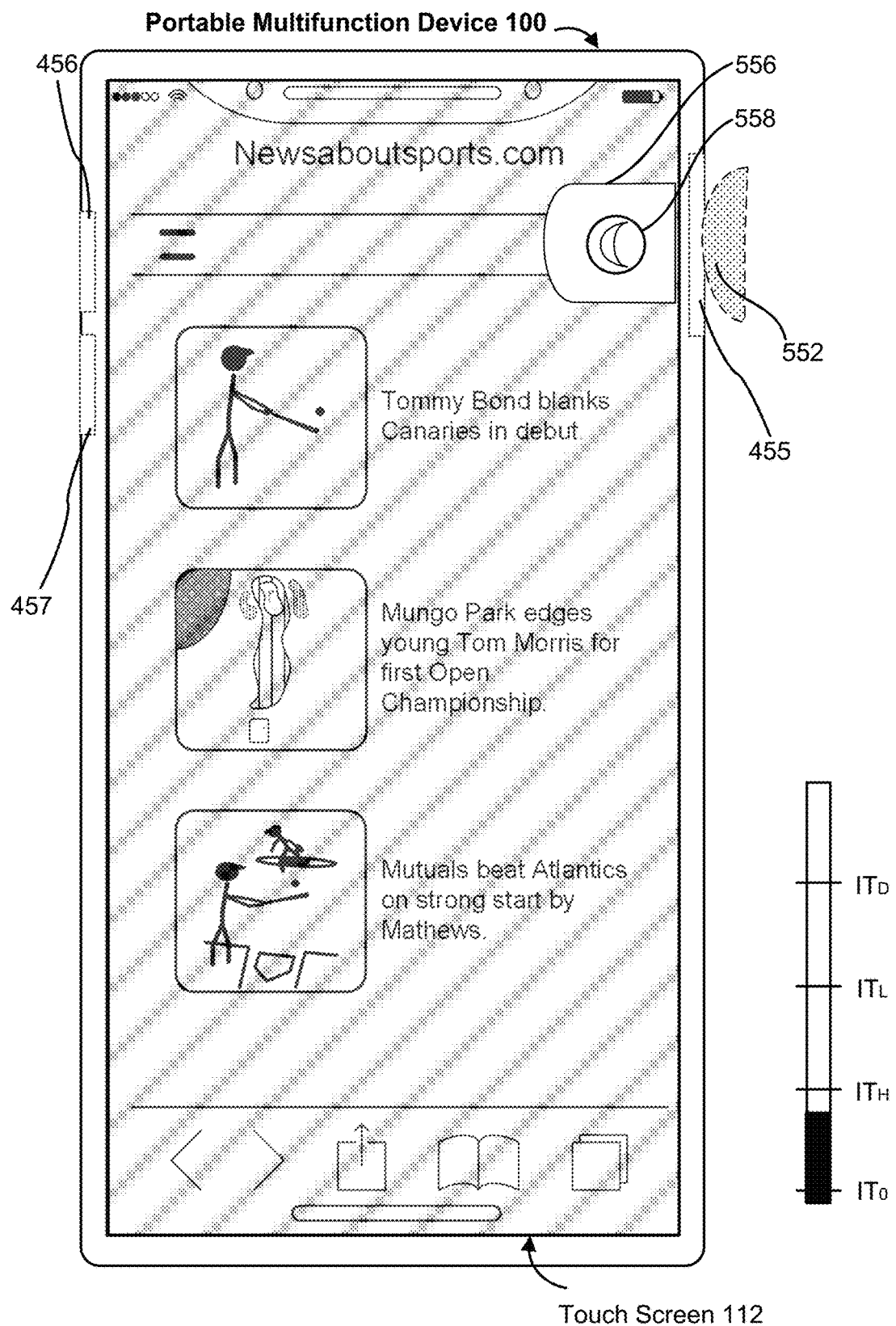
Figure 5C3

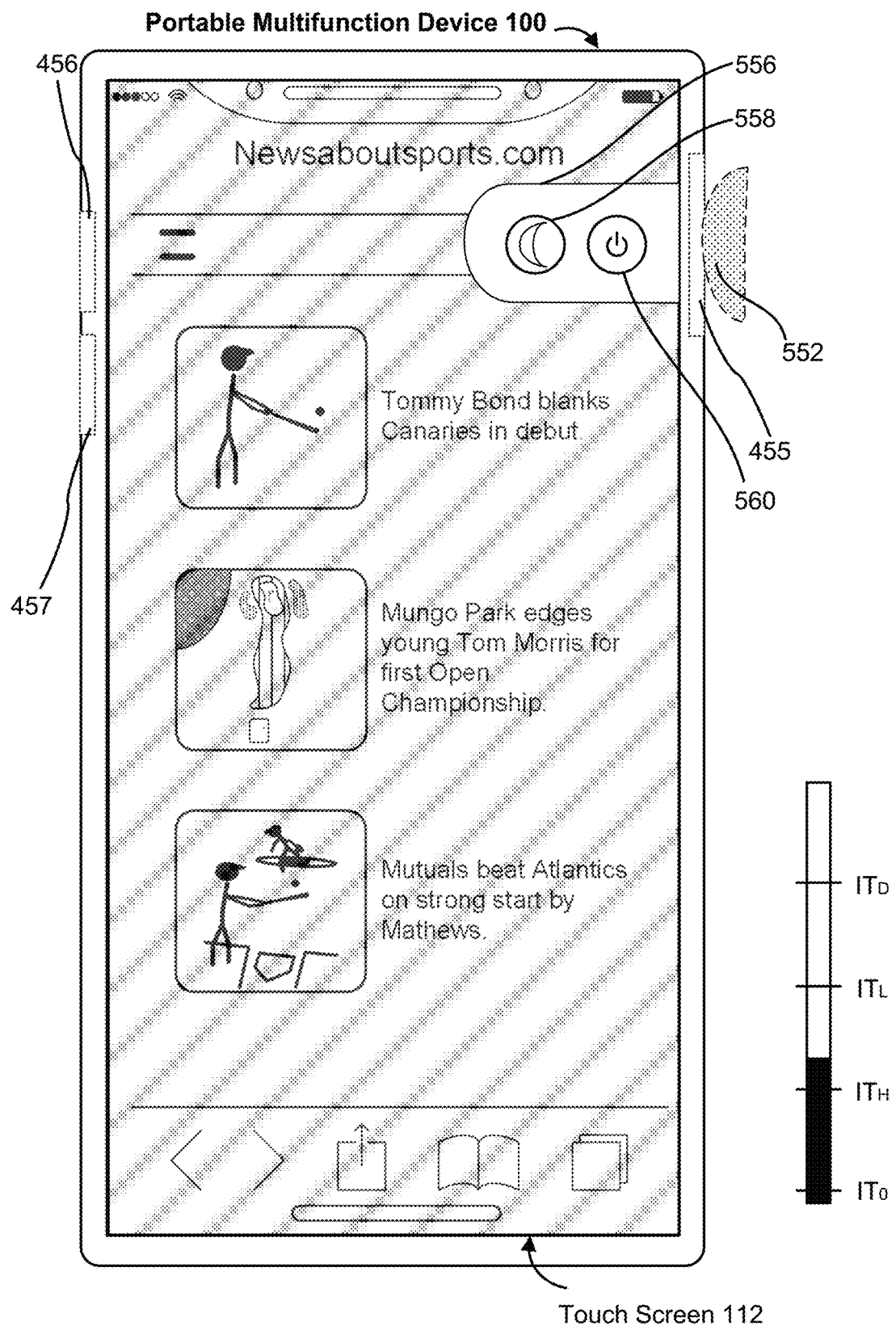
Figure 5C4

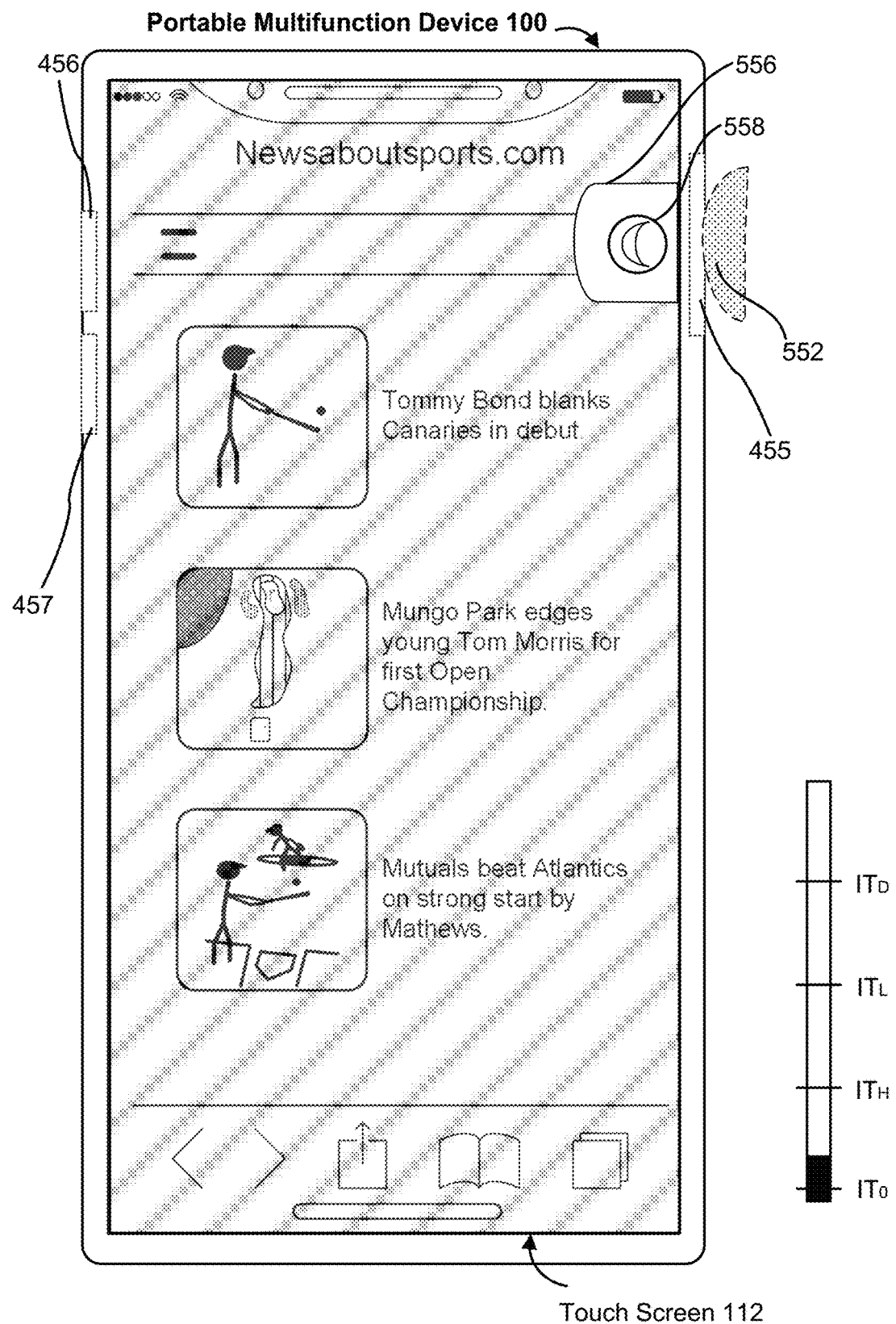
Figure 5C5

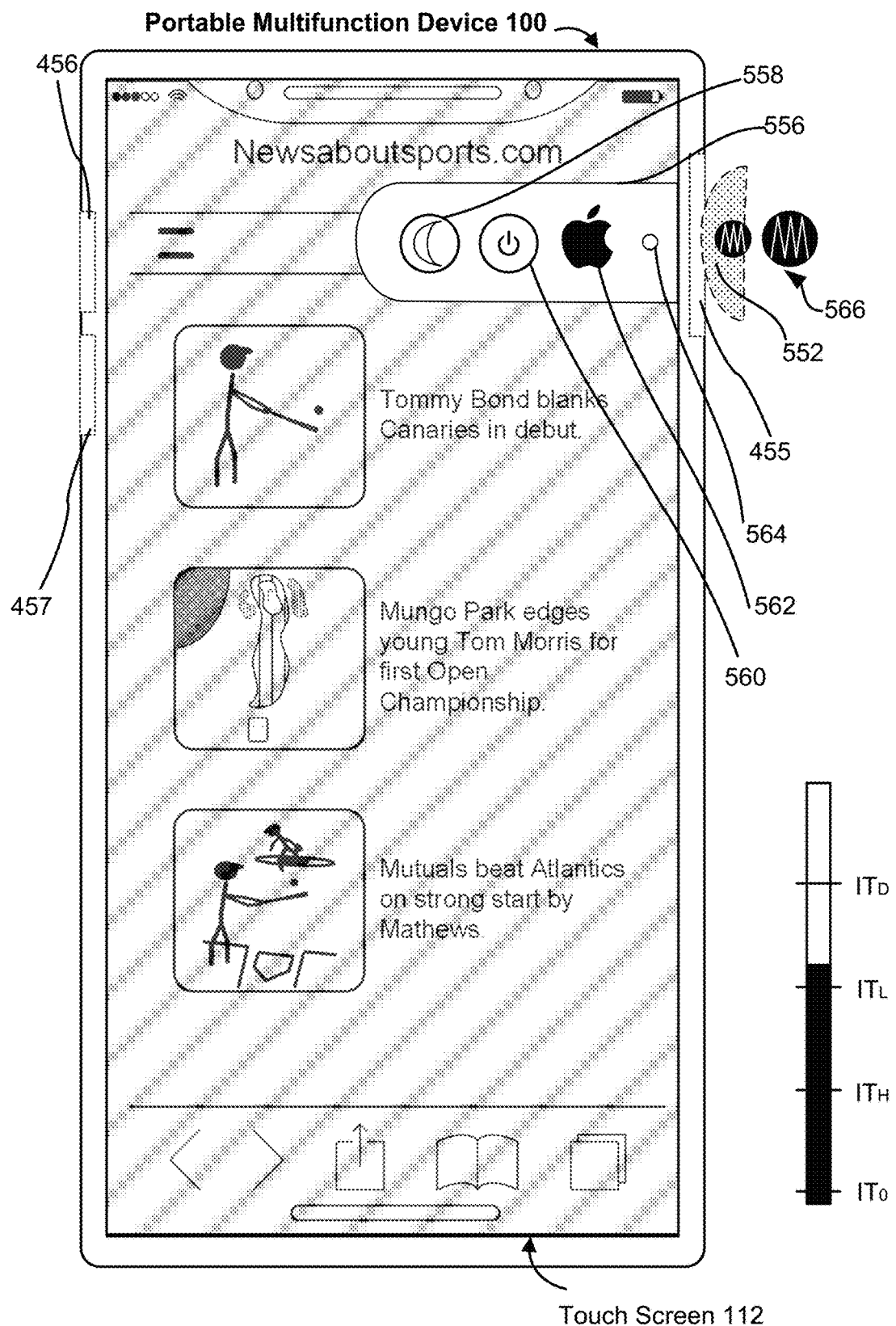
Figure 5C6

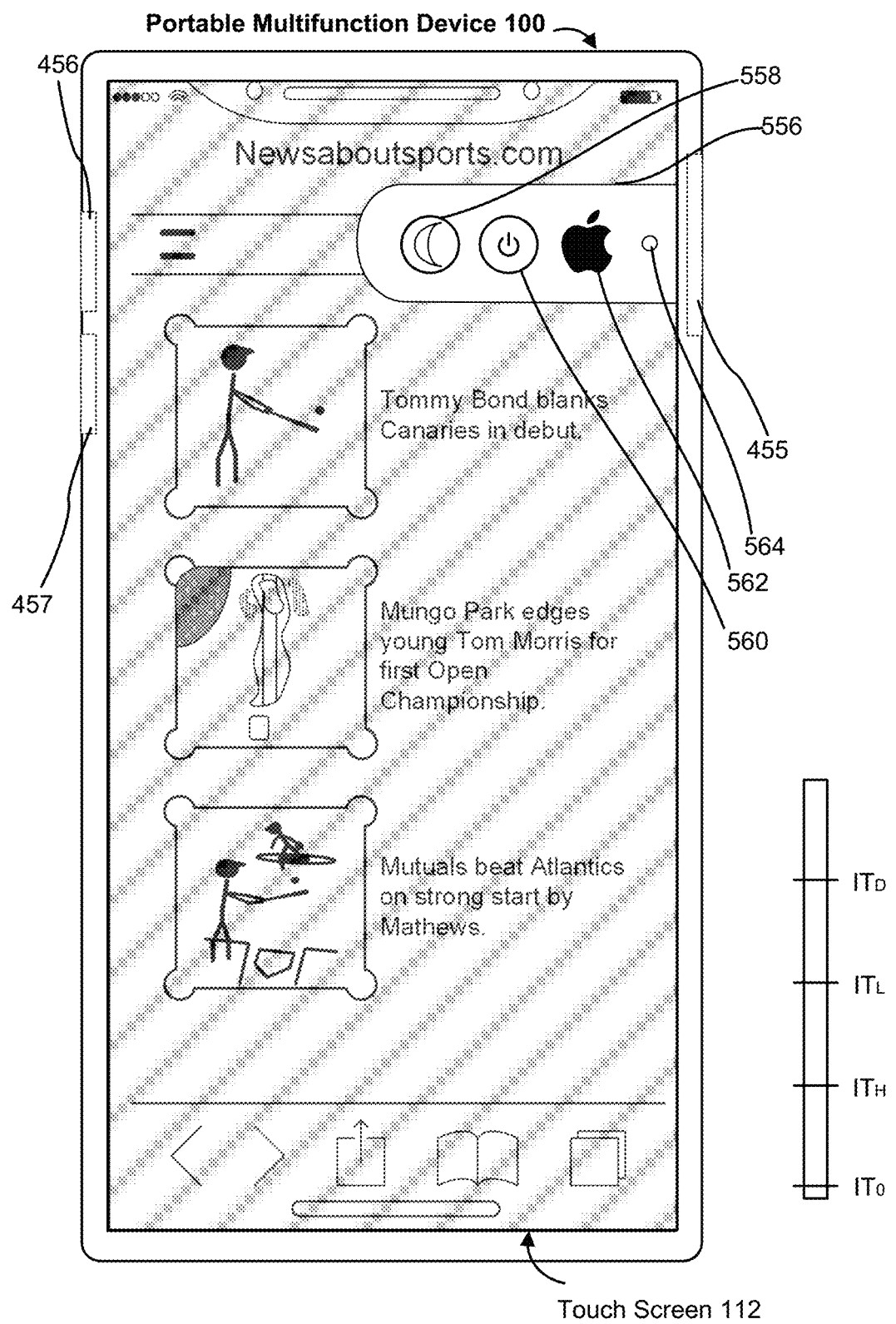
Figure 5C7

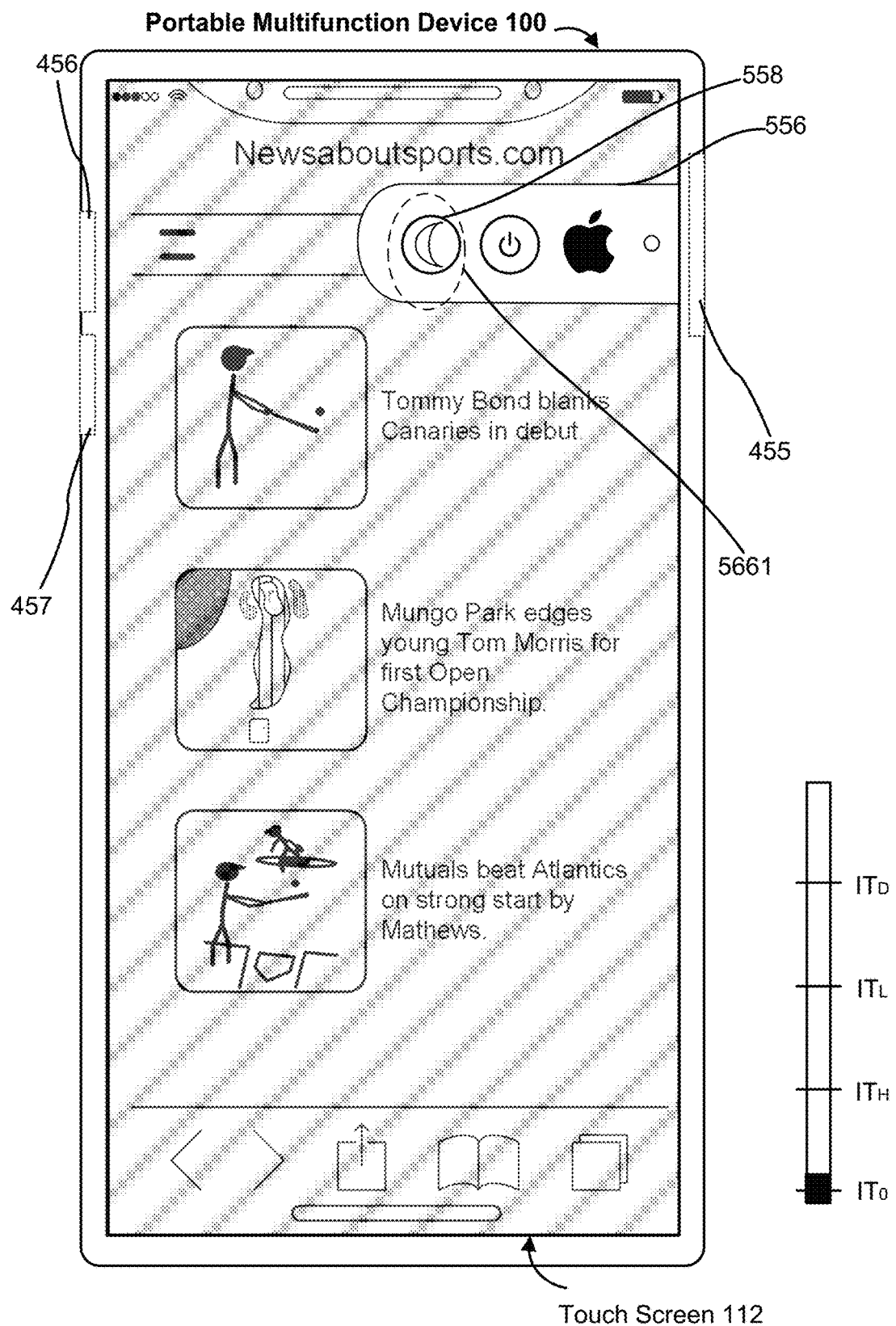
Figure 5C8

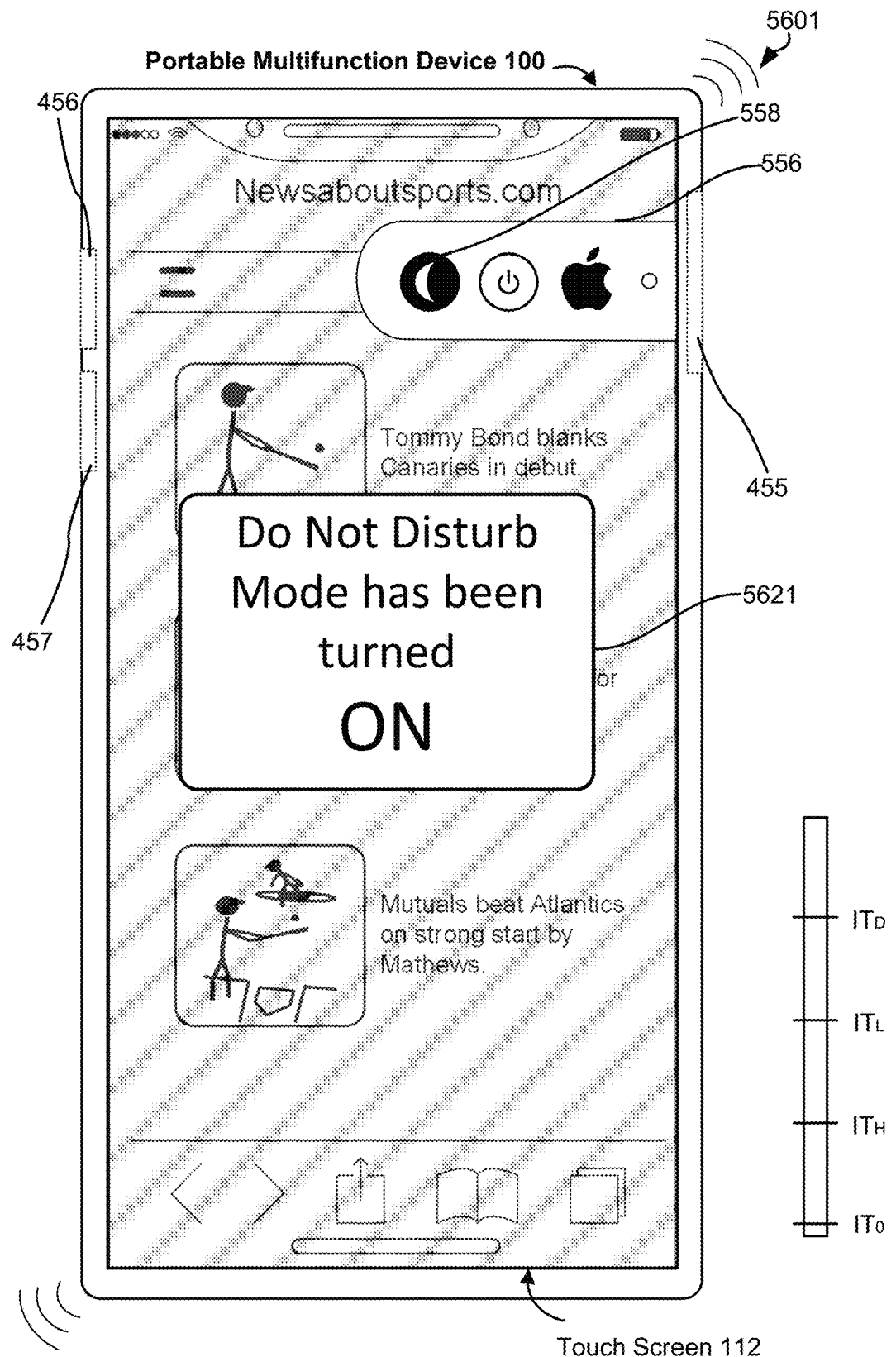
Figure 5C9

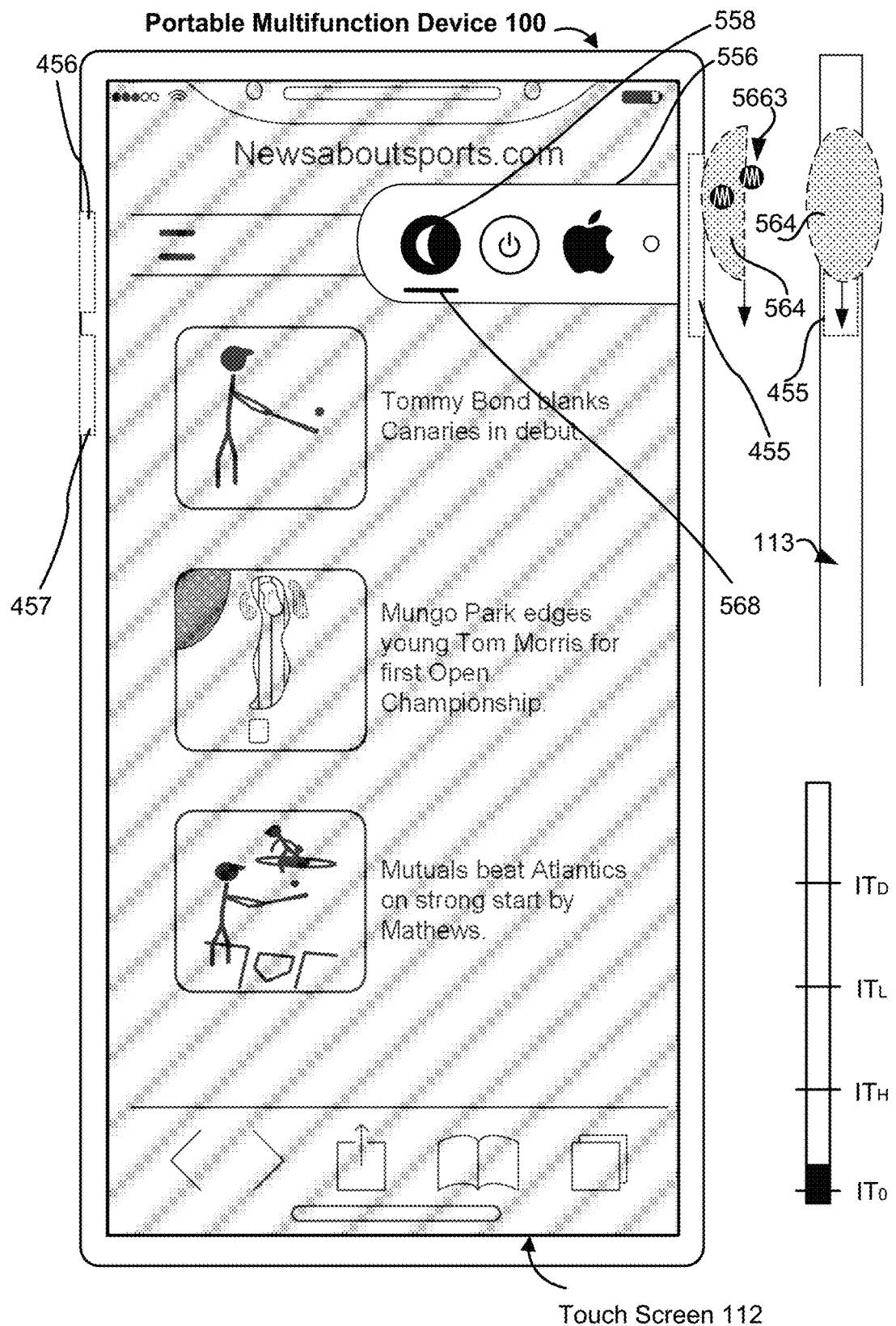
Figure 5C10

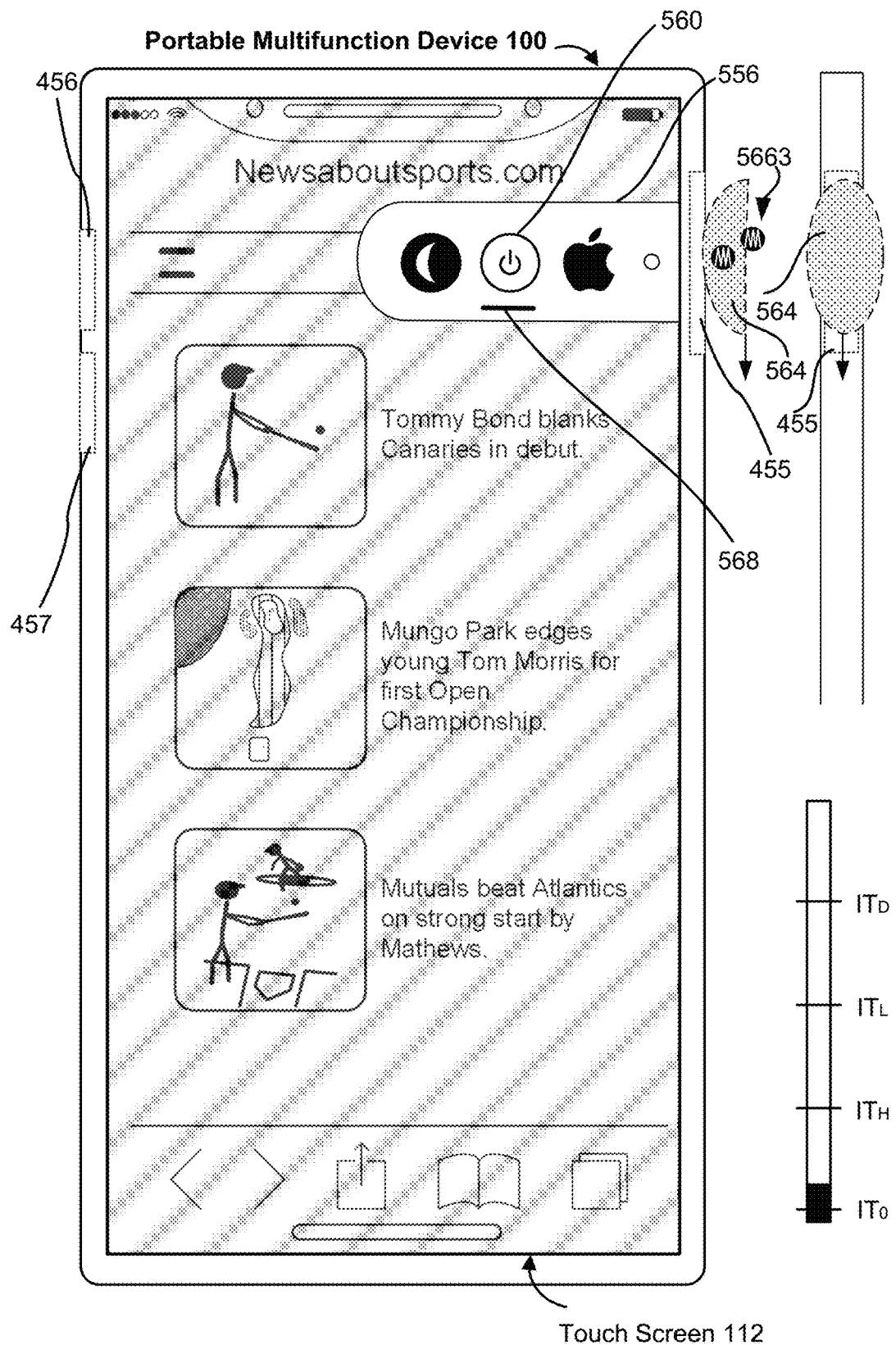
Figure 5C11

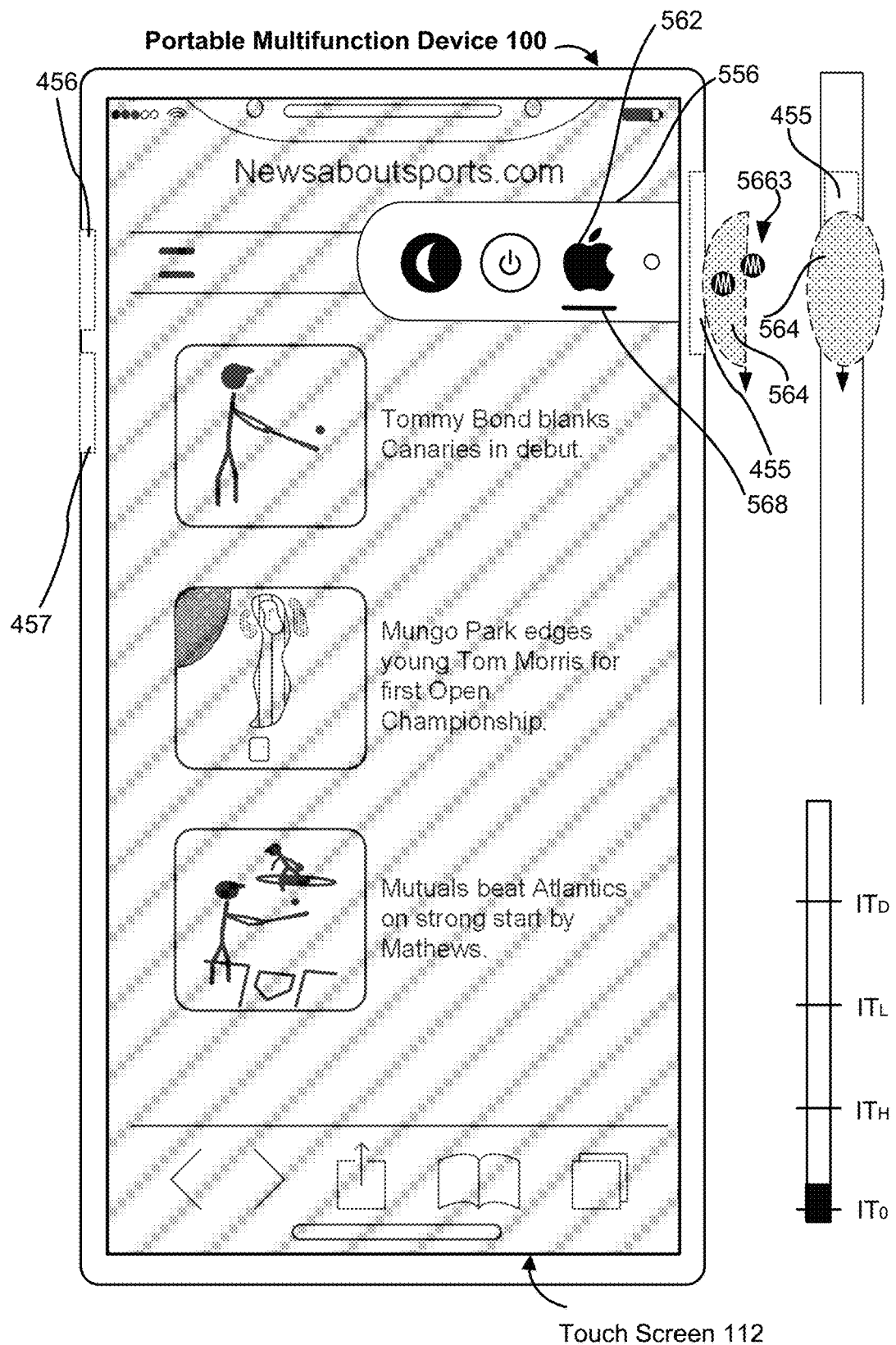
Figure 5C12

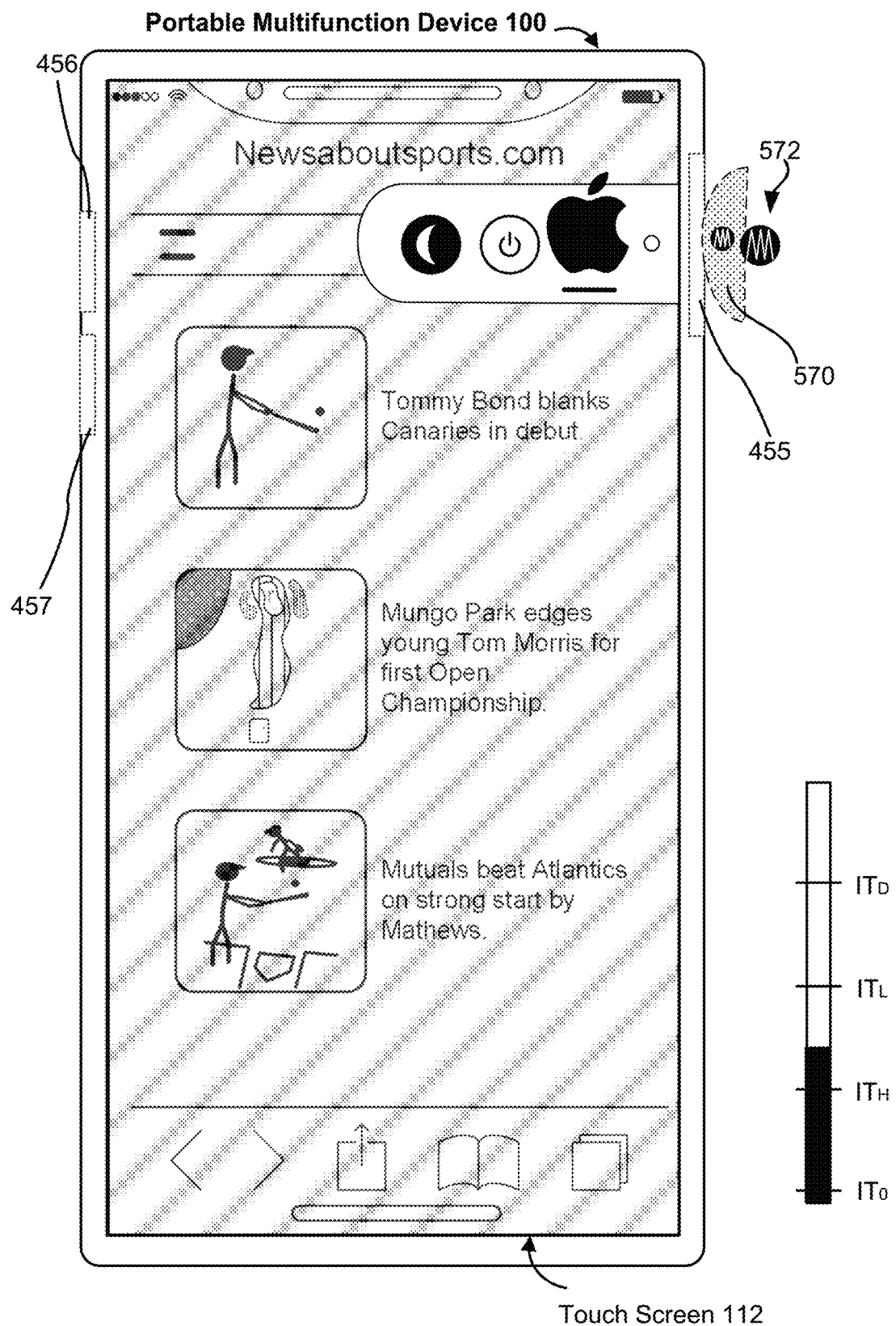
Figure 5C13

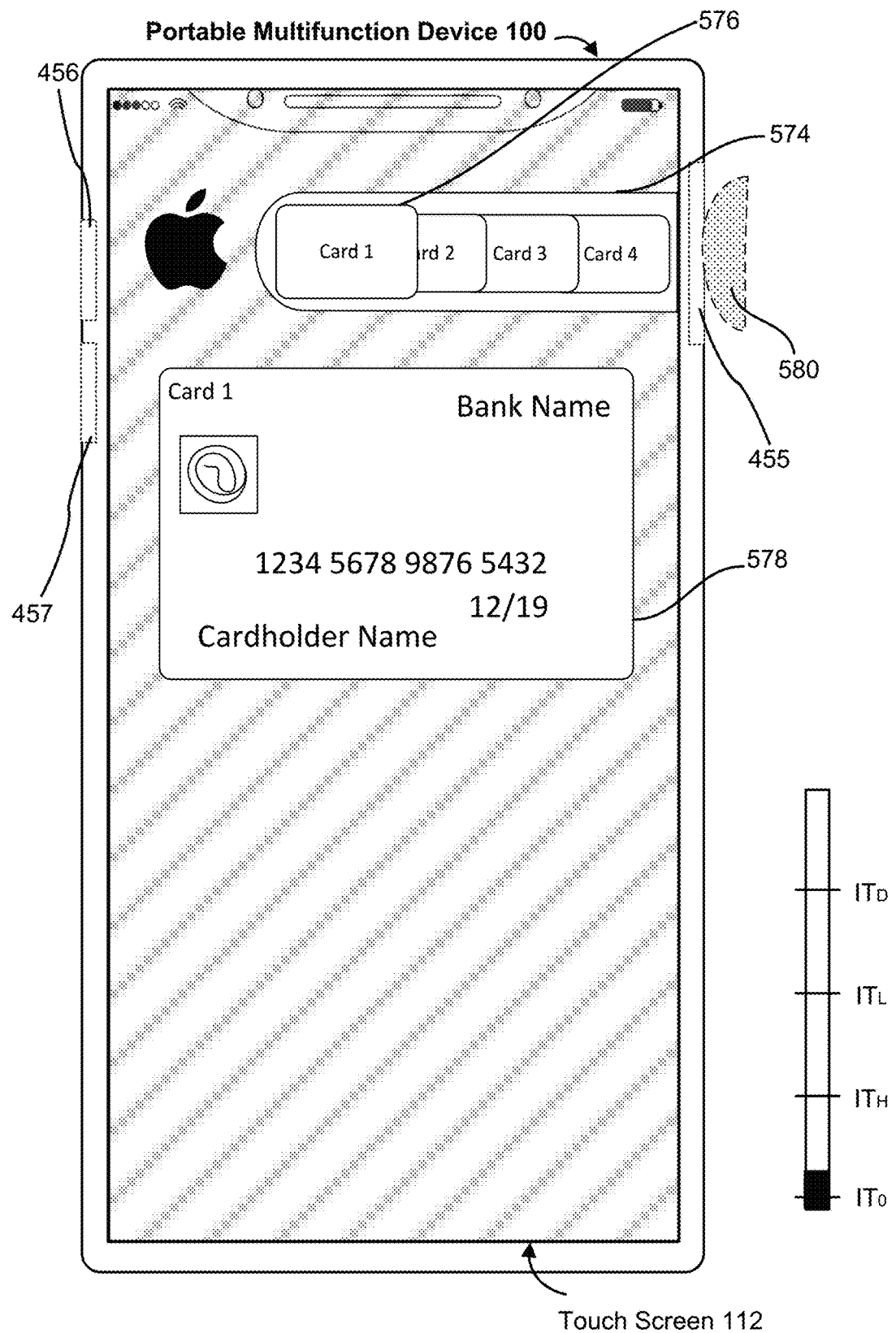
Figure 5C14

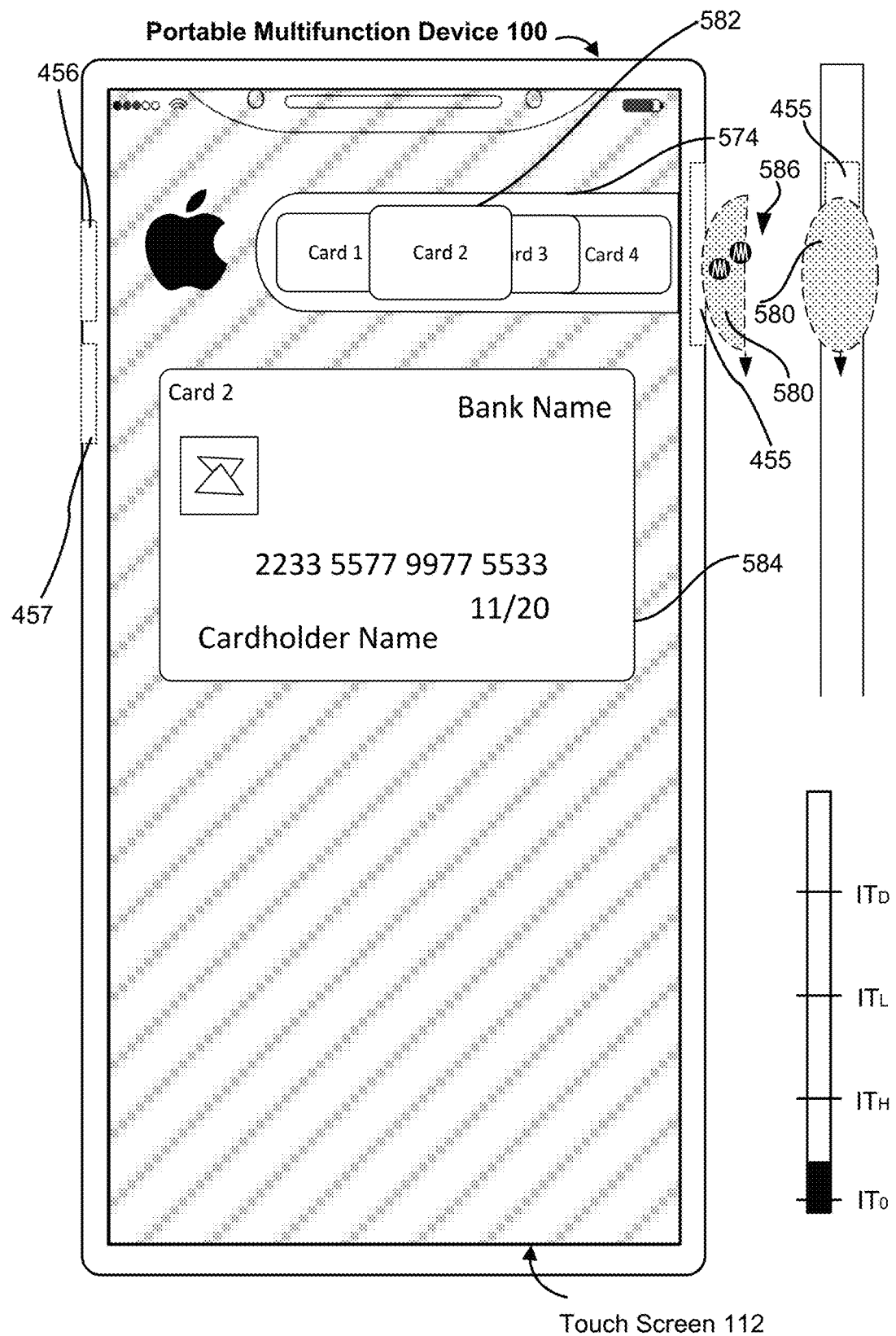
Figure 5C15

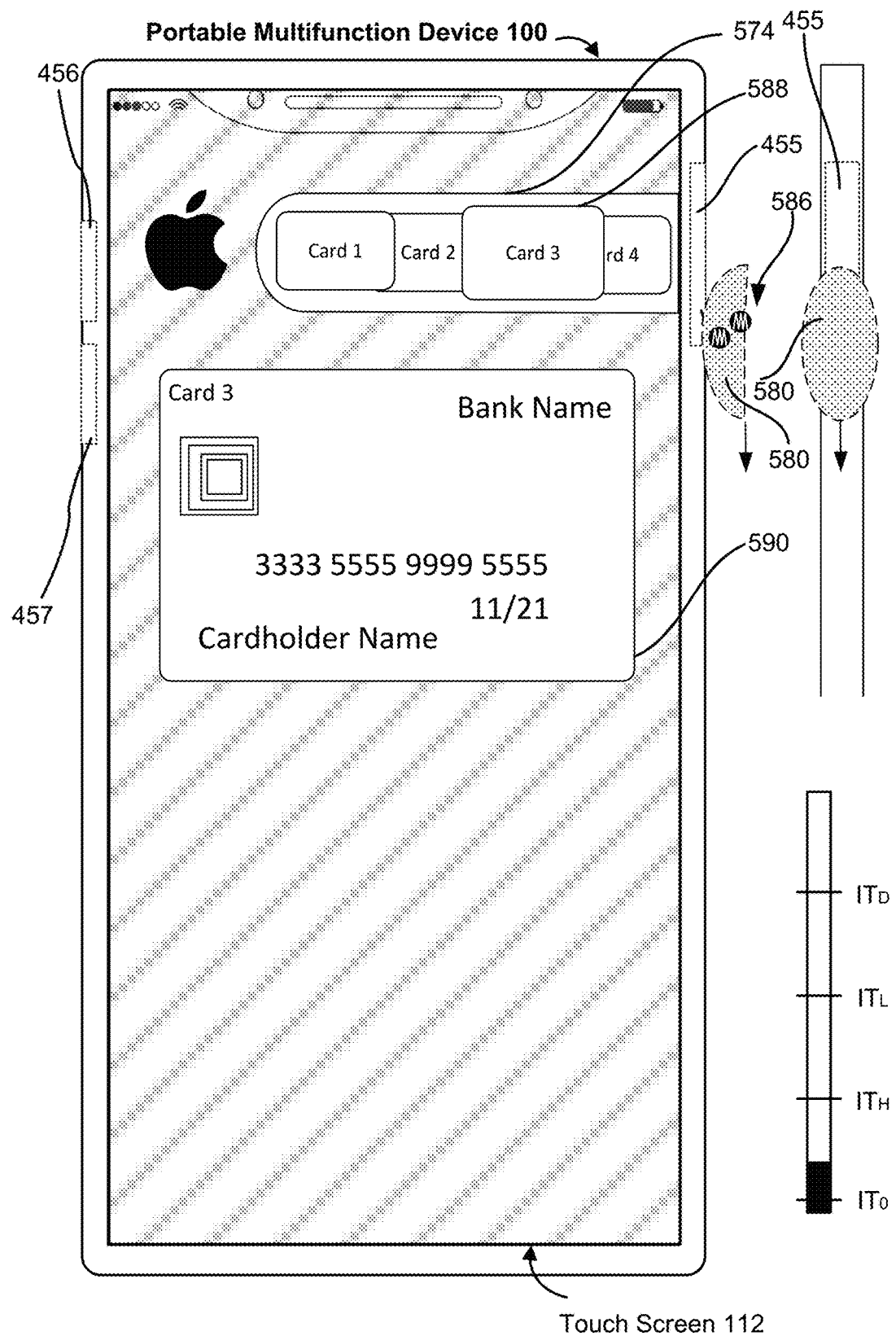
Figure 5C16

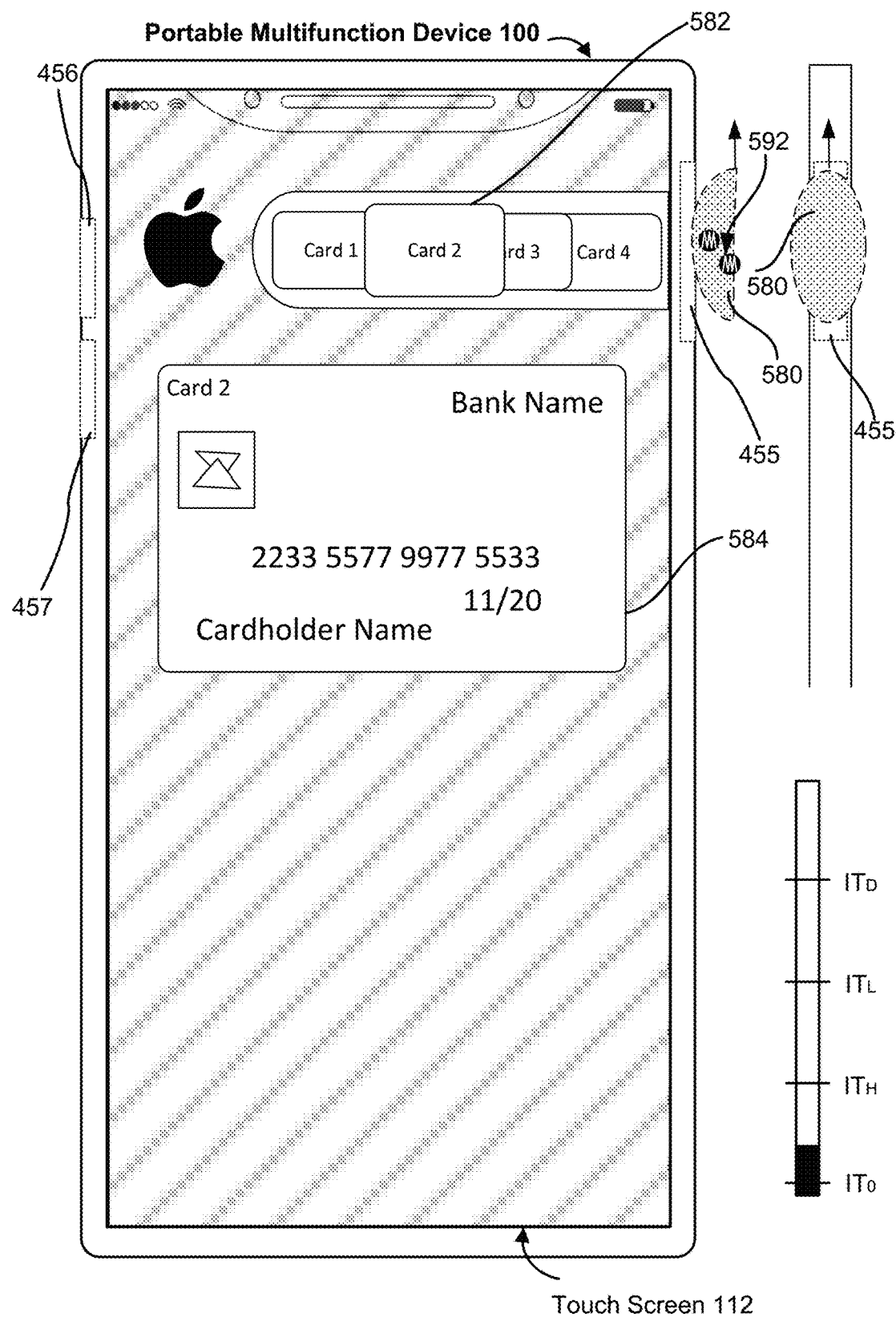
Figure 5C17

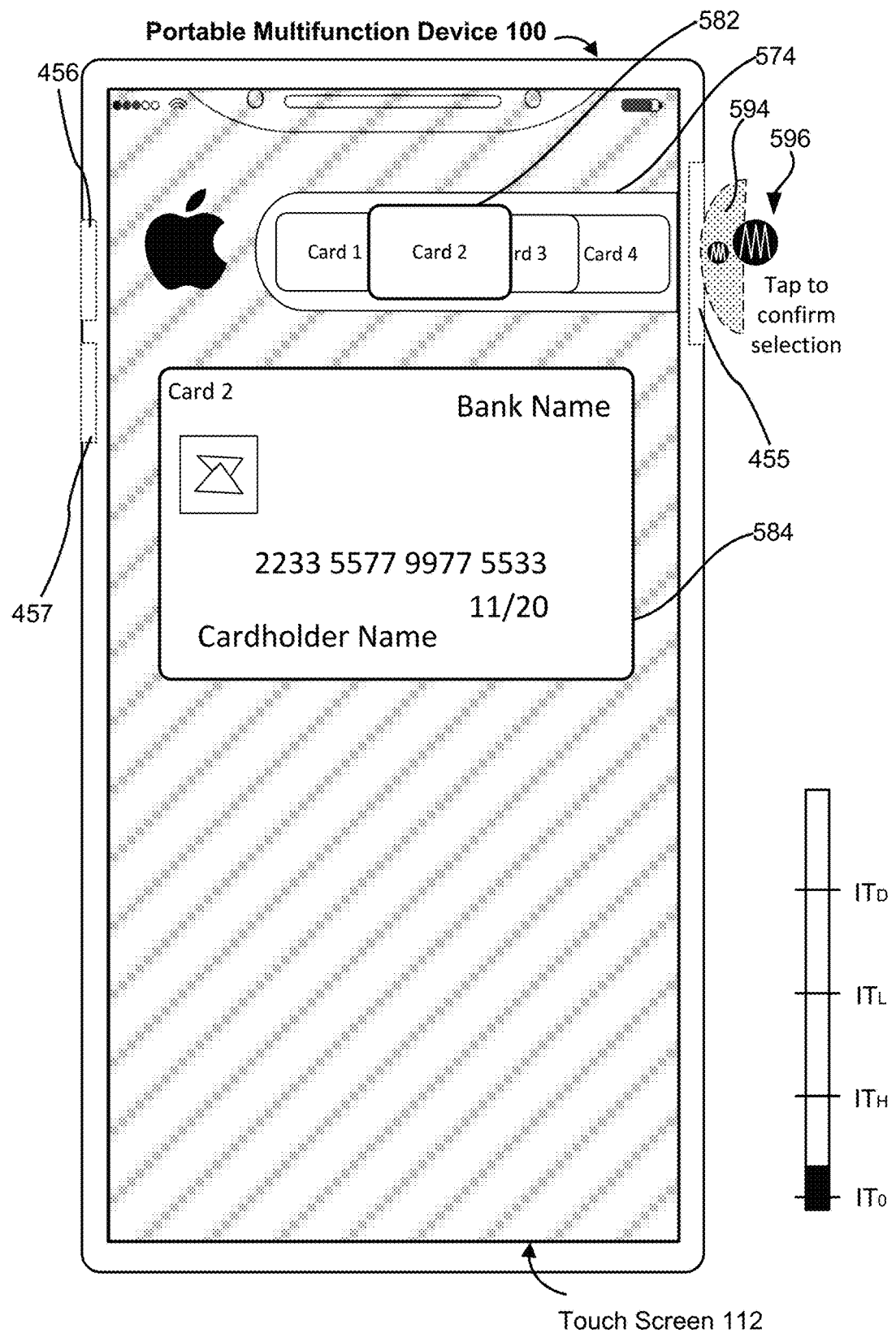
Figure 5C18

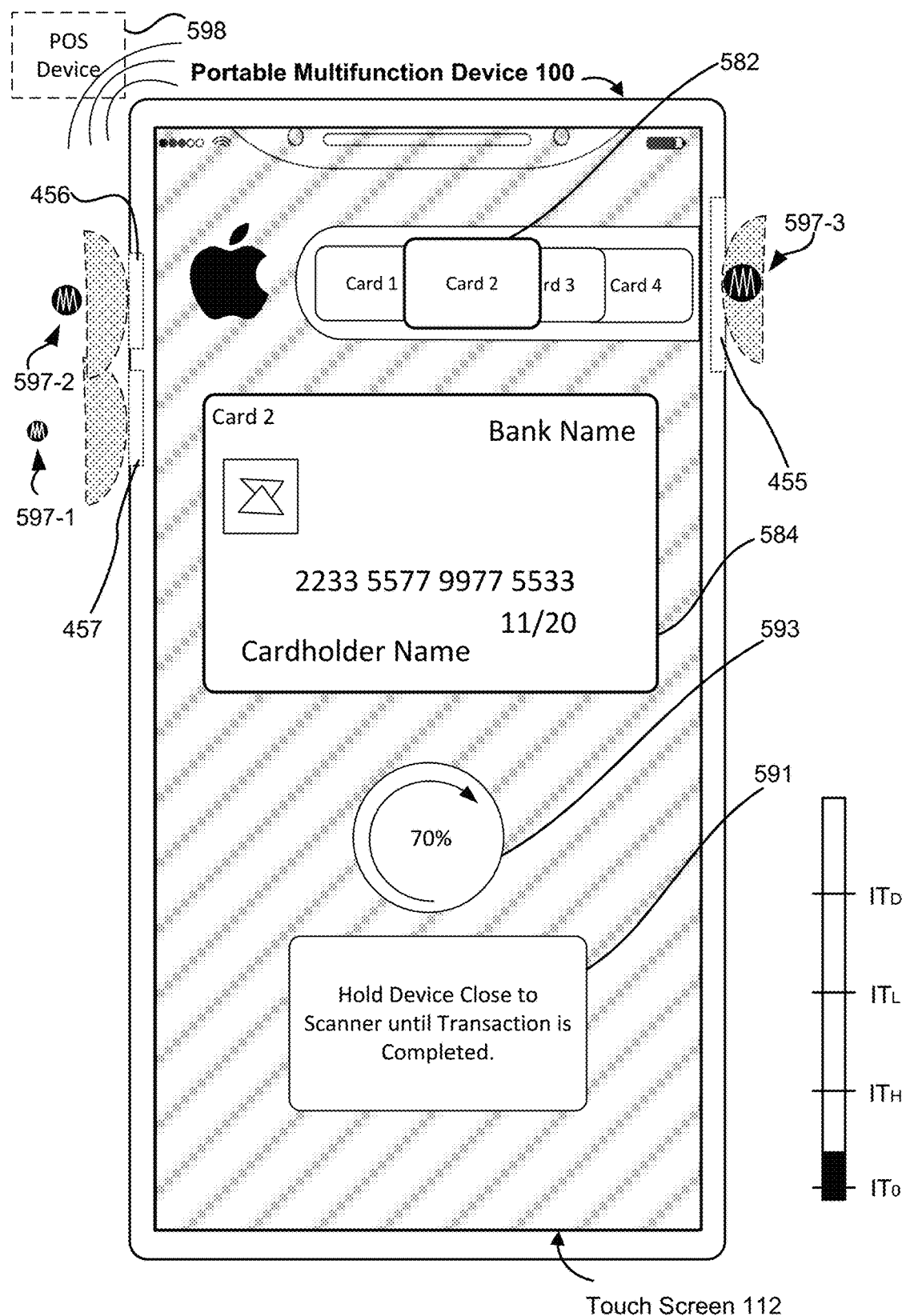
Figure 5C19

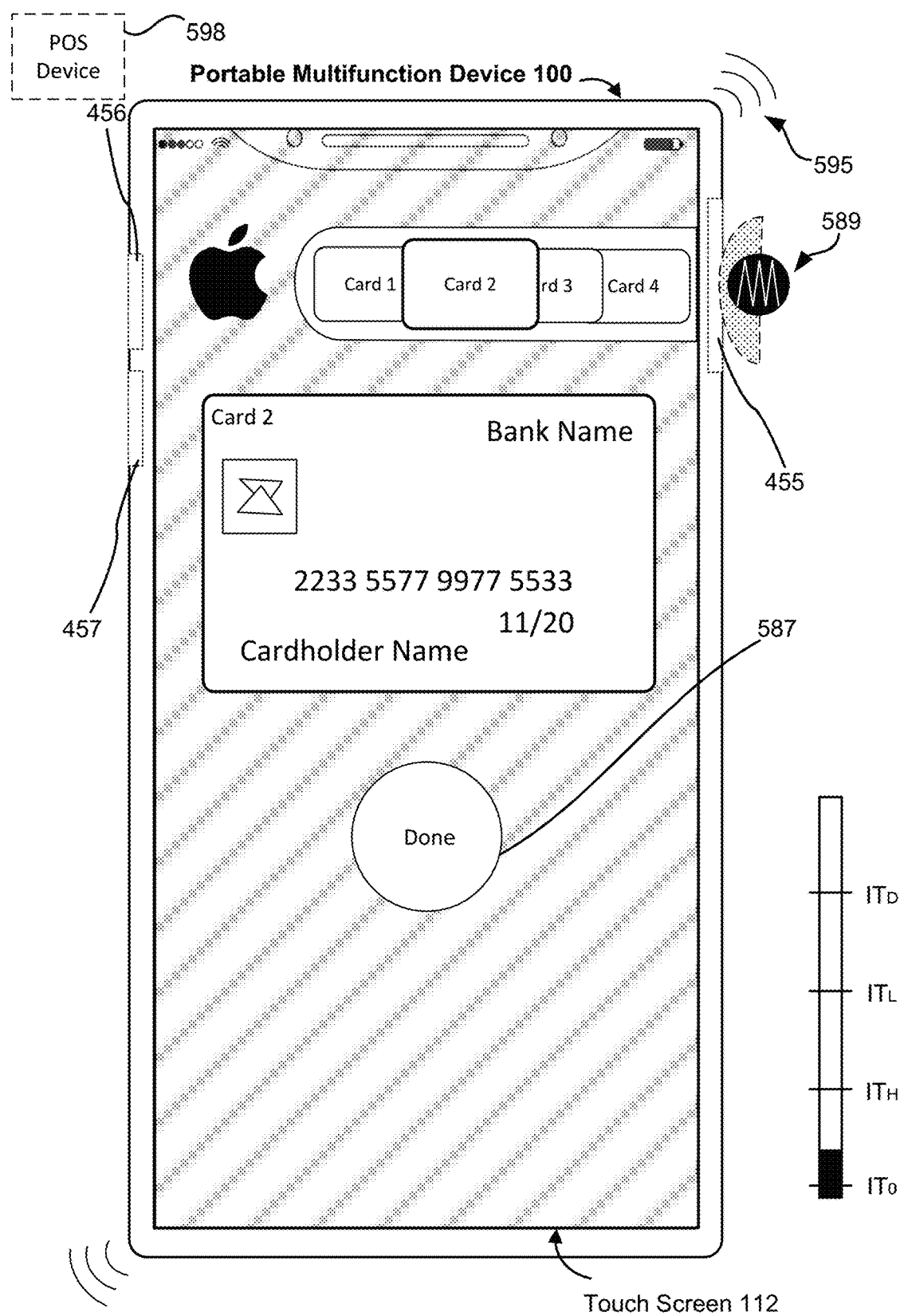
Figure 5C20

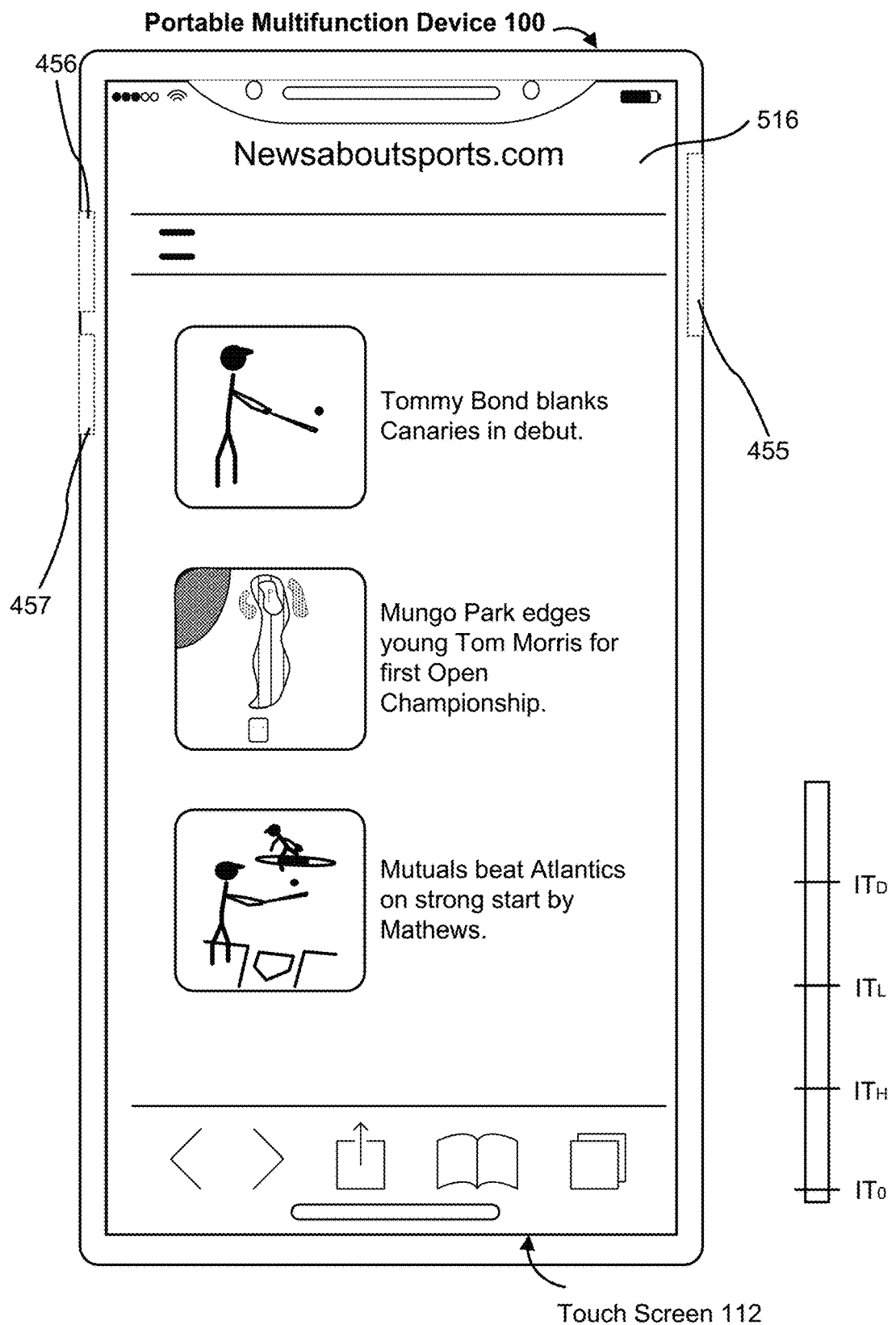
Figure 5D1

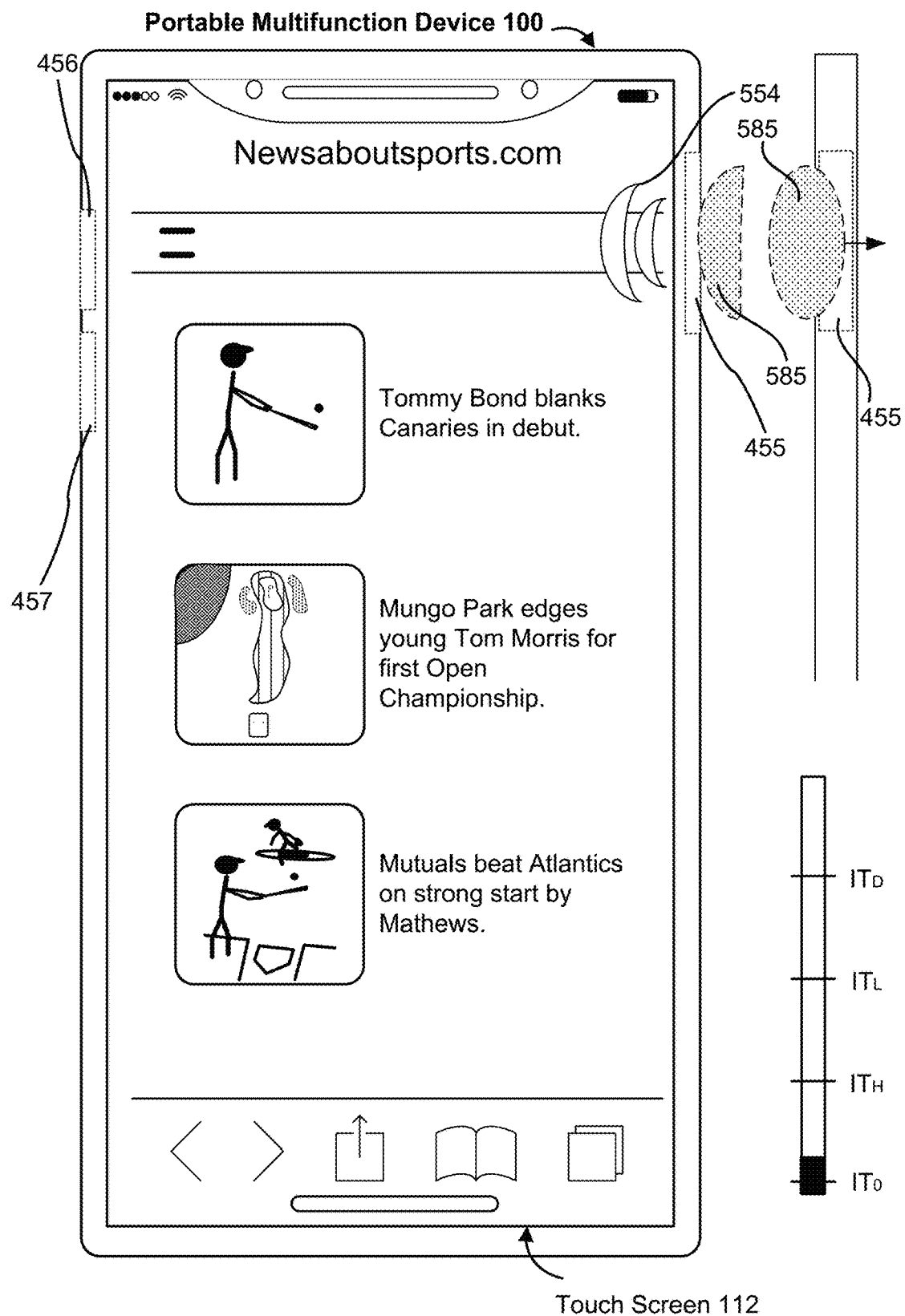
Figure 5D2

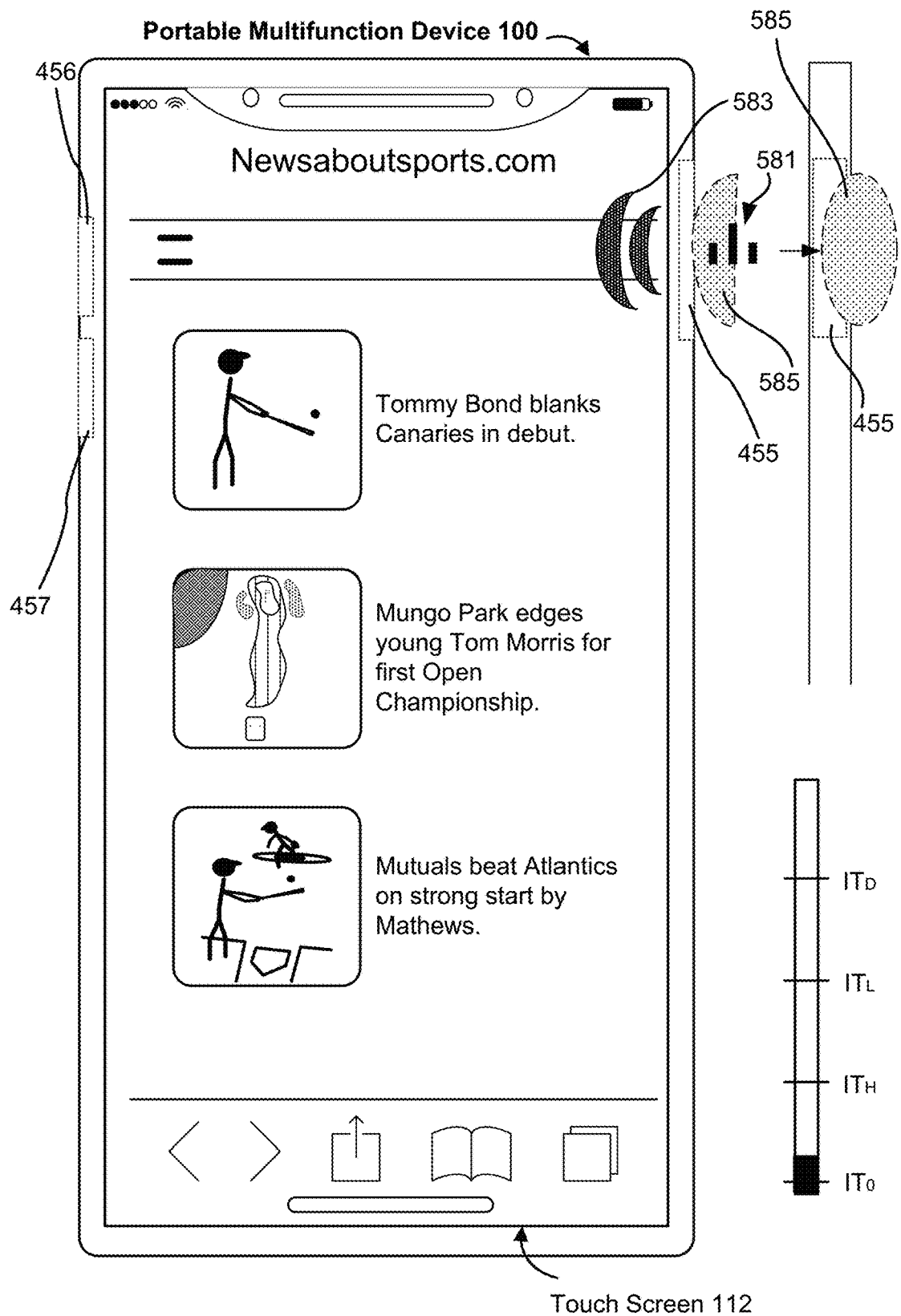
Figure 5D3

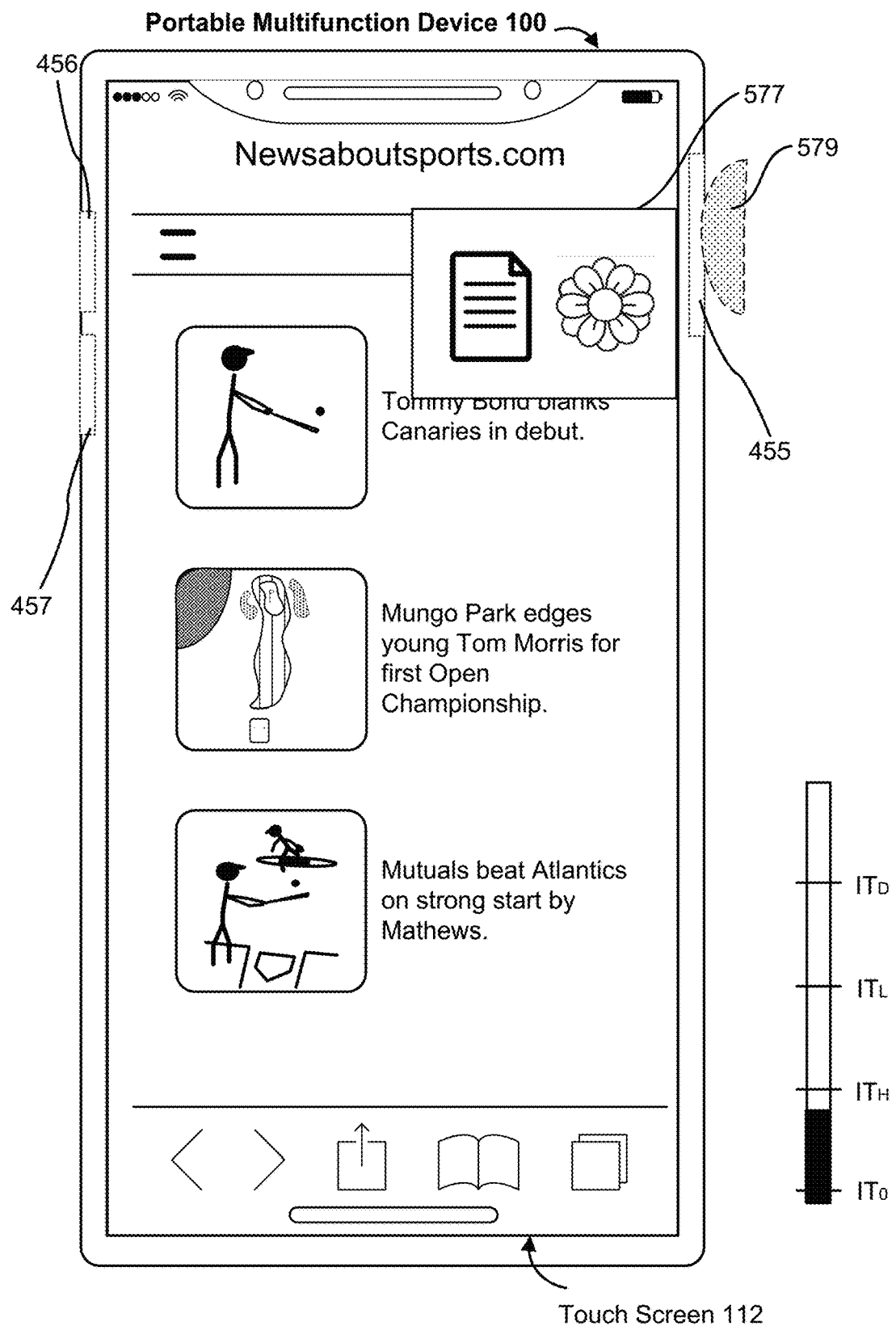
Figure 5D4

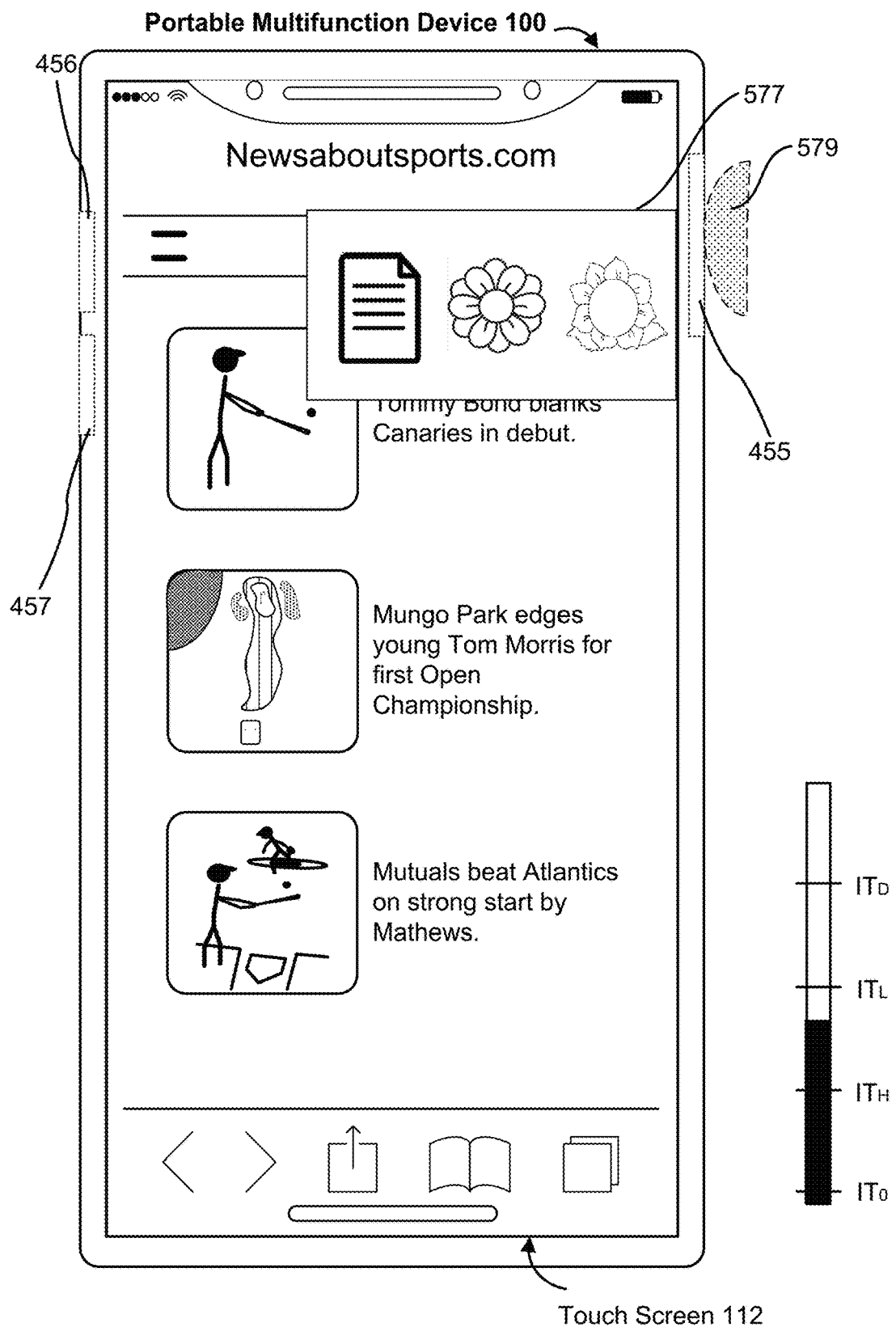
Figure 5D5

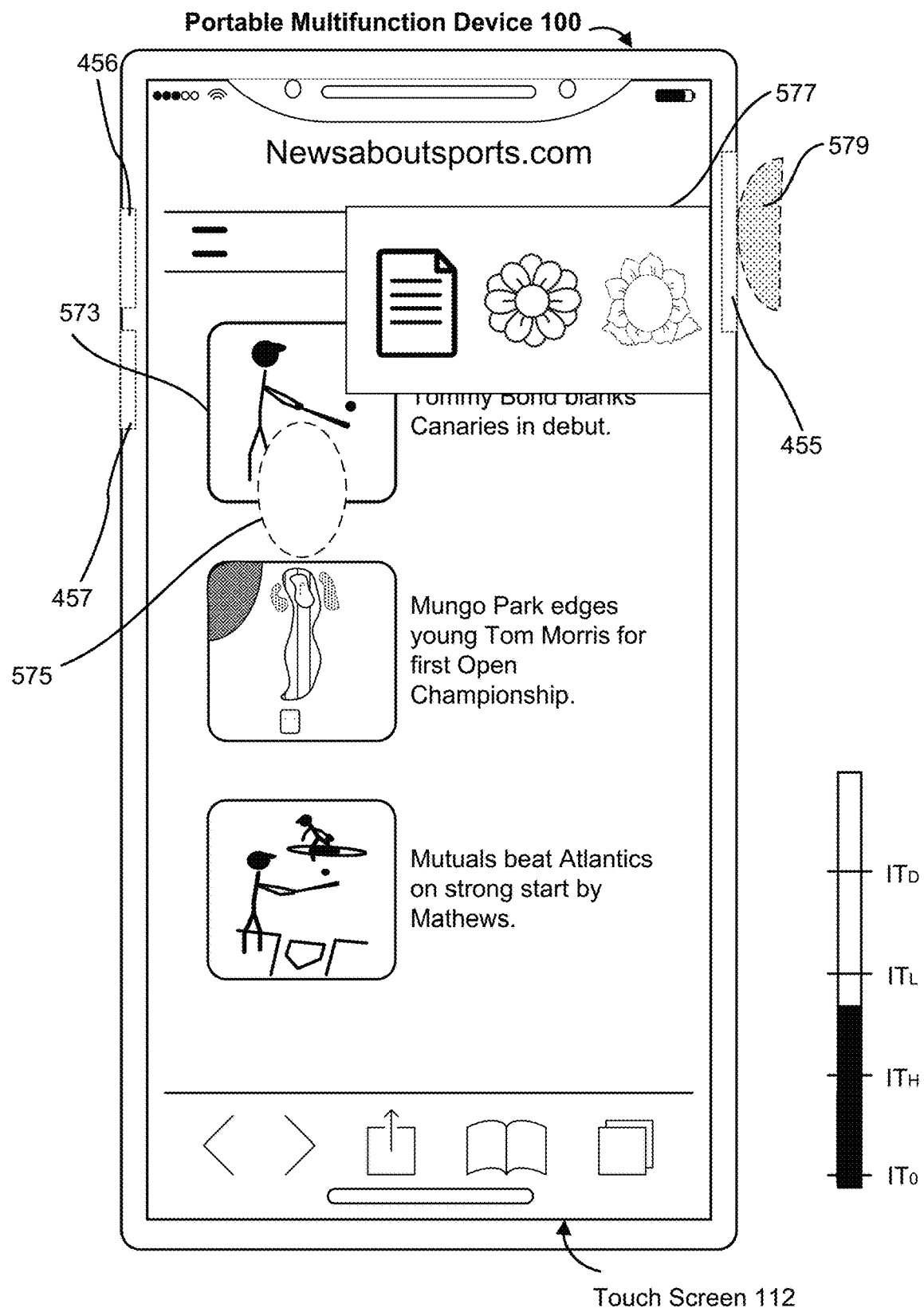
Figure 5D6

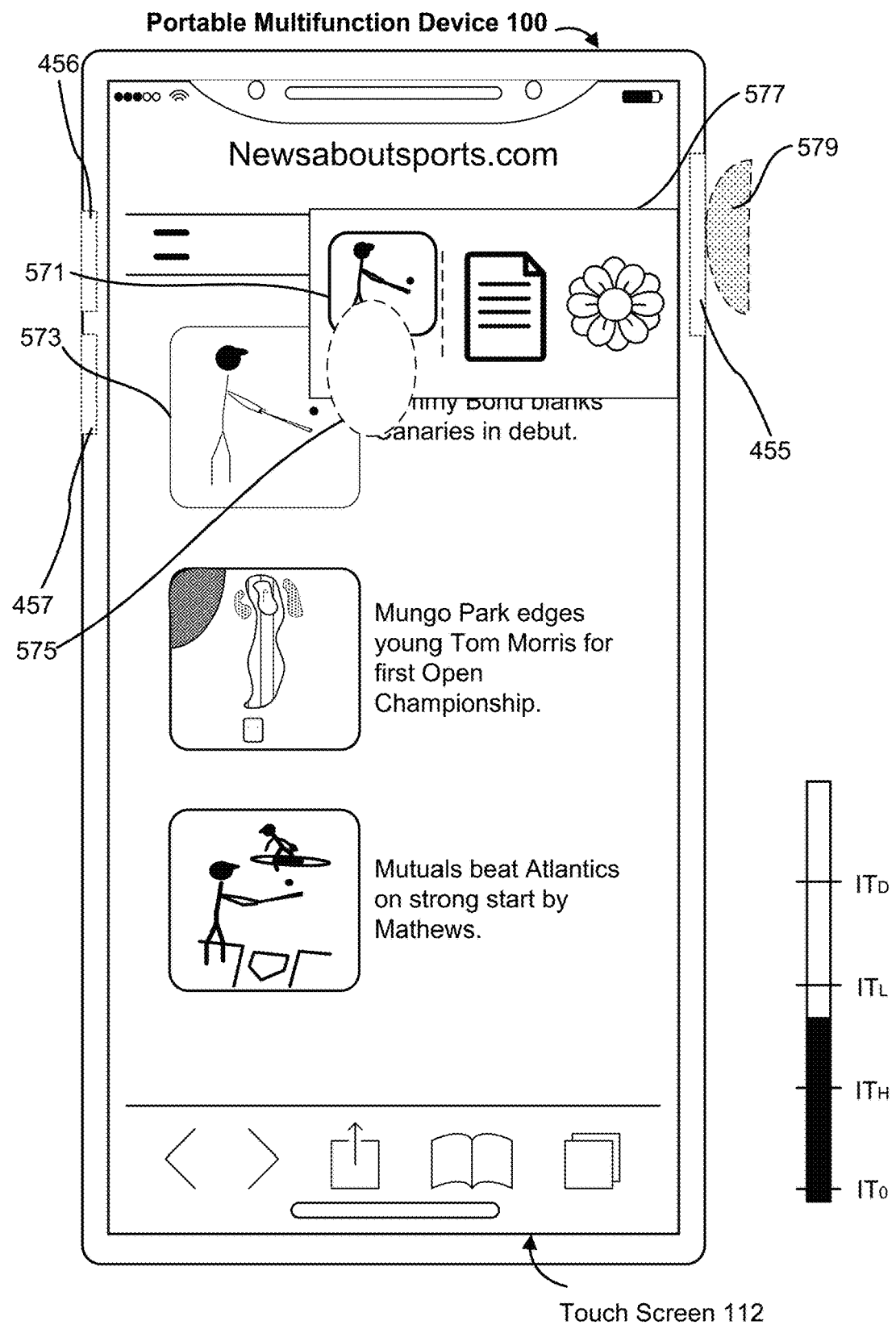
Figure 5D7

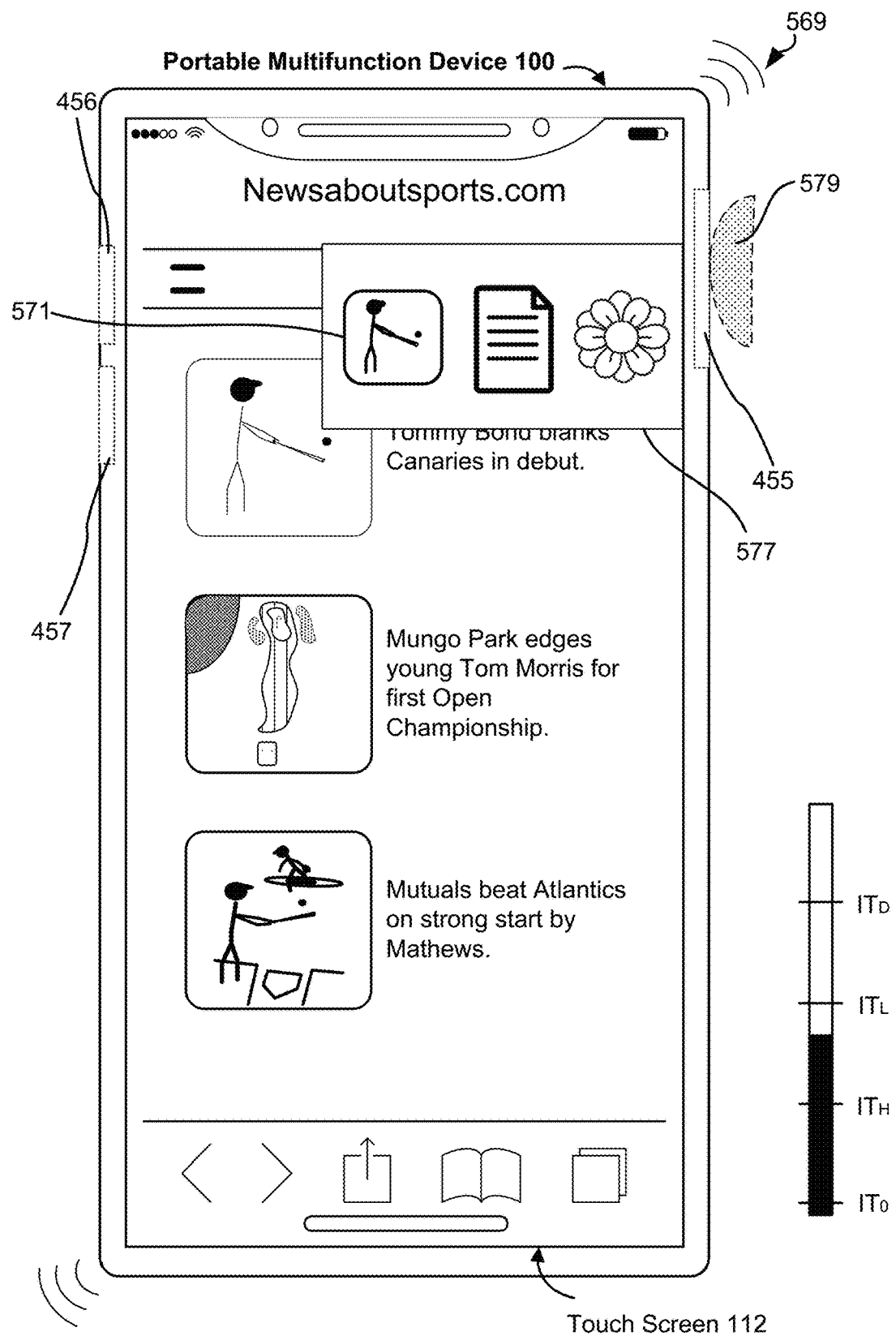
Figure 5D8

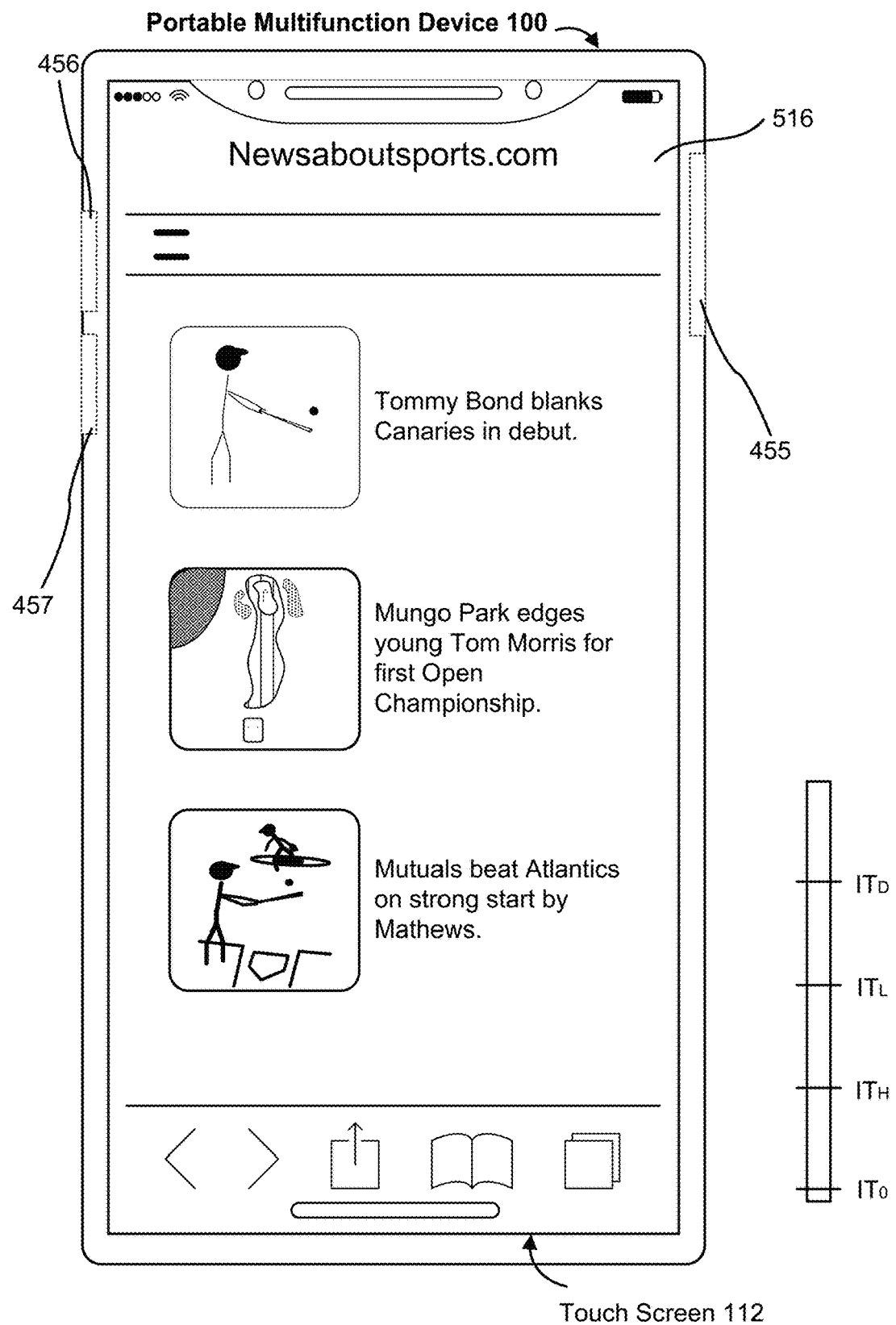
Figure 5D9

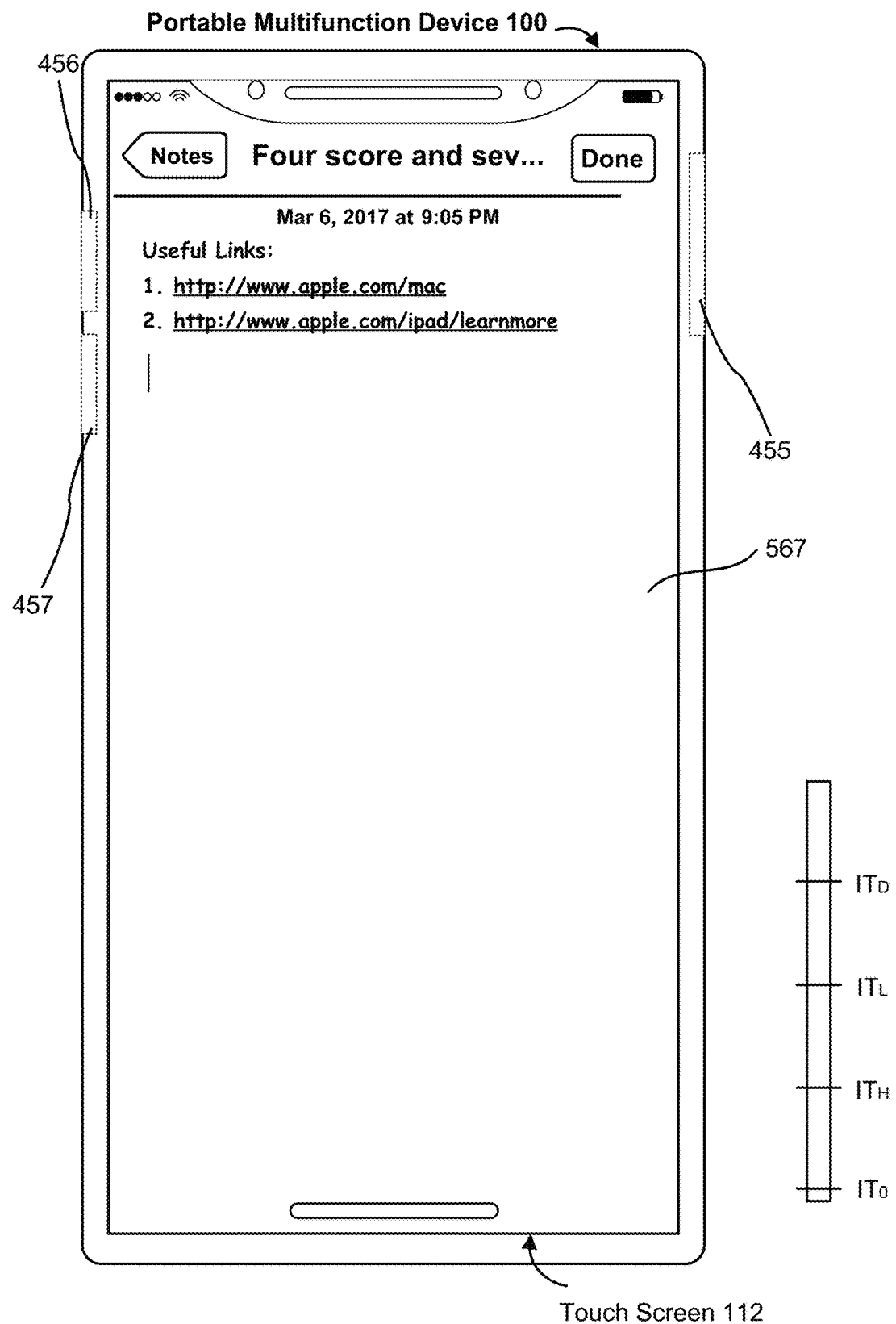
Figure 5D10

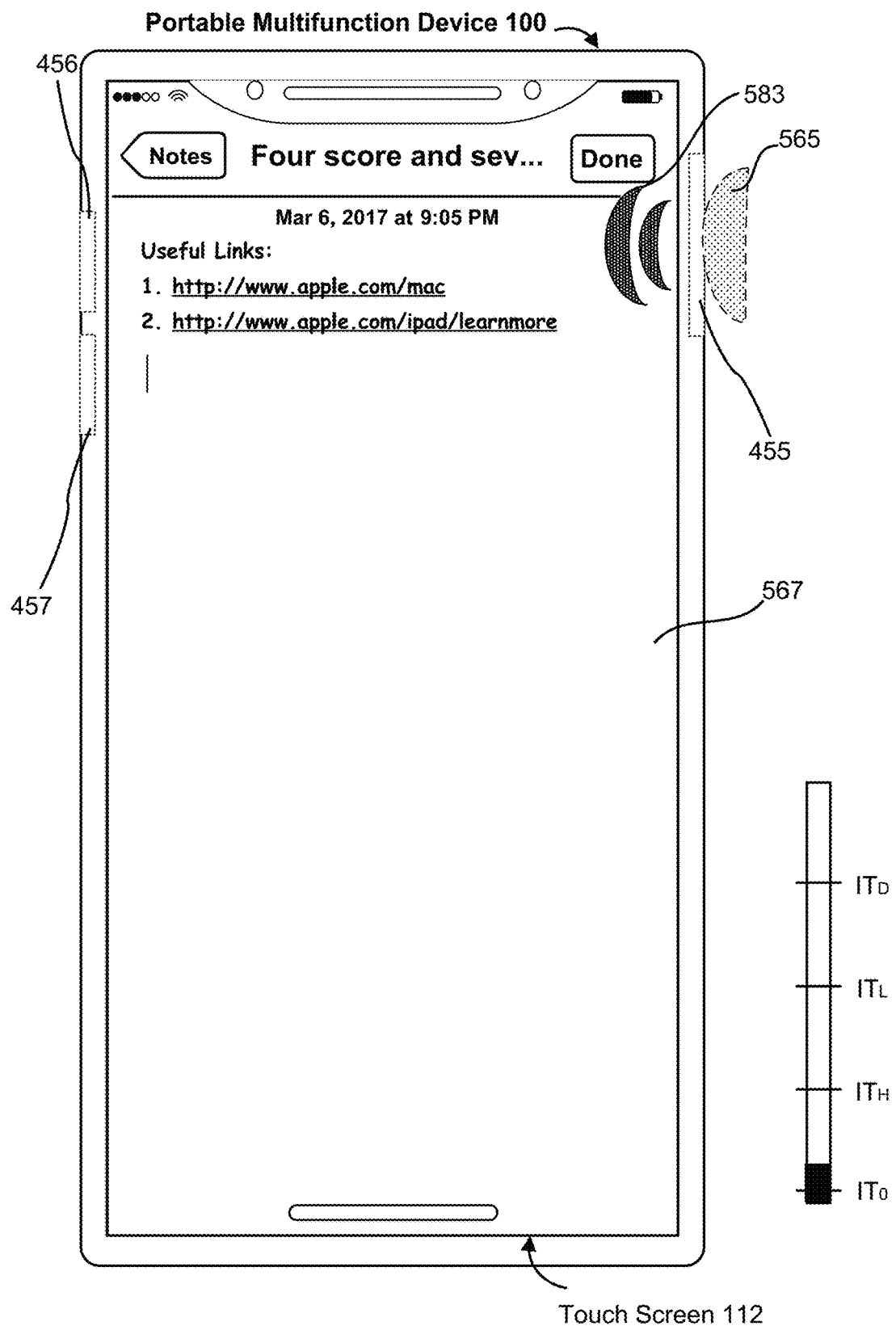
Figure 5D11

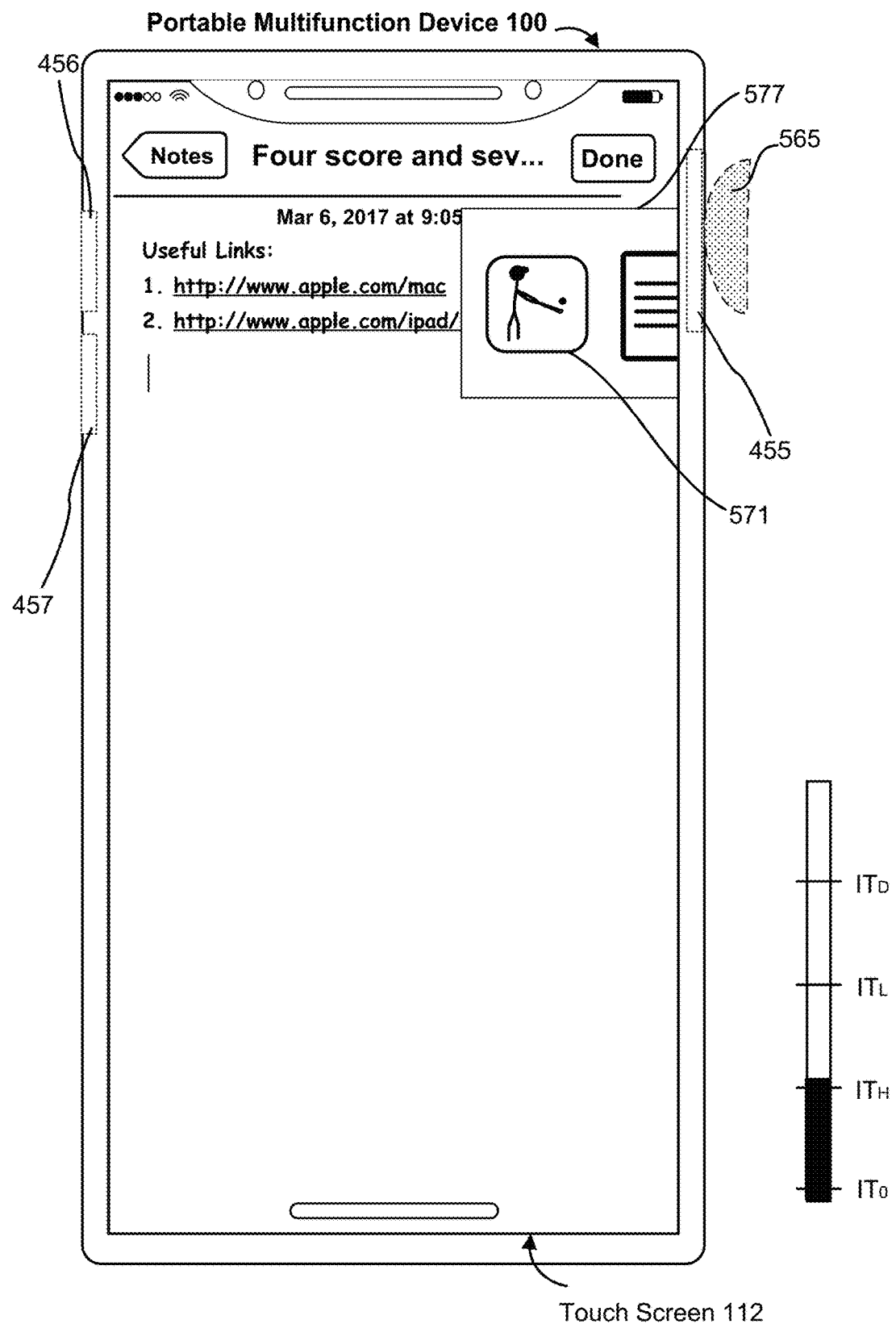
Figure 5D12

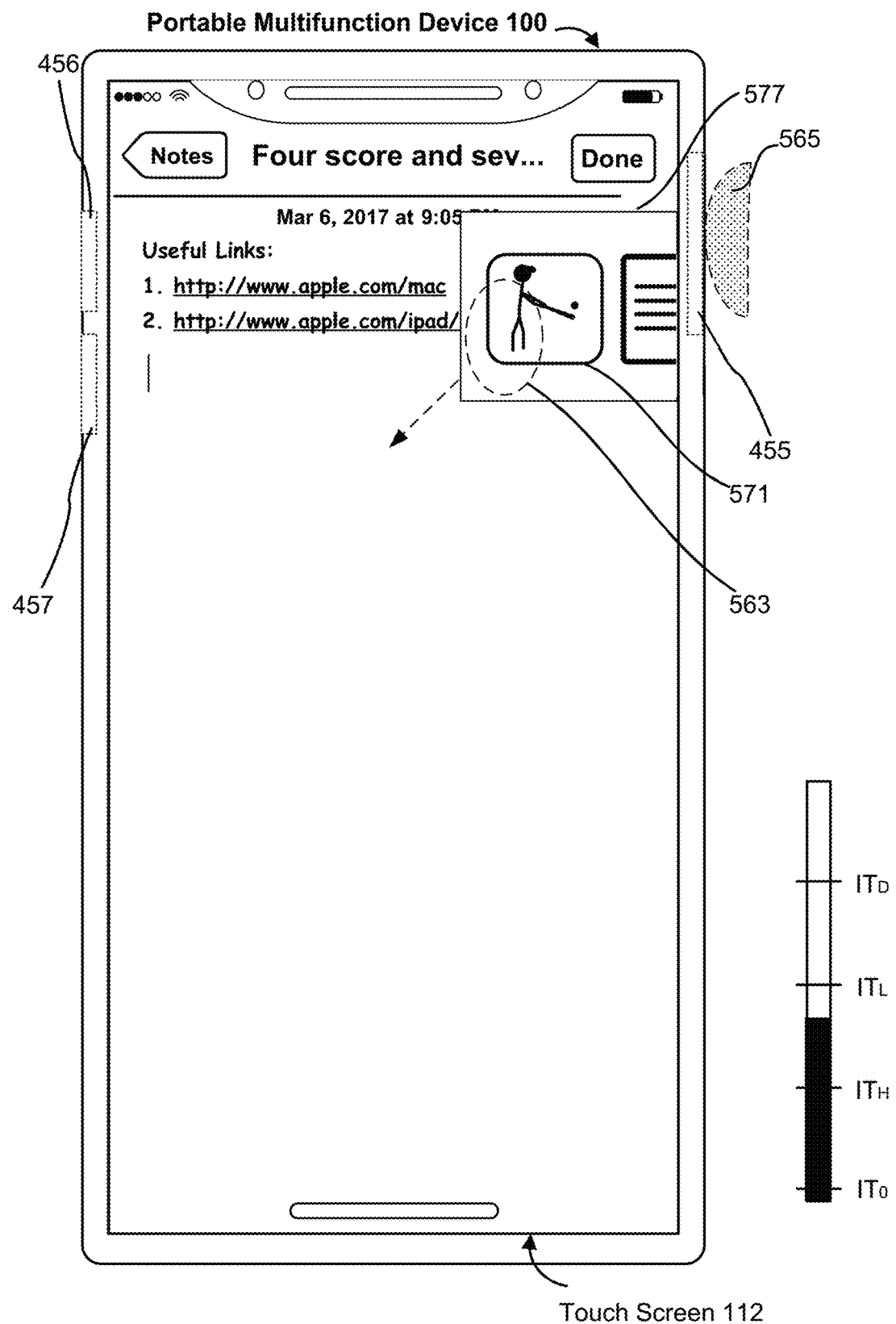
Figure 5D13

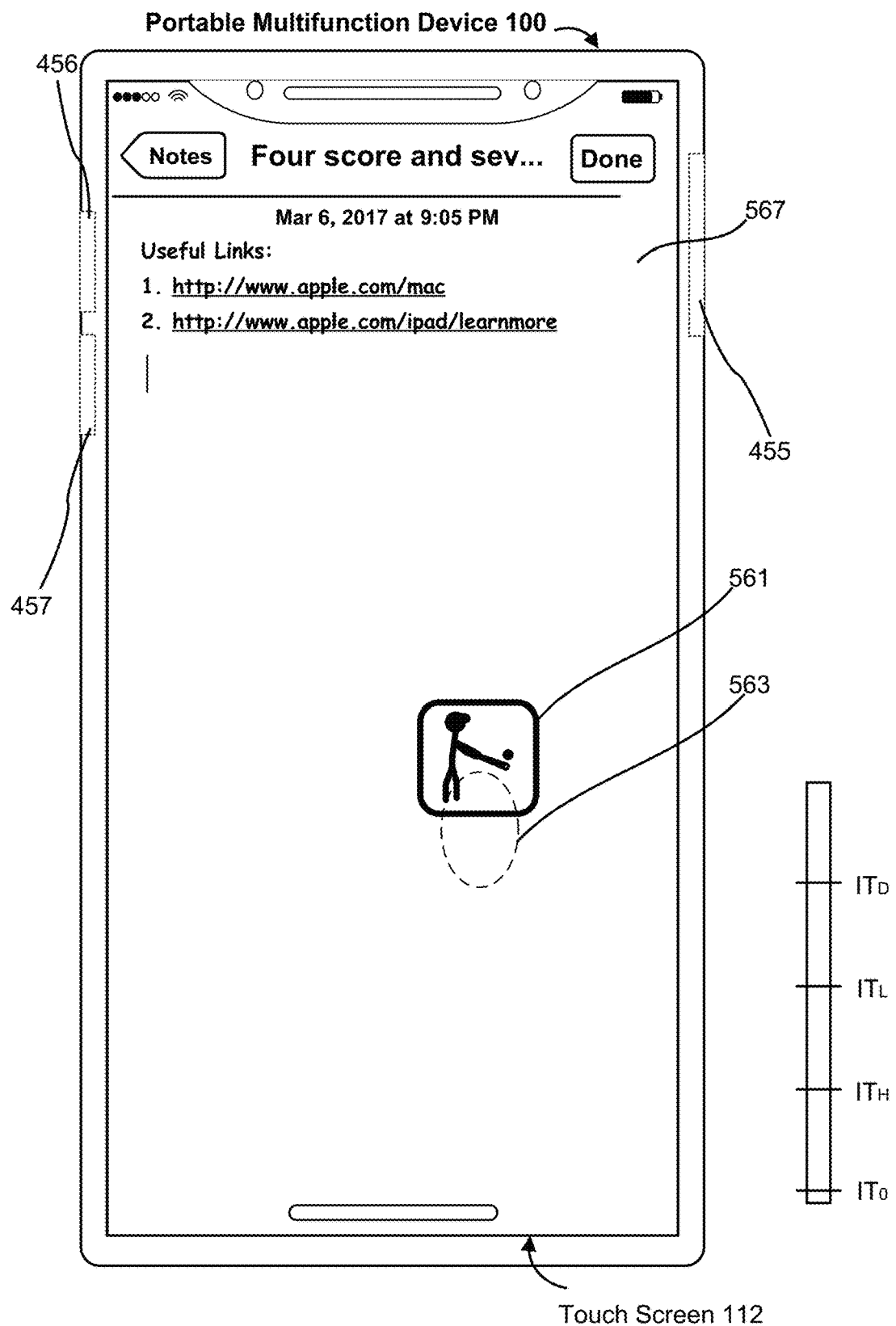
Figure 5D14

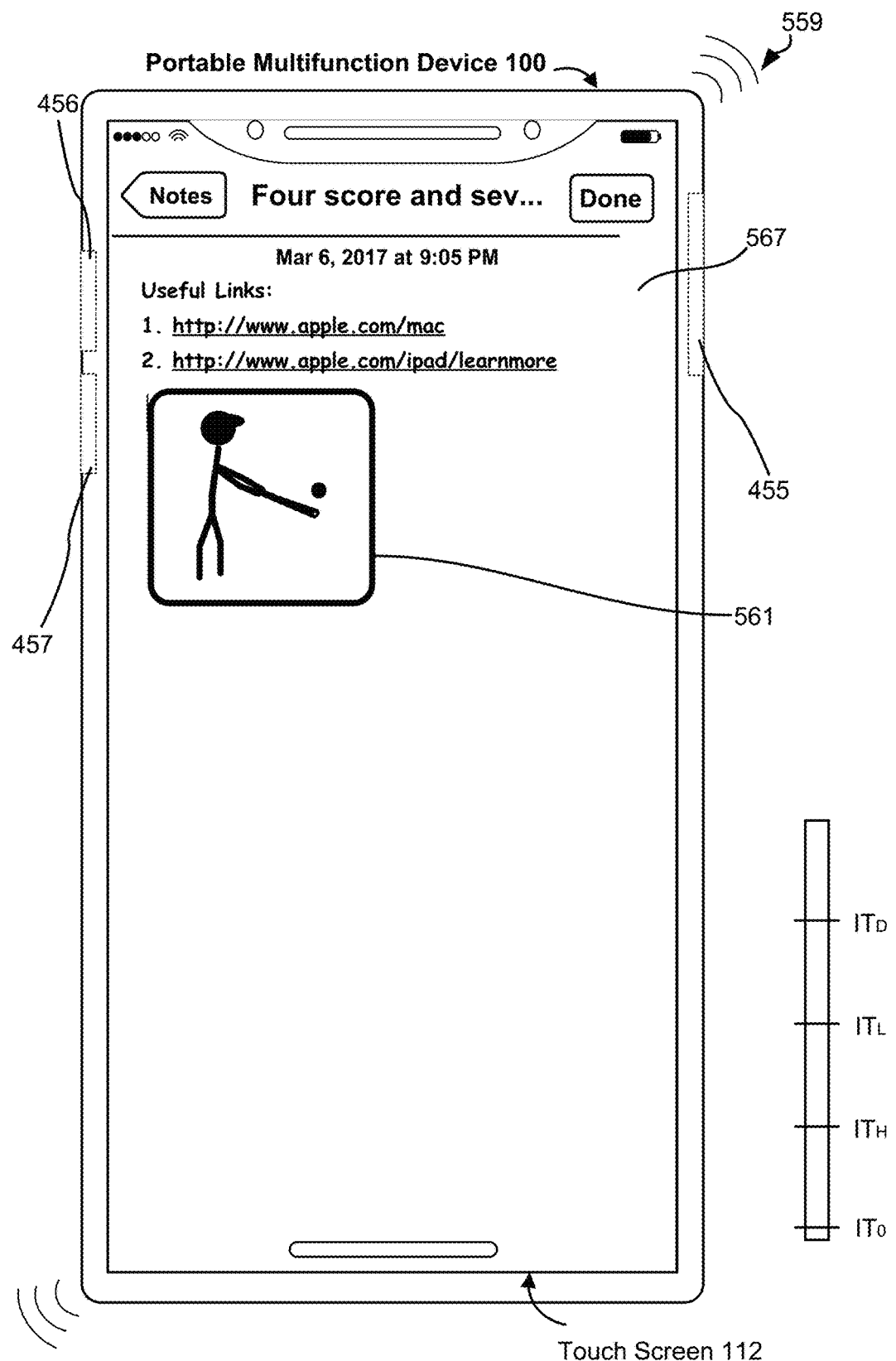
Figure 5D15

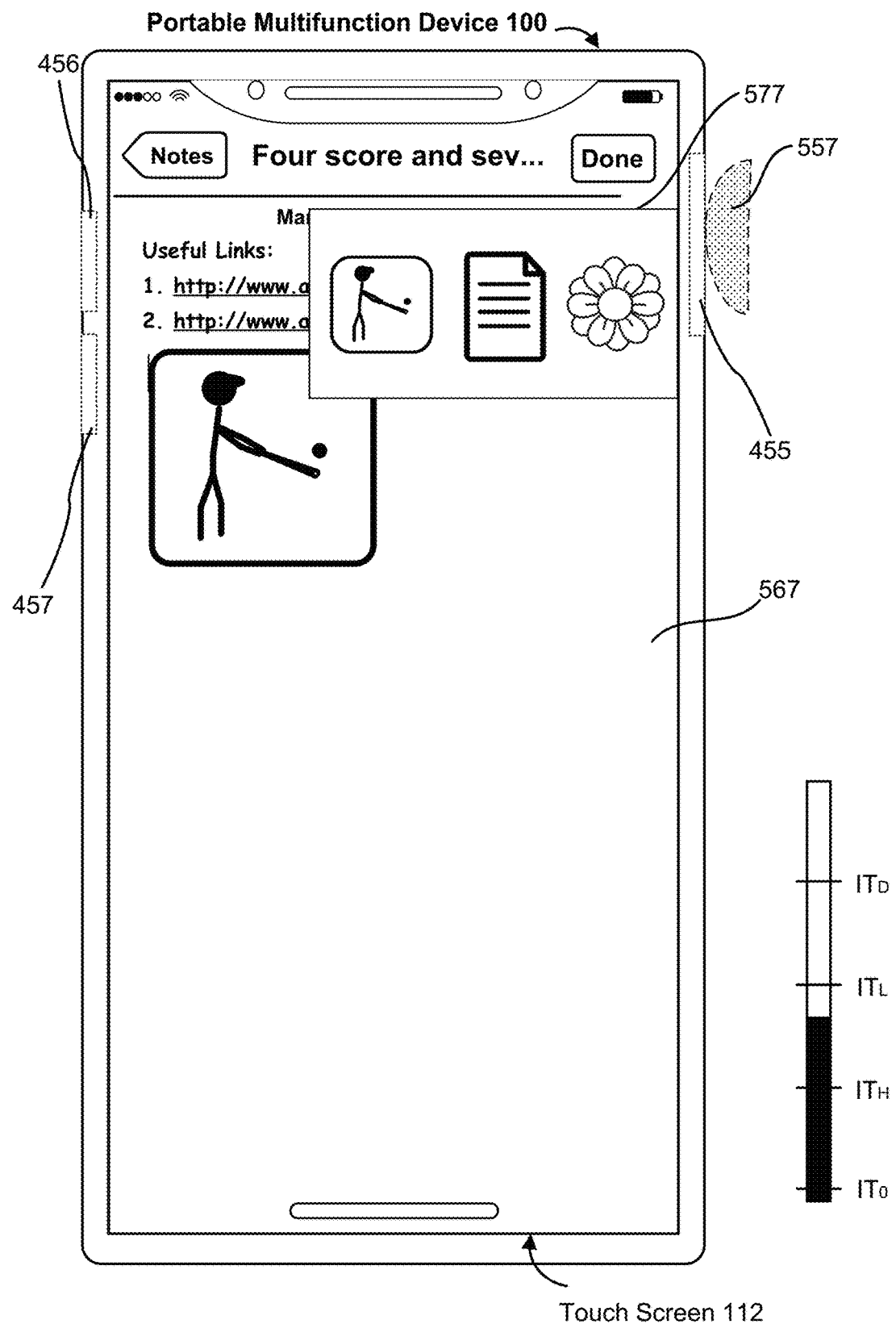
Figure 5D16

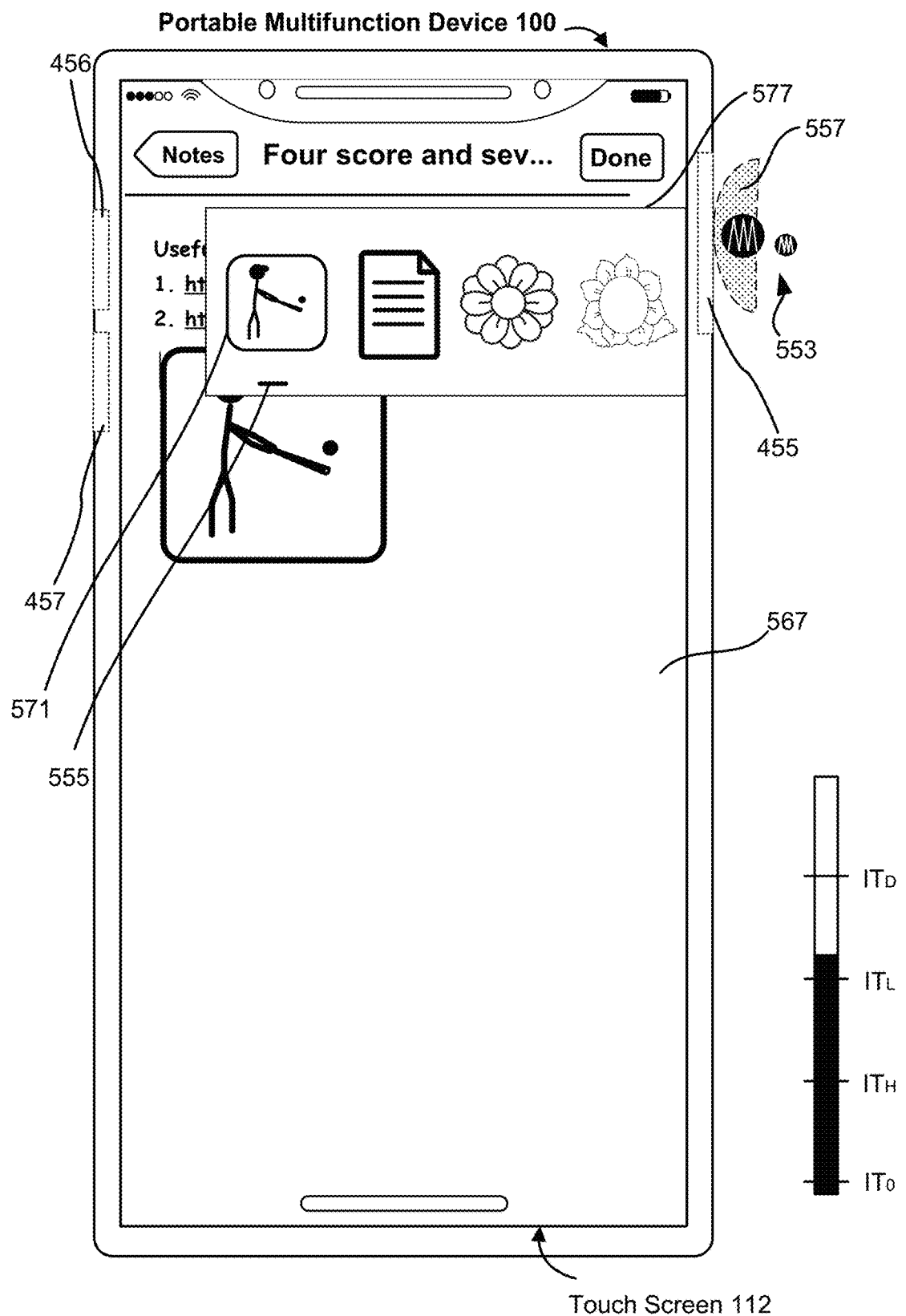
Figure 5D17

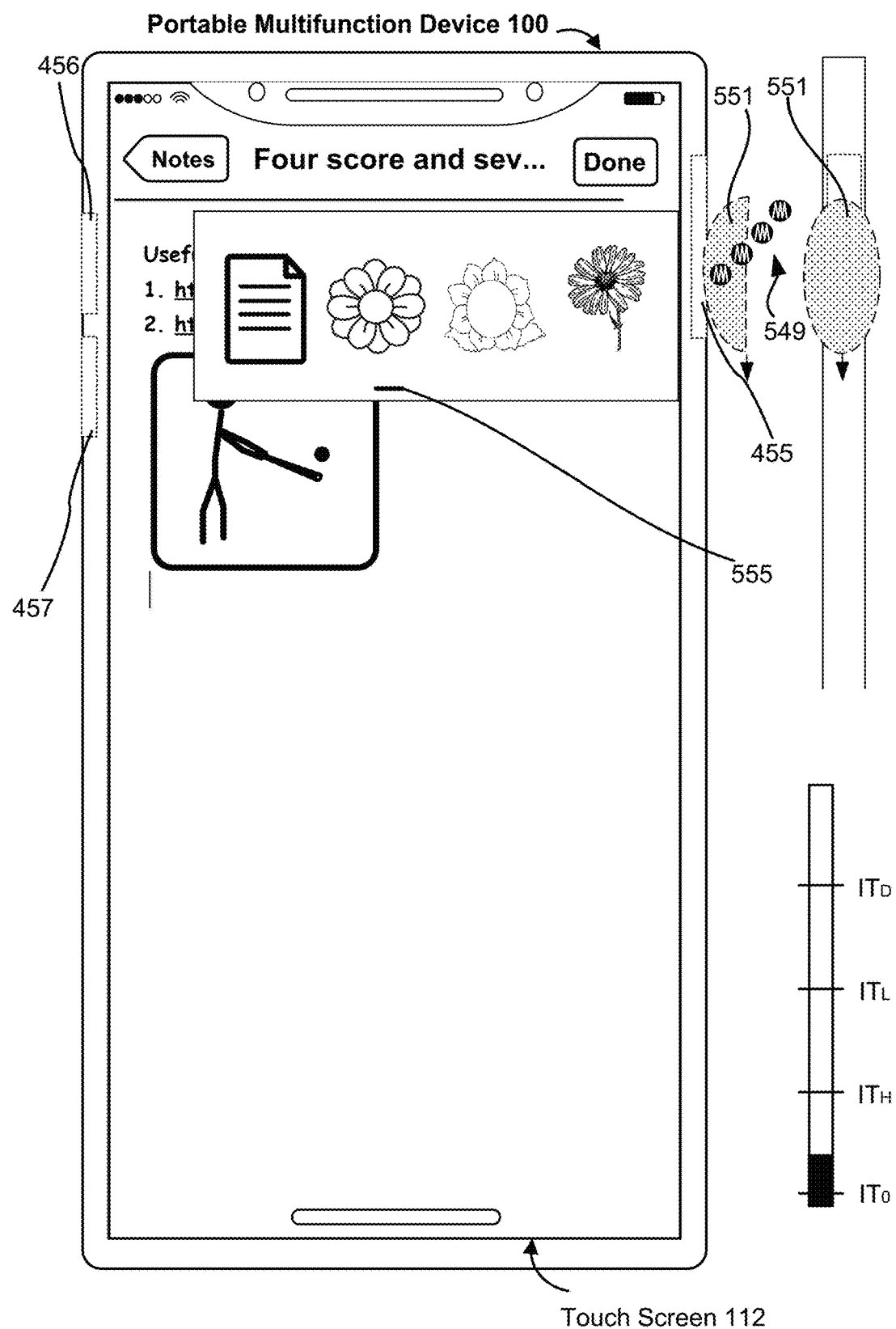
Figure 5D18

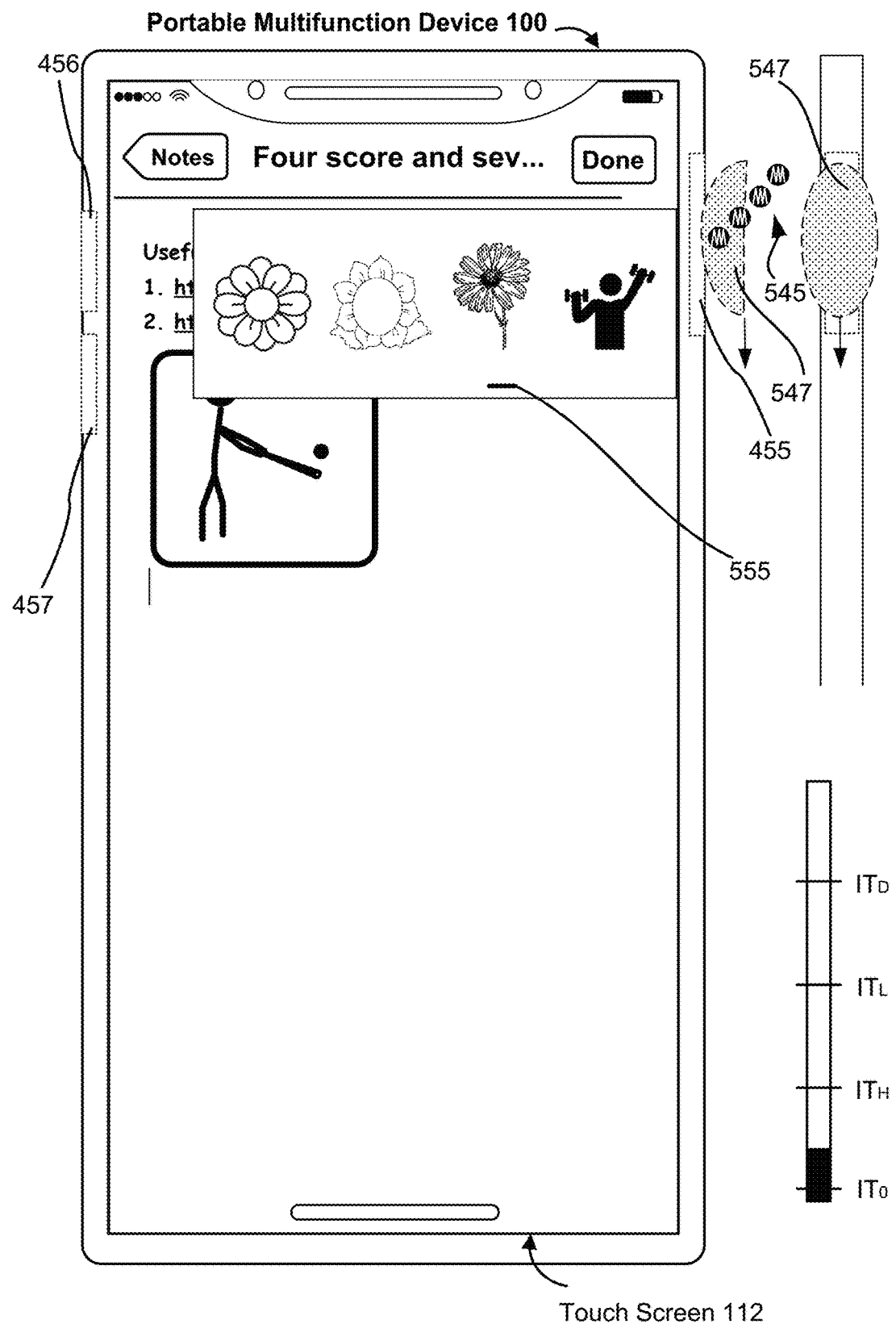
Figure 5D19

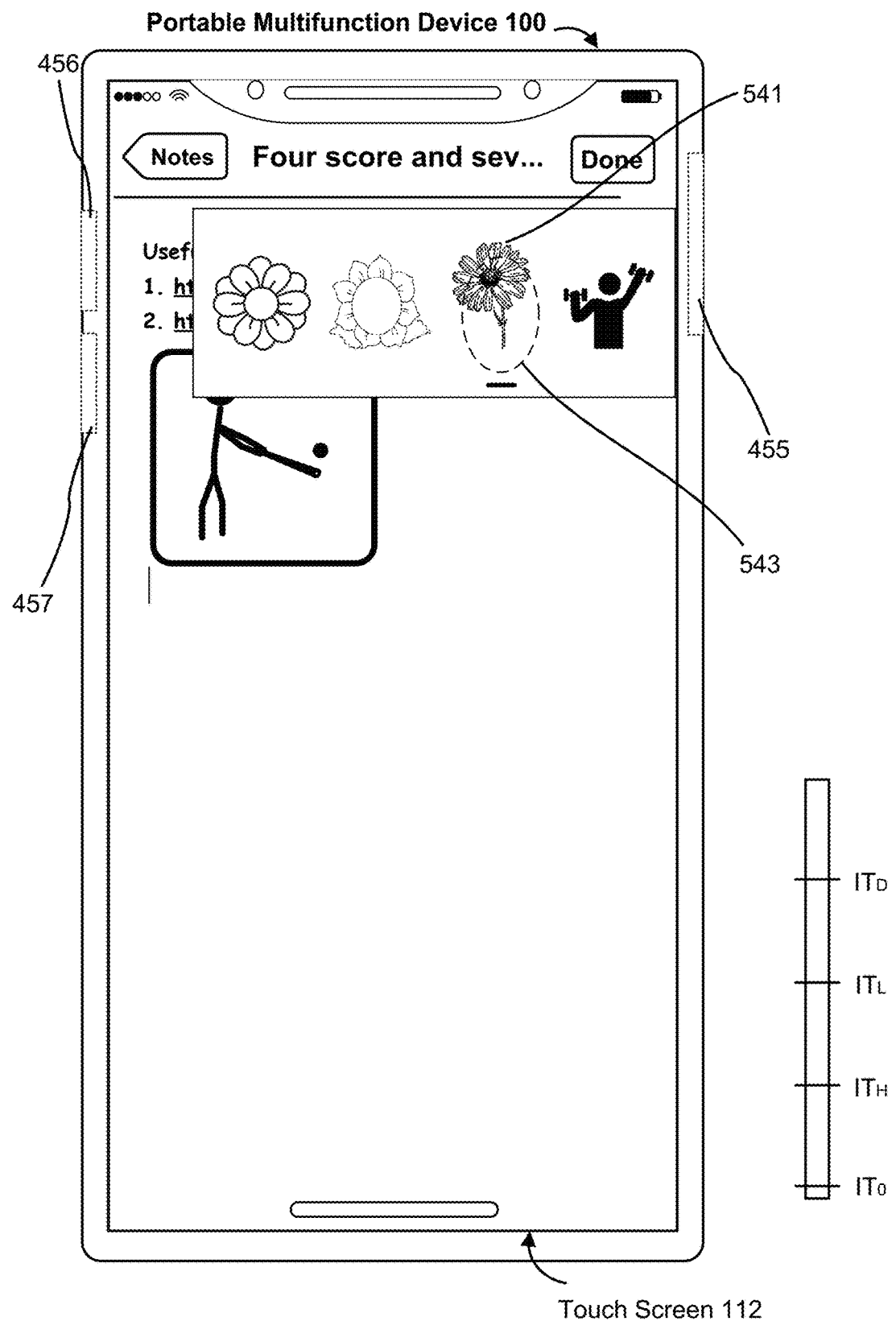
Figure 5D20

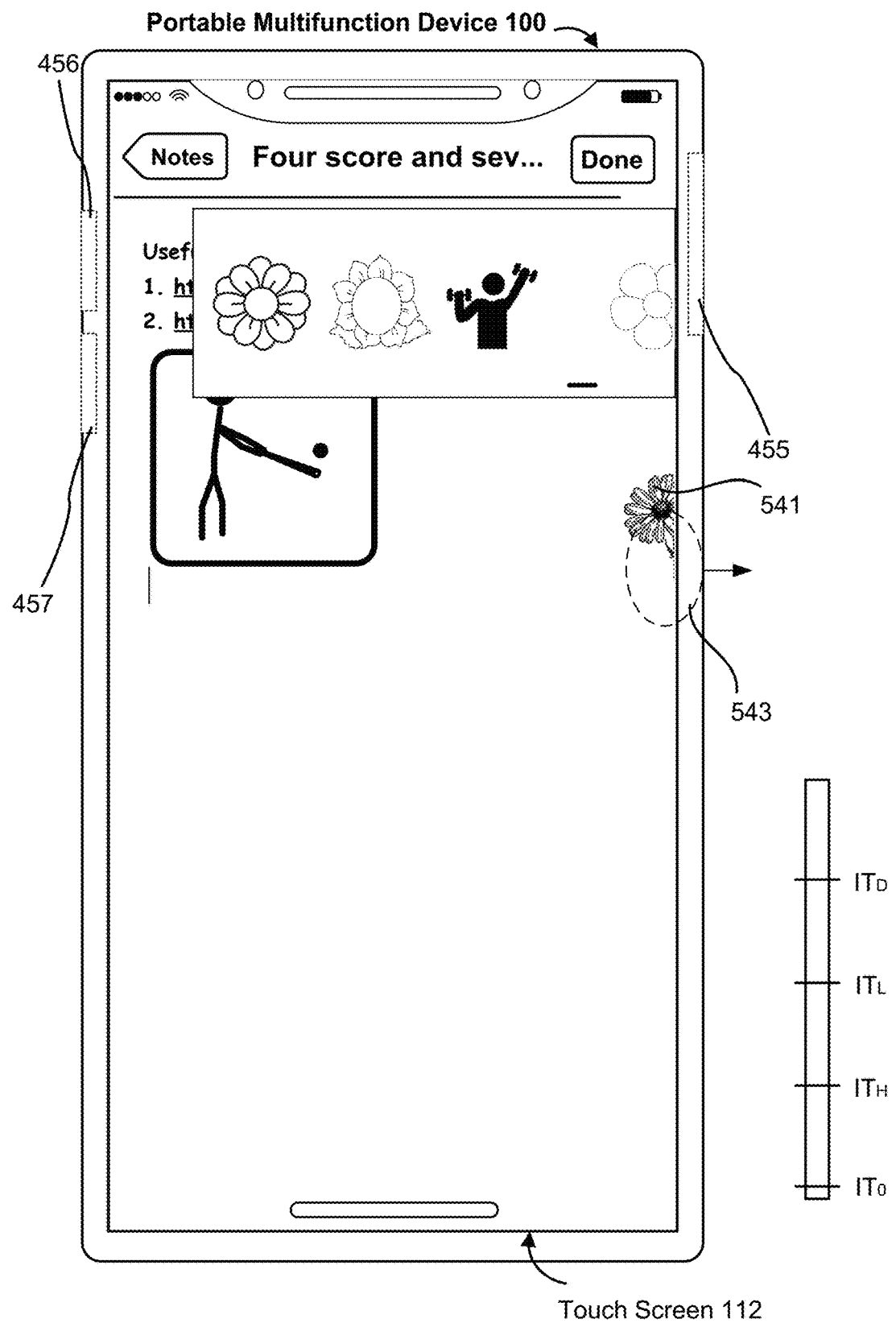
Figure 5D21

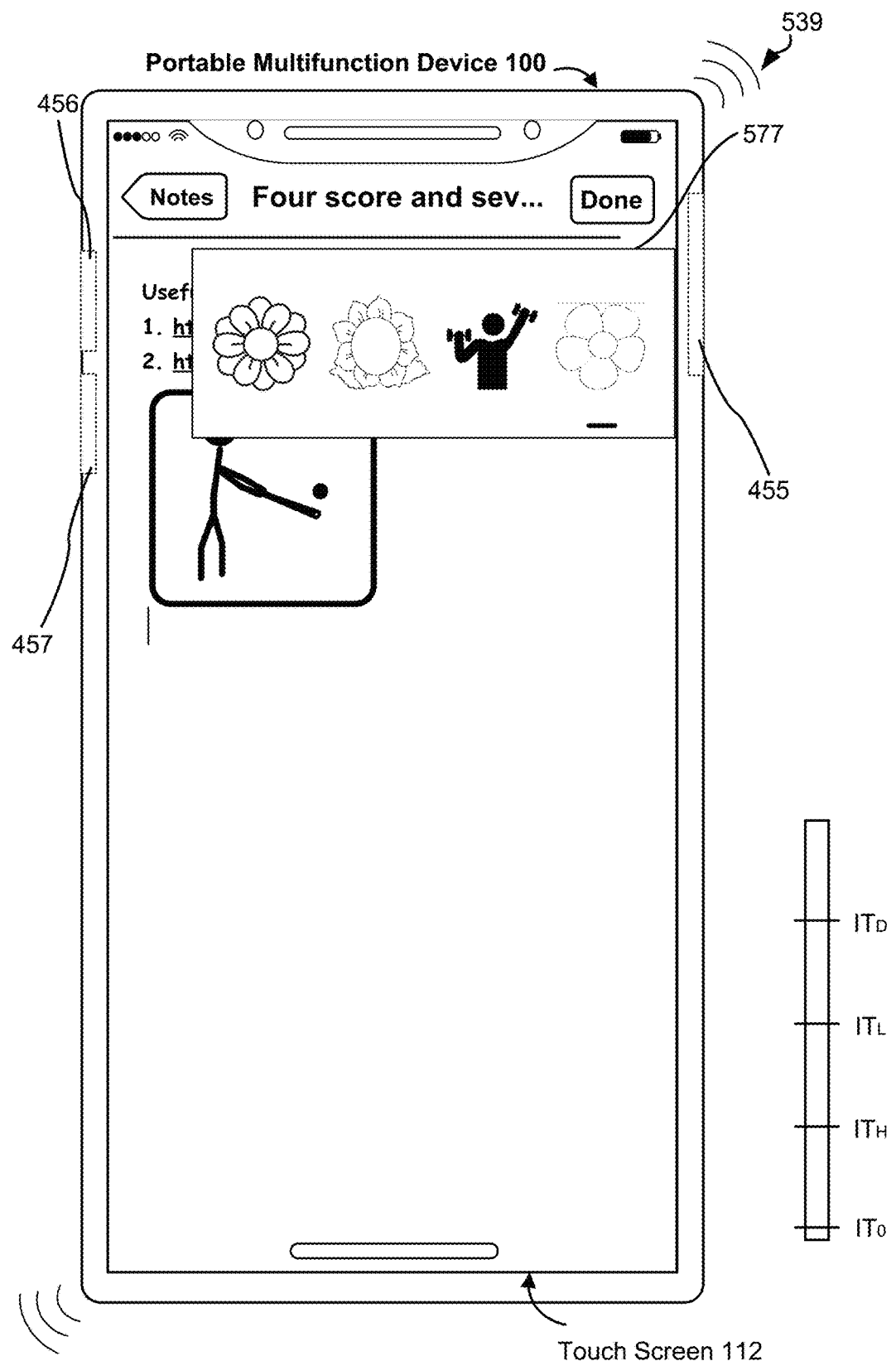
Figure 5D22

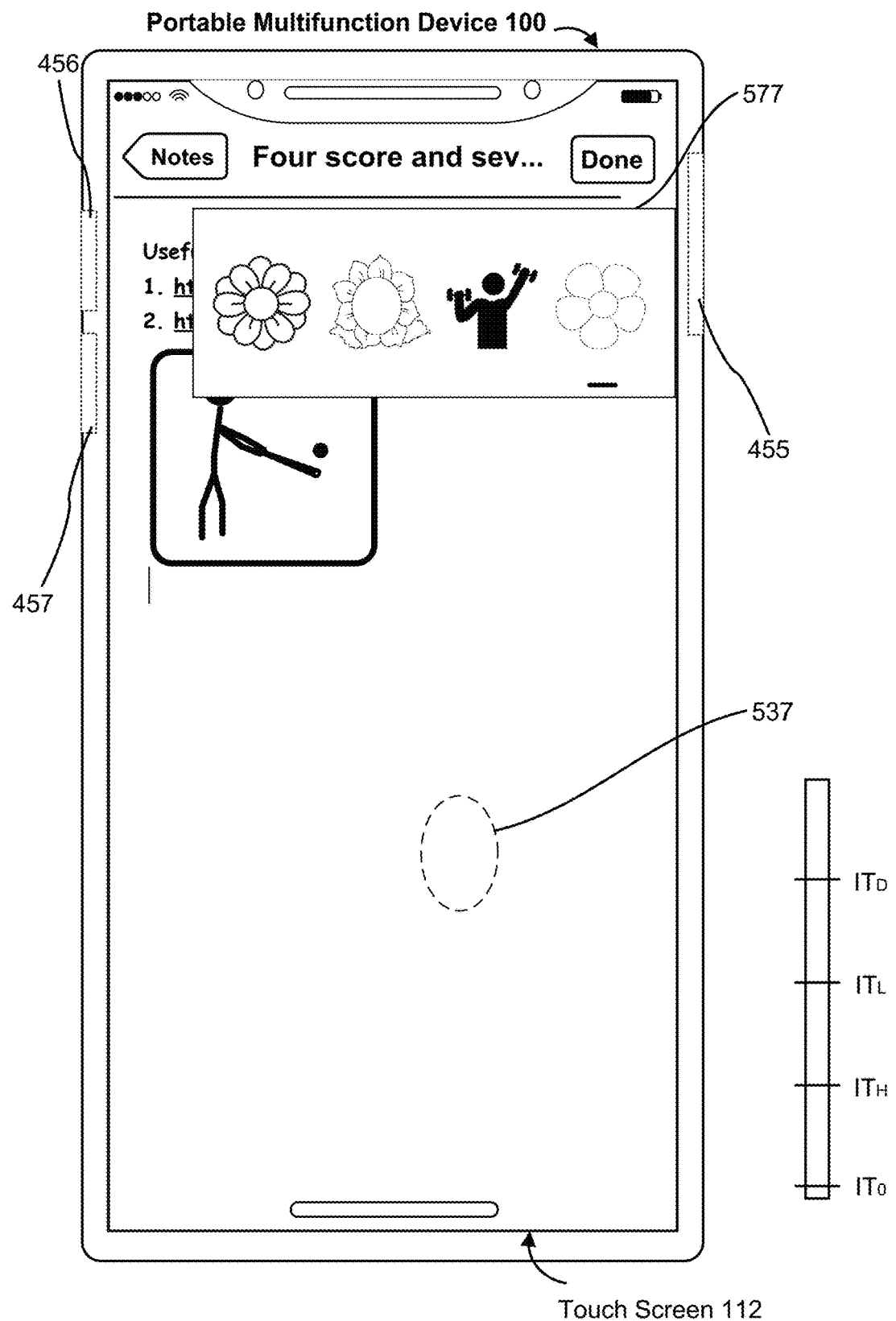
Figure 5D23

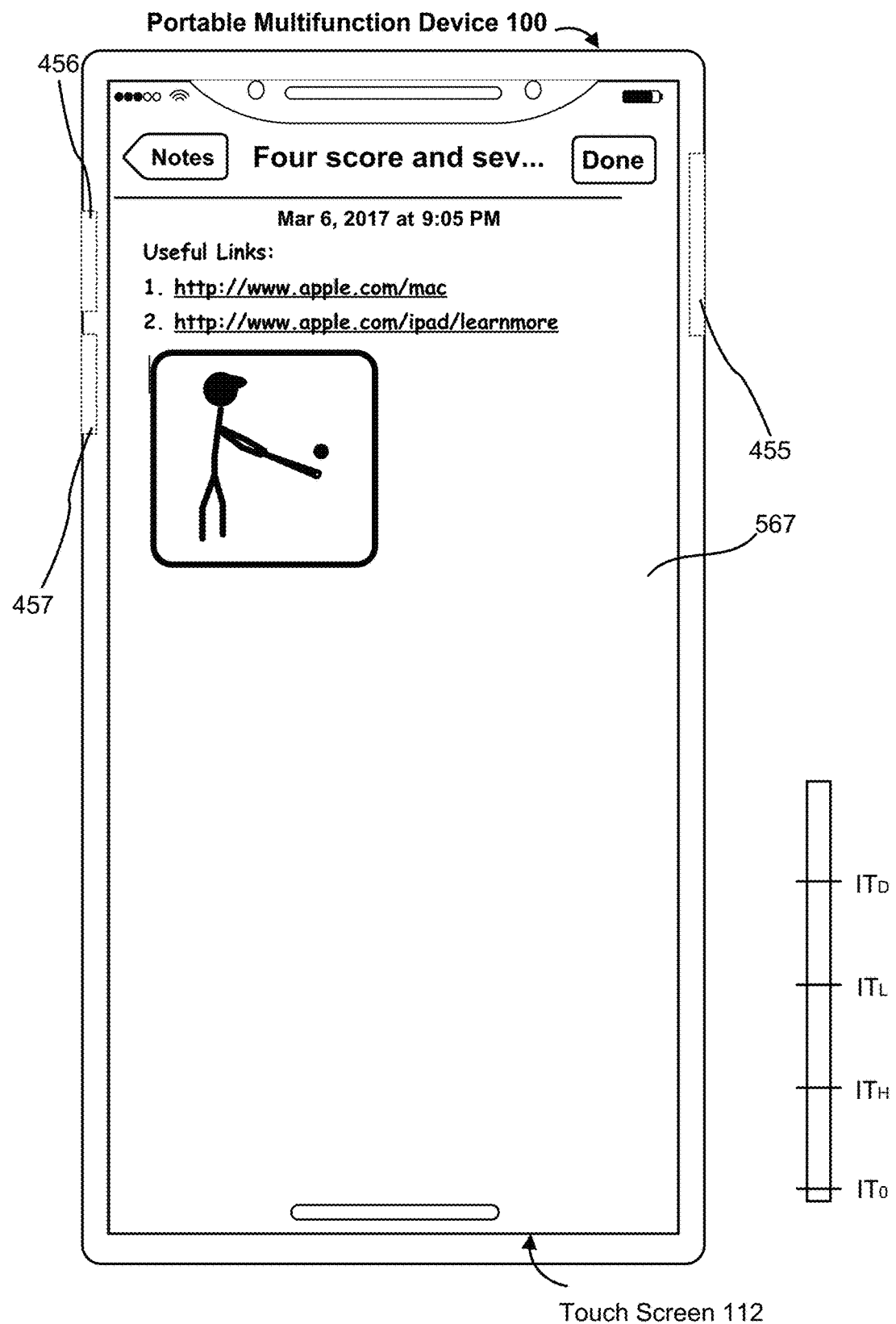
Figure 5D24

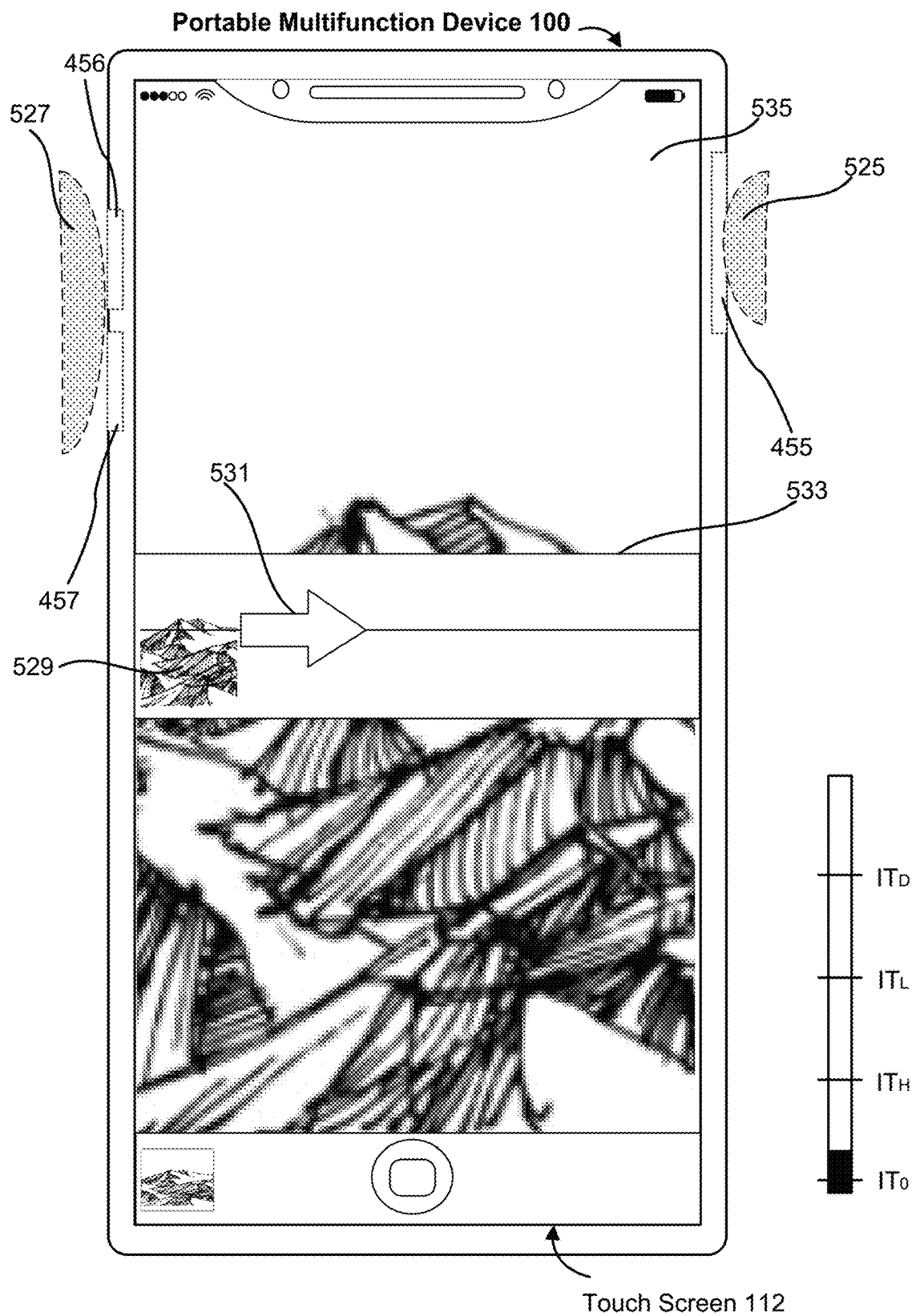
Figure 5E1

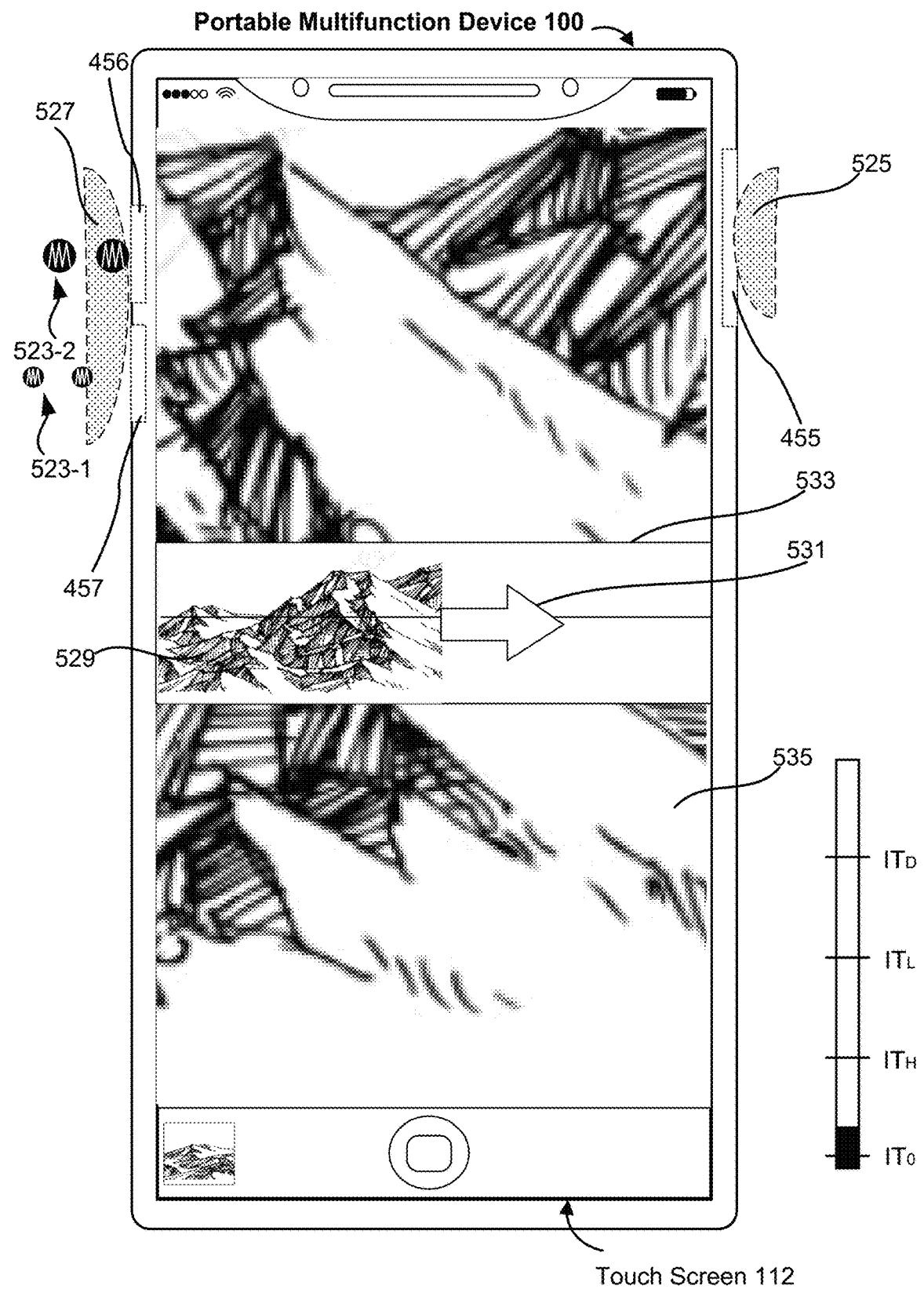
Figure 5E2

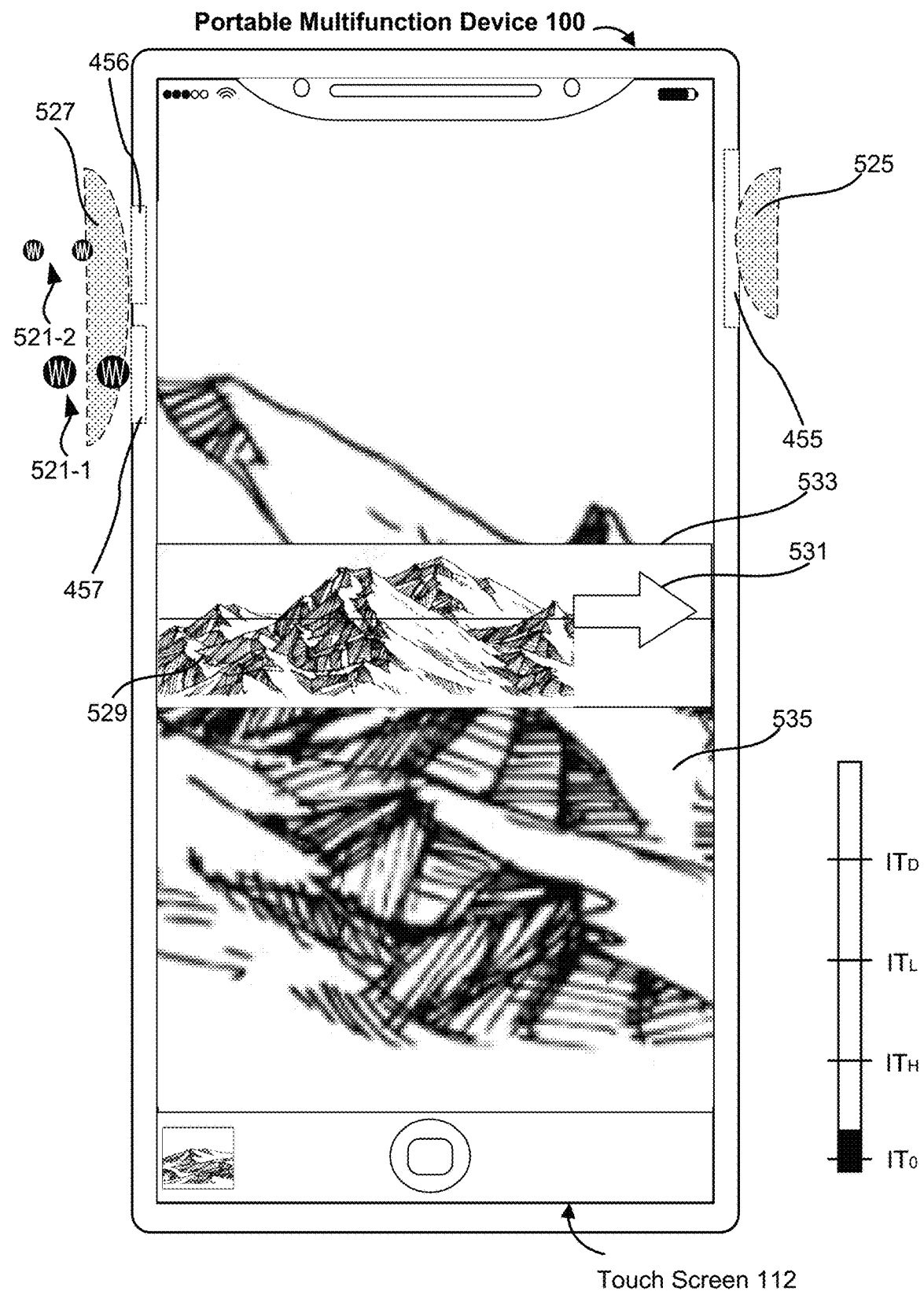
Figure 5E3

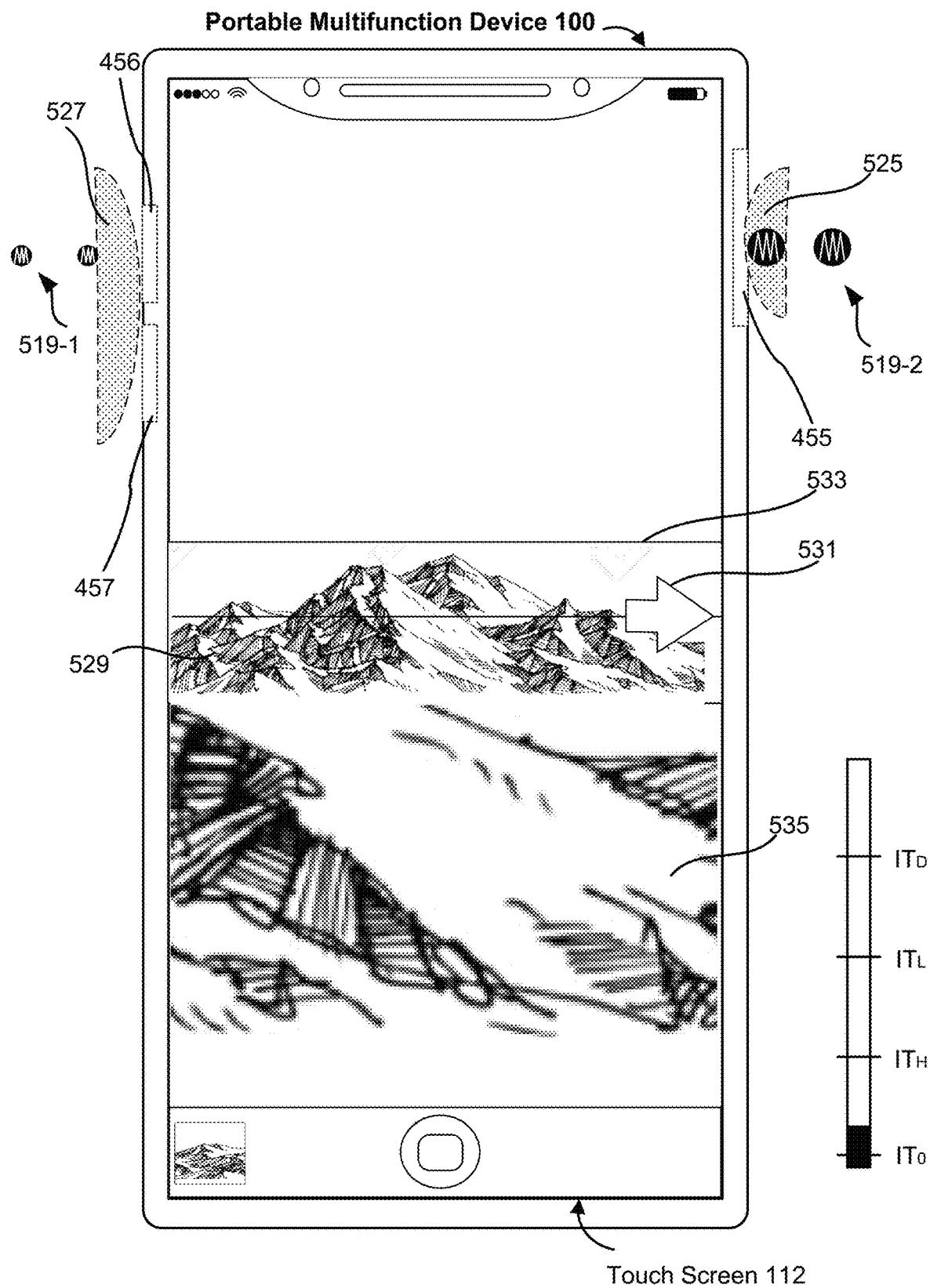
Figure 5E4

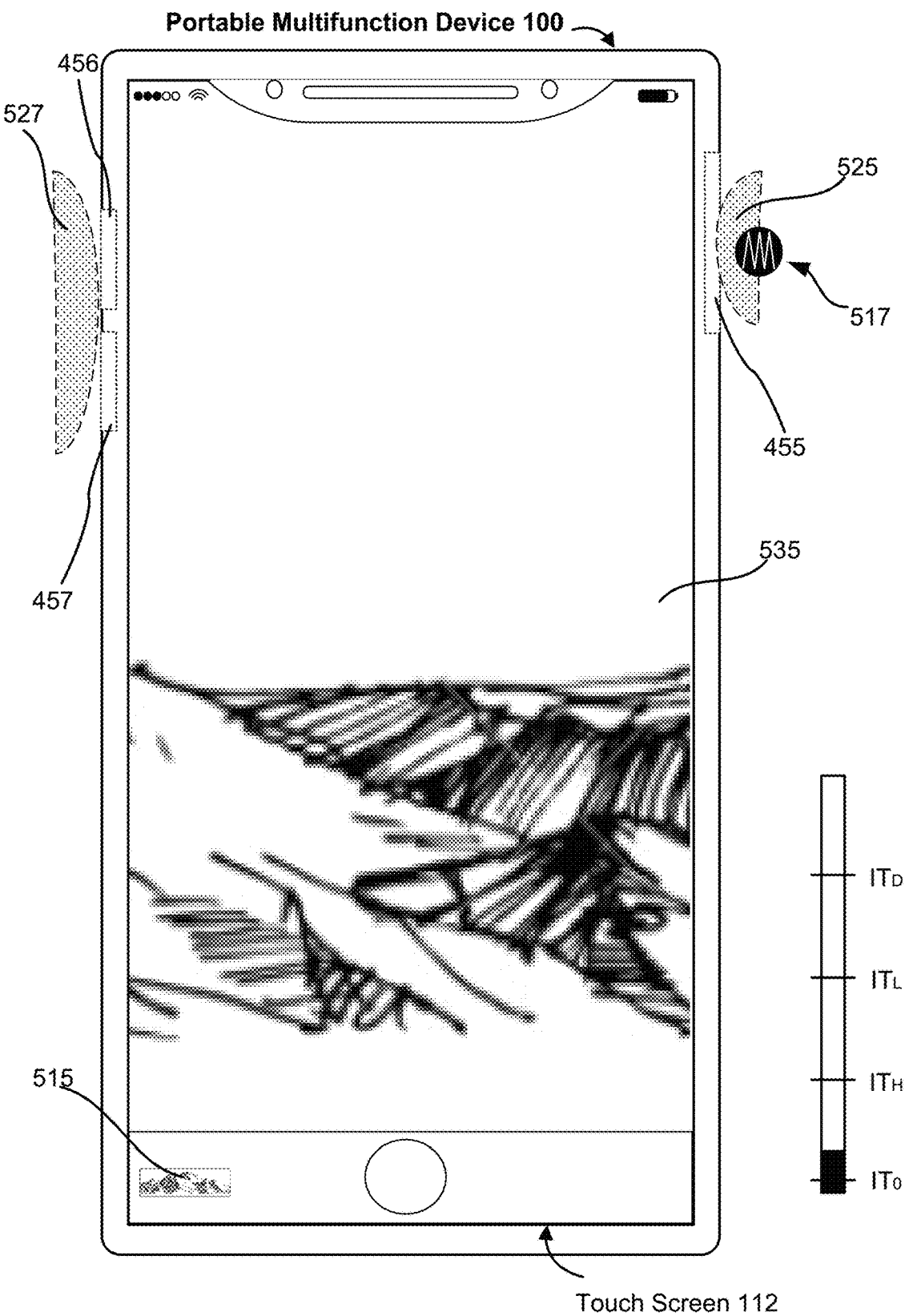
Figure 5E5

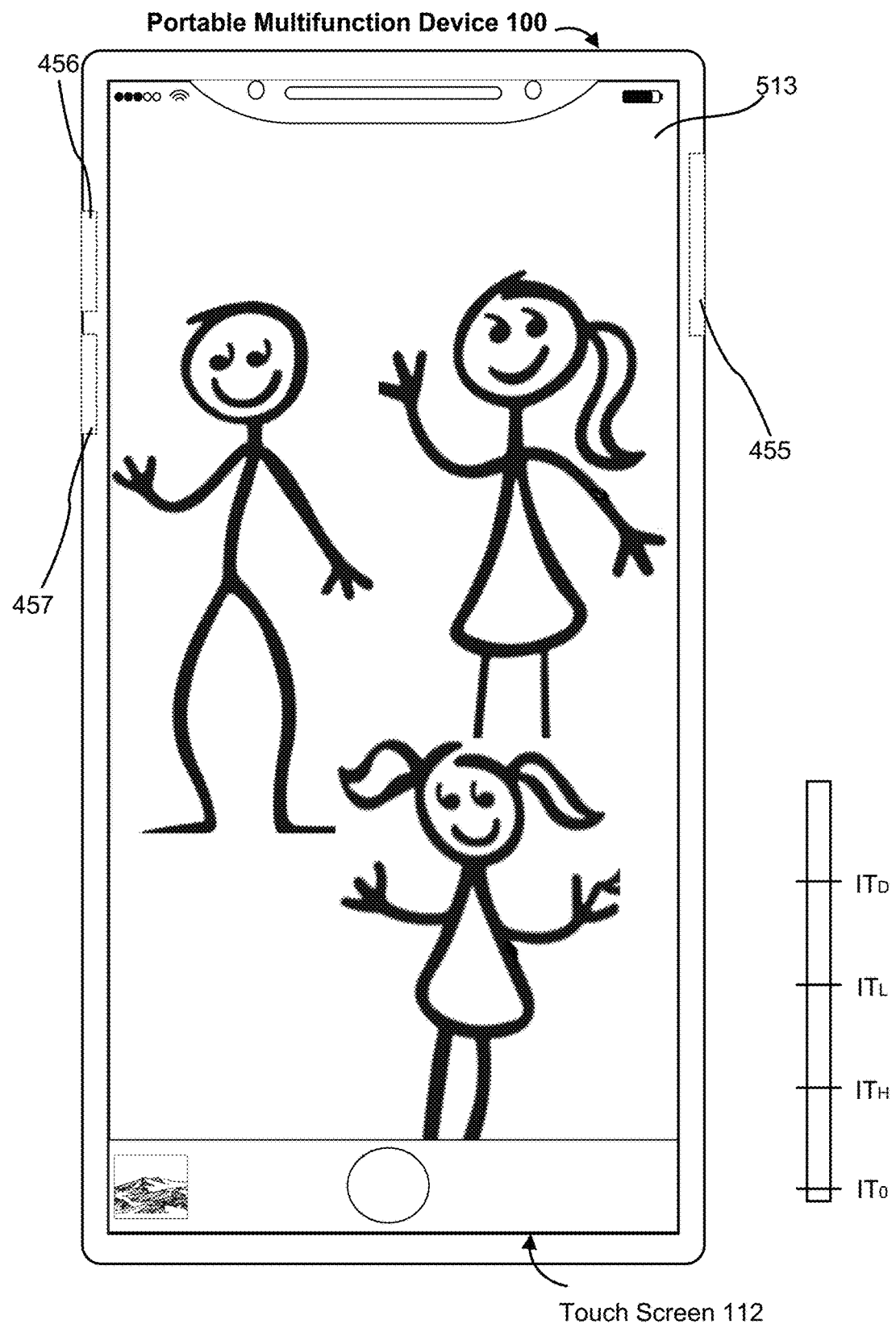
Figure 5F1

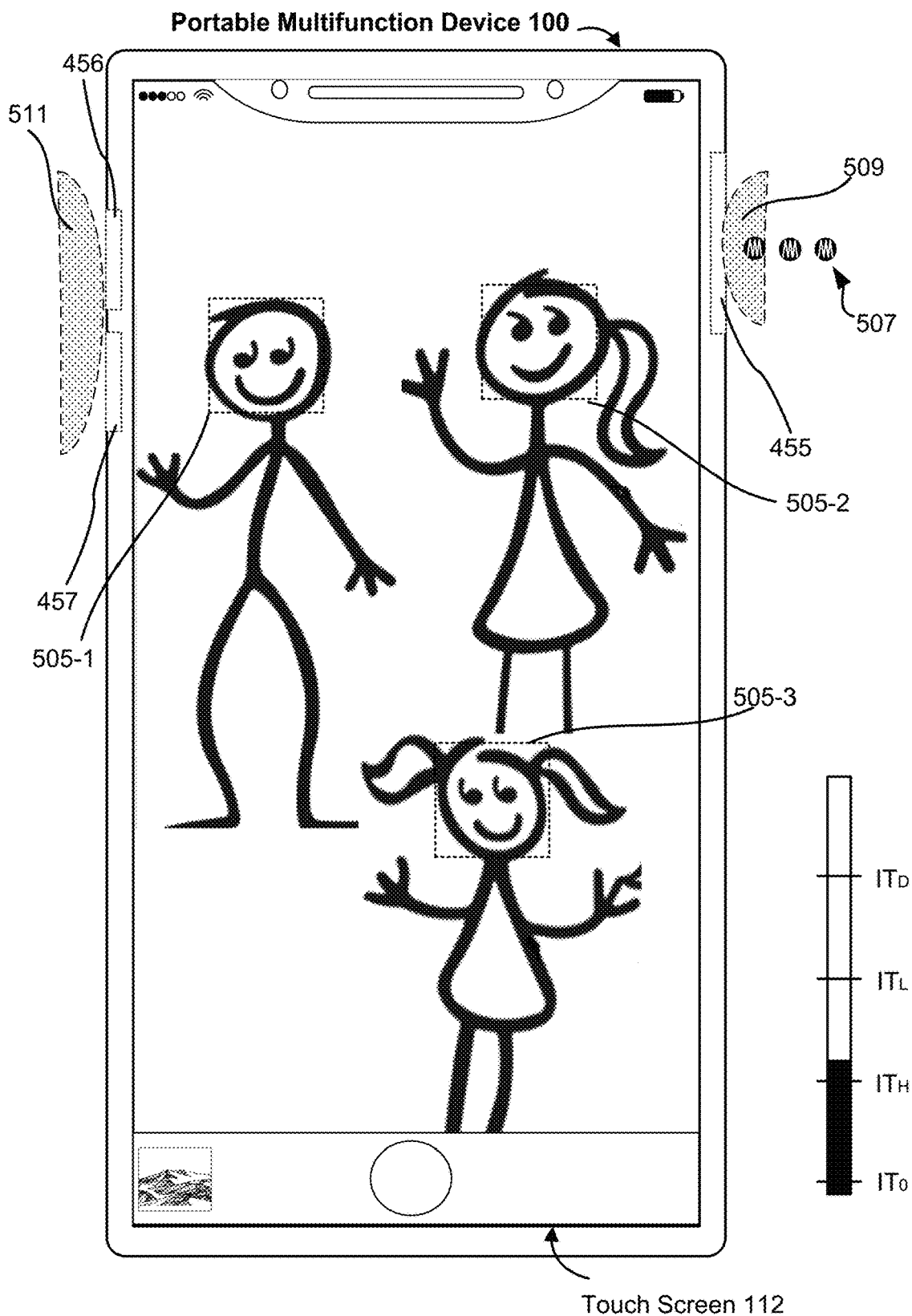
Figure 5F2

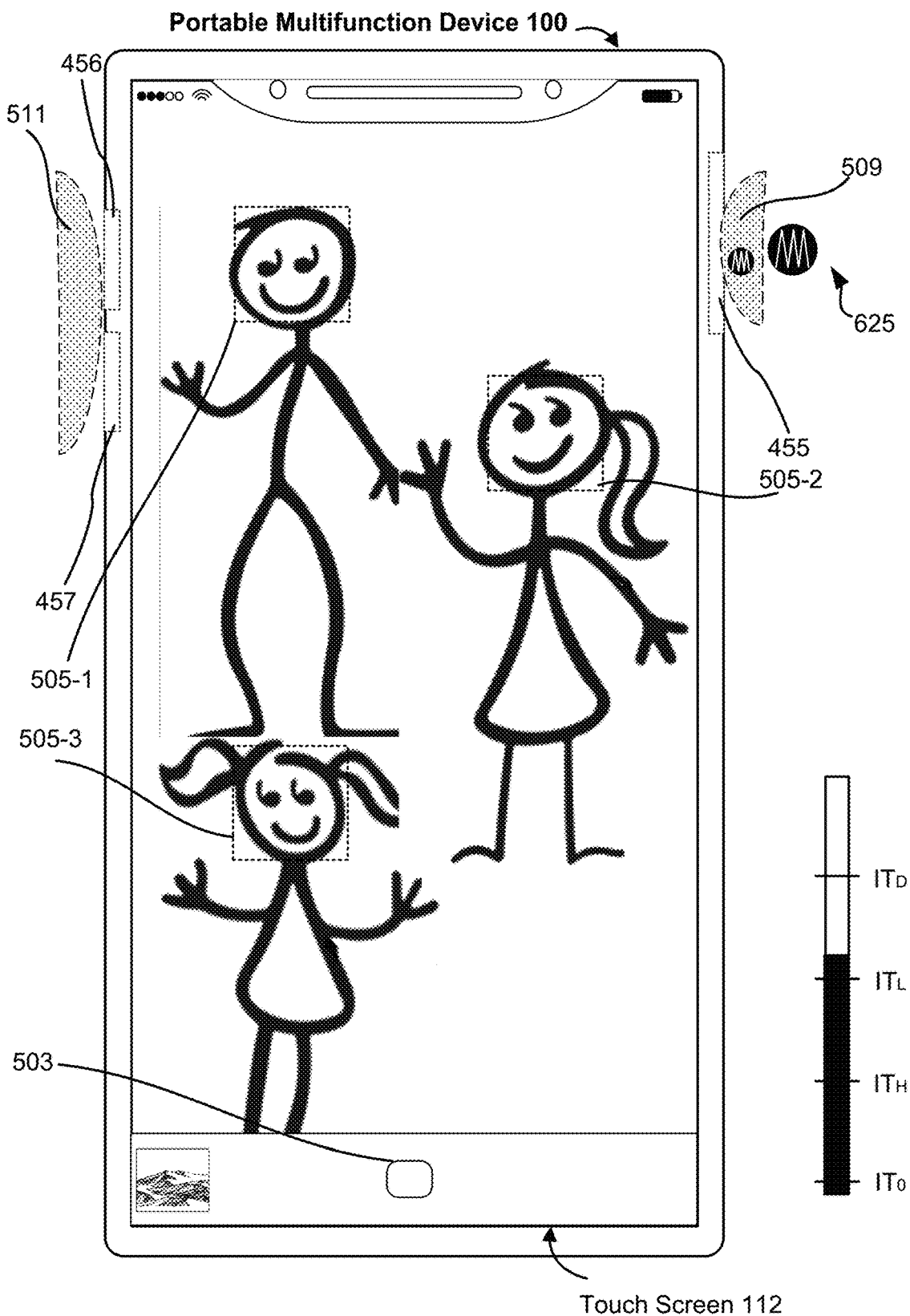
Figure 5F3

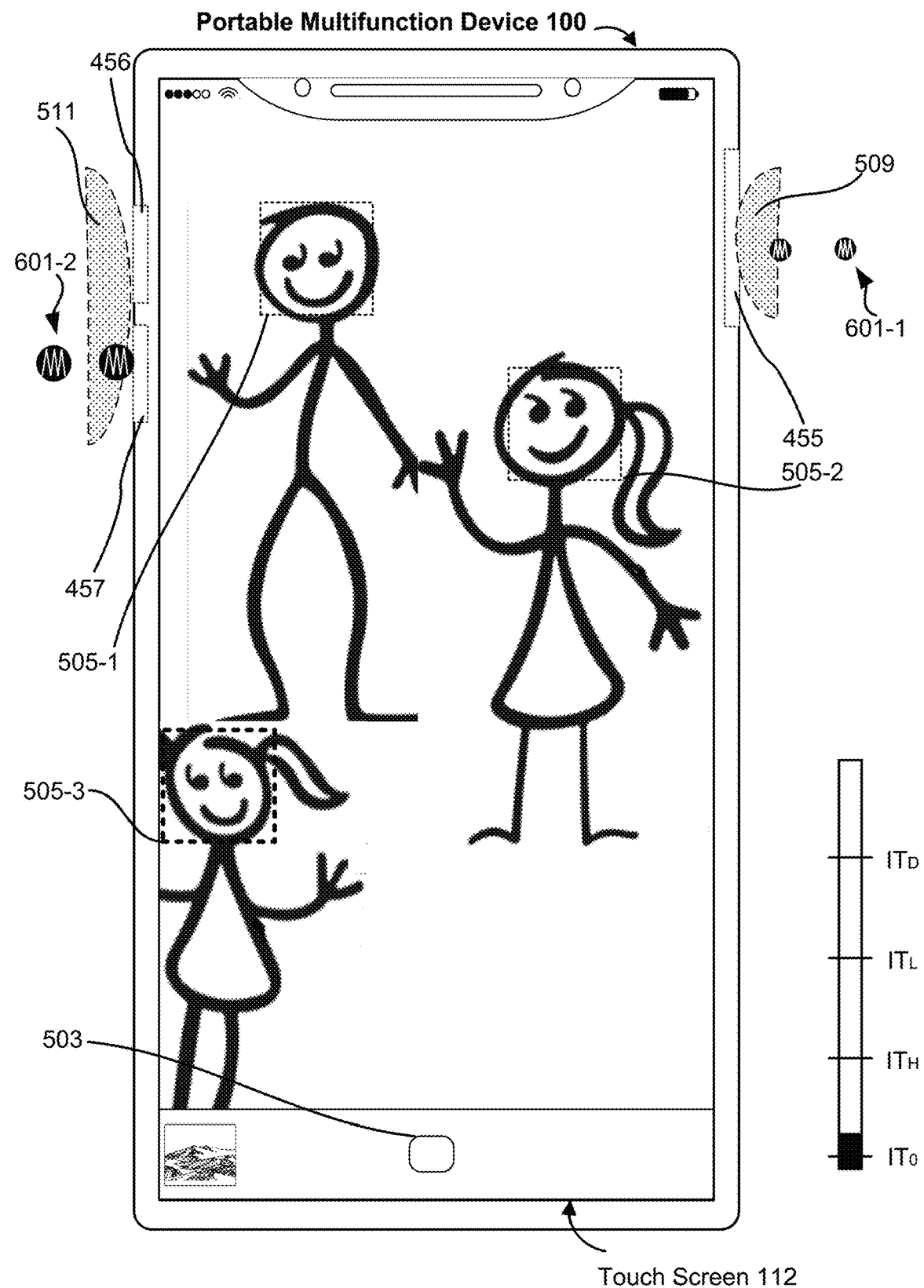
Figure 5F4

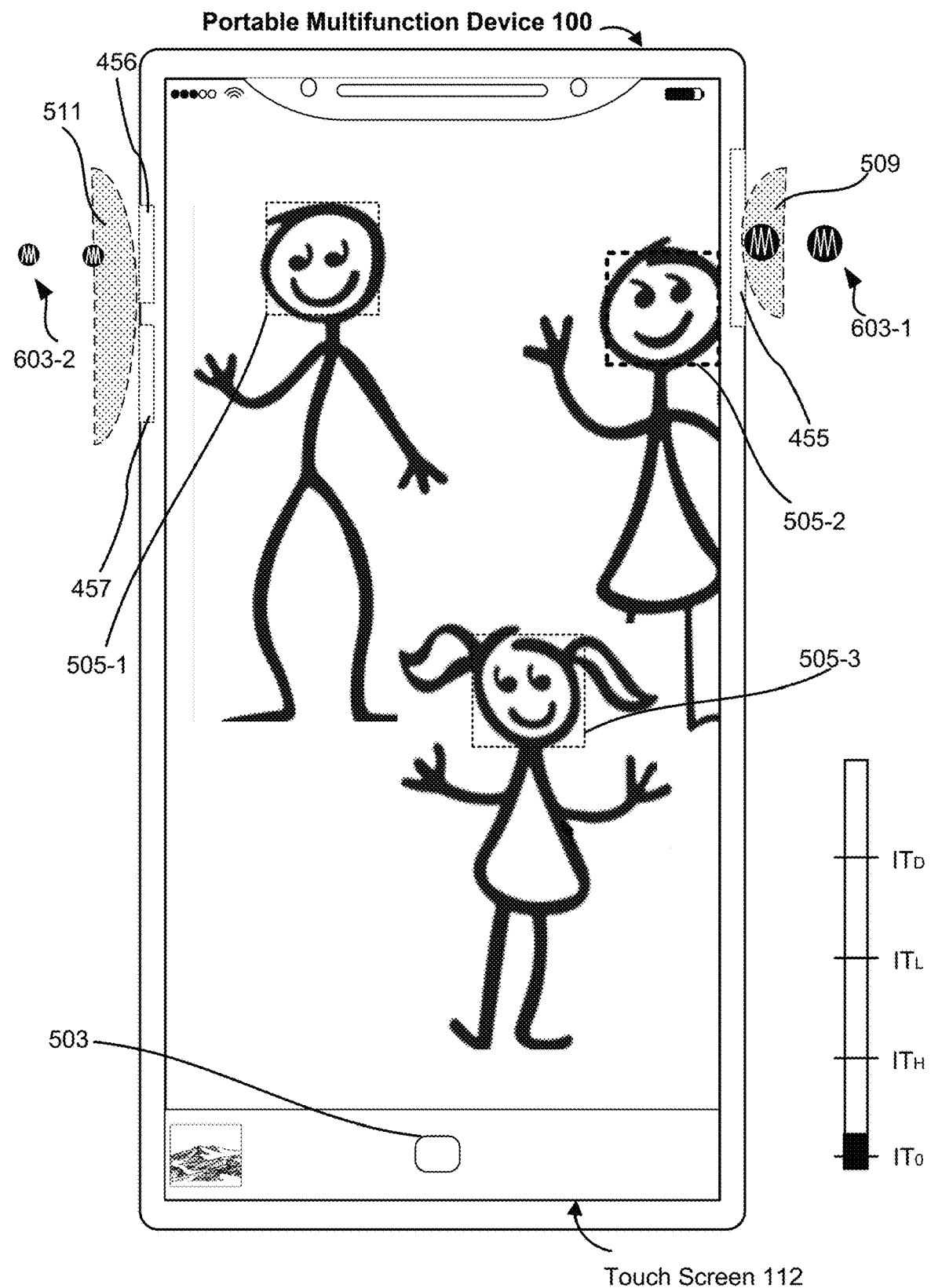
Figure 5F5

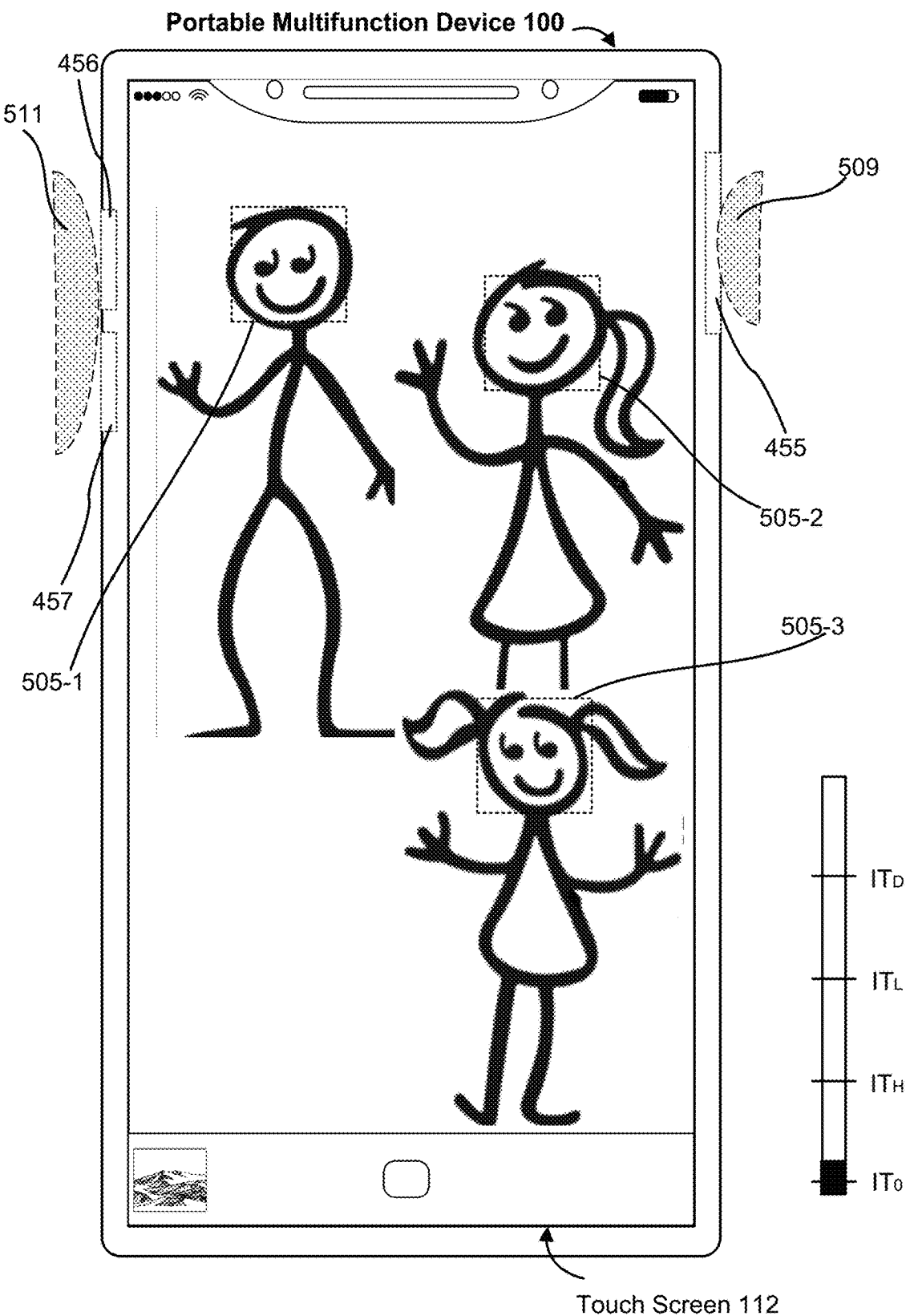
Figure 5F6

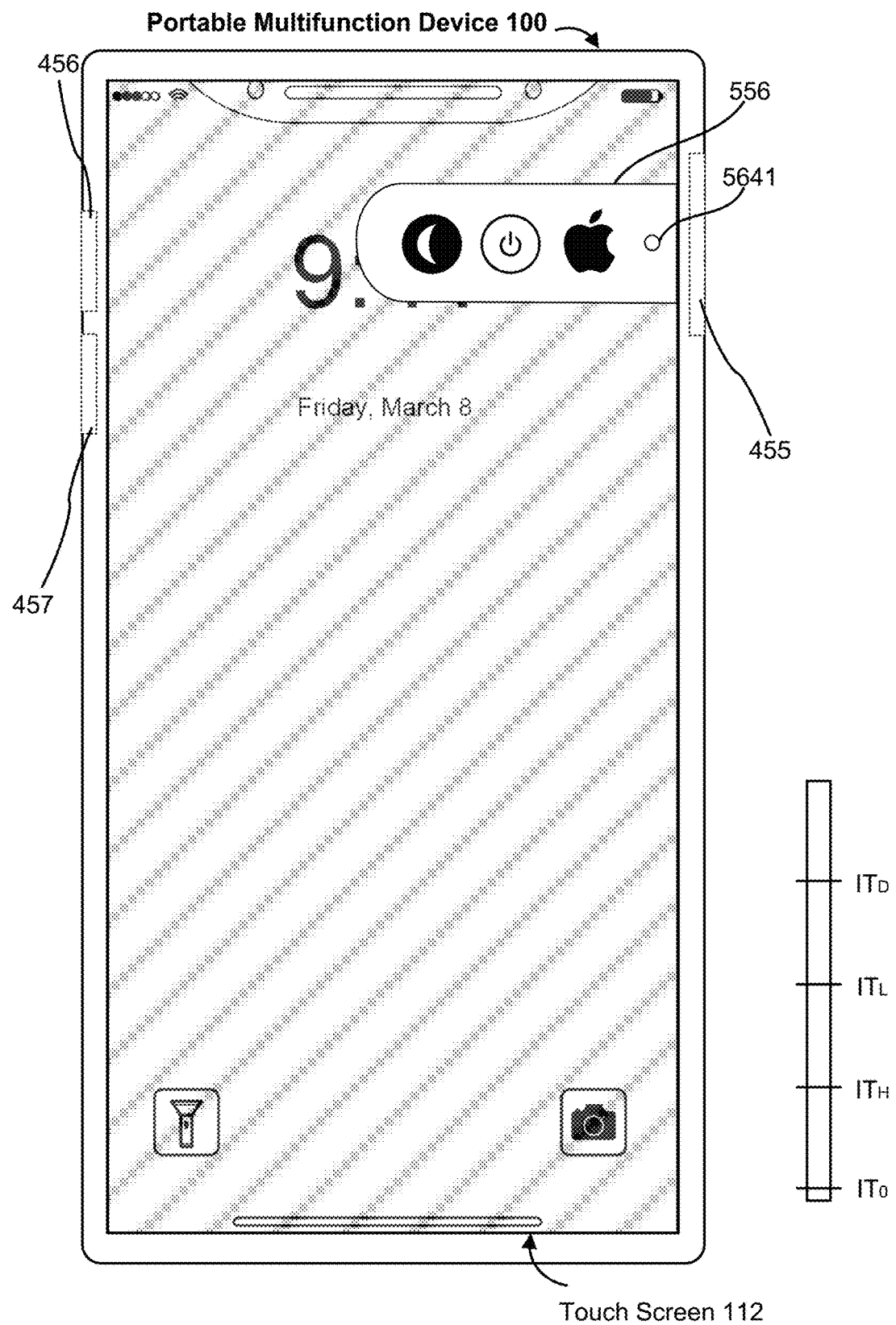
Figure 5G1

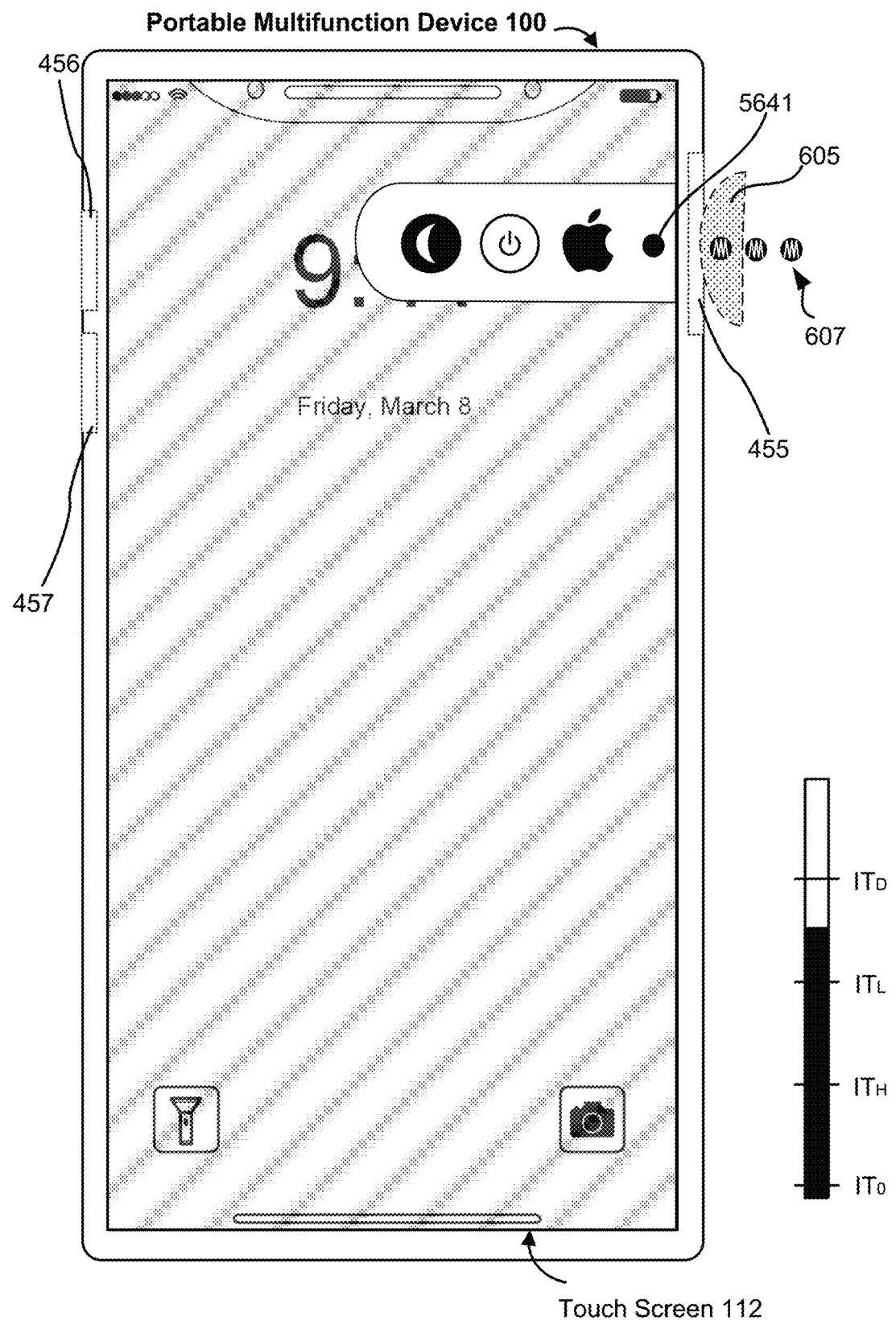
Figure 5G2

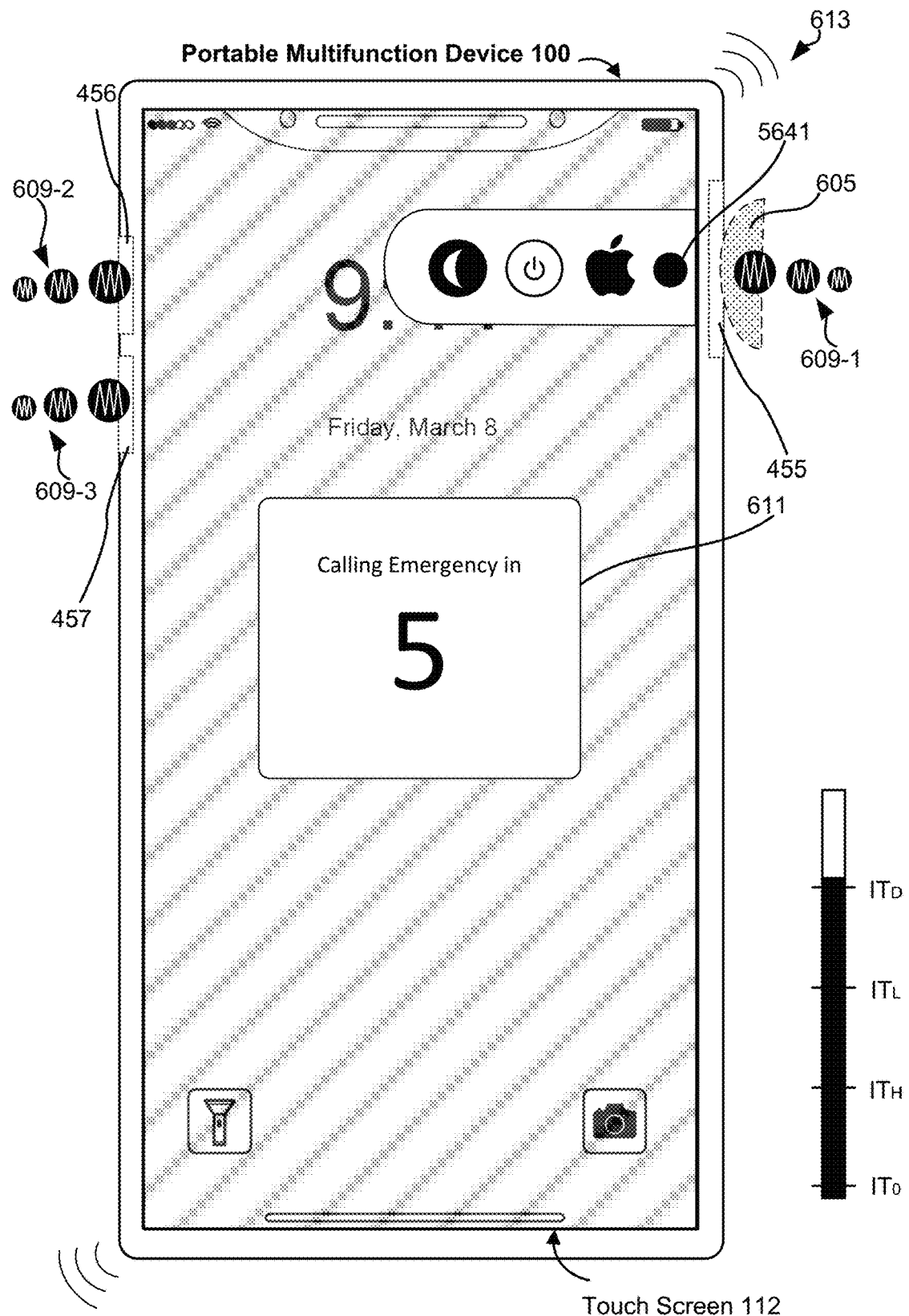
Figure 5G3

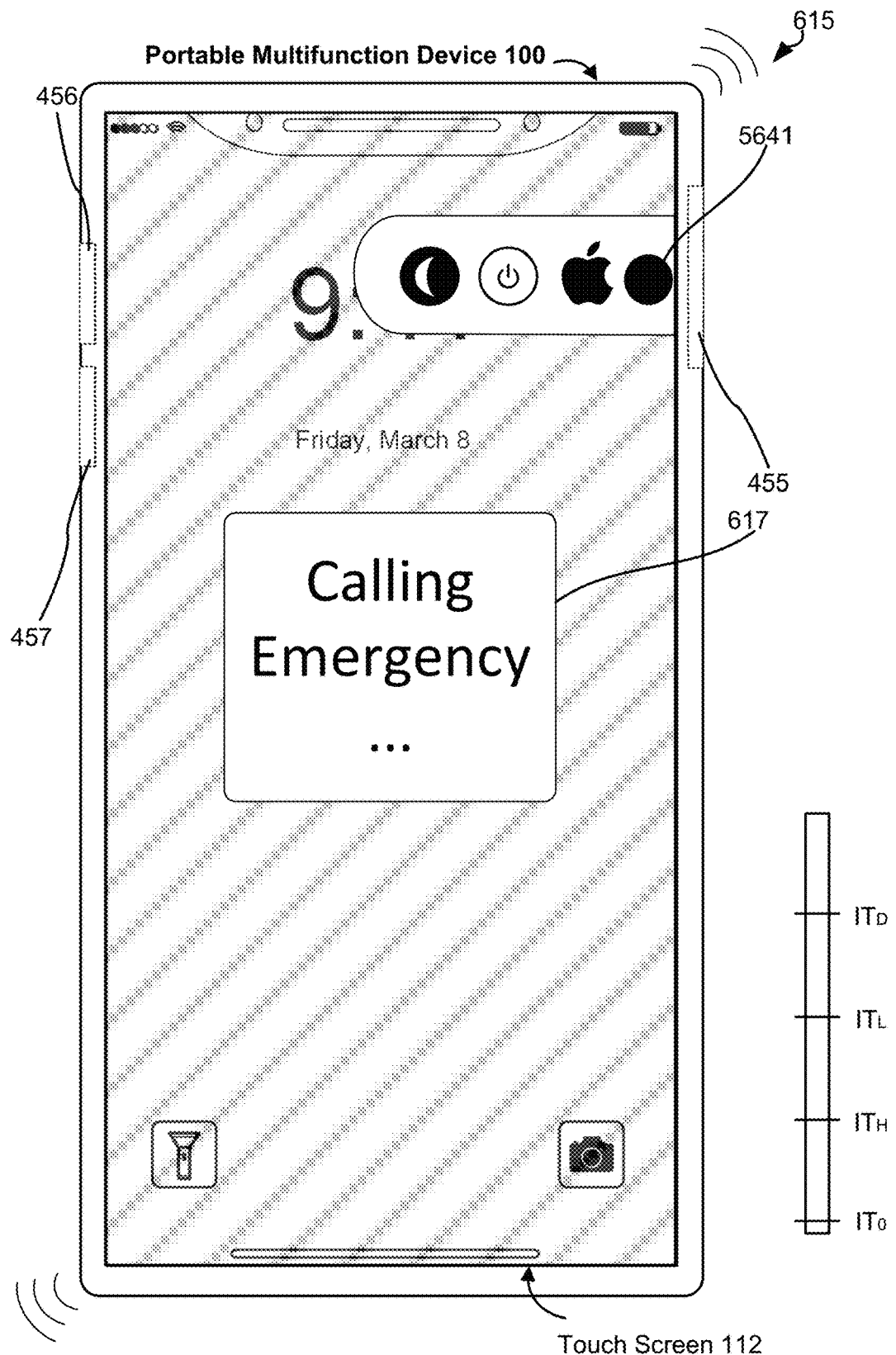
Figure 5G4

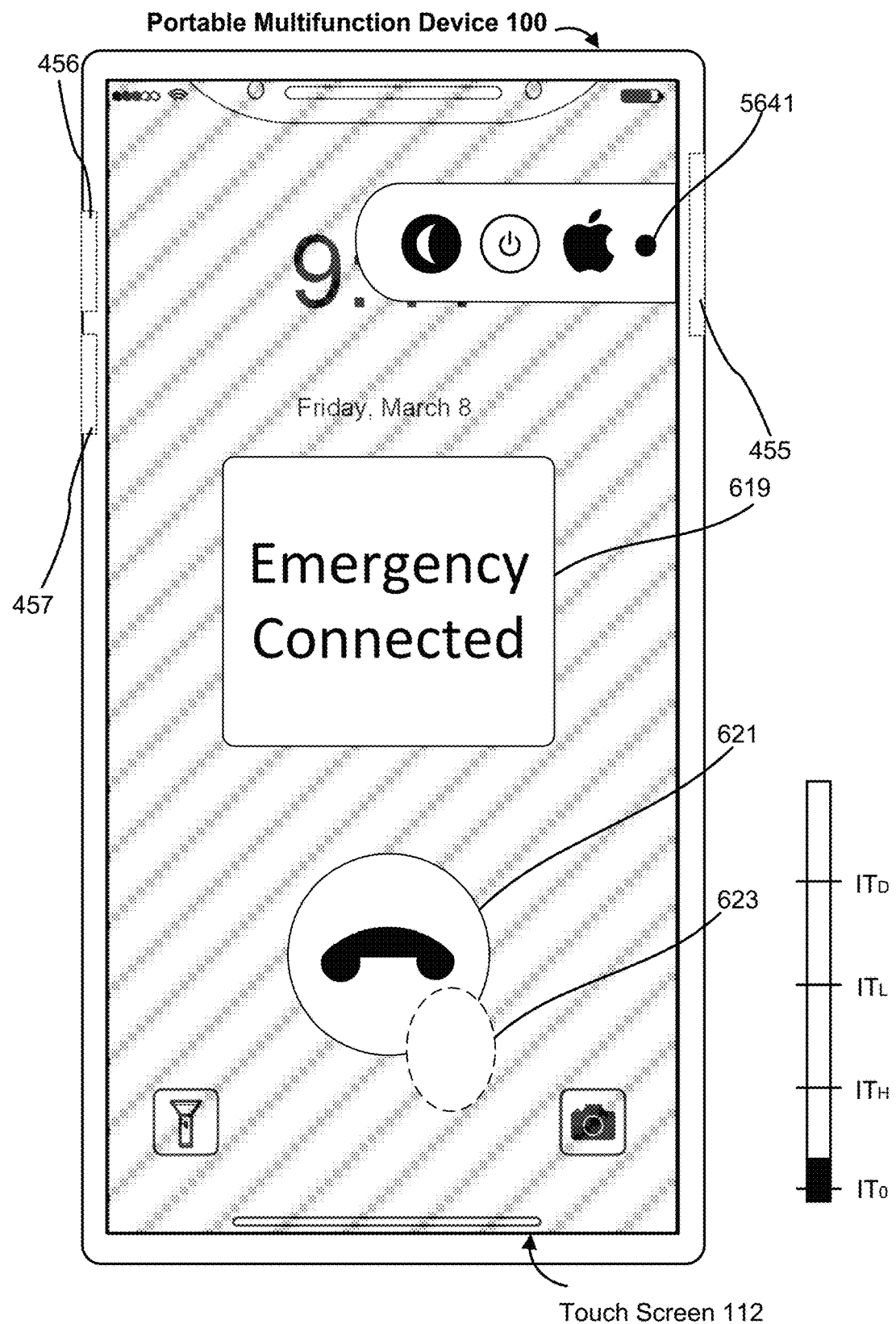
Figure 5G5

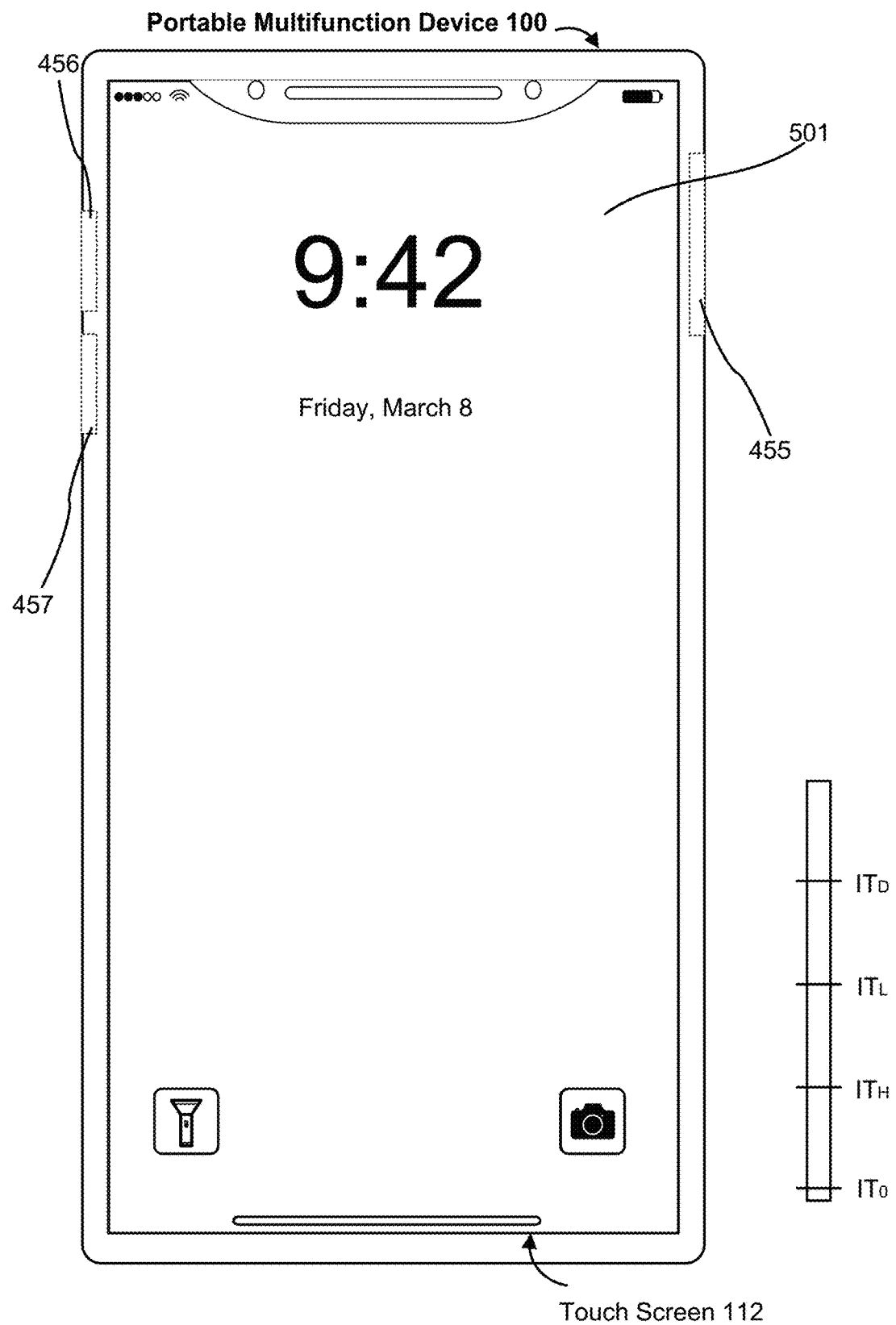
Figure 5H1

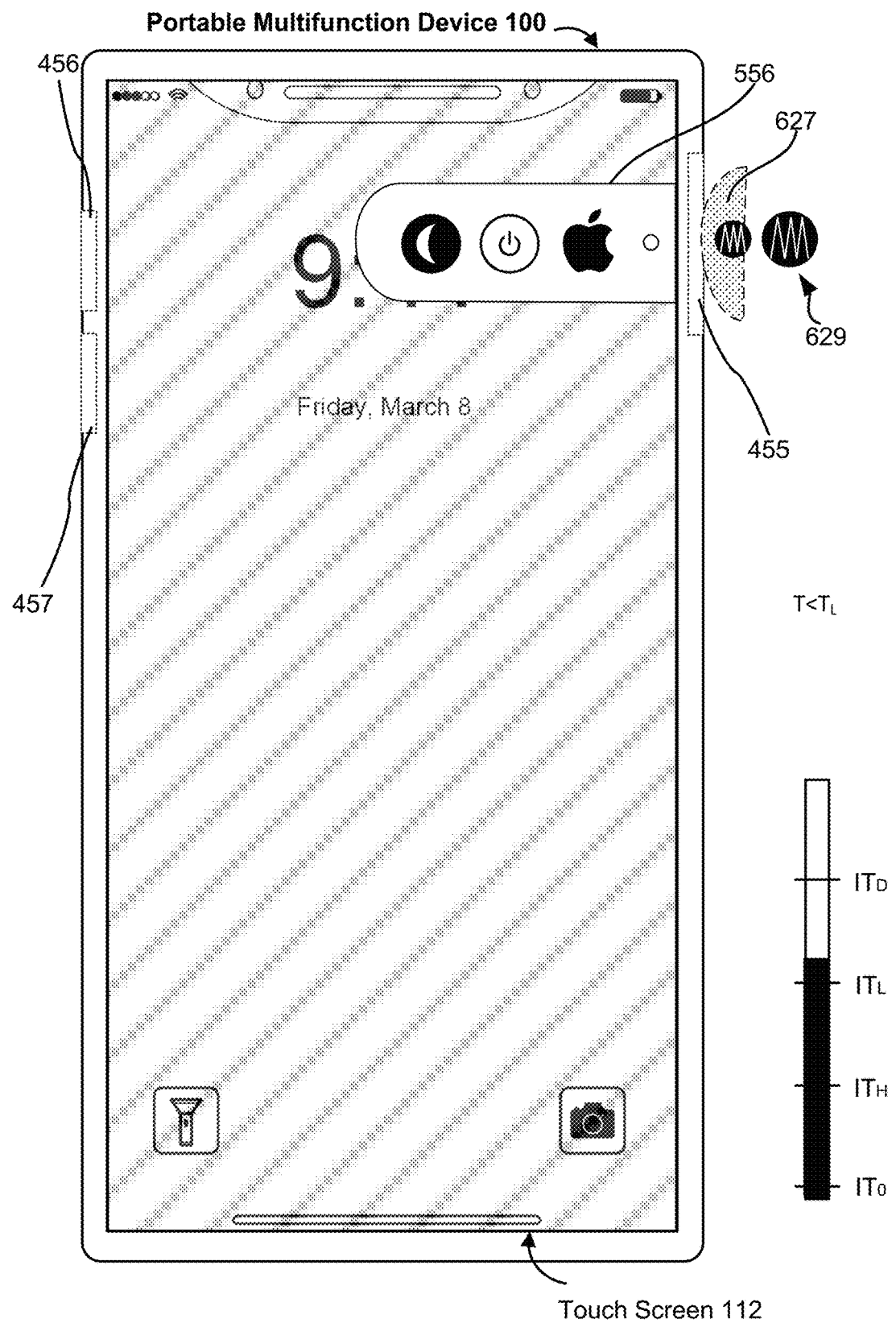
Figure 5H2

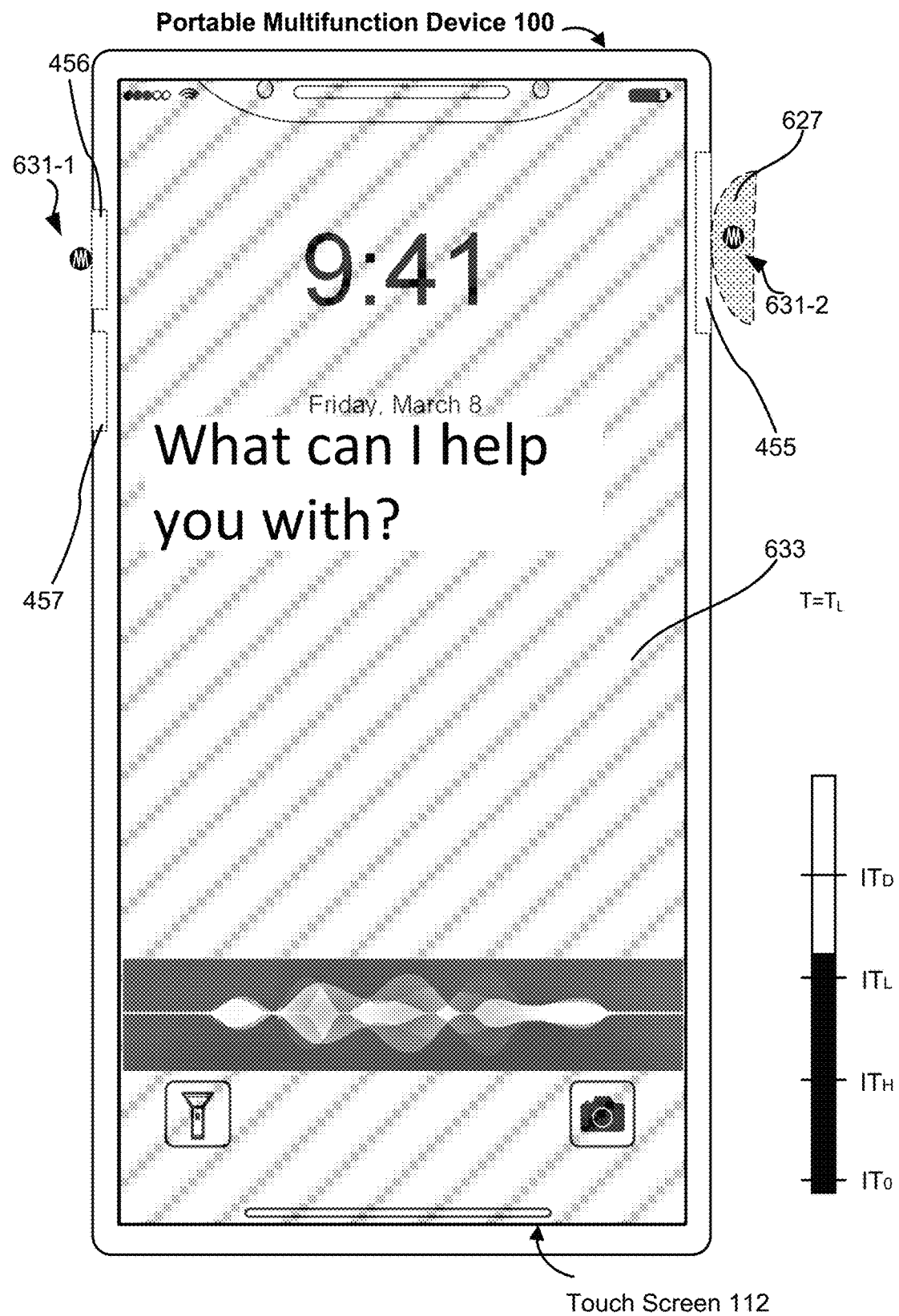
Figure 5H3

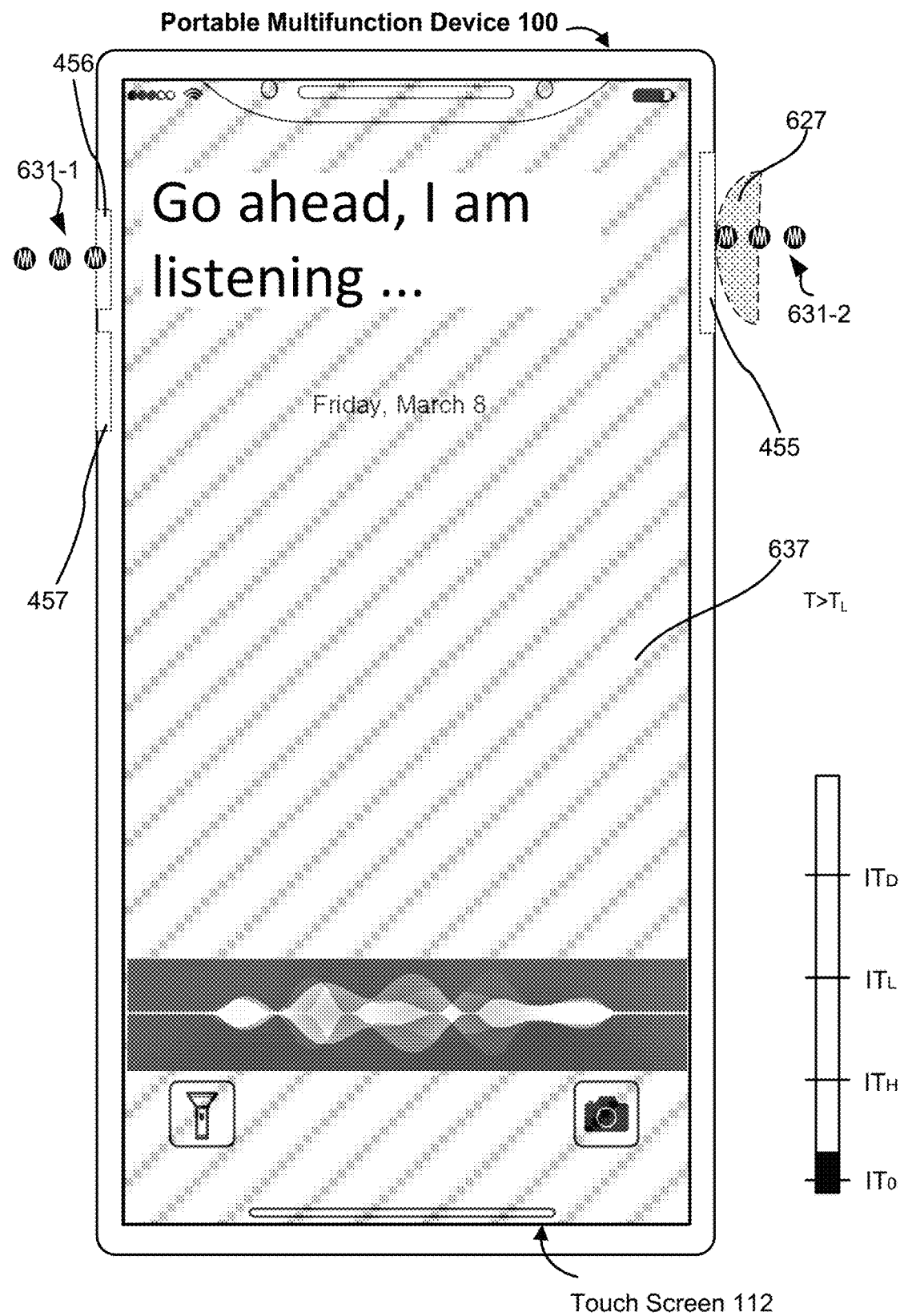
Figure 5H4

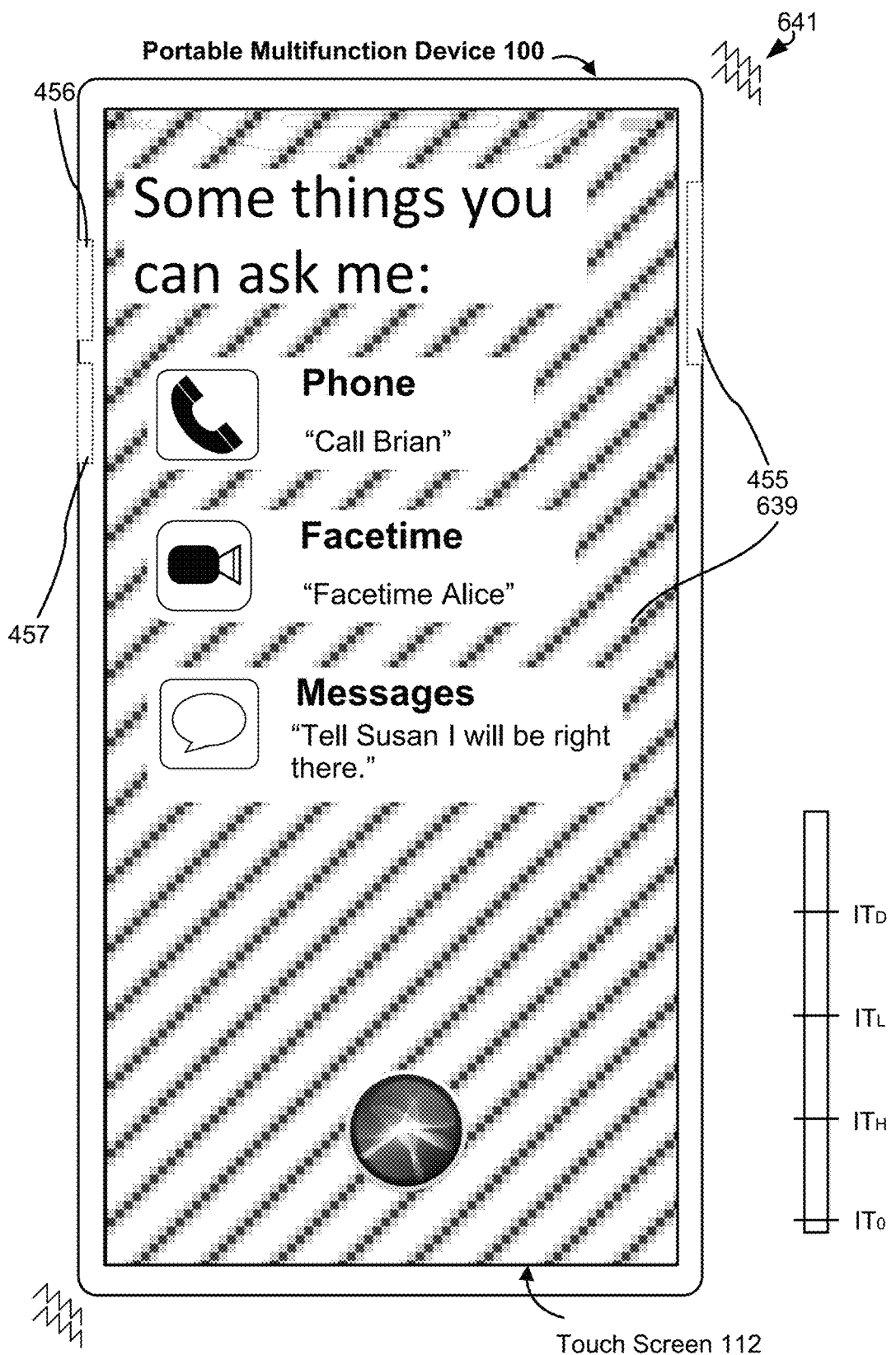
Figure 5H5

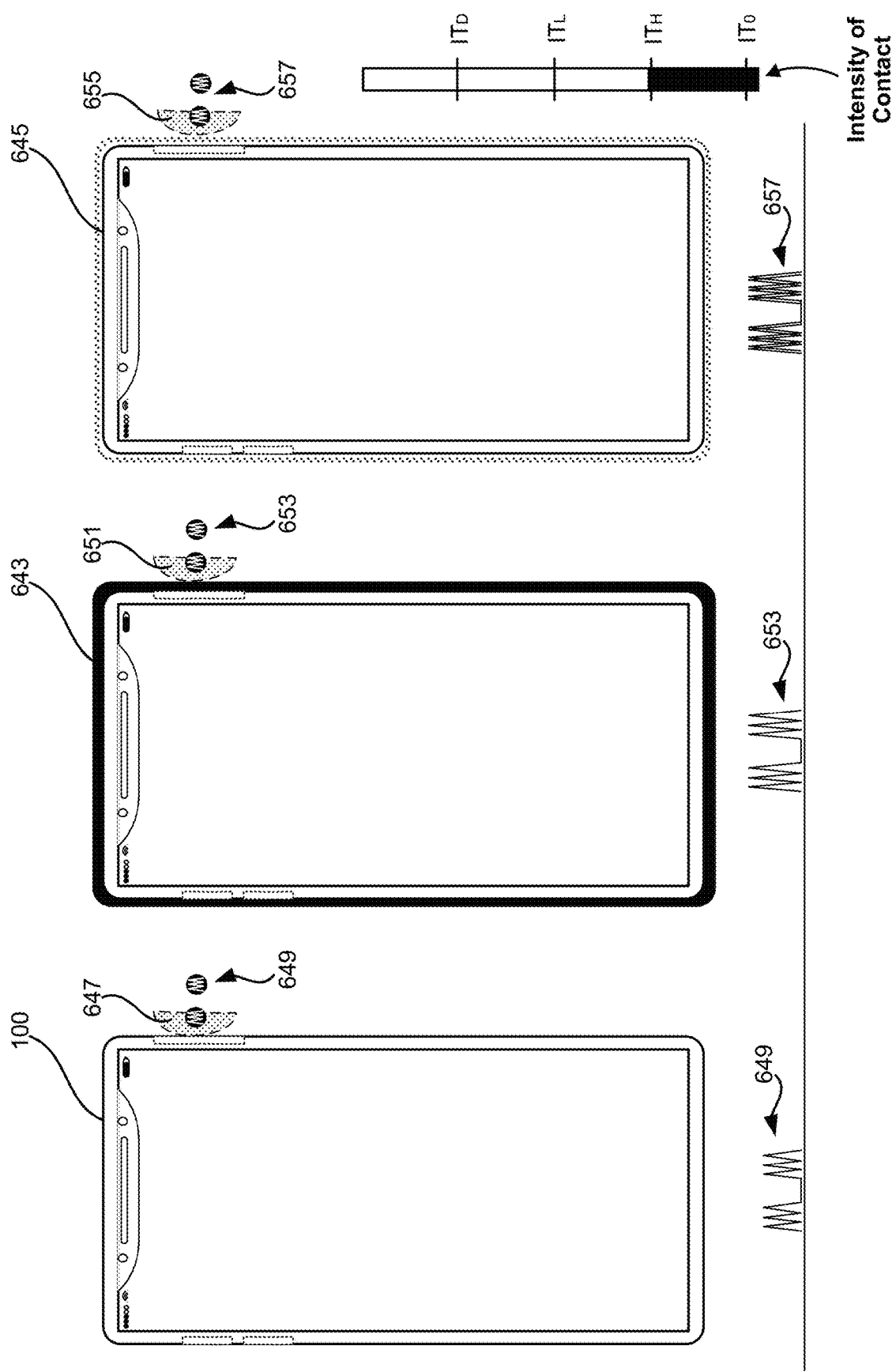
Figure 5I1

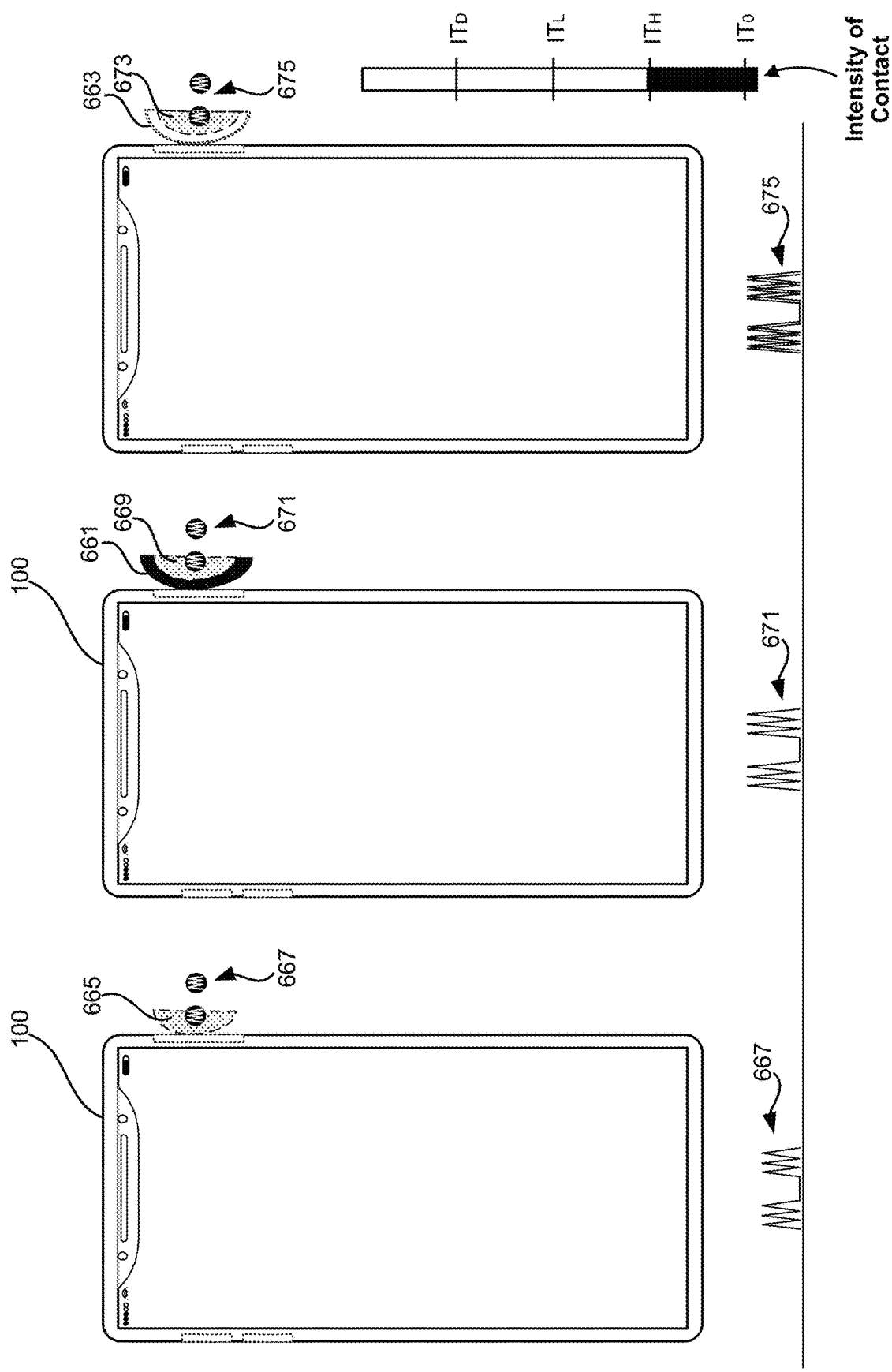
Figure 5I2

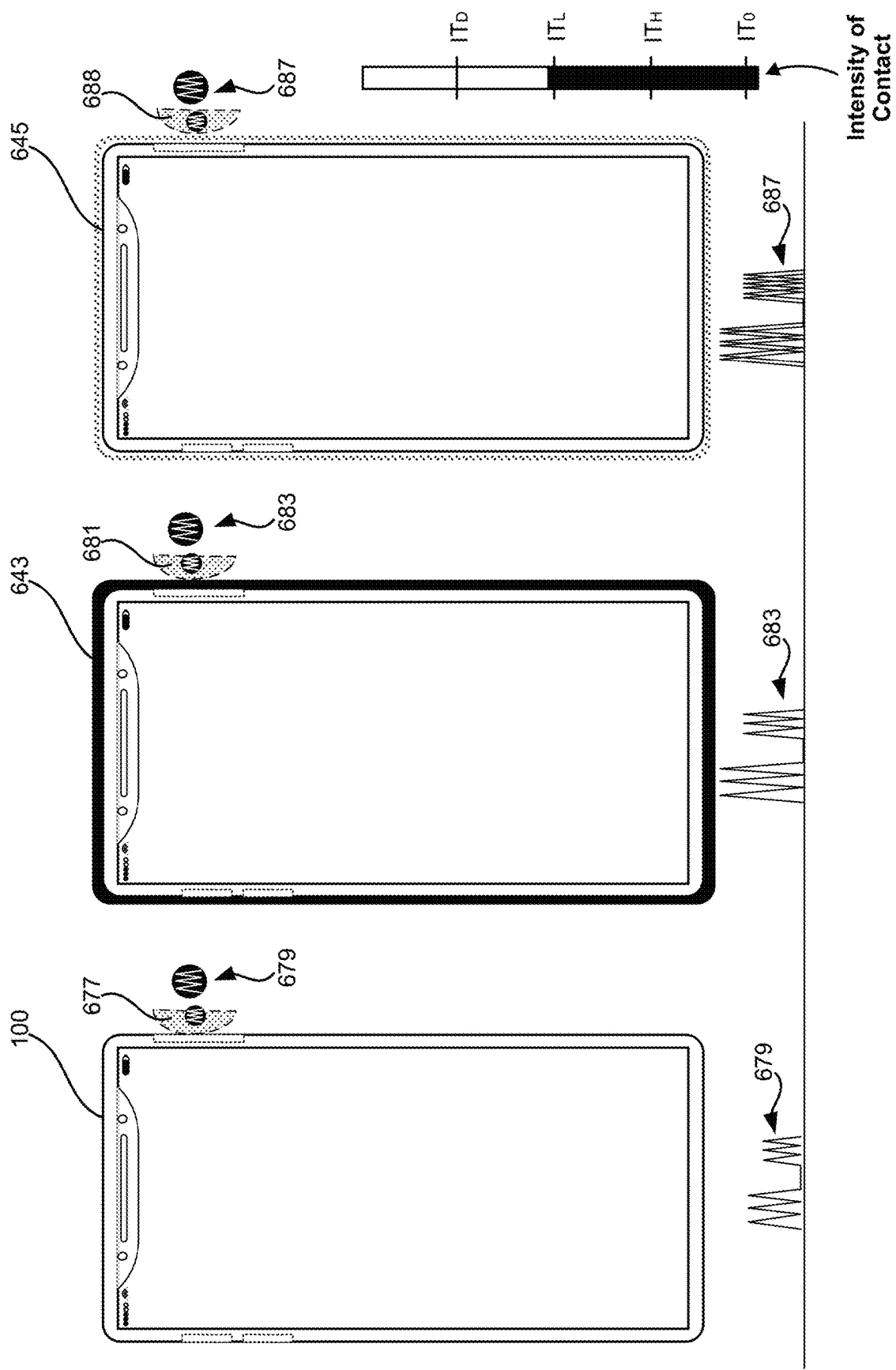
Figure 5I3

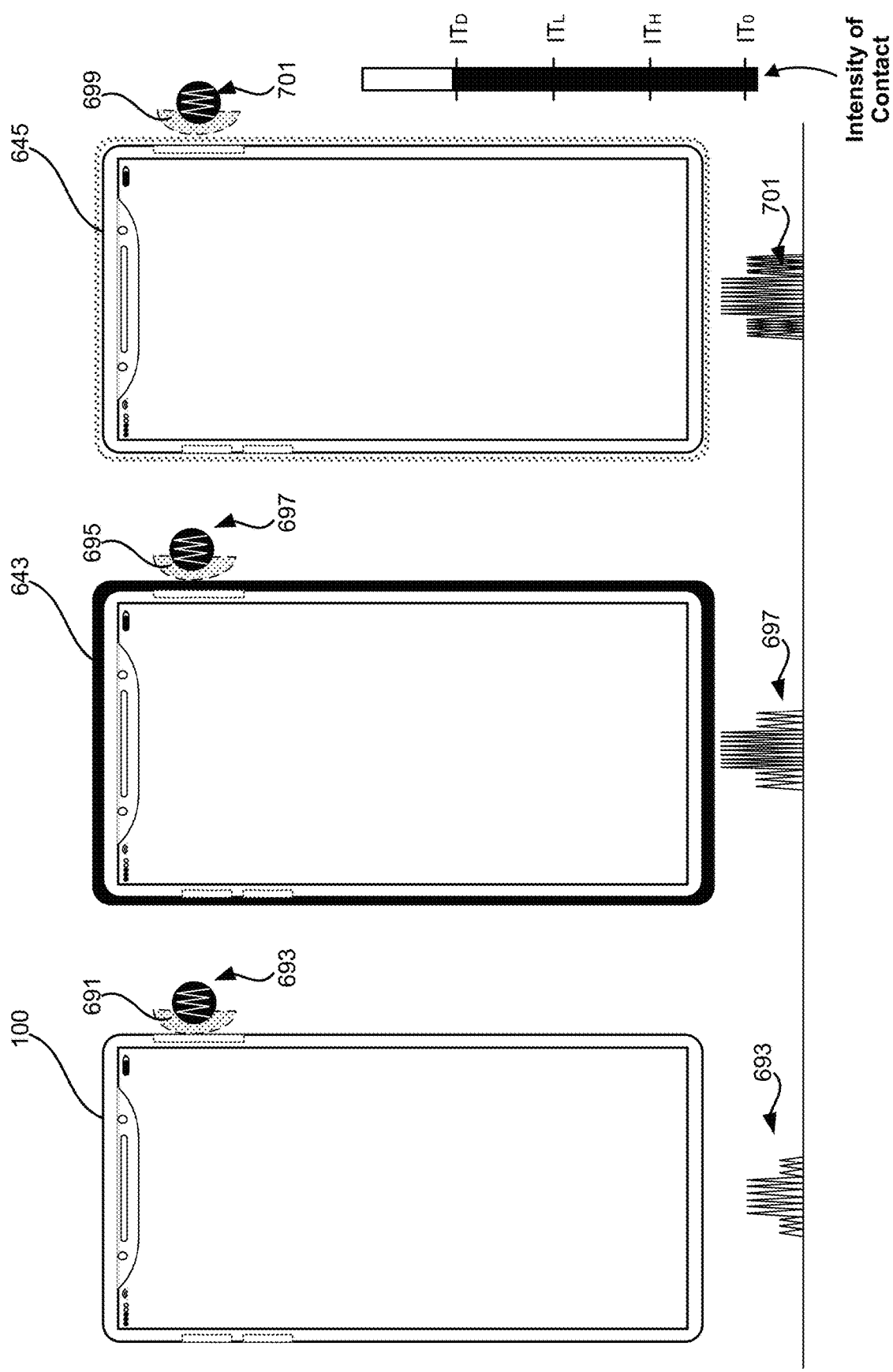
Figure 5I4

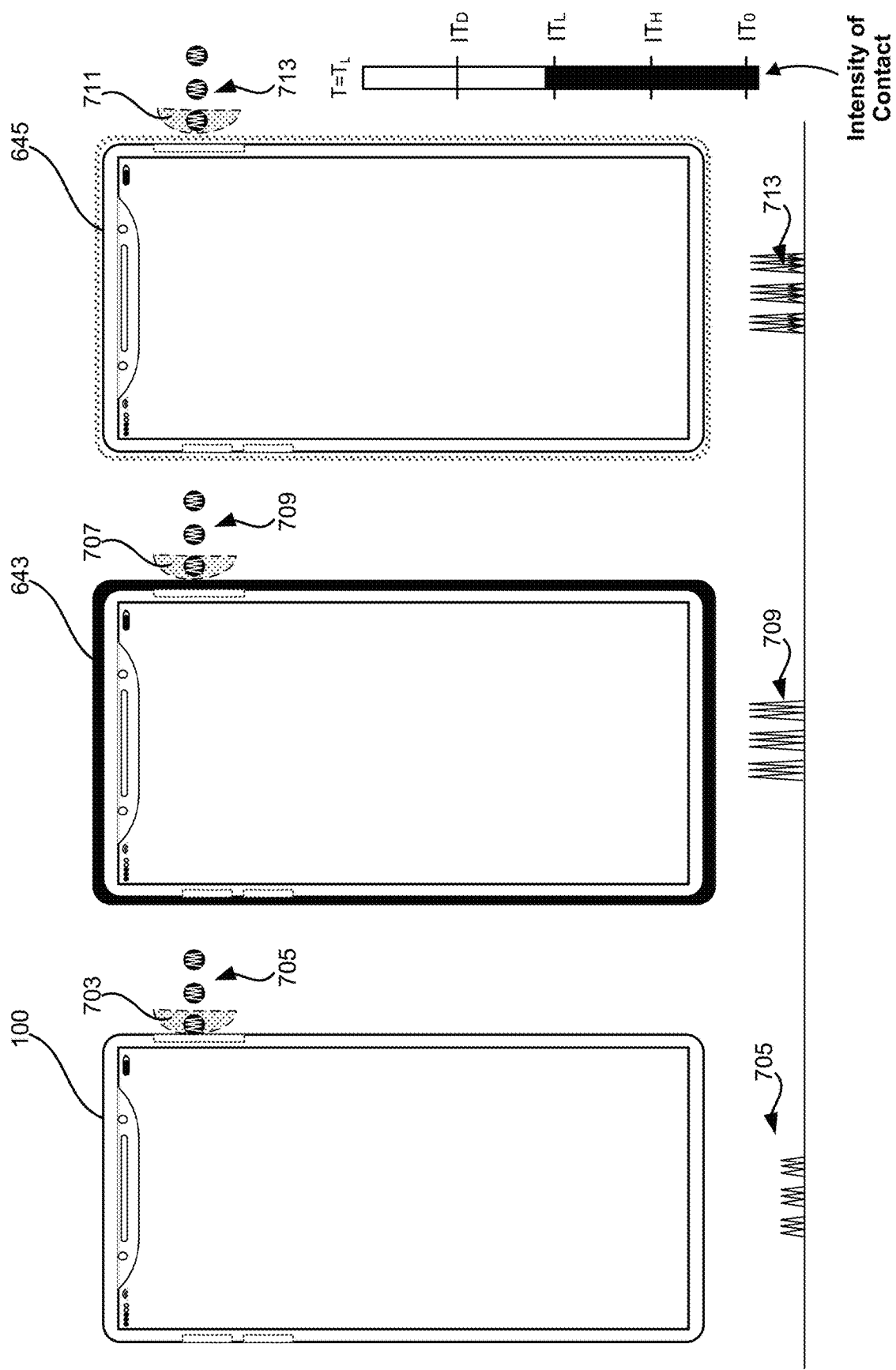
Figure 5I5

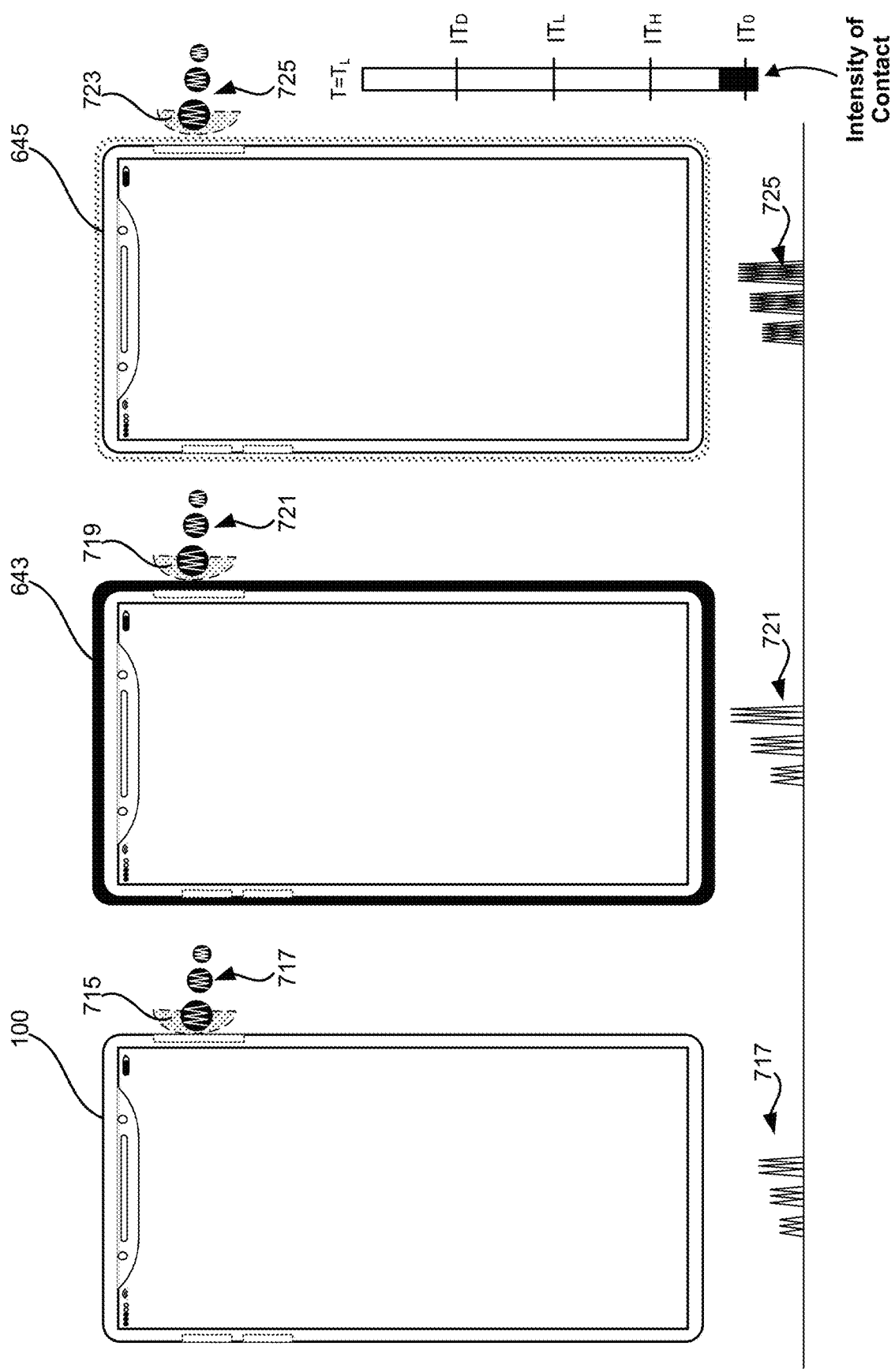
Figure 5I6

(A)

6012 Providing the first output that indicates the current state of the first attribute of the device without altering the attribute of the device includes:
 generating a first tactile output that has a first tactile output profile that corresponds to the current state of the first attribute 6014 Providing the first tactile output includes:
 in accordance with a determination that the display is not active when the first portion of the first input is detected, generating the first tactile output without activating the display 6016 The device includes a first tactile output generator that resides locally at the first input region and that provides localized tactile outputs, including the first tactile output, at the first input region 6018 Generating a first tactile output that has a first tactile output profile that corresponds to the current state of the first attribute includes:
 in accordance with a determination that the current state of the first attribute is a first state of multiple possible states of the first attribute, generating the first tactile output with a first amplitude or first pattern; and
 in accordance with a determination that the current state of the first attribute is a second state of the multiple possible states that is distinct from the first state, generating the first tactile output with a second amplitude or second pattern that is distinct from the first amplitude or first pattern 6020 The first portion of the first output is detected in accordance with outputs of one or more capacitive touch sensors, and the first intensity threshold is based on a capacitance threshold (B)

6022 The first portion of the first output is detected in accordance with outputs of one or more force sensors, and the first intensity threshold is based on a force threshold

---

6024 The first criteria further include a set of criteria that are met when the first input is detected on the first input region for more than a threshold amount of time

---

6026 Detecting the second portion of the first input includes detecting termination of the first input, and wherein the method includes:
    in response to detecting the termination of the first input and in accordance with a determination that the second portion of the first input does not meet the second criteria before the termination of the first input:
        ceasing to provide the first output that indicates the current state of the first attribute of the device

---

6028 The first attribute of the device includes a presence/absence of unread notifications,
    providing the output that indicates the current state of the first attribute without altering the first attribute of the device includes displaying an indicator of the unread notifications, and
    performing the first operation that alters the first attribute of the device includes:
        displaying content of at least one of the unread notifications; and
        changing a read/unread status of at least one of the unread notifications

6030 The first attribute of the device includes an adjustable control at the device,
    providing the output that indicates the current state of the first attribute without altering the first attribute of the device includes displaying a control object corresponding to the adjustable control, wherein the control object includes an indicator of a current value of the adjustable control, and
    performing the first operation that alters the first attribute of the device includes changing the current value of the adjustable control

7002 Detect a first portion of a first input on the first input region

7004 In response to detecting the first portion of the first input on the first input region:
    in accordance with a determination that the first portion of the first input meets first criteria, wherein the first criteria include a set of criteria that are met when the first input is detected on the first input region without a characteristic intensity of the first input increasing above a first intensity threshold, display, on the display, a precursor object of a user interface object that includes one or more selectable options

7006 While displaying the precursor object on the display, detect a second portion of the first input on first input region, including detecting an increase in intensity of the first input above the first intensity threshold

7008 In response to detecting the increase in intensity of the first input during the second portion of the first input, reveal the user interface object on the display by an amount that varies in accordance with a current intensity of the first input

- - - - - - - - - - - - - - - - - - - - - - - - - - - - - - - - - - - -

7010 After detecting the second portion of the first input, detect a third portion of the first input on the first input region, including detect a continued increase in intensity of the first input; and
    in response to detecting the continued increase in intensity of the first input:
        in accordance with a determination that the third portion of the first input meets second criteria, wherein the second criteria include a set of criteria that are met when a characteristic intensity of the first input increases above a second intensity threshold that is greater than the first intensity threshold before an end of the first input is detected:
            display the user interface object that includes the one or more selectable options on the display (A)

7012 After detecting the third portion of the first input, detect a fourth portion of the first input on the first input region, including detecting a decrease in intensity of the first input:

in accordance with a determination that the second criteria were met before detecting the fourth portion of the first input, maintain display of the user interface object without altering an amount by which the user interface object is currently displayed; and in accordance with a determination that the second criteria were not met before detecting the fourth portion of the first input, decrease an amount by which the user interface object is revealed on the display in accordance with a current intensity of the first input 7014 In response to detecting the continued increase in intensity of the first input:

in accordance with a determination that the third portion of the first input meets the second criteria: generate a first tactile output 7016 The device includes a first tactile output generator that resides locally at the first input region and that provides localized tactile outputs, including the first tactile output, at the first input region 7018 The generation of the first tactile output is synchronized with satisfaction of the second criteria by the first input 7020 The generation of the first tactile output is synchronized with initial full-display of the user interface object on the display (B)

7022 The device includes a touch-sensitive surface that is distinct from the first input region, and the method includes:
 while displaying the user interface object including the one or more selectable options on the display, detecting a second input on the touch-sensitive surface at a location that corresponds to a first selectable option of the one or more selectable options in the user interface object; and
 in response to detecting the second input:
  in accordance with a determination that the second input meets selection criteria, selecting the first selectable option 7024 In response to detecting the second input:
 in accordance with a determination that the second input meets selection-confirmation criteria, perform a first operation that corresponds to the first selectable option 7026 In response to detecting the second input:
 in accordance with a determination that the second input meets drag criteria, display a representation of the first selectable option outside of the user interface object 7028 In response to detecting the second input:
 in accordance with a determination that the second input meets drop criteria, display a copy of the first selectable option outside of the user interface object 7030 The second input is detected while the user interface object is partially revealed on the display, without the second criteria being met by the first input (C)

7032 While displaying the user interface object including the one or more selectable options on the display, detect a third input on the first input region, wherein the third input includes movement of a contact across the first input region; and in response to detecting the third input, scroll a selection indicator through the one or more selectable options on the display in accordance with the movement of the contact in the third input 7034 While the selection indicator is moved to a first selectable option of the one or more selectable options on the display in accordance with the movement of the contact in the third input on the first input region, detect a fourth input on the first input region that meets selection-confirmation criteria; and in response detecting the fourth input that meets the selection-confirmation criteria, perform an operation corresponding to the first selectable options 7036 The device includes a touch-sensitive surface that is distinct from the first input region, and the method includes:

while displaying the user interface object including the one or more selectable options on the display, detecting a fifth input on the touch-sensitive surface, including:

detecting touch-down of a contact on the touch-sensitive surface at a location that corresponds to a second user interface object that is displayed outside of the user interface object, detecting movement of the contract across the touch-sensitive surface to a location within the user interface object, and detecting lift-off of the contact from the touch-sensitive surface while the second user interface is within the user interface object; and in response to detecting the fifth input, adding the second user interface object as a new selectable option in the user interface object (D)

7038 The device includes a touch-sensitive surface that is distinct from the first input region, and the method includes:
    while displaying the user interface object including the one or more selectable options on the display, detecting a sixth input on the touch-sensitive surface, including:
        detecting touch-down of a contact on the touch-sensitive surface at a location that corresponds to a respective selectable option that is displayed within the user interface object,
        detecting movement of the contract across the touch-sensitive surface to a location outside of the user interface object, and
        detecting lift-off of the contact from the touch-sensitive surface while the respective selectable option is dragged outside of the user interface object; and
    in response to detecting the sixth input, removing the respective selectable option from the user interface object

```
┌─────────────────────────────────────────────────────────────────┐
│        8002 Detect an input on the input region                 │
└─────────────────────────────────────────────────────────────────┘
                                 │
                                 ▼
┌─────────────────────────────────────────────────────────────────┐
│  8004 In response to detecting the input on the input region:   │
│                                                                 │
│   ┌───────────────────────────────────────────────────────────┐ │
│   │   8006 In accordance with a determination that the input  │ │
│   │   meets first criteria, wherein the first criteria        │ │
│   │   require an increase in intensity of the input above a   │ │
│   │   first intensity threshold while the input is detected   │ │
│   │   in the first sub-region of the input region, in order   │ │
│   │   for the first criteria to be met, modify a first        │ │
│   │   parameter of the device in a first manner               │ │
│   └───────────────────────────────────────────────────────────┘ │
│                                                                 │
│   ┌───────────────────────────────────────────────────────────┐ │
│   │   8008 In accordance with a determination that the input  │ │
│   │   meets second criteria that are distinct from the first  │ │
│   │   criteria, wherein the second criteria require an        │ │
│   │   increase in intensity of the input above the first      │ │
│   │   intensity threshold while the input is detected in the  │ │
│   │   second sub-region of the input region that is distinct  │ │
│   │   from the first sub-region, in order for the second      │ │
│   │   criteria to be met, modify the first parameter of the   │ │
│   │   device in a second manner that is distinct from the     │ │
│   │   first manner                                            │ │
│   └───────────────────────────────────────────────────────────┘ │
│                                                                 │
│   ┌───────────────────────────────────────────────────────────┐ │
│   │   8010 In accordance with a determination that the input  │ │
│   │   did not increase above the first intensity threshold,   │ │
│   │   forgo modifying the first parameter of the device in    │ │
│   │   the first manner and forgoing modify the first          │ │
│   │   parameter of the device in the second manner            │ │
│   └───────────────────────────────────────────────────────────┘ │
└─────────────────────────────────────────────────────────────────┘
```

┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  8012 The device includes one or more first tactile output generators that are located at the input region and that provide localized tactile outputs at the input region, and wherein the method includes:

in accordance with a determination that the input meets the first criteria, generating a first tactile output with a first tactile output profile; and in accordance with a determination that the input meets the second criteria, generating a second tactile output with a second tactile output profile
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘

8014 In accordance with a determination that the input meets the first criteria, select the first tactile output profile for the first tactile output in accordance with a current value of the first parameter 8016 In accordance with a determination that the current value of the first parameter has reached an end of a value range of the first parameter, generate an end tactile output with a respective tactile output profile that is distinct from the first tactile output profile 8018 In accordance with a determination that the current value of the first parameter has reached an end of a value range of the first parameter, forgo generating the first tactile output profile 8020 In accordance with a determination that the input did not increase above the first intensity threshold:
  in accordance with a determination that the input is detected in the first sub-region of the input region, generate first feedback indicating that the input is detected in the first sub-region of the input region; and
  in accordance with a determination that the input is detected in the second sub-region of the input region, generate second feedback that is distinct from the first feedback indicating that the input is detected in the second sub-region of the input region (B)

> 8022 Modifying the first parameter of the device in the first manner includes modifying the first parameter of the device in a first direction; and
> modifying the first parameter of the device in the second manner includes modifying the first parameter of the device in a second direction that is distinct from the first direction > 8024 Modifying the first parameter of the device in the first manner includes modifying the first parameter of the device by a first amount; and
> modifying the first parameter of the device in the second manner includes modifying the first parameter of the device by a second amount that is distinct from the first amount > 8026 Modifying the first parameter of the device in the first manner includes dynamically adjusting a first rate by which the first parameter of the device is modified, in accordance with a characteristic intensity of the input that is detected at the first sub-region of the input region; and
> modifying the first parameter of the device in the second manner includes dynamically adjusting a second rate by which the first parameter of the device is modified, in accordance with a characteristic intensity of the input that is detected at the second sub-region of the input region > 8028 The first parameter is a control parameter for operating a hardware component of the device > 8030 The first parameter is an operation control parameter for moving through content > 8032 In accordance with a determination that the input meets the first criteria a first number of times, the device modifies the first parameter of the device in the first manner a second number of times that corresponds to the first number of times (C)

8034 In response to detecting the input on the input region:
in accordance with a determination that the input meets third criteria, wherein the third criteria require an increase in intensity of the input above a second intensity threshold that is above the first intensity threshold while the input is detected in the first sub-region of the input region, in order for the third criteria to be met, reset a first parameter of the device to a first predetermined value

---

8036 In response to detecting the input on the input region:
display a first user interface object that corresponds to the first parameter that is modifiable through a required input on the input region, wherein the user interface object is displayed without requiring an intensity of the input to exceed the first intensity threshold

---

8038 In response to detecting the input on the input region:
in accordance with a determination that the input meets fifth criteria, switch a current selected parameter that is modifiable through a required input on the input region from the first parameter to a second parameter that is distinct from the first parameter 8040 The fifth criteria require an increase in intensity of the input above the first intensity threshold while the input is concurrently detected in the first sub-region and the second sub-region of the input region, in order for the fifth criteria to be met

9002 While the device is in a media capture mode of operation, perform a respective task:

9004 Detect that one or more objects in a field of view of the one or more cameras of the device meet first criteria 9006 In response to detecting that the one or more objects in the field of view of the one or more cameras meet the first criteria, generate, with one or more of the plurality of tactile output generators, a tactile output prompting movement of the field of view of the one or more cameras in a respective direction, wherein generating the tactile output prompting movement of the field of view of the one or more cameras in the respective direction includes:

in accordance with a determination, based on the one or more objects in the field of view of the camera, that the field of view of the camera needs to be shifted in a first direction to continue performing the respective task, generating a first tactile output that prompts movement of the field of view of the one or more cameras in the first direction; and in accordance with a determination, based on the one or more objects in the field of view of the camera, that the field of view of the camera needs to be shifted in a second direction, different from the first direction, to continue performing the respective task, generating a second tactile output, different from the first tactile output, that prompts movement of the field of view of the one or more cameras in the second direction 9008 Generating the first tactile output includes generating the first tactile output using the first tactile output generator at the first location in the device; and generating the second tactile output includes generating the second tactile output generator using the second tactile output generator at the second location in the device

9010 Generating the first tactile output includes generating the first tactile output using the first tactile output generator and the second tactile output generator in accordance with a first output sequence; and generating the second tactile output includes generating the second tactile output using the first tactile output generator and the second tactile output generator in accordance with a second output sequence that is distinct from the first output sequence

---

9012 Generating the first tactile output includes generating the first tactile output using the first tactile output generator and the second tactile output generator in accordance with a first power ratio; and generating the second tactile output includes generating the second tactile output using the first tactile output generator and the second tactile output generator in accordance with a second power ratio that is distinct from the first power ratio

---

9014 Detecting that one or more objects in the field of view of the one or more cameras of the device meet first criteria includes:

identifying a first object in the field of view of the one or more cameras of the device in accordance with predefined object identification criteria; and detecting that a current position or movement of the first object in the field of view of the one or more cameras deviates from a predefined position or movement path in the field of view of the one or more cameras

---

9016 Detecting that one or more objects in the field of view of the one or more cameras of the device meet first criteria includes:

identifying a first object in the field of view of the one or more cameras of the device in accordance with predefined object identification criteria; and detecting that at least a portion of the first object is outside of the field of view of the one or more cameras

> 9018 Detecting that one or more objects in the field of view of the one or more cameras of the device meet first criteria includes:
> 
> identifying a first object in the field of view of the one or more cameras of the device in accordance with predefined object identification criteria; and
> 
> detecting that movement speed of the first object is outside of a predefined speed range > 9020 The device detects that the first criteria are met while the device is stationary > 9022 The device detects that the first criteria are met while the device is in motion > 9024 The device detects that the first criteria are met while the device and the object are both in motion > 9026 In response to detecting that the one or more objects in the field of view of the one or more cameras meet the first criteria, displaying a visual indicator prompting movement of the field of view of the one or more cameras in the respective direction, wherein generating the visual indicator prompting movement of the field of view of the one or more cameras in the respective direction includes:
> 
> in accordance with a determination, based on the one or more objects in the field of view of the camera, that the field of view of the camera needs to be shifted in the first direction to continue performing the respective task, providing the visual indicator with a first visual characteristic that prompts movement of the field of view of the one or more cameras in the first direction; and
> 
> in accordance with a determination, based on the one or more objects in the field of view of the camera, that the field of view of the camera needs to be shifted in the second direction to continue performing the respective task, generating the visual indicator with a second visual characteristic, different from the first visual characteristic, that prompts movement of the field of view of the one or more cameras in the second direction

| 10002 Detect an input on the input region |
|---|

10004 In response to detecting the input on the input region:

10006 In accordance with a determination that first criteria are met by the input on the input region, wherein the first criteria include a requirement that is met when a first input metric exceeds a first threshold in order for the first criteria to be met,
        generate a first tactile output with the tactile output generator associated with the input region; and
        after generating the first tactile output:
              in accordance with a determination that the input meets second criteria, wherein the second criteria include a requirement that is met when the first input metric exceeds a second threshold that is greater than the first threshold in order for the second criteria to be met, perform an operation; and
              in accordance with a determination that a cancelation input has been detected prior to the input meeting the second criteria, forgo performance of the operation 10008 In accordance with a determination that the first criteria are not met by the input on the input region, forgo generating the first tactile output

---

10010 After generating the first tactile output:
    in accordance with a determination that the input meets the second criteria, generate a second tactile output indicating performance of the operation

---

10012 After generating the first tactile output:
    in accordance with a determination that a cancellation input has been detected prior to the input meeting the second criteria, cease to generate the first tactile outputs

10014 Generating the first tactile output includes generating a continuous tactile output that is sustained until the second criteria are met or when the cancelation input is detected 10016 Generating the continuous tactile output includes monotonically changing at least one aspect of a tactile output profile corresponding to the first tactile output 10018 The first criteria include a requirement that is met when a characteristic intensity of the input exceeds a first intensity threshold in order for the first criteria to be met 10020 The second criteria include a requirement that is met when the characteristic intensity of the input exceeds a second intensity threshold that is greater than the first intensity threshold in order for the second criteria to be met 10022 The first criteria include a requirement that is met when the input is maintained for at least a first threshold amount of time with less than a threshold amount of movement in order for the first criteria to be met 10024 The second criteria include a requirement that is met when the input is maintained for at least a second threshold amount of time that is longer than the first threshold amount of time with less than the threshold amount of movement in order for the second criteria to be met

10026 The tactile output generator that is associated with the input region resides at the input region and produces localized tactile outputs at the input region, the device further includes a second tactile output generator that does not reside at the input region and produces whole-device tactile outputs, and
the method includes:
in response to detecting the input on the input region:
in accordance with a determination that the first criteria are met by the input on the input region, generating a third tactile output by the second tactile output generator that is not localized at the input region, in addition to the first tactile output that is localized at the input region 10028 The first tactile output is a discrete tactile output that simulates actuation of the input region by the input; and the third tactile output is a continuous tactile output that provides sustained warning feedback until the second criteria are met by the input or the cancelation input is detected 10030 In response to detecting the input on the input region:
in accordance with a determination that first criteria are met by the input on the input region, display an indication that the operation will be performed when the input on the input region meets additional criteria

| 11002 Detect a press input on the input region with a finger |

11004 In response to detecting the press input on the input region:

in accordance with a determination that the input region is not separated from the finger by an interstitial material, generate a first tactile output; and in accordance with a determination that the input region is separated from the finger by a first interstitial material, generate a second tactile output that is different from the first tactile output

---

11006 In response to detecting the press input on the input region, perform an operation that corresponds to the press input

---

11008 Generation of the first and second tactile outputs is performed in accordance with a determination that a characteristic intensity of the press input exceeds a first intensity threshold; and the method further includes:

in response to detecting the press input:

in accordance with a determination that the characteristic intensity of the press input does not exceed the first intensity threshold, forgoing generation of the first tactile output and forgoing generation of the second tactile output

---

11010 Select a second tactile output profile for the second tactile output profile such that the movement of the first interstitial material generated by the second tactile output is substantially similar to movement of the input region on the device generated by the first tactile output 11012 Selecting the second tactile output profile for the second tactile output profile includes selecting a respective material-specific tactile output profile based on the first interstitial material and a first tactile output profile that corresponds to the first tactile output

11014 Selecting the second tactile output profile for the second tactile output profile includes selecting different tactile output profiles in accordance with a determination of whether the first interstitial material is in a case enclosing at least a portion of the device including the input region or the first interstitial material is in a glove enclosing the finger on the input region 11016 The first tactile output and the second tactile output are generated by a first tactile output generator of the one or more tactile output generators that resides at the input region and produces localized tactile outputs at the input region 11018 The first material includes a material of a case that encases at least a portion of the device that includes the input region 11020 The first material includes a material of a glove that encases the finger that is on the input region 11022 Determine whether there is an interstitial material between the input region and the finger in accordance with a settings parameter specified by a user 11024 Determine whether there is an interstitial material between the input region and the finger in accordance with a capacitance characteristic of the press input provided by one or more sensors located at the input region

12002 Detect an input on the input region

12004 In response to detecting the input on the input region:
  in accordance with a determination that the input by the contact on the input region meets first criteria, wherein the first criteria require an increase in intensity of the input above a first intensity threshold in order for the first criteria to be met, perform a first operation and generate a first tactile output with a first tactile output profile; and
  in accordance with a determination that the input on the input region meets second criteria that are distinct from the first criteria, wherein the second criteria require that the input includes movement of a contact along a first direction across the input region in order for the second criteria to be met, perform a second operation different from the first operation and generate a second tactile output with a second tactile output profile that is distinct from the first tactile output profile

12006 In response to detecting the input on the input region:
  in accordance with a determination that the input on the input region meets third criteria that are distinct from the first criteria and the second criteria, wherein the third criteria require that the input includes movement of a contact along a second direction distinct from the first direction across the input region in order for the third criteria to be met, perform a third operation that is distinct from the first operation and the second operation, and generate a third tactile output with a third tactile output profile that is distinct from the first tactile output profile and the second tactile output profile

12008 In response to detecting the input on the input region:
  in accordance with a determination that the input on the input region meets fourth criteria that are distinct from the first criteria and the second criteria, wherein the fourth criteria require an increase in intensity of the input above a second intensity threshold that is greater than the first intensity threshold in order for the fourth criteria to be met, perform a fourth operation that is distinct from the first operation and the second operation, and generate a fourth tactile output with a fourth tactile output profile that is distinct from the first tactile output profile and the second tactile output profile (A)

12010 In response to detecting the input on the input region:
in accordance with a determination that the input on the input region meets fifth criteria that are distinct from the first criteria and the second criteria, wherein the fifth criteria require an intensity of the input remain below the first intensity threshold in order for the fifth criteria to be met, perform a fifth operation that is distinct from the first operation and the second operation, and generate a fifth tactile output with a fifth tactile output profile that is distinct from the first tactile output profile and the second tactile output profile 12012 In response to detecting the input on the input region:
in accordance with a determination that the input on the input region meets sixth criteria that are distinct from the first criteria and the second criteria, wherein the sixth criteria require that a contact is maintained at a first predefined region of the input region and that an intensity of the contact increases above the first intensity threshold in order for the sixth criteria to be met, perform a sixth operation that is distinct from the first operation and the second operation, and generate a sixth tactile output with a sixth tactile output profile that is distinct from the first tactile output profile and the second tactile output profile; and
in accordance with a determination that the input on the input region meets seventh criteria that are distinct from the first criteria, the second criteria, and the sixth criteria, wherein the seventh criteria require that a contact is maintained at a second predefined region of the input region that is below the first predefined region and that an intensity of the contact increases above the first predefined intensity threshold in order for the seventh criteria to be met, perform a seventh operation that is distinct from the first operation and the second operation, and the sixth operation, and generate a seventh tactile output with a seventh tactile output profile that is distinct from the first tactile output profile and the second tactile output profile (B)

12014 In response to detecting the input on the input region:
in accordance with a determination that the input on the input region meets eighth criteria that are distinct from the first criteria and the second criteria, and the sixth criteria and the seventh criteria, wherein the eighth criteria require that a first contact is maintained at the first predefined region of the input region with an intensity of the first contact above the first intensity threshold, while a second contact is maintained at the second predefined region of the input region with an intensity of the second contact above the first predefined intensity threshold in order for the eighth criteria to be met, perform an eighth operation that is distinct from the first operation, the second operation, and the sixth operation and the seventh operation, and generate an eight tactile output with an eighth tactile output profile that is distinct from the first tactile output profile and the second tactile output profile 12016 In response to detecting the input on the input region:
in accordance with a determination that the input on the input region meets ninth criteria that are distinct from the first criteria and the second criteria, wherein the ninth criteria require that a contact is maintained on the input region for at least a threshold amount of time with less than a threshold amount of movement in order for the ninth criteria to be met, perform a ninth operation that is distinct from the first operation and the second operation, and generate a ninth tactile output with a ninth tactile output profile that is distinct from the first tactile output profile and the second tactile output profile 12018 Detect termination of the input on the input region;
in response to detecting the termination of the input:
in accordance with a determination that a tactile output has been generated in response to the input based on satisfaction of one or more intensity-based criteria by the input, generate a respective button-release tactile output with a respective button-release tactile output profile (C)

12020 Detecting the input on the input region includes detecting an increase in the intensity of the input prior to detecting the intensity of the input increasing above the first intensity threshold, and the method includes:

in response to detecting the increase in the intensity of the input prior to detecting the intensity of the input increasing above the first intensity threshold:

displaying a visual feedback on the display with at least one visual characteristic that varies by an amount in accordance with a current intensity of the input on the input region

---

12022 Displaying the visual feedback on the display includes revealing a user interface object with movement of the user interface object onto the display in a direction that corresponds to a direction of force exerted on the input region

---

12024 In accordance with a determination that the input meets the second criteria, performing the second operation and generating the second tactile output with the second tactile output profile, includes:

determining whether the second operation is for changing a value for a device attribute from a first value to a second value that is distinct from the first value, or from the second value to the first value;

in accordance with a determination that the second operation is for changing the value for the device attribute from the first value to the second value, selecting a first set of parameter values for the second tactile output profile; and in accordance with a determination that the second operation is for changing the value for the device attribute from the second value to the first value, selecting a second set of parameter values for the second tactile output profile

---

12026 The device includes intensity sensors for detecting intensities of contacts on the input region, wherein detection of the intensities is made even before actuation of the input region is detected

12028 The device includes movement sensors for detecting movement of contacts on the input region, wherein detection of the movement of the contacts is made actuation of the input region is detected 12030 The device includes movement sensors for detecting movement of contacts on the input region, wherein the first and second tactile outputs are generated by movement of at least a portion of the input region with a movement pattern that is distinct from the movement of the contacts 12032 The first criteria and the second criteria are met without requiring a focus selector being concurrently present on the display 12034 The first and second tactile outputs are localized on the peripheral-side of the device

Figure 12E ly (e.g., a notebook computer, tablet com-
DEVICES, METHODS, AND GRAPHICAL USER INTERFACES FOR INTERACTION WITH AN INTENSITY-SENSITIVE INPUT REGION

RELATED APPLICATIONS

This application claims priority to U.S. Provisional Application Ser. No. 62/668,187, filed May 7, 2018, which is incorporated by reference herein in its entirety.

TECHNICAL FIELD

This relates generally to electronic devices with displays and intensity-sensitive input regions, including but not limited to electronic devices with displays and intensity-sensitive off-display input regions.

BACKGROUND

Many electronic devices with displays include mechanical buttons, such as mechanical home buttons, volume buttons, and power buttons. But mechanical buttons provide little, if any, feedback to a user beyond a fixed down click and a fixed up click. Some devices have solid state home buttons on the display-side of the devices to replace the mechanical home buttons. A display-side solid state home button is coupled with tactile output generators that generate tactile outputs to simulate various types of mechanical button clicks when the solid state home button is activated by a press input. The solid state home button is a close analog of a mechanical home button and is designated for a very limited set of functions triggered by a few types of press inputs. Display-side solid state buttons also take up valuable space on the display-side of the device, reducing available display area for visual information on a portable electronic device.

SUMMARY

Accordingly, there is a need for electronic devices with improved methods and interfaces for providing visual, haptic, and/or audio feedback during interaction with an off-display input region (e.g., an intensity-sensitive side button or surface), which make manipulation of user interfaces more efficient and intuitive for a user. There is also a need for electronic devices with improved methods and interfaces for providing additional functionality without cluttering up the display with more virtual controls or crowding the surface of the device with more hardware controls. Such methods and interfaces optionally complement or replace conventional methods for providing additional function controls and providing feedback during interaction with a device using a button. Such methods and interfaces reduce the number and extent of the inputs required from a user by helping the user to understand the connection between provided inputs and device responses to the inputs and reducing user input mistakes, thereby creating a more efficient human-machine interface.

The above deficiencies and other problems associated with user interfaces for electronic devices with buttons are reduced or eliminated by the disclosed devices, which include one or more intensity-sensitive input regions (e.g., off-display intensity-sensitive buttons or surfaces located on peripheral sides of the device). In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display and a first input region that is separate from the display. The method includes: detecting a first portion of a first input on the first input region; in response to detecting the first portion of the first input: in accordance with a determination that the first portion of the first input meets first criteria, wherein the first criteria include a set of criteria that are met when the first input is detected on the first input region without a characteristic intensity of the first input increasing above a first intensity threshold, providing a first output that indicates a current state of a first attribute of the device without altering the first attribute of the device; detecting a second portion of the input, including detecting an increase in intensity of the first input; and in response to detecting the second portion of the first input: in accordance with a determination that the second portion of the first input meets second criteria before an end of the first input is detected, wherein the second criteria include a set of criteria that are met when the characteristic intensity of the first input increases above the first intensity threshold, performing a first operation that alters the first attribute of the device; and in accordance with a determination that the second portion of the first input does not meet the second criteria, forgoing performing the first operation that alters the first attribute of the device.

In accordance with some embodiments, a method is performed at an electronic device with a display, and a first input region that is separate from the display. The method includes: detecting a first portion of a first input on the first input region; in response to detecting the first portion of the first input on the first input region: in accordance with a determination that the first portion of the first input meets first criteria, wherein the first criteria include a set of criteria that are met when the first input is detected on the first input region without a characteristic intensity of the first input increasing above a first intensity threshold, displaying, on the display, a precursor object of a user interface object that includes one or more selectable options; while displaying the precursor object on the display, detecting a second portion of the first input on first input region, including detecting an increase in intensity of the first input above the first intensity threshold; and in response to detecting the increase in intensity of the first input during the second portion of the first input, revealing the user interface object on the display by an amount that varies in accordance with a current intensity of the first input.

In accordance with some embodiments, a method is performed at an electronic device with a display, an input region that is distinct from the display and includes a first sub-region and a second sub-region. The method includes: detecting an input on the input region; in response to detecting the input on the input region: in accordance with a determination that the input meets first criteria, wherein the first criteria require an increase in intensity of the input above a first intensity threshold while the input is detected in the first sub-region of the input region, in order for the first criteria to be met, modifying a first parameter of the device in a first manner; in accordance with a determination that the input meets second criteria that are distinct from the first criteria, wherein the second criteria require an increase in intensity of the input above the first intensity threshold while the input is detected in the second sub-region of the input region that is distinct from the first sub-region, in order for the second criteria to be met, modifying the first parameter of the device in a second manner that is distinct from the first manner; and in accordance with a determination that the input did not increase above the first intensity threshold, forgoing modifying the first parameter of the device in the first manner and forgoing modifying the first parameter of the device in the second manner.

In accordance with some embodiments, a method is performed at an electronic device with a display, one or more cameras, and a plurality of tactile output generators including a first tactile output generator at a first location in the device and a second tactile output generator at a second location in the device. The method includes: while the device is in a media capture mode of operation, performing a respective task: detecting that one or more objects in a field of view of the one or more cameras of the device meet first criteria; and in response to detecting that the one or more objects in the field of view of the one or more cameras meet the first criteria, generating, with one or more of the plurality of tactile output generators, a tactile output prompting movement of the field of view of the one or more cameras in a respective direction, wherein generating the tactile output prompting movement of the field of view of the one or more cameras in the respective direction includes: in accordance with a determination, based on the one or more objects in the field of view of the camera, that the field of view of the camera needs to be shifted in a first direction to continue performing the respective task, generating a first tactile output that prompts movement of the field of view of the one or more cameras in the first direction; and in accordance with a determination, based on the one or more objects in the field of view of the camera, that the field of view of the camera needs to be shifted in a second direction, different from the first direction, to continue performing the respective task, generating a second tactile output, different from the first tactile output, that prompts movement of the field of view of the one or more cameras in the second direction.

In accordance with some embodiments, a method is performed at an electronic device with a display, and an input region that is associated with a tactile output generator. The method includes: detecting an input on the input region; in response to detecting the input on the input region: in accordance with a determination that first criteria are met by the input on the input region, wherein the first criteria include a requirement that is met when a first input metric exceeds a first threshold in order for the first criteria to be met, generating a first tactile output with the tactile output generator associated with the input region; and after generating the first tactile output: in accordance with a determination that the input meets second criteria, wherein the second criteria include a requirement that is met when the first input metric exceeds a second threshold that is greater than the first threshold in order for the second criteria to be met, performing an operation; and in accordance with a determination that a cancellation input has been detected prior to the input meeting the second criteria, forgoing performance of the operation; and in accordance with a determination that the first criteria are not met by the input on the input region, forgoing generating the first tactile output.

In accordance with some embodiments, a method is performed at an electronic device with a display, an input region that is distinct from the display, and one or more tactile output generators for generating tactile outputs. The method includes: detecting a press input on the input region with a finger; and in response to detecting the press input on the input region: in accordance with a determination that the input region is not separated from the finger by an interstitial material, generating a first tactile output; and in accordance with a determination that the input region is separated from the finger by a first interstitial material, generating a second tactile output that is different from the first tactile output.

In accordance with some embodiments, a method is performed at an electronic device with a display that is disposed on a front-side of the device, an input region that is disposed on one or more peripheral-sides of the device adjacent to the front-side of the device, and one or more tactile output generators for generating tactile outputs. The method includes: detecting an input on the input region; in response to detecting the input on the input region: in accordance with a determination that the input by the contact on the input region meets first criteria, wherein the first criteria require an increase in intensity of the input above a first intensity threshold in order for the first criteria to be met, performing a first operation and generating a first tactile output with a first tactile output profile; and in accordance with a determination that the input on the input region meets second criteria that are distinct from the first criteria, wherein the second criteria require that the input includes movement of a contact along a first direction across the input region in order for the second criteria to be met, performing a second operation different from the first operation and generating a second tactile output with a second tactile output profile that is distinct from the first tactile output profile.

In accordance with some embodiments, an electronic device includes a display, a touch-sensitive surface, one or more intensity-sensitive input regions (e.g., side buttons), one or more sensors to detect intensities of contacts with the touch-sensitive surface and the input regions, optionally, one or more tactile output generators for generating localized tactile outputs at the input regions and/or whole device tactile outputs throughout multiple regions of the device, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, one or more intensity-sensitive input regions (e.g., side buttons), one or more sensors to detect intensities of contacts with the touch-sensitive surface and the input regions, and optionally, one or more tactile output generators for generating localized tactile outputs at the input regions and/or whole device tactile outputs throughout multiple regions of the device, cause the device to perform or cause performance of the operations of any of the methods described herein. In accordance with some embodiments, a graphical user interface on an electronic device with a display, a touch-sensitive surface, one or more intensity-sensitive input regions (e.g., side buttons), one or more sensors to detect intensities of contacts with the touch-sensitive surface, optionally, one or more tactile output generators for generating localized tactile outputs at the input regions and/or whole device tactile outputs throughout multiple regions of the device, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, one or more intensity-sensitive input regions (e.g., side buttons), one or more sensors to detect intensities of contacts with the touch-sensitive surface, optionally, one or more tactile output generators for generating localized tactile outputs at the input regions and/or whole device tactile outputs throughout multiple regions of the device; and means for performing or causing performance of the operations of any of the methods described herein. In accordance with some embodiments, an information processing apparatus, for use in an electronic device with a display and a touch-sensitive surface, one or more intensity-sensitive input regions (e.g., side buttons), one or more sensors to detect intensities of contacts with the touch-sensitive surface, optionally, one or more tactile output generators for generating localized tactile outputs at the input regions and/or whole device tactile outputs throughout multiple regions of the device, includes means for performing or causing performance of the operations of any of the methods described herein.

Thus, electronic devices with displays, touch-sensitive surfaces, one or more intensity-sensitive input regions (e.g., side buttons), one or more sensors to detect intensities of contacts with the touch-sensitive surface, optionally, one or more tactile output generators for generating localized tactile outputs at the input regions and/or whole device tactile outputs throughout multiple regions of the device, optionally one or more device orientation sensors, and optionally an audio system, are provided with improved methods and interfaces for providing feedback to a user during interaction with an off-display input region, thereby increasing the effectiveness, efficiency, and user satisfaction with such devices. Such methods and interfaces may complement or replace conventional methods for facilitating interactions with the device and providing haptic feedback to a user.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates a multifunction device with a touch-sensitive surface that is separate from the display in accordance with some embodiments.

FIGS. 4F1-4F4 and 4G1-4G4 illustrate a set of sample tactile output patterns in accordance with some embodiments.

FIGS. 4K-4Q illustrate example combinations of tactile output patterns and haptic audio output patterns versus time in accordance with some embodiments.

FIGS. 5A1-5A8 illustrate exemplary user interfaces for providing haptic and visual feedback for button interactions corresponding to querying and/or modifying a current state of a device attribute in accordance with some embodiments.

FIGS. 5B1-5B11 illustrate exemplary user interfaces for providing haptic and visual feedback for button interactions corresponding to modifying a device parameter in different manners in accordance with some embodiments.

FIGS. 5C1-5C20 and 5D1-5D24 illustrate exemplary user interfaces for providing haptic and visual feedback for different types of button interactions corresponding to presenting and interacting with a retractable menu in accordance with some embodiments.

FIGS. 5E1-5E5 and 5F1-5F6 illustrate exemplary user interfaces for providing haptic and visual feedback for guiding device movement to perform a respective task when the device is in a media capture mode of operation in accordance with some embodiments.

FIGS. 5G1-5G5 and 5H1-5H5 illustrate exemplary user interfaces for providing haptic and visual feedback for warning a user of impending performance of an operation in accordance with some embodiments.

FIGS. 5I1-5I6 illustrate providing, for each respective type of button interaction, tactile outputs that have varying tactile output profiles depending on the presence of an interstitial material between the input region and the user's finger in accordance with some embodiments.

FIGS. 6A-6D are flow diagrams illustrating a method of querying and modifying a device attribute in accordance with some embodiments.

FIGS. 7A-7E are flow diagrams illustrating a method of presenting and interacting with a retractable menu in accordance with some embodiments.

FIGS. 8A-8D are flow diagrams illustrating a method of modifying a device parameter in different manners in accordance with some embodiments.

FIGS. 9A-9C are flow diagrams illustrating a method of guiding device movement in accordance with some embodiments.

FIGS. 10A-10C are flow diagrams illustrating a method of generating warning feedback for an impending operation in accordance with some embodiments.

FIGS. 11A-11B are flow diagrams illustrating a method of adjusting tactile outputs for an input on an input region depending on whether there is an interstitial material present between the input region and a user's finger detected on the input region in accordance with some embodiments.

FIGS. 12A-12E are flow diagrams illustrating a method of providing different tactile outputs for distinct types of inputs detected on an off-display input region disposed on a peripheral side of the device in accordance with some embodiments.

DESCRIPTION OF EMBODIMENTS

Figure 1A:
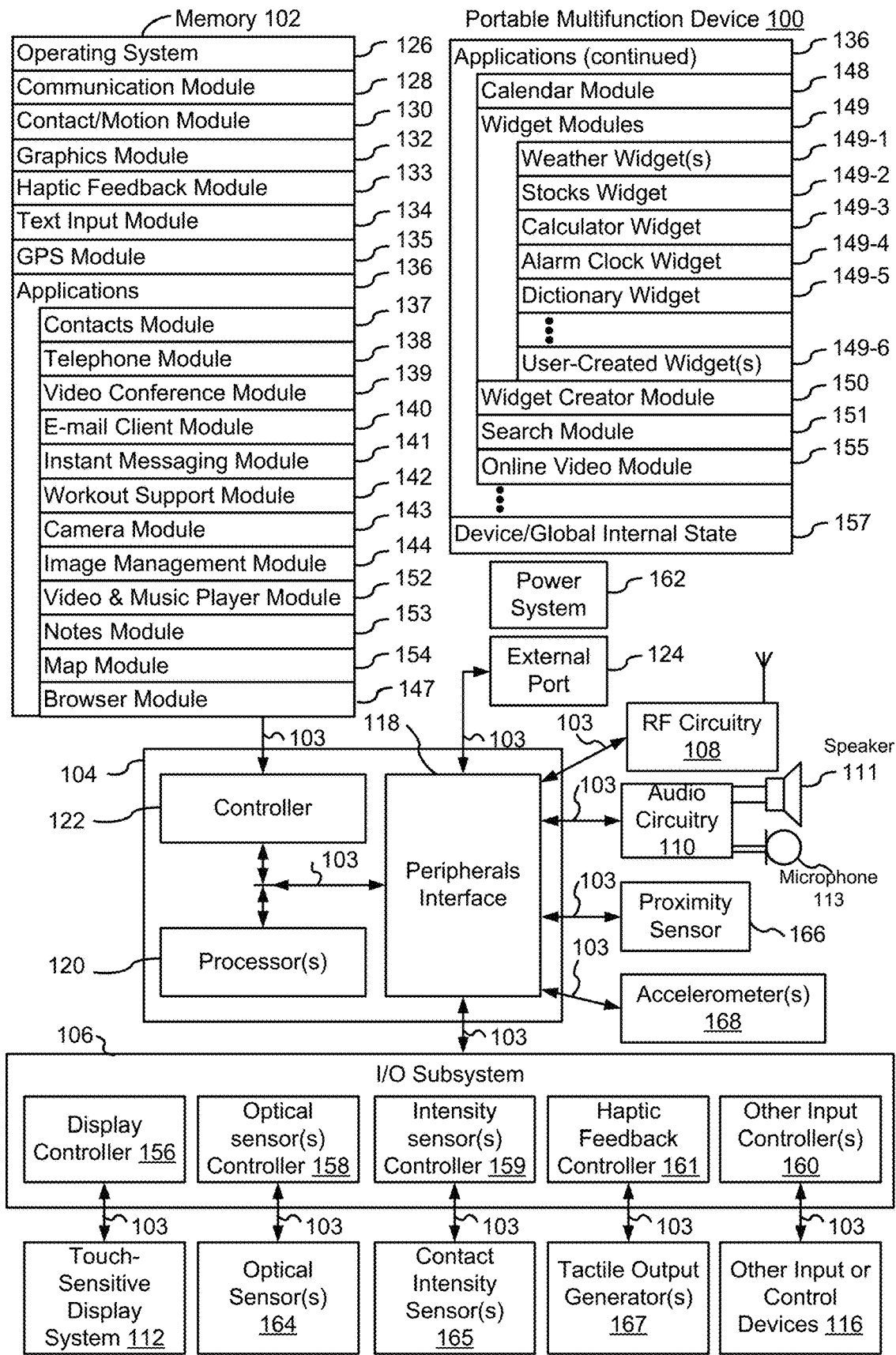
FIG. 1A is a block diagram illustrating a portable multifunction device with a touch-sensitive display in accordance with some embodiments.

Many electronic devices with displays include mechanical buttons, such as mechanical home buttons, for triggering device functions and navigating between user interfaces. Some devices have solid state home buttons that mimics mechanical home buttons by providing localized tactile outputs in response to press inputs detected on the solid state home buttons. But mechanical buttons and solid state home button are suitable for activating only a couple of fixed functions, and provide little feedback beyond simple button clicks. Methods described herein provide visual, haptic, and/or audio feedback during a variety of user interactions with an intensity-sensitive off-screen input region (e.g., a side button or surface) that make manipulation of user interfaces more efficient and intuitive for a user.

The methods, devices, and GUIs described herein providing novel and improved ways of triggering device functions and using haptic and visual feedback to improve device-user interactions, including:

querying and optionally modifying a device attribute (e.g., presence of unread notifications, current volume, etc.) in accordance with off-display button interactions, and providing corresponding haptic feedback, in lieu of or in conjunction with visual feedback;
 presenting and interacting with a retractable menu in accordance with various types of touch inputs detected on an off-display input region (e.g., detected in the absence of and/or in conjunction with inputs detected on a touch-screen displaying the menu) and providing corresponding haptic feedback in conjunction with visual feedback;
 providing haptic feedback for modifying a device parameter in different manners depending on which subportions of an off-display input region are activated by the inputs;
 providing directional haptic feedback at the intensity-sensitive input regions to guide device movement to continue performance of a respective task when a device is in a media capture mode of operation;
 generating warning feedback for an impending operation through coordinated operations of multiple feedback channels (e.g., localized tactile outputs on the off-display input regions, whole device tactile outputs, audio outputs, visual outputs, etc.);
 providing consistent haptic feedback to a user under a variety of operating conditions by adjusting a respective tactile output profile of tactile outputs generated for an input on an input region depending on whether there is an interstitial material present between the input region and a user's finger detected on the input region; and
 providing tactile outputs with different tactile output profiles for distinct types of touch inputs detected on an off-display input region disposed on a peripheral side of the device.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display, a touch-sensitive surface, and one or more off-display intensity-sensitive input regions is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface or the one or more intensity-sensitive off-display input regions. One or more functions of the touch-sensitive surface as well as corresponding information displayed on the device are, optionally, adjusted and/or varied from one application to the next and/or within a respective application. In this way, a common physical architecture (such as the touch-sensitive surface or intensity-sensitive off-display input regions) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display, a trackpad, an intensity-sensitive side button, or a solid state button) is, optionally, interpreted by the user as a "down click" or "up click" of a physical actuator button, a "detent" of a physical scroll-wheel or dial, and/or a "snap" of a mechanical switch or toggle, etc. In some cases, a user will feel a tactile sensation, such as an "down click" or "up click", a "detent", or a "snap", even when there is no movement of an input region that is physically pressed or swiped by the user's finger movements, before the movement of the input region is detected, and/or when the movement of the input region is drastically different from the movement that a physical mechanical button, scroll-wheel or dial, or switch would undergo to produce the tactile sensations that the user perceives through the input region. As another example, movement of the touch-sensitive surface (e.g., a touch-sensitive display, a trackpad, an intensity-sensitive side button, or a solid state button) is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness", "detent", or "flip and snap of a toggle or switch"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, the mode of motion of the tactile output (e.g., linear oscillations in x direction, y-direction, or z-direction; or angular oscillations around x-axis, y-axis, or z-axis, etc.), and/or the duration of the tactile output.

When tactile outputs with different tactile output patterns are generated by a device, the tactile outputs may invoke different haptic sensations in a user holding or touching the device and/or the input region. The device optionally includes one or more whole device tactile output generators (e.g., a moveable mass that is coupled to the housing of the device) to generate tactile outputs at many different locations on the device at the same time. The device may also include one or more localized tactile output generators (e.g., a surface oscillator that oscillates or vibrates around a fixed pivot in various directions underneath the input region or other tactile output generator that is capable of generating tactile outputs that are directed specifically toward the input region) to generate localized tactile outputs. The localized vibrations have varying amplitudes at different locations on the device with greater amplitudes on the input region or a sub-portion thereof where a user's finger will typically rest while interacting with the input region and with lower amplitudes at other places (e.g., outside of the input region) where a user's hand will not typically rest while interacting with the input region.

While the sensation of the user is based on the user's perception of the tactile output, most users will be able to identify changes in waveform, frequency, mode of motion, and amplitude of tactile outputs generated by the device. Thus, the waveform, frequency, mode of motion, and amplitude can be adjusted to indicate to the user that different types of inputs have been detected on the input region (e.g., an intensity-sensitive side button, a solid state button, a touch pad, or a touch-screen), and/or different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device.

Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device. In some embodiments, an accompanying audio enhances the effect of the tactile output and makes the haptic sensation experienced by a user more salient and/or realistic. The tactile output profile of a tactile output is optionally extended to include an audio profile for an accompanying audio output that is generated to supplement the tactile output. The audio profile for an accompanying audio output of a tactile output includes characteristics of the audio output such as timing (e.g., timing offsets from the corresponding tactile output), amplitude (e.g., amplitude specified in predefined values or a ratio or correlation between the amplitude of the audio output and one or more characteristics of the tactile output), frequency (e.g., frequency specified in predefined values or in terms of a relationship with one or more characteristics of the tactile output), shape of a waveform (e.g., a predefined waveform or a waveform specified in terms of a relationship with one or more characteristics of the tactile output). The accompany audio output for a tactile output is distinct from regular device audio output (e.g., audio alerts or media output generated by the device independent of generation of a tactile output).

In some embodiments, multiple different tactile output generators (e.g., whole device tactile output generators, and/or localized tactile output generators located at different locations on the device) coordinate their individual outputs (e.g., with timing coordination, amplitude coordination, and wave pattern coordination, or a combination of the above) to convey a sense of direction around the device (e.g., up, down, left, right, front, back, clockwise, counter-clockwise, etc.), which further enhance a user's experience when the user interacts with a user interface and/or the device, and facilitate better conveyance of information regarding the state of the user interface and/or the device, and which reduce input errors and increase the efficiency of the user's operation of the device. In some embodiments, the tactile output profile of a tactile output to be generated by a respective tactile output generator is extended to identify other tactile output generators and specify the respective manner by which the respective tactile output generator will coordinate with these other tactile output generators to generate coordinated tactile outputs for a respective purpose (e.g., indicate a direction to a user).

FIG. 4F1 provides a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. FIGS. 4F2-4F4 are expanded views of the graphs shown in FIG. 4F1. This example of a palette of tactile outputs shows how a set of three waveforms and eight frequencies can be used to produce an array of tactile output patterns. In addition to the tactile output patterns shown in this figure, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIG. 4G1, which are each shown with variants having a gain of 1.0, 0.75, 0.5, and 0.25.

FIGS. 4G2-4G4 are expanded views of the graphs shown in FIG. 4G1. As shown in FIG. 4G1, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

In FIG. 4F1, each column shows tactile output patterns that have a particular waveform. The waveform of a tactile output pattern represents the pattern of physical displacements relative to a neutral position (e.g., $x_{zero}$) versus time that a moveable mass goes through to generate a tactile output with that tactile output pattern. For example, a first set of tactile output patterns shown in the left column in FIG. 4F1 (e.g., tactile output patterns of a "FullTap") each have a waveform that includes an oscillation with two complete cycles (e.g., an oscillation that starts and ends in a neutral position and crosses the neutral position three times). A second set of tactile output patterns shown in the middle column in FIG. 4F1 (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in the right column in FIG. 4F1 (e.g., tactile output patterns of a "MicroTap") each have a waveform that includes an oscillation that include one-half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIG. 4F1-4G4 include $x_{min}$ and $x_{max}$ values which represent the maximum and minimum extent of movement of the moveable mass. For larger electronic devices with larger moveable masses, there may be larger or smaller minimum and maximum extents of movement of the mass. The example shown in FIGS. 4F1-4G4 describes movement of a mass in 1 dimension, however similar principles would also apply to movement of a moveable mass in two or three dimensions.

As shown in FIG. 4F1, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIG. 4F1, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4F1). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIG. 4F1, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIG. 4F1 for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well.

Figure 4A:
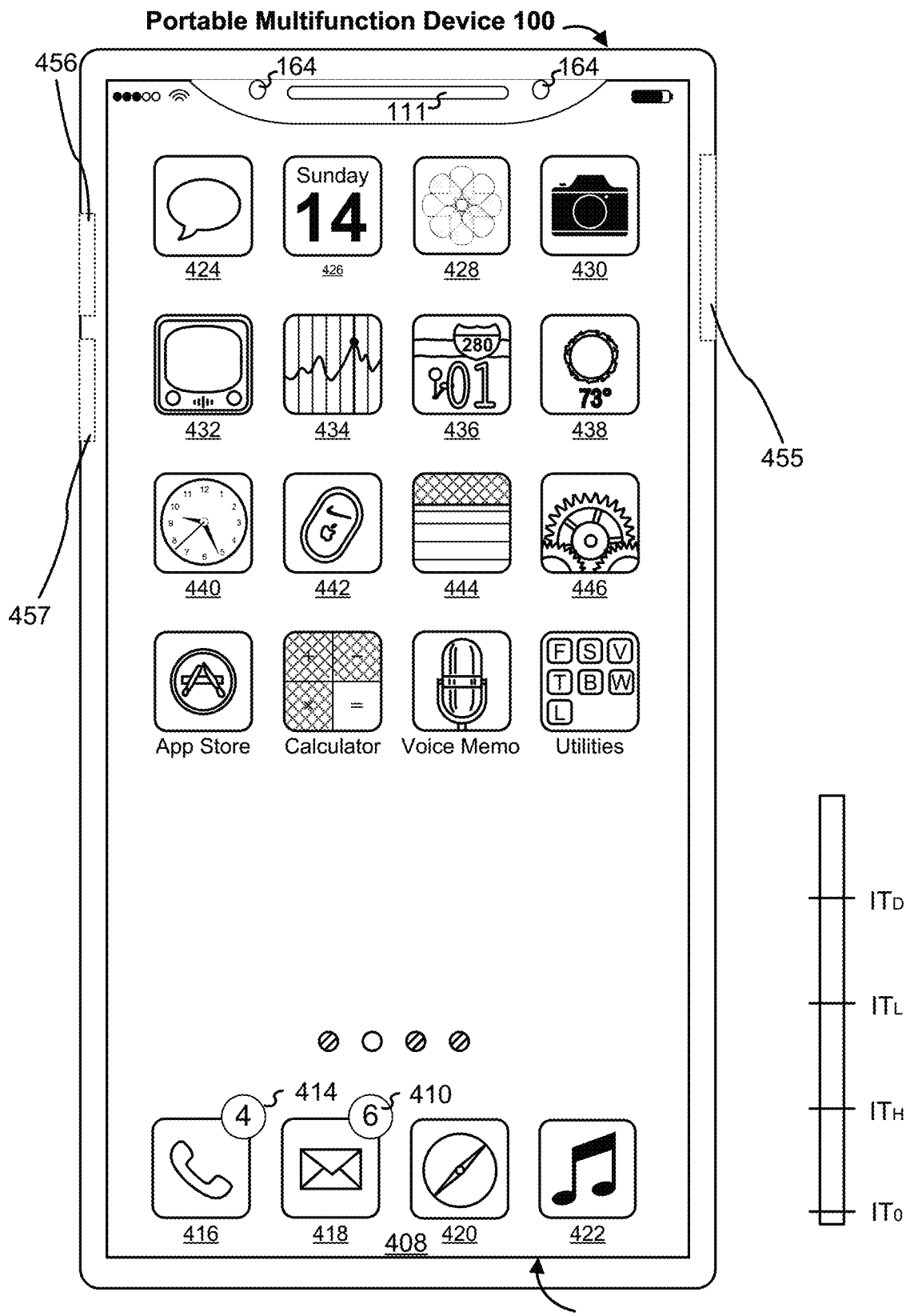
FIG. 4A illustrates a portable multifunction device with one or more intensity-sensitive off-display input regions on one or more peripheral sides of the device, and a touchscreen display showing an example home screen user interface with a menu of application launch icons corresponding to different applications, in accordance with some embodiments.
Figure 4C:
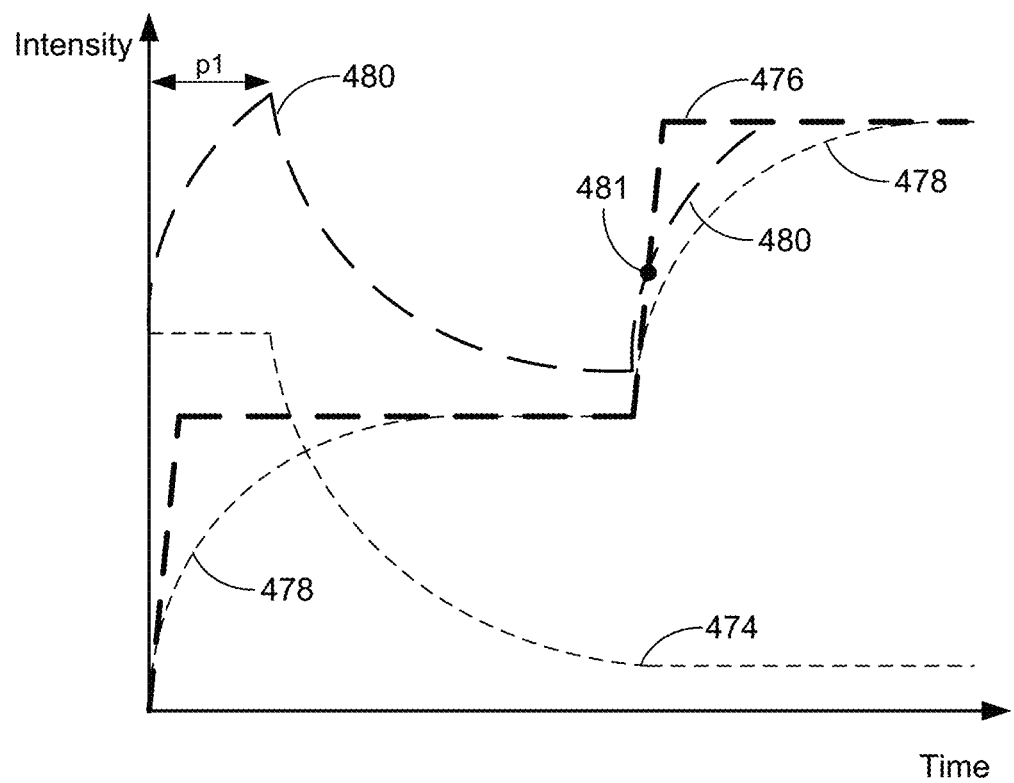
FIGS. 4C-4E illustrate examples of dynamic intensity thresholds in accordance with some embodiments.
Figure 4D:
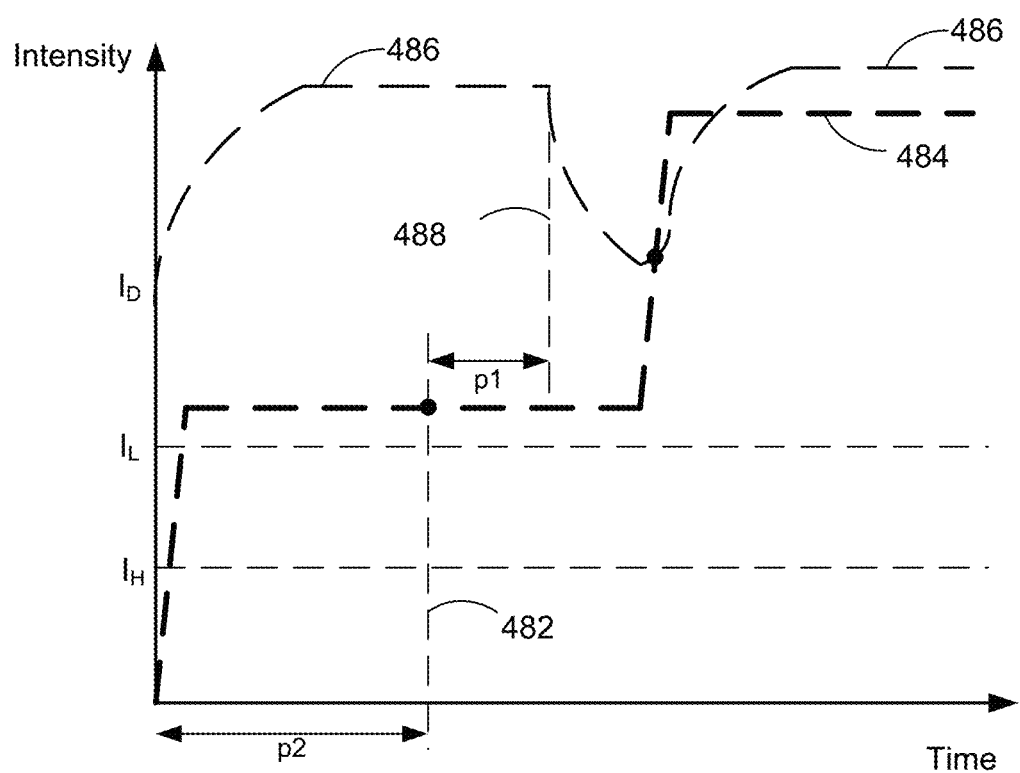
Figure 4E:
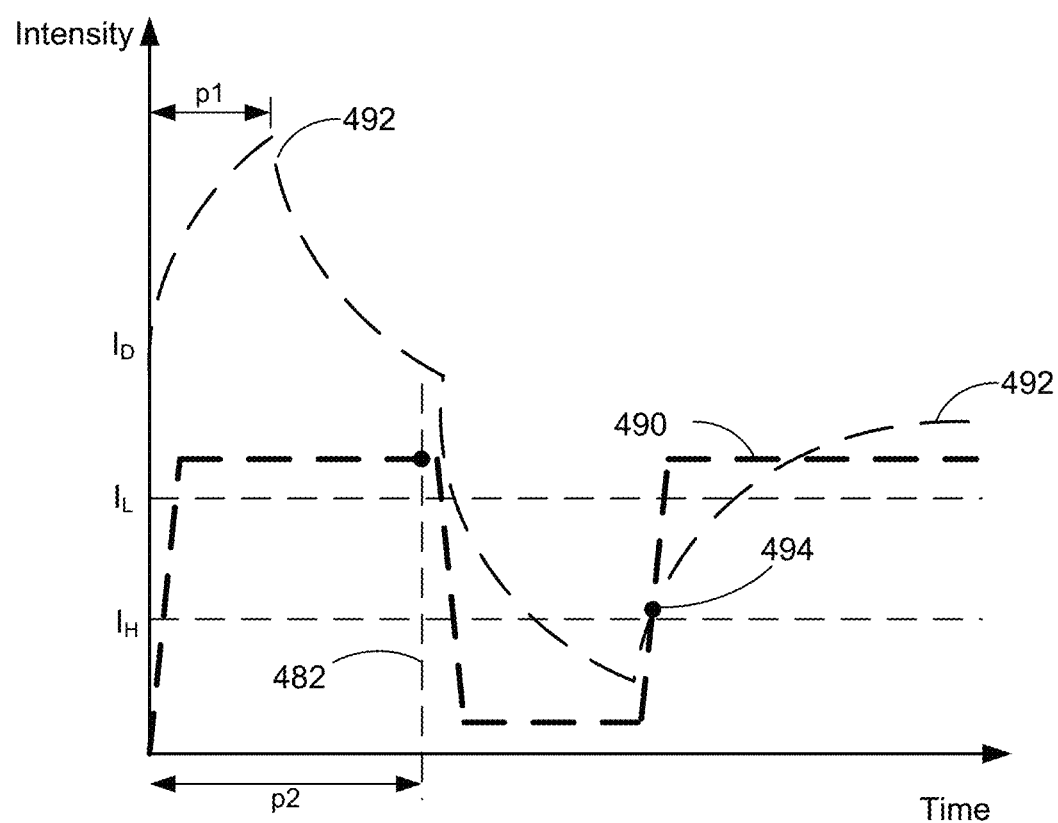
Figure 4H:
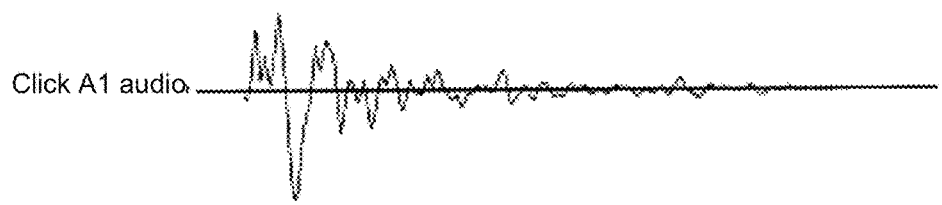
FIGS. 4H-4J illustrate example haptic audio output patterns versus time that are used in conjunction with tactile outputs to simulate button clicks in accordance with some embodiments.
Figure 4I:
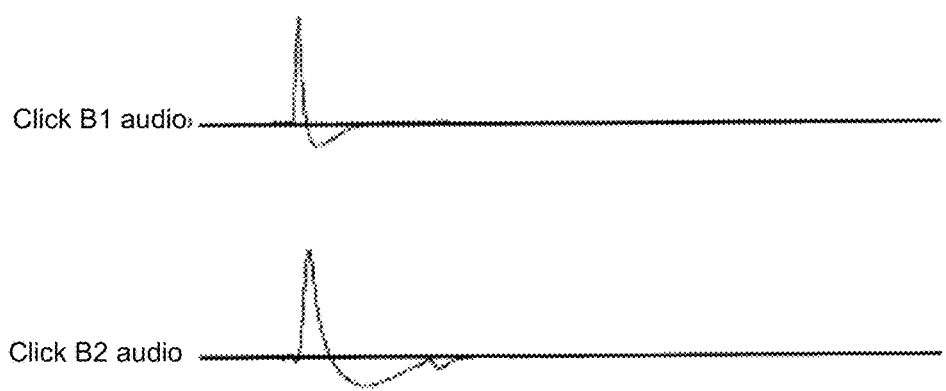
Figure 4J:
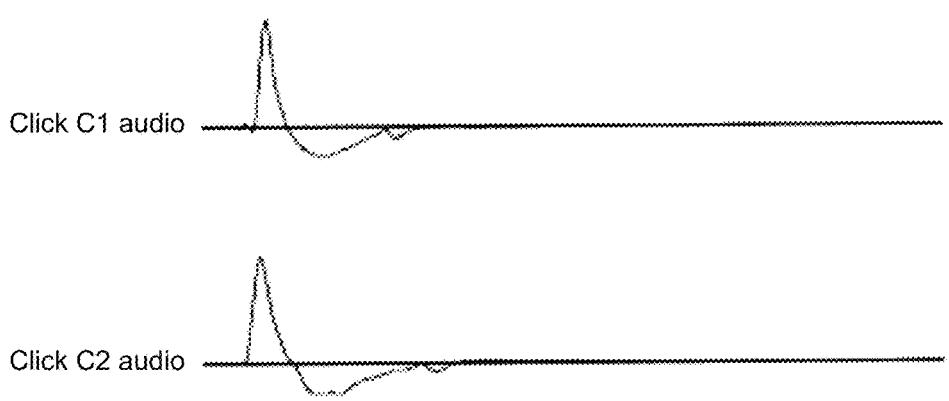

FIGS. 4H-4J illustrate example haptic audio output patterns versus time that are used in conjunction with tactile outputs to simulate button clicks in accordance with some embodiments.

FIGS. 4K-4Q illustrate example combinations of tactile output patterns and haptic audio output patterns versus time in accordance with some embodiments.

Figure 4K:
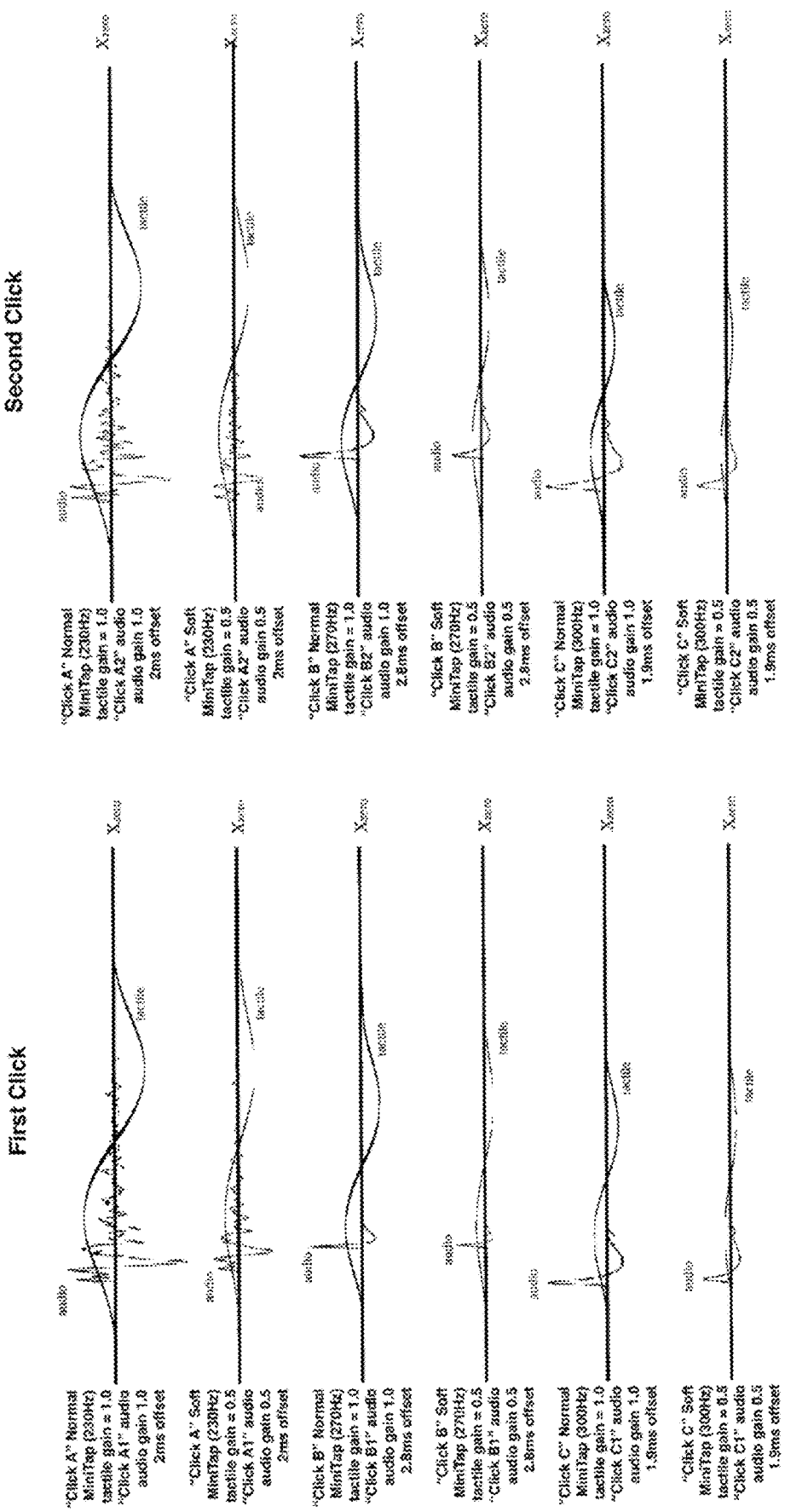
Figure 4L:
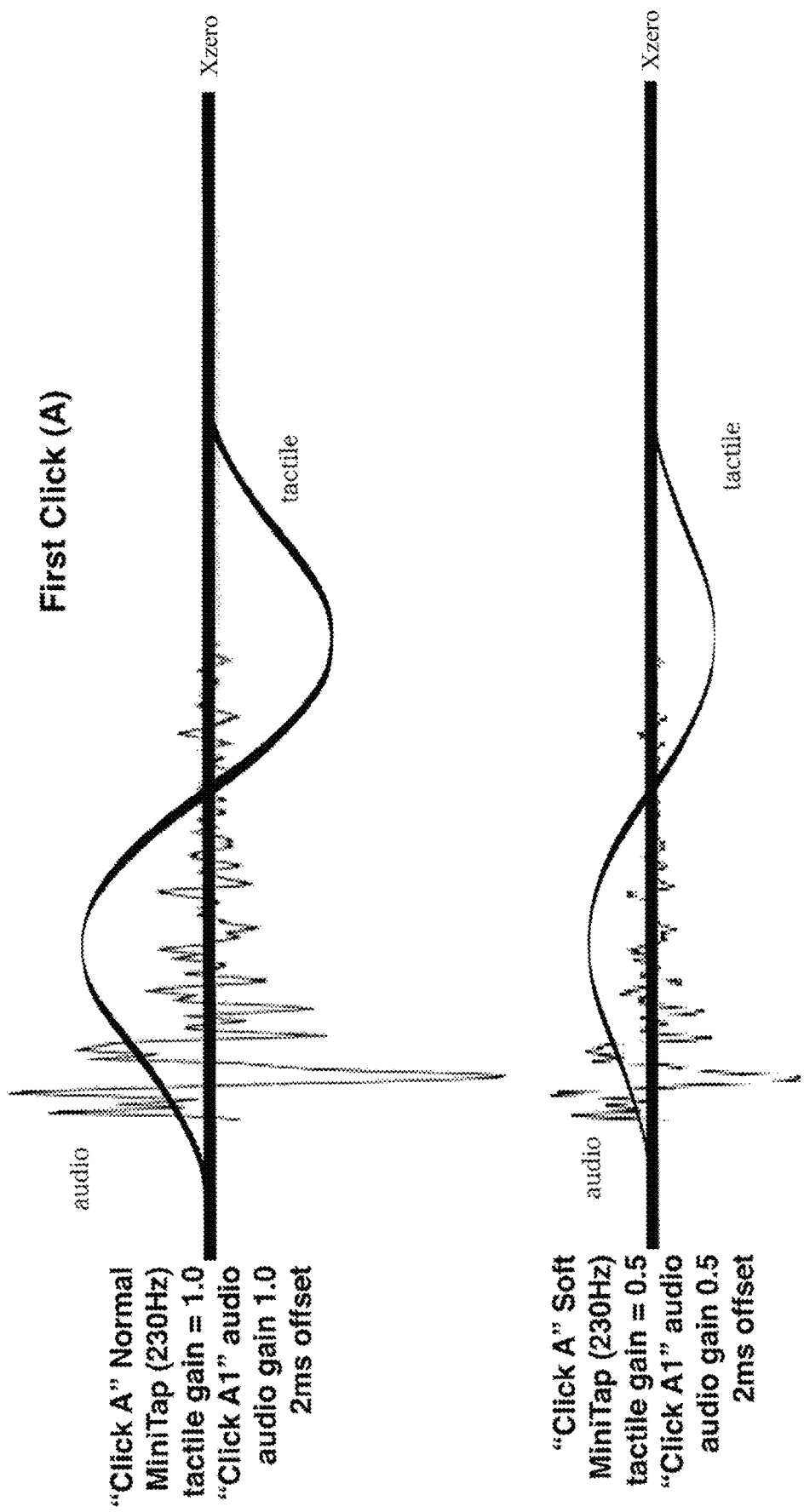

In FIG. 4H, the top haptic audio pattern "Click A1 audio" is audio output that is played conjunction with "Click A" Normal MiniTap (230 Hz) to simulate a first down-click in a "normal" first click, as shown in FIG. 4K (first row in the First Click column) and the upper portion of FIG. 4L, where the rate of change of intensity of a contact at a control activation threshold is above a threshold rate of change (e.g., the contact is making a "normal" hard/fast press). In this example, "Click A1 audio" is offset from the start of the "Click A" Normal MiniTap (230 Hz) tactile output by 2 ms. In some cases, the same "Click A1 audio" and "Click A" Normal MiniTap (230 Hz) are played to simulate the first up-click that follows the first down-click. In some cases, the gain of the "Click A1 audio" and/or "Click A" Normal MiniTap (230 Hz) are reduced (e.g., by 50%) in the up-click relative to the preceding down-click.

The top haptic audio pattern "Click A1 audio" is also played in conjunction with "Click A" Soft MiniTap (230 Hz) to simulate a first down-click in a "soft" first click, as shown in FIG. 4K (second row in the First Click column) and the lower portion of FIG. 4L, where the rate of change of intensity of a contact at a control activation threshold is below a threshold rate of change (e.g., the contact is making a "soft" and/or slow press). To simulate a "soft" down-click, the gain of the "Click A1 audio" and "Click A" Soft MiniTap (230 Hz) are reduced (e.g., by 50%) in the "soft" down-click relative to the "normal" down-click. In this example, "Click A1 audio" is offset from the start of the "Click A" Soft MiniTap (230 Hz) tactile output by 2 ms. In some cases, the same "Click A1 audio" and "Click A" Soft MiniTap (230 Hz) are played to simulate the first up-click that follows the first down-click. In some cases, the gain of the "Click A1 audio" and/or "Click A" Soft MiniTap (230 Hz) are reduced (e.g., by 50%) in the up-click relative to the preceding down-click.

Figure 4M:
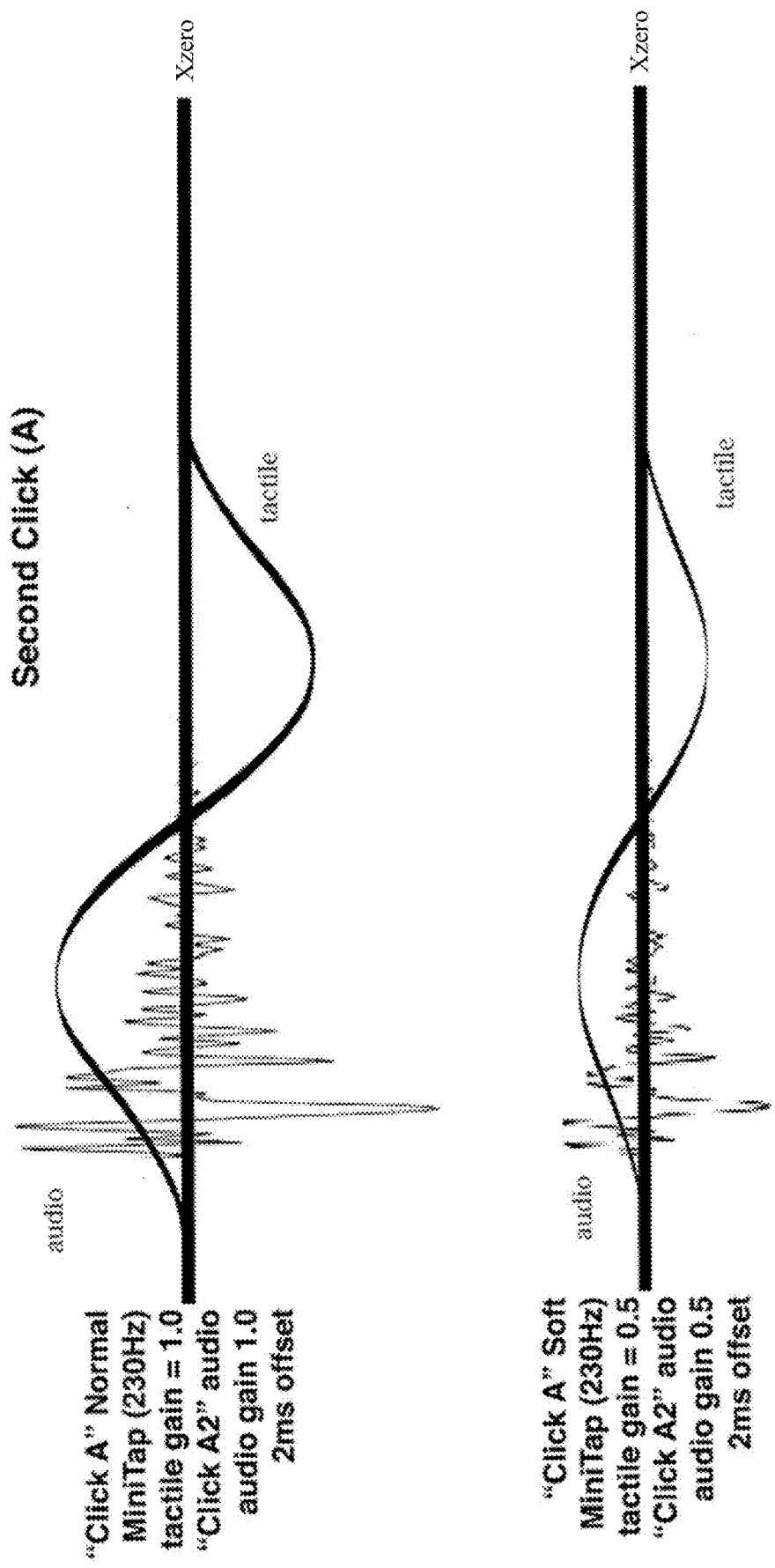

In FIG. 4H, the bottom haptic audio pattern "Click A2 audio" is audio output that is played conjunction with "Click A" Normal MiniTap (230 Hz) to simulate a second down-click in a "normal" second click that follows the first click within a predetermined period of time (e.g., as the second click in a double click input), as shown in FIG. 4K (first row in the Second Click column) and the upper portion of FIG. 4M, where the rate of change of intensity of a contact at a control activation threshold is above a threshold rate of change (e.g., the contact in the second click is making a "normal" hard/fast press). In this example, "Click A2 audio" is offset from the start of the "Click A" Normal MiniTap (230 Hz) tactile output by 2 ms. In some cases, the same "Click A2 audio" and "Click A" Normal MiniTap (230 Hz) are played to simulate the second up-click that follows the second down-click. In some cases, the gain of the "Click A2 audio" and/or "Click A" Normal MiniTap (230 Hz) are reduced (e.g., by 50%) in the second up-click relative to the preceding second down-click.

The bottom haptic audio pattern "Click A2 audio" is also played in conjunction with "Click A" Soft MiniTap (230 Hz) to simulate a second down-click in a "soft" second click that follows the first click within a predetermined period of time (e.g., as the second click in a double click input), as shown in FIG. 4K (second row in the Second Click column) and the lower portion of FIG. 4M, where the rate of change of intensity of a contact at a control activation threshold is below a threshold rate of change (e.g., the contact is making a "soft" and/or slow press). To simulate a "soft" down-click, the gain of the "Click A2 audio" and "Click A" Soft MiniTap (230 Hz) are reduced (e.g., by 50%) in the "soft" down-click relative to the "normal" down-click. In this example, "Click A2 audio" is offset from the start of the "Click A" Soft MiniTap (230 Hz) tactile output by 2 ms. In some cases, the same "Click A2 audio" and "Click A" Soft MiniTap (230 Hz) are played to simulate the second up-click that follows the second down-click. In some cases, the gain of the "Click A2 audio" and/or "Click A" Soft MiniTap (230 Hz) are reduced (e.g., by 50%) in the second up-click relative to the preceding second down-click.

In FIG. 4I, the top haptic audio pattern "Click B1 audio" is audio output that is played conjunction with "Click B" Normal MiniTap (270 Hz) to simulate a first down-click in a "normal" first click, as shown in FIG. 4K (third row in the First Click column) and the upper portion of FIG. 4N, where the rate of change of intensity of a contact at a control activation threshold is above a threshold rate of change (e.g., the contact is making a "normal" hard/fast press). In this example, "Click B1 audio" is offset from the start of the "Click B" Normal MiniTap (270 Hz) tactile output by 2.8 ms. In some cases, the same "Click B1 audio" and "Click B" Normal MiniTap (270 Hz) are played to simulate the first up-click that follows the first down-click. In some cases, the gain of the "Click B1 audio" and/or "Click B" Normal MiniTap (270 Hz) are reduced (e.g., by 50%) in the up-click relative to the preceding down-click.

The top haptic audio pattern "Click B1 audio" is also played in conjunction with "Click B" Soft MiniTap (270 Hz) to simulate a first down-click in a "soft" first click, as shown in FIG. 4K (fourth row in the First Click column) and the lower portion of FIG. 4N, where the rate of change of intensity of a contact at a control activation threshold is below a threshold rate of change (e.g., the contact is making a "soft" and/or slow press). To simulate a "soft" down-click, the gain of the "Click B1 audio" and "Click B" Soft MiniTap (270 Hz) are reduced (e.g., by 50%) in the "soft" down-click relative to the "normal" down-click. In this example, "Click B1 audio" is offset from the start of the "Click B" Soft MiniTap (270 Hz) tactile output by 2.8 ms. In some cases, the same "Click B1 audio" and "Click B" Soft MiniTap (270 Hz) are played to simulate the first up-click that follows the first down-click. In some cases, the gain of the "Click B1 audio" and/or "Click B" Soft MiniTap (230 Hz) are reduced (e.g., by 50%) in the up-click relative to the preceding down-click.

In FIG. 4I, the bottom haptic audio pattern "Click B2 audio" is audio output that is played conjunction with "Click B" Normal MiniTap (270 Hz) to simulate a second down-click in a "normal" second click that follows the first click within a predetermined period of time (e.g., as the second click in a double click input), as shown in FIG. 4K (third row in the Second Click column) and the upper portion of FIG. 4O, where the rate of change of intensity of a contact at a control activation threshold is above a threshold rate of change (e.g., the contact in the second click is making a "normal" hard/fast press). In this example, "Click B2 audio" is offset from the start of the "Click B" Normal MiniTap (270 Hz) tactile output by 2.8 ms. In some cases, the same "Click B2 audio" and "Click B" Normal MiniTap (230 Hz) are played to simulate the second up-click that follows the second down-click. In some cases, the gain of the "Click B2 audio" and/or "Click B" Normal MiniTap (270 Hz) are reduced (e.g., by 50%) in the second up-click relative to the preceding second down-click.

The bottom haptic audio pattern "Click B2 audio" is also played in conjunction with "Click B" Soft MiniTap (270 Hz)

to simulate a second down-click in a "soft" second click that follows the first click within a predetermined period of time (e.g., as the second click in a double click input), as shown in FIG. 4K (fourth row in the Second Click column) and the lower portion of FIG. 4O, where the rate of change of intensity of a contact at a control activation threshold is below a threshold rate of change (e.g., the contact is making a "soft" and/or slow press). To simulate a "soft" down-click, the gain of the "Click B2 audio" and "Click B" Soft MiniTap (270 Hz) are reduced (e.g., by 50%) in the "soft" down-click relative to the "normal" down-click. In this example, "Click B2 audio" is offset from the start of the "Click B" Soft MiniTap (270 Hz) tactile output by 2.8 ms. In some cases, the same "Click B2 audio" and "Click B" Soft MiniTap (270 Hz) are played to simulate the second up-click that follows the second down-click. In some cases, the gain of the "Click B2 audio" and/or "Click B" Soft MiniTap (270 Hz) are reduced (e.g., by 50%) in the second up-click relative to the preceding second down-click.

In FIG. 4J, the top haptic audio pattern "Click C1 audio" is audio output that is played conjunction with "Click C" Normal MiniTap (300 Hz) to simulate a first down-click in a "normal" first click, as shown in FIG. 4K (fifth row in the First Click column) and the upper portion of FIG. 4P, where the rate of change of intensity of a contact at a control activation threshold is above a threshold rate of change (e.g., the contact is making a "normal" hard/fast press). In this example, "Click C1 audio" is offset from the start of the "Click C" Normal MiniTap (300 Hz) tactile output by 1.9 ms. In some cases, the same "Click C1 audio" and "Click C" Normal MiniTap (300 Hz) are played to simulate the first up-click that follows the first down-click. In some cases, the gain of the "Click C1 audio" and/or "Click C" Normal MiniTap (300 Hz) are reduced (e.g., by 50%) in the up-click relative to the preceding down-click.

The top haptic audio pattern "Click C1 audio" is also played in conjunction with "Click C" Soft MiniTap (300 Hz) to simulate a first down-click in a "soft" first click, as shown in FIG. 4K (sixth row in the First Click column) and the lower portion of FIG. 4P, where the rate of change of intensity of a contact at a control activation threshold is below a threshold rate of change (e.g., the contact is making a "soft" and/or slow press). To simulate a "soft" down-click, the gain of the "Click C1 audio" and "Click C" Soft MiniTap (300 Hz) are reduced (e.g., by 50%) in the "soft" down-click relative to the "normal" down-click. In this example, "Click C1 audio" is offset from the start of the "Click C" Soft MiniTap (300 Hz) tactile output by 1.9 ms. In some cases, the same "Click C1 audio" and "Click C" Soft MiniTap (270 Hz) are played to simulate the first up-click that follows the first down-click. In some cases, the gain of the "Click C1 audio" and/or "Click C" Soft MiniTap (300 Hz) are reduced (e.g., by 50%) in the up-click relative to the preceding down-click.

Figure 4Q:
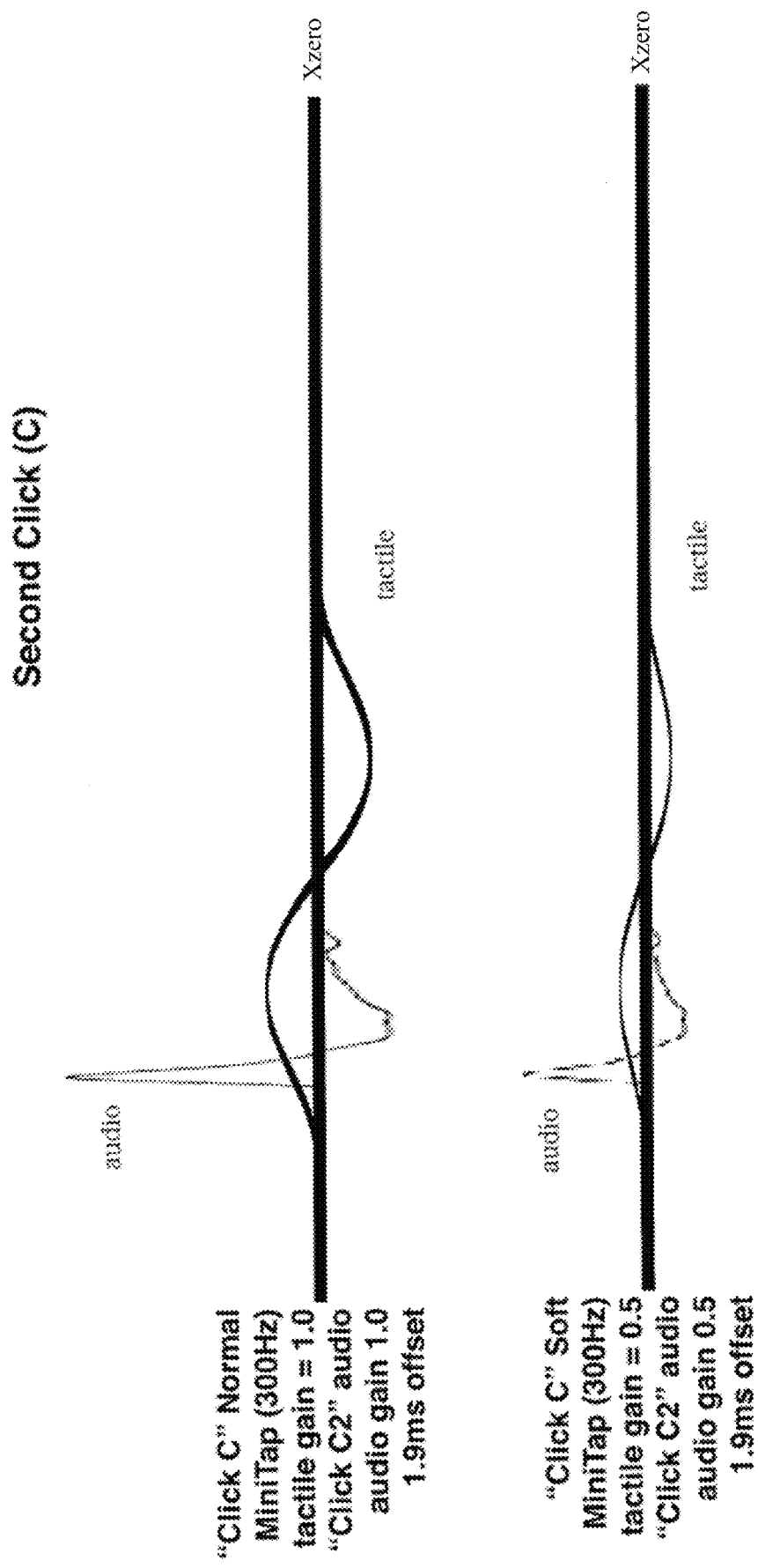

In FIG. 4J, the bottom haptic audio pattern "Click C2 audio" is audio output that is played conjunction with "Click C" Normal MiniTap (300 Hz) to simulate a second down-click in a "normal" second click that follows the first click within a predetermined period of time (e.g., as the second click in a double click input), as shown in FIG. 4K (fifth row in the Second Click column) and the upper portion of FIG. 4Q, where the rate of change of intensity of a contact at a control activation threshold is above a threshold rate of change (e.g., the contact in the second click is making a "normal" hard/fast press). In this example, "Click C2 audio" is offset from the start of the "Click C" Normal MiniTap (300 Hz) tactile output by 1.9 ms. In some cases, the same "Click C2 audio" and "Click C" Normal MiniTap (300 Hz) are played to simulate the second up-click that follows the second down-click. In some cases, the gain of the "Click C2 audio" and/or "Click C" Normal MiniTap (300 Hz) are reduced (e.g., by 50%) in the second up-click relative to the preceding second down-click.

The bottom haptic audio pattern "Click C2 audio" is also played in conjunction with "Click C" Soft MiniTap (300 Hz) to simulate a second down-click in a "soft" second click that follows the first click within a predetermined period of time (e.g., as the second click in a double click input), as shown in FIG. 4K (sixth row in the Second Click column) and the lower portion of FIG. 4Q, where the rate of change of intensity of a contact at a control activation threshold is below a threshold rate of change (e.g., the contact is making a "soft" and/or slow press). To simulate a "soft" down-click, the gain of the "Click C2 audio" and "Click C" Soft MiniTap (300 Hz) are reduced (e.g., by 50%) in the "soft" down-click relative to the "normal" down-click. In this example, "Click C2 audio" is offset from the start of the "Click C" Soft MiniTap (300 Hz) tactile output by 1.9 ms. In some cases, the same "Click C2 audio" and "Click C" Soft MiniTap (300 Hz) are played to simulate the second up-click that follows the second down-click. In some cases, the gain of the "Click C2 audio" and/or "Click C" Soft MiniTap (300 Hz) are reduced (e.g., by 50%) in the second up-click relative to the preceding second down-click.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2A). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2A) optionally include an up/down button for volume control of speaker 111 and/or microphone 113. The one or more buttons optionally include a push button (e.g., 206, FIG. 2A).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" is a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

In some embodiments, in addition to the touch screen and/or touchpad, device 100 optionally include one or more off-display touch-sensitive input regions that are separate from the touch-screen and/or touch pad. In some embodiments, the off-display touch-sensitive input regions are positioned on one or more peripheral-sides of the device that is adjacent to the display-side of the device. A touch-sensitive surface of the touch-sensitive input regions are optionally perpendicular to the display of the device. In some embodiments, in addition to being able to detect different levels of intensity of a contact with the input region, the input region is also configured to detect movement in one or more directions across the surface of the input region. In some embodiments, the device will recognize different types of inputs (e.g., press inputs, scroll inputs, and toggle inputs) on the input region based on the movement direction and intensity of the contact detected on the input region, and the device will generate localized tactile outputs at the input region to simulate the haptic feedback provided by a mechanical input device, such as a switch, a slider, a dial, a wheel, or a button. In some embodiments, the off-display touch-sensitive input region is distinct in nature from a touchpad in that, the location and movement of a contact on the off-display touch-sensitive input region does not directly correspond to a location and movement of a focus selector on the display in the manner that the location and movement of a contact on the touchpad would correspond to a location and movement of a focus selector on the display. In fact, frequently, a focus selector is not displayed or required on the display when an off-display input region is used by a user to interact with the device and manipulate a user interface shown on the display. In many cases, the focus of an input on the input region is preset to a location, an object, or a function prior to detection of the input on the input region, and/or based on the type of the input that is detected, as opposed to an exact location of a contact detected on the input region.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
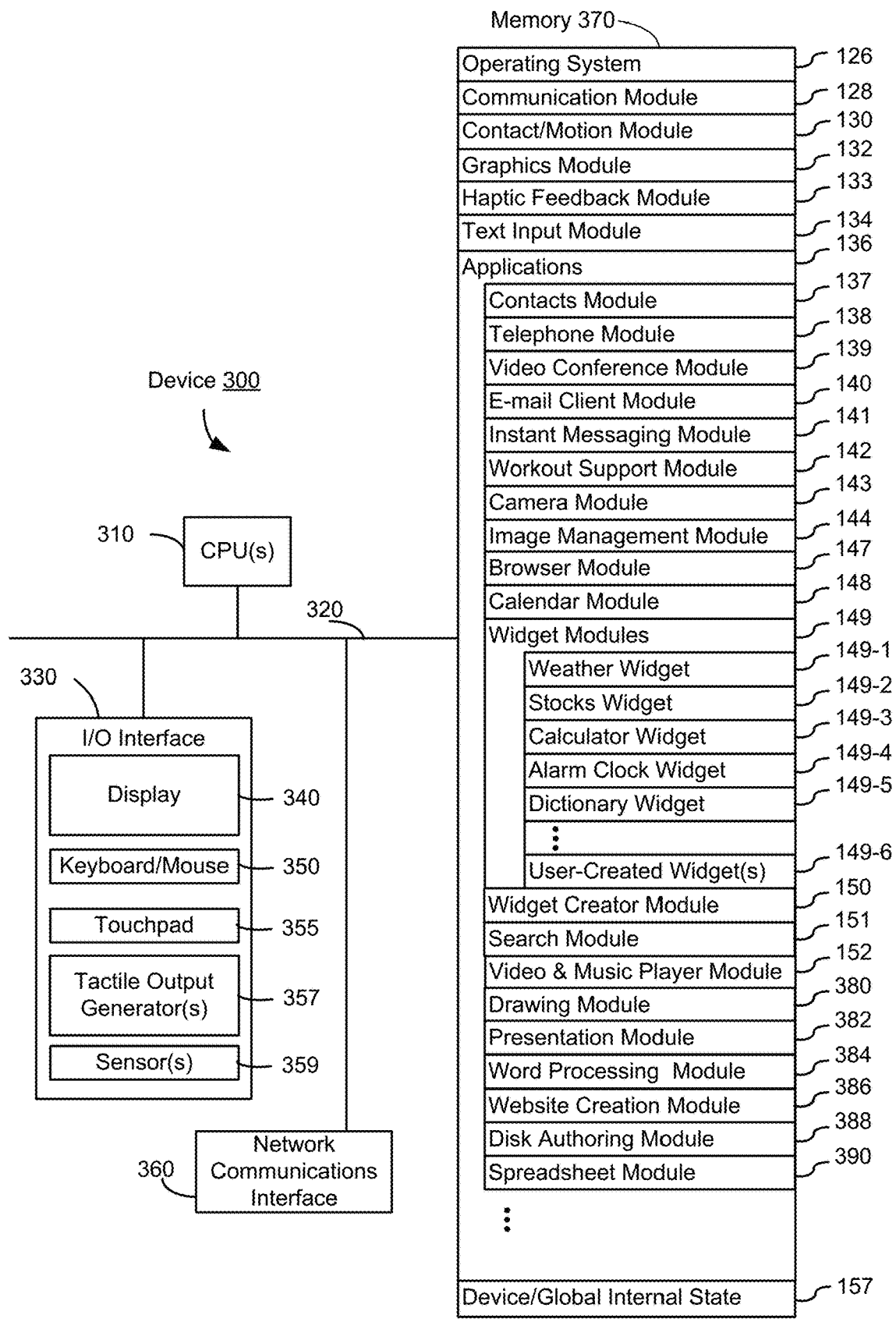
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensities of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
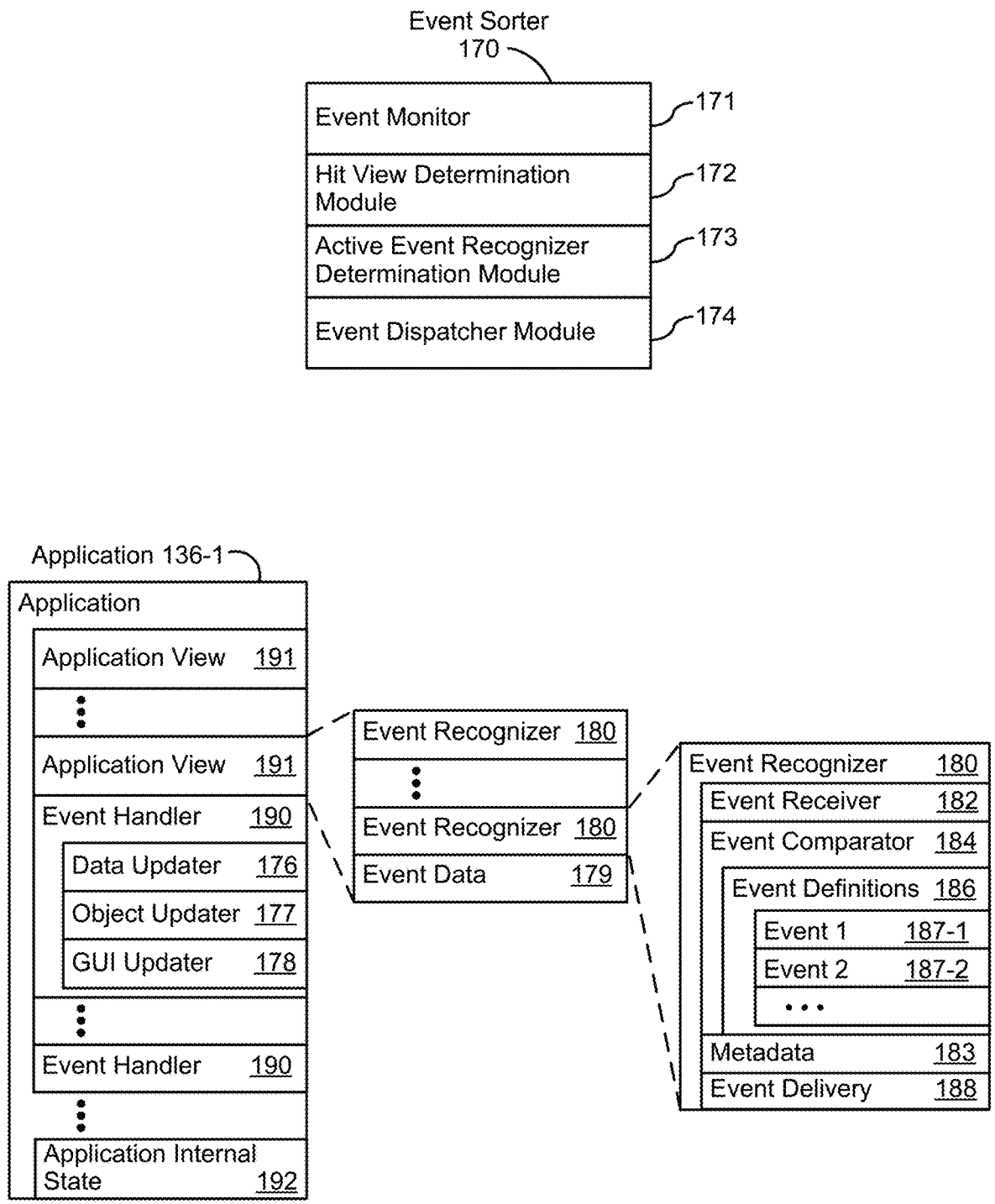
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
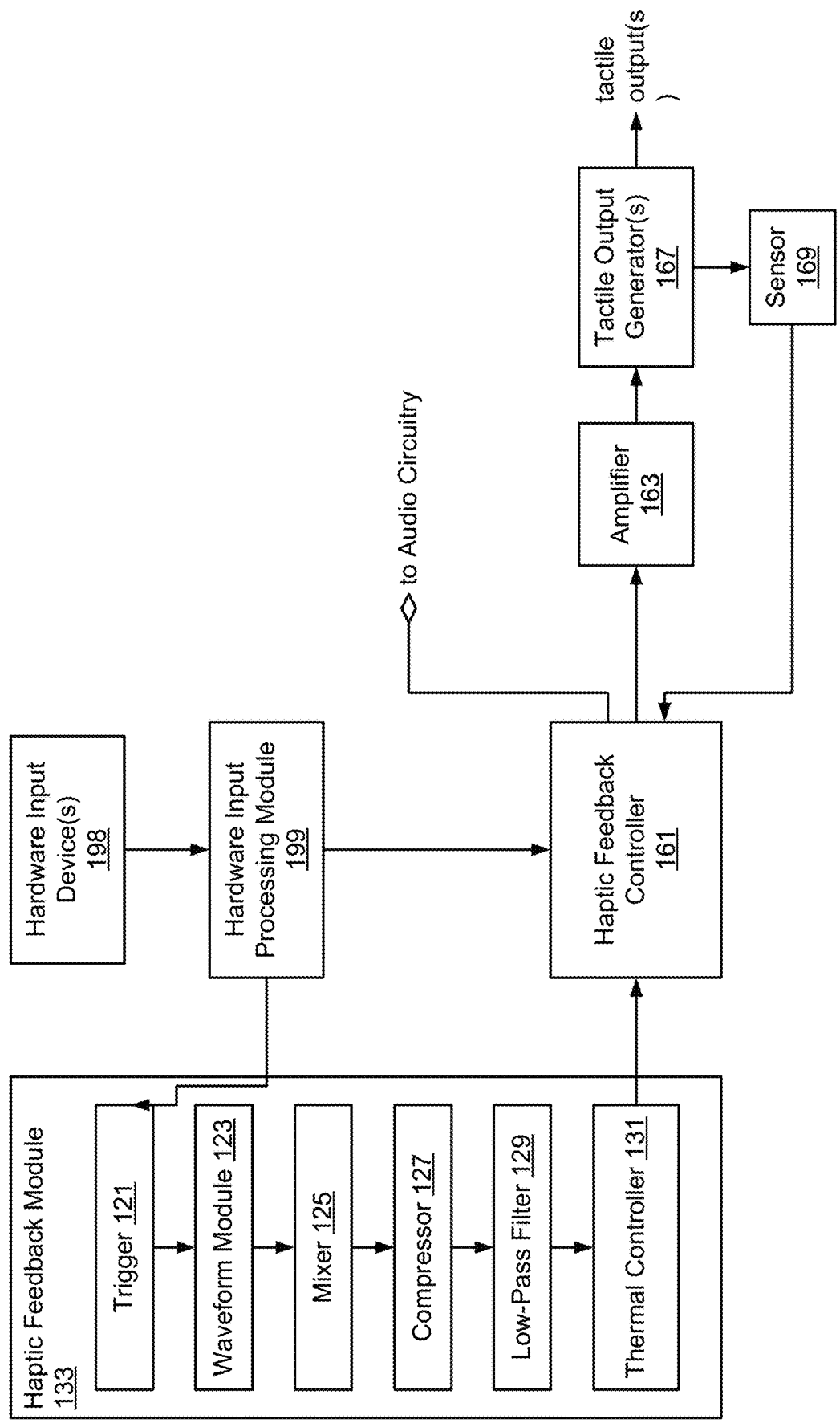
FIG. 1C is a block diagram illustrating a tactile output module in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 199 located outside haptic feedback module 133) and relays the trigger signals to other components within haptic feedback module 133 (e.g., waveform module 123) or software applications that trigger operations (e.g., with trigger module 121) based on activation of the hardware input device (e.g., a home button, a side button, a power button, etc.). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4F1-4G4).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167)

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 199. In some embodiments, other input controller(s) 160 in FIG. 1A includes hardware input processing module 199. In some embodiments, hardware input processing module 199 receives inputs from hardware input device 198 (e.g., other input or control devices 116 in FIG. 1A, such as a home button, a side button, or a power button). In some embodiments, hardware input device 198 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive button (e.g., a home button as shown in FIG. 2B, a side button on the side of the device (e.g., input regions 455, 456, and 457) as shown in FIG. 4A), or a button with a mechanical actuator as illustrated in FIG. 2C). In some embodiments, hardware input device 198 consists of an intensity-sensitive input region (e.g., a home button as shown in FIG. 2B, a side button on the side of the device adjacent to the display-side as illustrated in FIG. 4A, or a button with a mechanical actuator as illustrated in FIG. 2C), and not touch-sensitive display system 112 (FIG. 1A), keyboard/mouse 350 (FIG. 3), or touchpad 355 (FIG. 3). In some embodiments, in response to inputs from hardware input device 198, hardware input processing module 199 provides one or more trigger signals to haptic feedback module 133 to indicate that a user input satisfying predefined input criteria, such as an input corresponding to a "click" of a button (e.g., a "down click" or an "up click"), has been detected. In some embodiments, haptic feedback module 133 provides waveforms that correspond to the "click" of a button in response to the input corresponding to the "click" of a button, simulating a haptic feedback of pressing a physical button. In some embodiments, haptic feedback module 133 provides waveforms that correspond to the "detents" of a scroll wheel or dial in response to the input corresponding to the "scrolling" of a scroll wheel or "turning" of a dial, simulating a haptic feedback of rotating a physical wheel or dial. In some embodiments, haptic feedback module 133 provides waveforms that correspond to the "snap" of a switch in response to the input corresponding to the "opening" or "closing" of a switch, simulating a haptic feedback of flipping a physical switch.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 198 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 198 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator(s) 167 (e.g., any one or more of tactile output generators 167 (FIG. 1A) or 357 (FIG. 3)). For example, amplifier 163 amplifies the received waveforms to signal levels that are in accordance with physical specifications of tactile output generator(s) 167 (e.g., to a voltage and/or a current required by tactile output generator(s) 167 for generating tactile outputs so that the signals sent to tactile output generator(s) 167 produce tactile outputs that correspond to the waveforms received from haptic feedback controller 161) and sends the amplified waveforms to tactile output generator(s) 167. In response, tactile output generator(s) 167 generates tactile outputs (e.g., localized tactile outputs and/or whole device tactile outputs). In some embodiments, localized tactile outputs are generated by a surface oscillator that rocks back and forth around a fixed pivot underneath the input region (e.g., a side button) or other tactile output generator that is capable of generating tactile outputs that are directed specifically toward the input region. In some embodiments, the whole device tactile outputs are generated by shifting a moveable mass back and forth in one or more dimensions relative to a neutral position of the moveable mass. The whole device tactile outputs are created in many different locations on the device at the same time, e.g., by a tactile output generator that is coupled to a housing of the device.

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

Figure 2A:
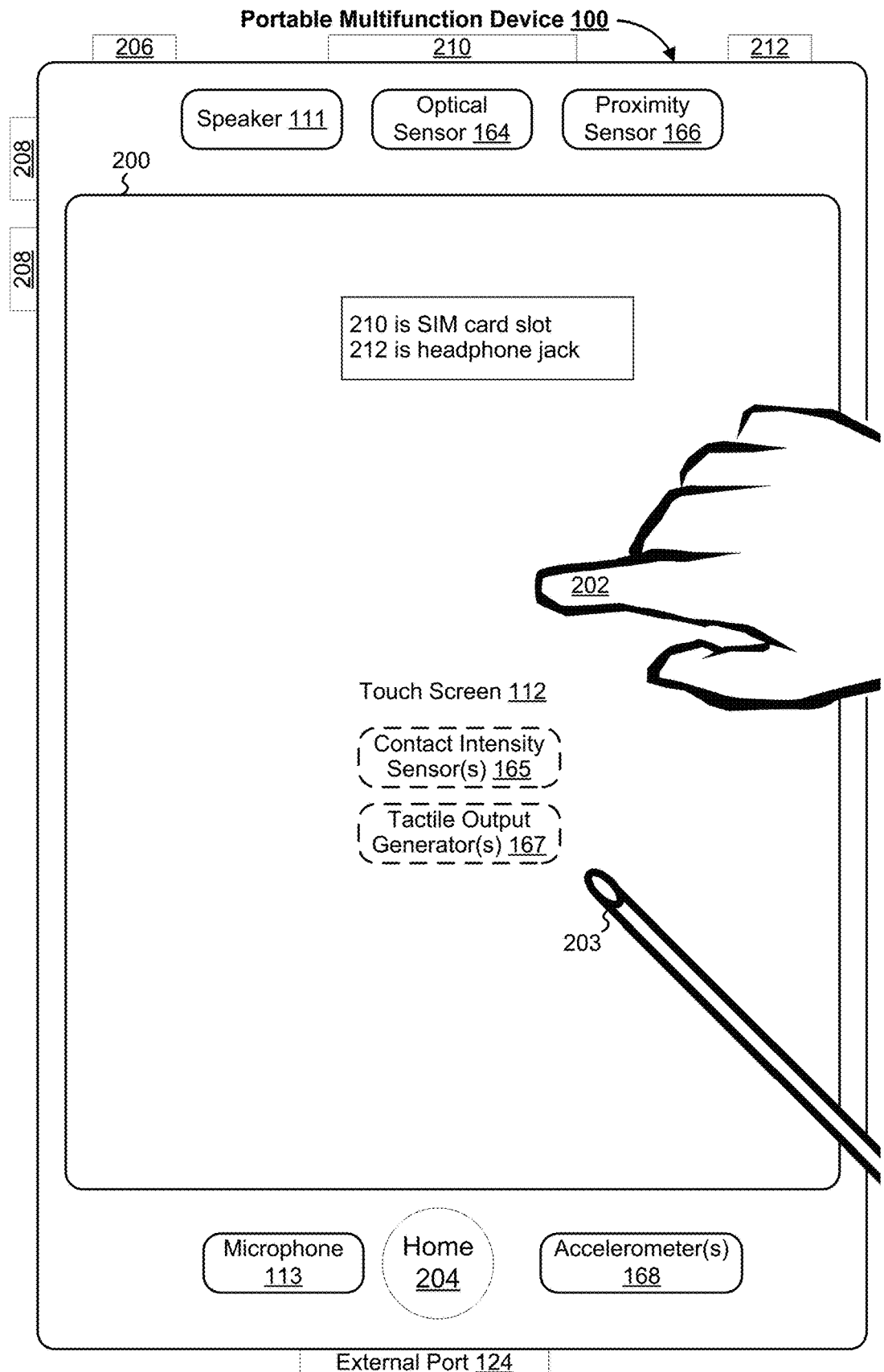
FIG. 2A illustrates a portable multifunction device having a touch screen in accordance with some embodiments.
Figure 2B:
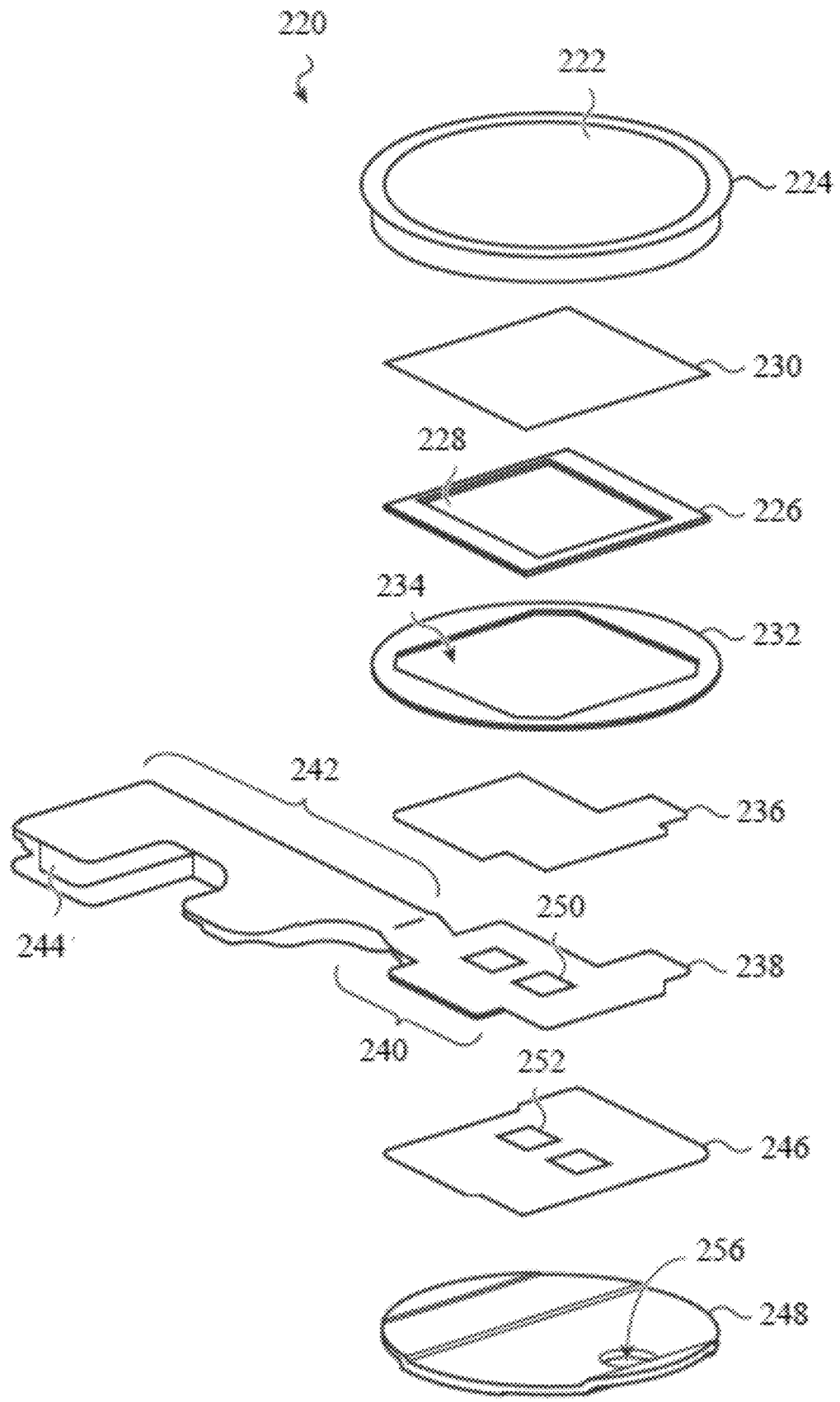
FIGS. 2B-2C show exploded views of an intensity-sensitive input device in accordance with some embodiments.
Figure 2C:
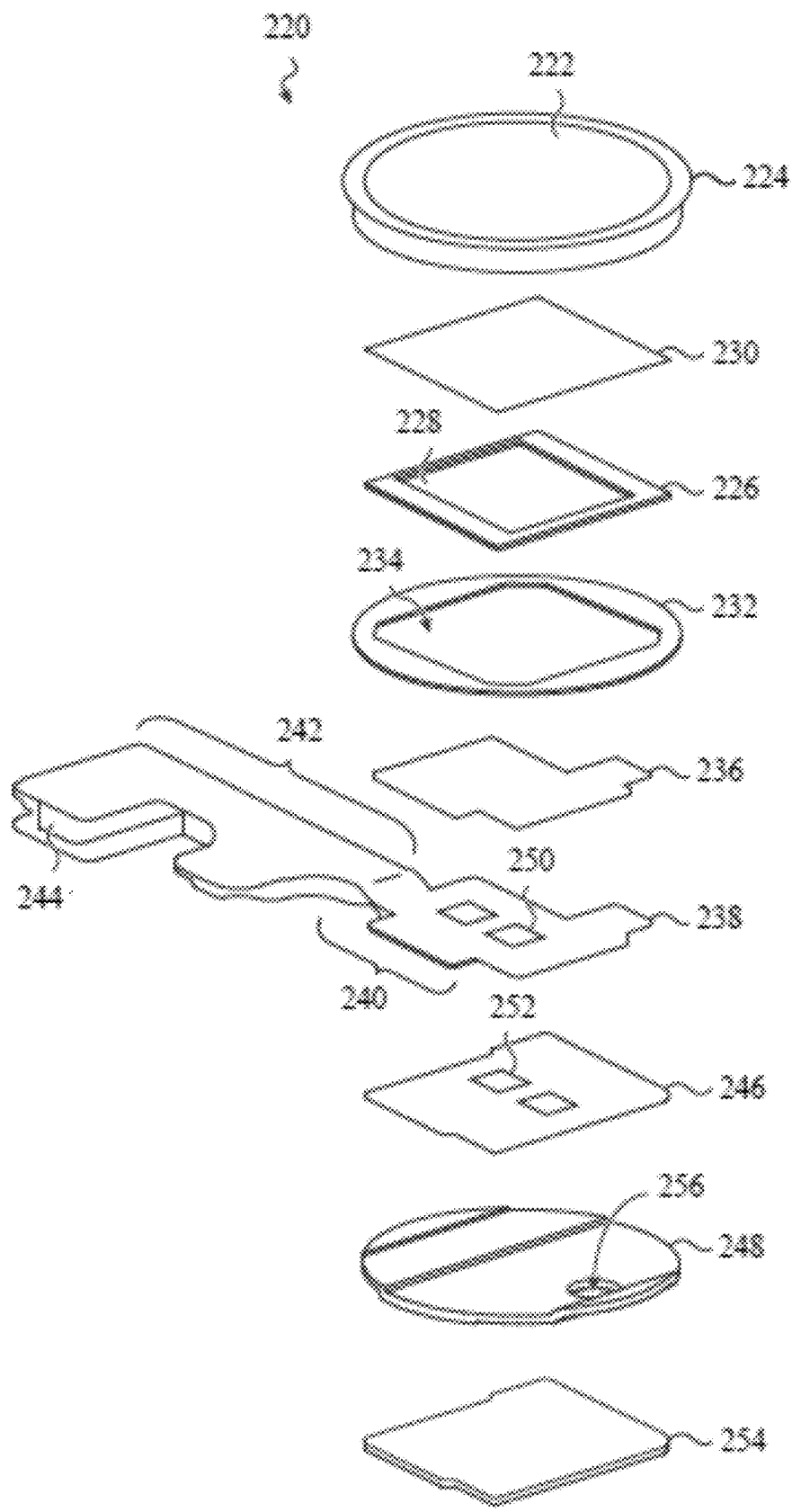

FIG. 2A illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display. In some embodiments, the home button is removed and its functions are invoked by a predefined gesture on the touch-sensitive display (e.g., an upward swipe gesture from the bottom edge of the touch-screen display).

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100. In some embodiments, the volume buttons 208 and the push button 206 are replaced by an intensity-sensitive input region that is coupled with localized tactile output generators that provide tactile outputs for simulating the feel of a physical button, wheel, switch or other hardware input devices in response to different types of touch inputs.

FIGS. 2B-2C show exploded views of a first input device suitable for use in the electronic devices shown in FIGS. 1A, 2A, 3, and/or 4A (e.g., as home button 204). FIG. 2B shows an example of an intensity-sensitive home button with capacitive sensors used to determine a range of intensity values that correspond to force applied to the intensity-sensitive home button. FIG. 2C shows an example of a home button with a mechanical switch element. With reference to FIG. 2B, the input device stack 220 includes a cover element 222 and a trim 224. In the illustrated embodiment, the trim 224 completely surrounds the sides of the cover element 222 and the perimeter of the top surface of the cover element 222. Other embodiments are not limited to this configuration. For example, in one embodiment the sides and/or top surface of the cover element 222 can be partially surrounded by the trim 224. Alternatively, the trim 224 can be omitted in other embodiments.

Both the cover element 222 and the trim 224 can be formed with any suitable opaque, transparent, and/or translucent material. For example, the cover element 222 can be made of glass, plastic, or sapphire and the trim 224 may be made of a metal or plastic. In some embodiments, one or more additional layers (not shown) can be positioned below the cover element 222. For example, an opaque ink layer can be disposed below the cover element 222 when the cover element 222 is made of a transparent material. The opaque ink layer can conceal the other components in the input device stack 220 so that the other components are not visible through the transparent cover element 222.

A first circuit layer 226 can be disposed below the cover element 222. Any suitable circuit layer may be used. For example, the first circuit layer 226 may be a circuit board or a flexible circuit. The first circuit layer 226 can include one or more circuits, signal lines, and/or integrated circuits. In one embodiment, the first circuit layer 226 includes a biometric sensor 228. Any suitable type of biometric sensor can be used. For example, in one embodiment the biometric sensor is a capacitive fingerprint sensor that captures at least one fingerprint when a user's finger (or fingers) approaches and/or contacts the cover element 222.

The first circuit layer 226 may be attached to the bottom surface of the cover element 222 with an adhesive layer 230. Any suitable adhesive can be used for the adhesive layer. For example, a pressure sensitive adhesive layer may be used as the adhesive layer 230.

A compliant layer 232 is disposed below the first circuit layer 226. In one embodiment, the compliant layer 232 includes an opening 234 formed in the compliant layer 232. The opening 234 exposes the top surface of the first circuit layer 226 and/or the biometric sensor 228 when the device stack 220 is assembled. In the illustrated embodiment, the compliant layer 232 is positioned around an interior perimeter of the trim 224 and/or around a peripheral edge of the cover element 222. Although depicted in a circular shape, the compliant layer 232 can have any given shape and/or dimensions, such as a square or oval. The compliant layer 232 is shown as a continuous compliant layer in FIGS. 2B and 2C, but other embodiments are not limited to this configuration. In some embodiments, multiple discrete compliant layers may be used in the device stack 220. Additionally, in some embodiments, the compliant layer 232 does not include the opening 234 and the compliant layer 232 extends across at least a portion of the input device stack 220. For example, the compliant layer 232 may extend across the bottom surface of the cover element 222, the bottom surface of the first circuit layer 226, or a portion of the bottom surface of the cover element 222 (e.g., around the peripheral edge of the cover element) and the bottom surface of the first circuit layer 226.

A second circuit layer 238 is positioned below the first circuit layer 226. A flexible circuit and a circuit board are examples of a circuit layer that can be used in the second circuit layer 238. In some embodiments, the second circuit layer 238 can include a first circuit section 240 and a second circuit section 242. The first and second circuit sections 240, 242 can be electrically connected one another other.

The first circuit section 240 can include a first set of one or more intensity sensor components that are included in an intensity sensor. In some embodiments, the first circuit section 240 can be electrically connected to the first circuit layer 226. For example, when the first circuit layer 226 includes a biometric sensor 228, the biometric sensor 228 may be electrically connected to the first circuit section 240 of the second circuit layer 238.

The second circuit section 242 can include additional circuitry, such as signal lines, circuit components, integrated circuits, and the like. In one embodiment, the second circuit section 242 may include a board-to-board connector 244 to electrically connect the second circuit layer 238 to other circuitry in the electronic device. For example, the second circuit layer 238 can be operably connected to a processing device using the board-to-board connector 244. Additionally, or alternatively, the second circuit layer 238 may be operably connected to circuitry that transmits signals (e.g., sense signals) received from the intensity sensor component(s) in the first circuit section 240 to a processing device. Additionally, or alternatively, the second circuit layer 238 may be operably connected to circuitry that provides signals (e.g., drive signals, a reference signal) to the one or more intensity sensor components in the first circuit section 240.

In some embodiments, the first circuit section 240 of the second circuit layer 238 may be attached to the bottom surface of the first circuit layer 226 using an adhesive layer 236. In a non-limiting example, a die attach film may be used to attach the first circuit section 240 to the bottom surface of the first circuit layer 226.

A third circuit layer 246 is disposed below the first circuit section 240 of the second circuit layer 238. The third circuit layer 246 may include a second set of one or more intensity sensor components that are included in an intensity sensor. The third circuit layer 246 is supported by and/or attached to a support element 248. In one embodiment, the support element 248 is attached to the trim 224 to produce an enclosure for the other components in the device stack 220. The support element 248 may be attached to the trim 224 using any suitable attachment mechanism.

The first set of one or more intensity sensor components in the first circuit section 240 and the second set of one or more intensity sensor components in the third circuit layer 246 together form an intensity sensor. The intensity sensor can use any suitable intensity sensing technology. Example sensing technologies include, but are not limited to, capacitive, piezoelectric, piezoresistive, ultrasonic, and magnetic.

In the examples shown in FIGS. 2B and 2C, the intensity sensor is a capacitive force sensor. With a capacitive force sensor, the first set of one or more intensity sensor components can include a first set of one or more electrodes 250 and the second set of one or more force sensor components a second set of one or more electrodes 252. Although shown in a square shape in FIGS. 2B and 2C each electrode in the first and second sets of one or more electrodes 250, 252 can have any given shape (e.g., rectangles, circles). Additionally, the one or more electrodes in the first and second sets 250, 252 may be arranged in any given pattern (e.g., one or more rows and one or more columns).

FIGS. 2B and 2C show two electrodes in the first and second sets of one or more electrodes 250, 252. However, other embodiments are not limited to this configuration. The first and second sets of one or more electrodes 250, 252 may each be a single electrode or multiple discrete electrodes. For example, if the first set of one or more electrodes is a single electrode, the second set of one or more electrodes comprises multiple discrete electrodes. In some embodiments, the second set of one or more electrodes can be a single electrode and the first set includes multiple discrete electrodes. Alternatively, both the first and second sets of one or more electrodes may each include multiple discrete electrodes.

Each electrode in the first set of one or more electrodes 250 is aligned in at least one direction (e.g., vertically) with a respective electrode in the second set of one or more electrodes 252 to produce one or more capacitors. When a force input is applied to the cover element 222 (e.g., the input surface of the input device), at least one electrode in the first set 250 moves closer to a respective electrode in the second set 252, which varies the capacitance of the capacitor(s). A capacitance signal sensed from each capacitor represents a capacitance measurement of that capacitor. A processing device (not shown) is configured to receive the capacitance signal(s) and correlate the capacitance signal(s) to an amount of intensity applied to the cover element 222. In some embodiments, the force sensor can replace a switch element and different intensity thresholds can be used to determine activation events.

In some embodiments, such as the embodiment shown in FIG. 2C, a switch element 254 can be positioned below the support element 248. The switch element 254 registers a user input when a force input applied to the cover element 222 exceeds a given amount of force (e.g., a force threshold associated with closing the distance between the first circuit section 240 and the third circuit layer 246). Any suitable switch element can be used. For example, the switch element 254 may be a dome switch that collapses when the force input applied to the cover element 222 exceeds the force threshold. When collapsed, the dome switch completes a circuit that is detected by a processing device and recognized as a user input (e.g., a selection of an icon, function, or application). In one embodiment, the dome switch is arranged such that the apex of the collapsible dome is proximate to the bottom surface of the support plate 248. In another embodiment, the base of the collapsible dome can be proximate to the bottom surface of the support plate 248.

Figure 2D:
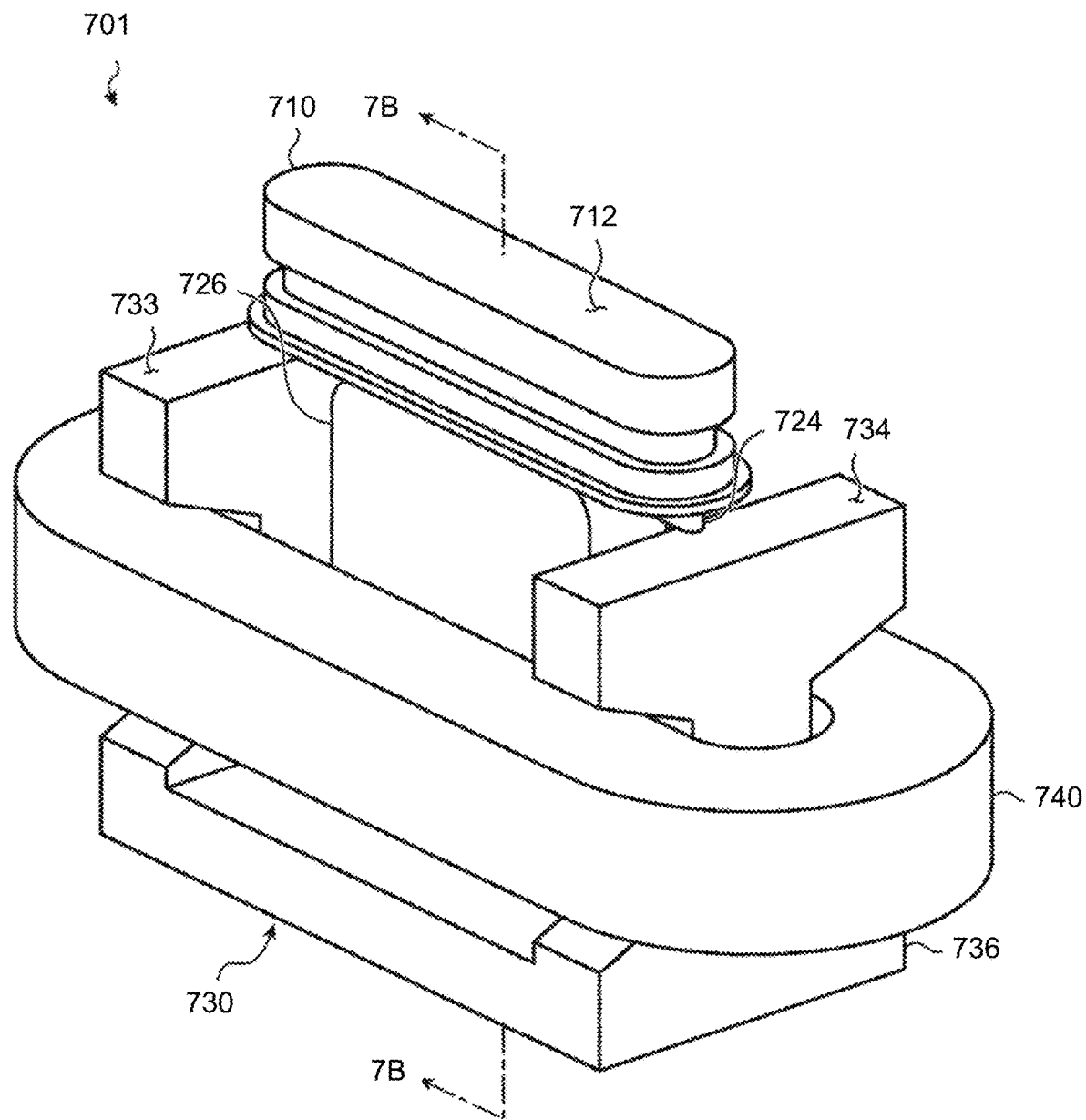
FIGS. 2D-2F show different views of an intensity-sensitive input device in accordance with some embodiments.
Figure 2E:
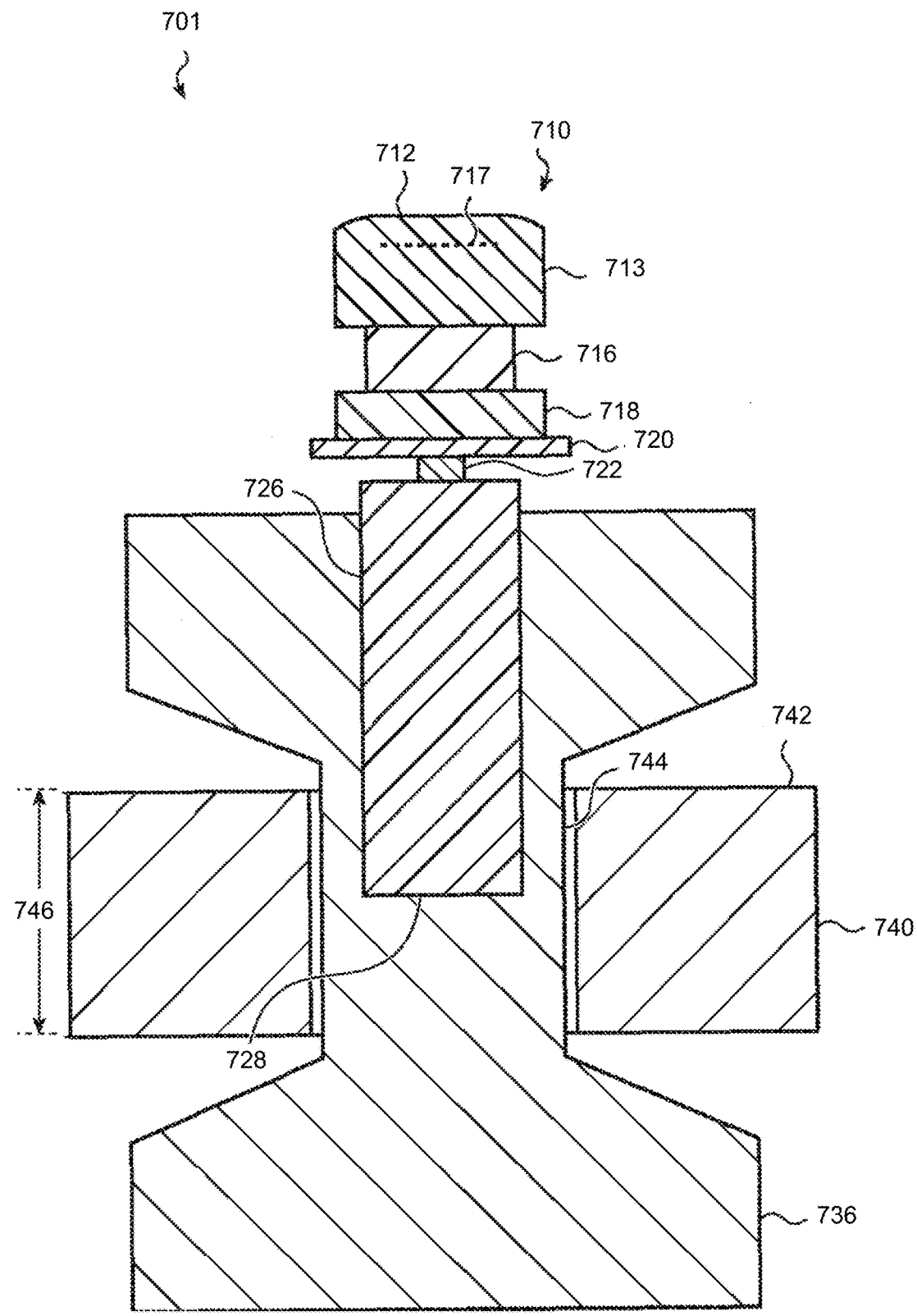
Figure 2F:
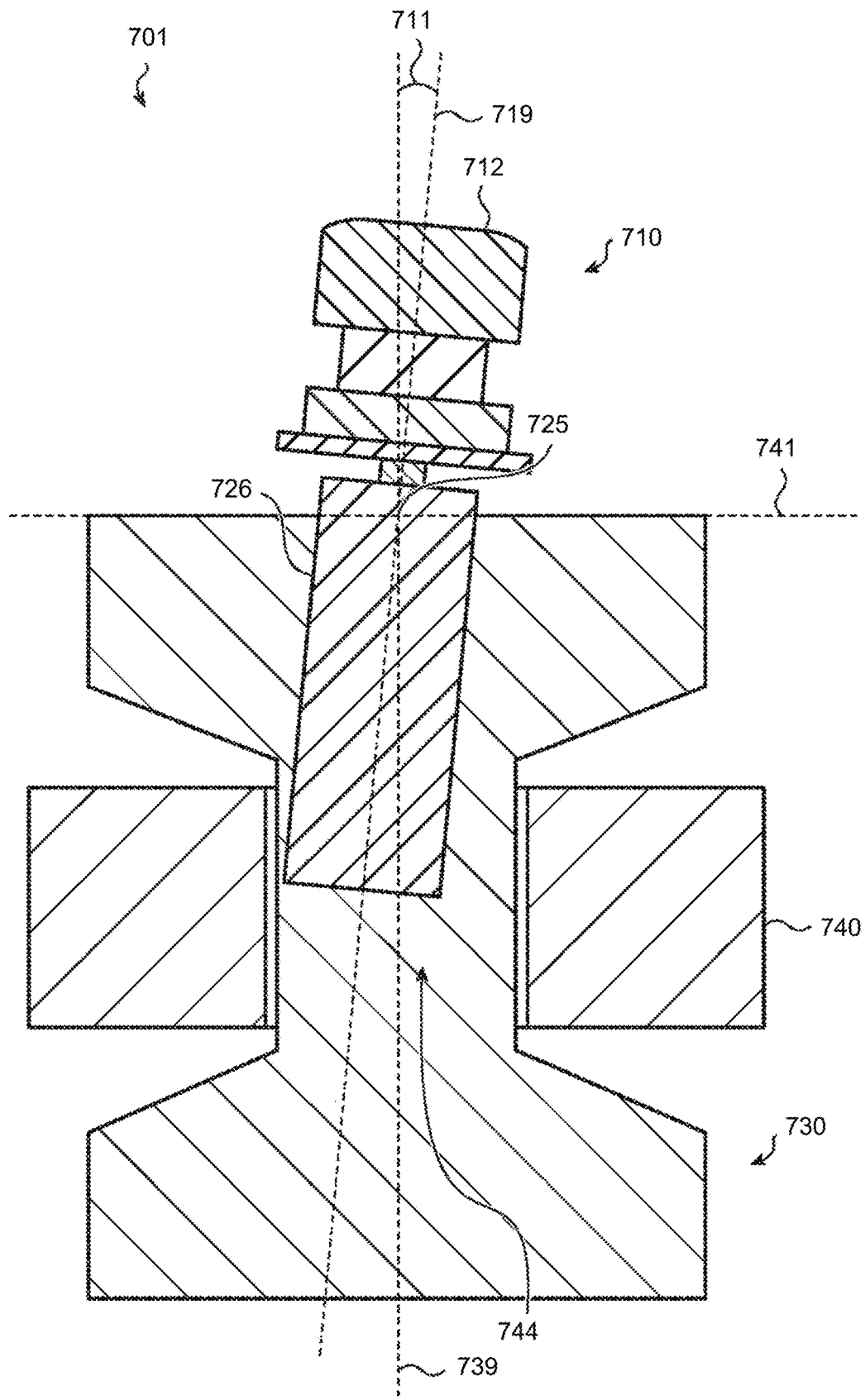

FIGS. 2D-2F show different views of an intensity-sensitive input device 701 suitable for use in the electronic devices shown in FIGS. 1A, 2A, 3, and/or 4A (e.g., as input regions 255, 256, and 257). In some embodiments, the intensity-sensitive input device 701 is a pivoting input device that implemented as a button 710. An input surface 712 of button 710 optionally serves as one or more individual input regions and/or sub-regions located on one or more peripheral sides (e.g., sides that are adjacent to the display-side) of the electronic device (e.g., device 100 and 300), in accordance with some embodiments.

Button 710 includes permanent magnet 726 attached to a lower surface of button 710. The permanent magnet 726 may be rigidly attached to button 710, such that permanent magnet 726 moves or displaces in concert with button 710.

Button 710 rotates relative to body 730 about a pair of pivots 727 (or, in some embodiments, a single pivot). The pair of pivots 727 are attached to body 730 and positioned on each of first and second projections 733, 737, both of which are part of upper body 732. Each of the two pivots 727 are positioned between a respective projection 733, 737 and a lower surface of button 710. Thus, the pair of pivots 727 are below button 710 (or other input structure) and its input surface 712. More specifically, one pivot 727 is positioned between the first projection 733 and a first lower end of the button, and another pivot 727 is positioned between the second projection 737 and a second lower end of the button 710. One pivot 727 is disposed on the first projection 733 and another pivot 727 is disposed on the second projection 737. The pivot(s) 727 may rotate with respect to body 730 or may be stationary while permitting button 710 to rotate relative to the body 730.

Input surface 712 of the button/input structure 710 may be touched, pressed, swiped in one or more directions, or otherwise interacted with by a user. In some embodiments, input surface 710 may translate, deflect, bend, or otherwise move a relatively small distance in response to user input and/or in response to a movement of permanent magnet 726. In other embodiments, input surface 712 does not translate, deflect, bend, or otherwise move in response to a user input. Input may be detected through various intensity sensors (e.g., force sensors, touch sensors, or combination of the two). Such sensors are not shown for simplicity's sake.

Button 710 may include one or more steps or shelves. The one or more shelves may aid in fitting the button to a host electronic device, such as fitting the button 710 within an opening along an exterior of a host electronic device. The one or more shelves may receive a gasket, the gasket engaging one or more shelves.

With attention to FIGS. 7A-7B, button 710, in order from an upper portion (e.g., a portion extending from or facing an exterior of a host electronic device) to a lower portion (e.g., a portion extending into an interior of a host electronic device), includes an input surface 712, first upper portion 713, collar 716, first shelf 718, and second shelf 720. Collar 716 is narrower and/or thinner than first upper portion 713 of button 710. Collar 716 and first upper portion 713 of button 710 may have the same general shape or may be of different shapes. As one example, both may be oblong (e.g., lozenge-shaped). Collar 716 is positioned above or otherwise disposed on first shelf 718. Generally, upper button portion 713, collar 716, first shelf 718, and second shelf 720 may all be formed integrally with one another or may be formed separately and affixed to one another.

First shelf 718 of button 710 is typically wider and/or longer than collar 716. In some embodiments, first shelf 718 is of similar or identical width to first upper portion 713. First shelf 718 may have the same shape as either or both of upper portion 713 and collar 716, or may have a different shape.

Second shelf 720 of button 710 is generally wider and/or longer than first shelf 718. The second shelf 720 may have a similar shape as one or more of first upper portion 713, collar 716, and first shelf 718 of button 710, or may be differently-shaped. Second shelf 720 is positioned below first shelf 718. Second shelf 720 is positioned between first shelf 718 and connector 722.

Generally, the first shelf, collar, and second shelf cooperate to define a grove, annulus, or the like extending around a perimeter of button 710. A gasket or other seal may be seated in this groove.

Connector 722 is positioned below second shelf 720 and connects button 710 to permanent magnet 726. Connector 722 may be positioned at a central portion of the upper surface of permanent magnet 726. Connector 722 may be connected to permanent magnet 726 along substantially all of the length of an upper surface of permanent magnet 726. The permanent magnet may be rigidly connected to button 710 by way of connector 722. In some embodiments, permanent magnet 726 extends into a space within body 730. That is, the body may be hollow or may have multiple projections defining a space receiving at least part of permanent magnet 730.

Body 730 includes upper body 732 and lower body 736. Each of first projection 733 and second projection 737 are part of upper body 732; the first and second projections define a volume or space therebetween in which part of permanent magnet 726 rests. Upper body 732 and lower body 736 are separated by a region of reduced width configured to receive electromagnet 770. The body may be attached to an enclosure of the electronic device, or a structure within the enclosure.

Electromagnet 770 is configured to attach to body 730 and positioned relative to permanent magnet 726 such that a magnetic field generated by electromagnet 770 is received by permanent magnet 726 sufficient to displace or move permanent magnet 726. Electromagnet 770 encircles body 730 (specifically, the first and second projections 733, 737 and is positioned between upper body 732 and lower body 736. More specifically, electromagnet 770 is positioned to fit around a region of reduced width formed between upper body 732 and lower body 736. Electromagnet 770 has sidewall 776. Generally, electromagnet 770 is located below button 710 (or other input structure) and its input surface 712.

The positioning of permanent magnet 726 relative to electromagnet 770 modifies the operation (e.g., actuation) of button 710. More specifically, the magnetic interaction between electromagnet 770 and permanent magnet 726 is influenced by the relative positioning of permanent magnet 726 with respect to the electromagnet. In the embodiment of FIGS. 7A-7C, lower surface 728 of permanent magnet 726 is positioned between ends of electromagnet 770. Stated another way, a horizontal plane extending from the lower surface 728 of permanent magnet 726 intersects a sidewall of electromagnet 770. In one embodiment, the horizontal plane extending from lower surface 728 of permanent magnet 726 intersects sidewall 776 of electromagnet 770 at a midpoint of sidewall 776 (e.g., the end of permanent magnet 726 is coplanar with a midpoint of sidewall 776). Thus, permanent magnet 726 extends halfway through the electromagnet 770.

In some embodiments, permanent magnet 726 may be replaced by a second electromagnet, or may be supplemented by a second electromagnet. Using an electromagnet in place of, or in addition to, permanent magnet 726 may facilitate fine control of the magnetic force exerted on button 710 (or other input structure), thereby likewise providing fine control of the force of the haptic output. It should be appreciated that haptic output via button 710 or other input structure may be increased by increasing the field strength of the second electromagnet or decreased by decreasing its field strength. Likewise, field strength of first electromagnet 770 may be varied to vary haptic output force even when permanent magnet 726 is used instead of a second electromagnet.

Further, it should be noted that such variations in field strength generally vary haptic output strength, but not travel; a distance traveled by the input structure (e.g., button 710) and associated input surface varies with the distance of the pivot point from the input surface, as discussed above. Increases in both haptic output strength and travel distance may increase saliency and/or perceptibility of a haptic output.

With attention to FIGS. 7B-7C, button 710, and attached permanent magnet 726, are depicted in a neutral, unactuated first button position (as shown in FIG. 7B, which is a cross-section taken along line 7A-7A of FIG. 7A) and in an actuated second button position (FIG. 7C). Button 710 actuates or pivots between the first button position and the second button position through reaction of permanent magnet 728 to a magnetic field generated by electromagnet 770.

Button 710 is attached to permanent magnet 726 by way of connector 722; in many embodiments, the ends of connector 722 define pivots 727. Button 710 is configured to pivot on body 730 by way of the pair of pivots 727. In other embodiments, the connector and pivot(s) may be separate elements. Body 730, permanent magnet 726, and electromagnet 770 may be disposed within a host electronic device.

Electromagnet 770, which may encircle at least a portion of permanent magnet 726, generates a magnetic field which interacts with permanent magnet 726, in turn pivoting button 710 between a neutral, unactuated first button position and an actuated, second button position.

When no electric current is flowing through the wire windings of electromagnet 770, no magnetic field is generated by electromagnet 770 and permanent magnet 726 is in a neutral position that is approximately in the middle of the electromagnet's interior volume 777, as shown in FIG. 7B, with one end within the interior volume. This corresponds to a neutral, unactuated first button position. However, when electromagnet 770 is turned on, the resulting magnetic field moves (e.g., tilts) permanent magnet 726 within interior volume 777. More specifically, permanent magnet 726 tilts or rotates about pivot(s) 723, 727 such that its end 728 moves closer to one side of electromagnet 777, as shown in FIG. 7C. Since button 710 is attached to permanent magnet 726, it also moves about the pivot(s) in a direction opposite the motion of the permanent magnet. Put another way, the button (or other input surface) and permanent magnet both rotate in the same direction (e.g., clockwise or counterclockwise) but move in opposite directions, since they are positioned on opposing sides of the pivot(s). Thus, when the electromagnet is activated, button 710 moves into an actuated position. This motion may provide haptic feedback to a person touching the button 710 (and typically, the button's input surface 712) to indicate the input device 701 has been actuated. In some embodiments, the button 710 and permanent magnet 726 may oscillate back and forth about the pivot 727 to provide haptic feedback. In some embodiments, a haptic feedback controller (e.g., haptic feedback controller 161 in FIG. 1C) varies the operating parameters of the electromagnet 777, in accordance with the requirements of a selected tactile output profile (e.g., selected based on the characteristics of the input, and the function that is triggered, and the user interface feedback that is displayed).

The permanent magnet 726, when influenced by the magnetic field, moves from its neutral position (as shown in FIG. 7B) to its actuated position, as shown in FIG. 7C. In its neutral position, the permanent magnet's 726 centerline is generally aligned with a major axis of the input device 701, as is a centerline of button 710. In the actuated position shown in FIG. 7C, the centerline of button 712 and permanent magnet 726 is offset from major axis 739 of input device 701 by angle 711. The angle between centerline of the button 712 and major axis 739 is generally the same as the angle between the centerline of permanent magnet 726 and major axis 739.

The button/permanent magnet centerline 719 and major axis 739 intersect at pivot point 725. Pivot point 725 is positioned at the bottom of pivot 727; pivot 727 is not visible in FIGS. 7B-7C but is shown in FIG. 7A. Permanent magnet 726, and thus button 710, rotates about the pivot point in a plane defined by major axis 739 and minor axis 771 of the input device 701. Typically, although not necessarily, major axis 739 passes through input surface 712 and button 710, while minor axis 771 is parallel to the input surface and button. Likewise, the pivot axis (which passes through pivot point 725) is generally parallel to the input surface.

The direction of rotation about pivot point 725 may change with the direction of current passing through electromagnet 770; thus, button 710 and permanent magnet 726 may both rotate in two directions (e.g., clockwise or counterclockwise about the pivot point 725). As previously mentioned, permanent magnet 726 and button 710 generally move in opposite directions while rotating about the pivot point 725 and any associated pivot(s) 727.

A user receives haptic feedback from button 710 actuation in that the input surface 712 of button 710 pivots with button 710. A user touching input surface 712 may sense the pivoting or actuation of button 710. Furthermore, the user may be able to see the pivoting of button 710 from the neutral, unactuated first position to the actuated, second position.

Button 710 (or other input structure) may include intensity sensors (e.g., force sensor 717) below input surface 712 and within upper portion 713; the force sensor is shown in FIG. 7B, although it should be appreciated that the location of the intensity sensors (e.g., force sensor 717) may vary in various embodiments. For example, force sensor 717 may be positioned below input surface 712 and upper portion 713 instead of within the upper portion, or may be positioned below or to the side of permanent magnet 726, or anywhere else within the input device (or on a portion of an associated electronic device's enclosure). Force sensor 717 senses an input force on input surface 712 (e.g., detecting contact of a user's finger on input surface 712) and produces an output signal. Force sensor 717 may be any type of force sensor 717 known to those skilled in the art, such as a strain gauge, a capacitive sensor, a resistive sensor, an optical sensor, and so on. If force sensor 717 is a capacitive sensor, for example, changes in capacitance may be sensed by sensor 717 and output as an electrical output signal to the processor. In one embodiment, the force sensor is a strain gauge. The output signal produced by force sensor 717 is received by a processor.

The output signal generated by force sensor 717 allows the processor (e.g., via the tactile output controller 161 in FIG. 1C) to control, for example, electromagnet 770 (or other actuator) to effect actuation of button 710 and may also be used as a system input to the electronic device. For example, the force sensor output may be used to indicate that a user has pressed or otherwise interacted with (e.g., touched, swiped) the button 710 and thus control or change some function of the electronic device.

The processor also may control any of several inputs to electromagnet 770 to vary the magnetic field generated by electromagnet 770. For example, the processor may control the current running through the wire of actuator 770. Generally, an increased current will result in an increase in magnetic field strength, thereby moving permanent magnet 726 more quickly and increasing the haptic output's strength.

The processor may control additional aspects of electromagnet 770. For example, upon receipt of force sensor's 717 signal, the processor may power up the electromagnet and/or alter the state of the electromagnet so as to ready electromagnet 770 to generate a magnetic field to actuate button 710. Such a scenario may occur if the electromagnet is consistently powered on but at a level that generates a magnetic field of a size and/or strength that does not pivot permanent magnet 726. Upon receipt of the output signal from force sensor 717, the processor may control electromagnet 770 to move from stand-by status to a full power-on mode, thereby actuating button 710 by moving permanent magnet 726. In some embodiments, input device 701 may be configured to actuate (e.g., the button moves) only upon receiving an input exceeding a threshold force level, below which no actuation is triggered.

In some embodiments, motion of permanent magnet 726 within electromagnet 770 may be sensed by measuring the back electromotive force (EMF) of the electromagnet.

Generally, the EMF induced in the electromagnet will vary with a magnitude of permanent magnet's 726 travel. Further, as a user presses harder on input surface 712 or otherwise more rigidly constrains the input surface with his or her finger, the permanent magnet's travel reduces. Thus, if a user has a "stiff" input, input structure 710 (e.g., button) travel is constrained and this may be sensed by measuring the back EMF of electromagnet 770 via a sensor. A user may provide a stiff input if the user is exerting high force on input surface 712, is wearing gloves, has dry skin, a calloused finger, and so on. Generally, conditions that yield a stiff input also reduce sensitivity to haptic output. Accordingly, when the back EMF of the electromagnet 770 is exceeds a threshold, a processing unit of input device 701 may direct additional power to the electromagnet 770 to increase the force and perceptibility of haptic output.

Button 710 may be positioned in an opening along an exterior surface of an electronic device, such that the button presents an input surface to a user. Button 710 may be conformal with the exterior surface, or may project from the exterior surface of a host electronic device. In one embodiment, button 710 is oblong and fits along an exterior edge of an electronic device, such as a mobile phone.

Button 710 may actuate (e.g., move) in any of several ways. In the embodiment of FIGS. 7A-7C, button 710 pivots off major axis 739 of the input device 701, which is generally perpendicular to its pivot axis. However, other configurations are possible. For example, button 710 may be configured to actuate along a minor axis. In some embodiments, button 710 may actuate in a seesaw manner. In some embodiments, button 710 moves along a surface or edge of a host electronic device.

In one embodiment, although button 710 may actuate, the actuation is not required to register a button input to an electronic device, such as to register a button input by a processor of an electronic device. Stated another way, the physical movement or actuation of button 710 is not required to register a button on or off input. Instead, button actuation is effected to provide a type of haptic feedback to the user.

Button 710 may have a variety of shapes, including defining a curved or convex input surface 712, and/or may be rectangular, square, and so on. As another example, input surface 712 may be substantially flat. Input surface 712 and/or other parts of button 710 may include texture such as bumps, ridges, or the like. Button 710 may have readjusted, beveled, or flat edges. Generally, the smaller the curvature of input surface 712, the greater the shear (e.g., transverse displacement) of the user's skin contacting the input surface and thus the greater the perceptibility of the haptic output. Accordingly, travel of planar input surfaces 712 may be more easily perceived by a user than the same travel of a curved input surface. The curvature of the input surface 712 may be selected to impart a particular haptic output or particular perceptibility of a haptic output.

Generally, if the curvature of input surface 712 equals the curvature of an arc segment along which input surface 712 travels during rotation of the input structure 710 about the pivot, the skin of a user's finger in contact with the input surface 712 experiences purely tangential motion from the input surface. The "arc segment" is the portion of a circle through which a point on the input surface moves while the input structure rotates. Put another way, if every point of input surface 712 lies on a single arc circumscribed by the entirety of input surface 712 while haptic output is provided, then the curvature of the input surface equals the curvature of an arc segment. Put still another way, if the distance from pivot 727 to every point of the input surface within the rotational plane is equal, then the curvature of the input surface 712 matches the curvature of the arc segment during rotation. Purely tangential motion of the input surface 712 against a user's skin yields a high degree of skin shear and a unique feeling of haptic output. Generally, such haptic output is indistinguishable or near-indistinguishable from a "click" or depress of a typical button that moves in the direction of an input force.

By changing the curvature of input surface 712, the feel of the haptic output may be varied. The more the curvature of the input surface varies from the arc segment along which the input surface 712 travels during rotation, the more the haptic output feels like a "rocking" (e.g., for simulating a "toggle" operations) motion to a user as opposed to a "clicking" or depressing/collapsing motion. The curvature of the input surface 712 may be tuned to provide particular haptic outputs, as desired or necessary.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates a portable multifunction device 100 with one or more intensity-sensitive off-display input regions on one or more peripheral sides of the device, and a touch-screen display showing an example home screen user interface with a menu of application launch icons corresponding to different applications, in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
a Bluetooth indicator;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon. In some embodiments, when an icon corresponding to a respective application is activated (e.g., by a tap input), the device launches the respective application and replaces the home screen user interface with a user interface of the respective application. When a request for dismissing the currently displayed user interface and returning to the home screen user interface is received (e.g., a predefined home gesture or activation of a home button is detected), the device dismisses the currently displayed user interface and redisplays the home screen user interface (e.g., a last displayed page of the home screen user interface or a default starting page of the home screen user interface).

As shown in FIG. 4A, in some embodiments, the portable multifunction device 100 does not include a home button on the display-side of the device, and the touch-screen 112 occupies substantially all of available areas on the display-side of the device. The device 100 as shown in FIG. 4A includes a number of discrete intensity-sensitive input regions 455, 456, and 457. The input regions 456 and 457 are optionally implemented on two sub-portions of a contiguous touch-sensitive surface. Each of the input regions are coupled with a respective set of one or more localized tactile output generators for generating localized tactile outputs that have greater amplitudes at the input region (or a respective sub-portion thereof), and smaller amplitudes or negligible amplitudes at locations outside of the input region (or the respective sub-portion thereof).

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensities of contacts on touch-sensitive surface 451 and/or one or more tactile output generators 359 for generating tactile outputs for a user of device 300. In some embodiments, the device includes an intensity-sensitive input region that is distinct from touch-sensitive surface 451. For example, the intensity-sensitive input region is disposed on a peripheral side of the device (e.g., a side edge of the device) that is adjacent to the display-side of the device, and the touch-sensitive surface 451 is coplanar with the display-side of the device or disposed on the display-side of the device. In some embodiments, a contact detected on the intensity-sensitive input regions do not have a corresponding focus selector displayed on the display of the device that is located at a corresponding location of the contact on the input region and/or that move in accordance with movement of the contact across the input region. In some embodiments, the touch-sensitive surface 451 serves as an off-display input region of the device.

Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" is an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface is the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact is a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a hint intensity threshold $IT_H$ (e.g., that is higher than $IT_0$), a light press intensity threshold $IT_L$ (e.g., that is at least initially higher than $IT_H$), a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold $I_D$ (e.g., also referred to as $IT_D$)). FIG. 4D also illustrates two other intensity thresholds: a first intensity threshold $I_H$ (e.g., also referred to as $IT_H$) and a second intensity threshold $I_L$. In FIG. 4D, although touch input 484 satisfies the first intensity threshold $I_H$ and the second intensity threshold $I_L$ (e.g., also referred to as $IT_L$) prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments, $IT_0$ is zero. In some embodiments, $IT_0$ is greater than zero. In some illustrations, a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, one or more tactile output generators for generating tactile outputs (e.g., one or more localized tactile output generators and/or one or more whole device tactile output generators), one or more sensors to detect intensities of contacts with the touch-sensitive surface and one or more input regions of the device (e.g., one or more off-display side buttons).

FIGS. 5A1-5H15 illustrate exemplary user interfaces for providing tactile outputs and visual feedback in response to multiple types of inputs on an intensity-sensitive input region (e.g., an off-display input regions 455, 456, and 457) of the device in accordance with some embodiments. The user interfaces in these figures are used to illustrate the processes described below, including the processes in FIGS. 6A-6D, 7A-7E, 8A-8D, 9A-9C, 10A-10C, 11A-11B, and 12A-12E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A1-5A8 illustrate exemplary user interfaces for providing haptic and visual feedback for button interactions corresponding to querying and/or modifying a current state of a device attribute in accordance with some embodiments. The user interfaces in these figures are used to illustrate the processes described below, including the processes in FIGS. 6A-6D and 12A-12E.

FIG. 5A1 illustrates device 100 in a display-off state. For example, after a period of inactivity, the device automatically turns off the display 112 to conserve power. In some embodiments, the device is locked when the display is turned off and requires authentication (e.g., via facial recognition or biometric inputs) to be unlocked. No user interface is displayed on the screen when the device is in the display-off state. In some embodiments, the device displays a wake screen user interface (e.g., wake screen user interface

501) as an initial interface that is displayed when the device transitions from the display-off state to a display-on state (e.g., in response to occurrence of an event or detection of a user input).

FIG. 5A2 illustrates that, when a new notification (e.g., notification 502 for a newly received message) is generated at device 100, the device transitions from the display-off state to the display-on state, and displays the new notification 502 on wake screen user interface 501. The wake screen user interface displays an existing unread notification 504 that was generated at an earlier time, but has not been read or interacted with by the user. The wake screen user interface 501 displays the current time. The wake screen user interface 501 is dismissed when an upward wipe gesture (e.g., a home-display gesture) is detected at the bottom edge of the touch-screen 112, and a home screen user interface or a user interface of a last displayed application replaces the wake screen user interface 501 on the screen. In some embodiments, the device navigates to a mini application user interface in response to a horizontal swipe gesture detected on the touch-screen, without displaying the home screen or the last displayed application user interface.

FIG. 5A3 illustrates that, after a period of inactivity by the user since the receipt of new notification 502, the device has returned to the display-off state, without changing the read/unread statuses of notifications 502 and 504. In FIG. 5A3, a touch input by contact 506 is detected on input region 456. In accordance with the detection of the touch input by contact 506 (e.g., intensity of contact 506 exceeds contact detection intensity threshold $IT_0$), without requiring the intensity of contact 506 to exceed a light press intensity threshold $IT_L$, the device generates localized tactile outputs 508 at input region 456 to indicate a current value or state (e.g., "Present, as opposed to "Not Present") of a predefined device attribute (e.g., the presence/absence of unread notifications at the device). In some embodiments, tactile outputs 508 further indicate the number of unread notifications (e.g., two) present at the device based on one or more characteristics of the tactile outputs (e.g., the tactile outputs 508 are a tactile output sequence with a corresponding number of identical, discrete tactile outputs at input region 456). In some embodiments, the device generates tactile outputs 508 only after contact 506 has been maintained on input region 456 for at least a threshold amount of time T, to reduce accidental triggering of the device's response regarding the presence/absence of unread notifications. In some embodiments, the device does not transition from the display-off state to the display-on state when the intensity of the input by contact 506 remains below the hint intensity threshold $IT_H$ and the light press intensity threshold $IT_L$. In some embodiments, the device does not transition from the display-off state to the display-on state when the device detects that the device is inside of a pocket (e.g., based on inputs from an ambient light sensor). Forgoing turning on the display when responding to the user's query of device attribute information conserves energy and better maintains user privacy (e.g., the device provides the information that the user needs when the device remains concealed inside the user's pocket).

FIG. 5A4 illustrates that, in some embodiments, wake screen user interface 501 gradually fades in (e.g., in a shaded state) in when an intensity of the input by contact 506 on input region 456 increases above the hint intensity threshold $IT_H$. The visibility of wake screen user interface along with the unread notifications 502 and 504 dynamically changes in accordance with a current intensity of contact 506 on input region 456. In some embodiments, tactile outputs 508 is provided in conjunction with the visual feedback (e.g., visual display of the unread notifications 502 and 504 and/or a count thereof) displayed on the screen. In some embodiments, no tactile output indicating the presence/count of unread notifications is provided until the intensity of contact 506 exceeds the hint intensity threshold $IT_H$. In some embodiments, the device forgoes requiring that the contact be maintained on input region 456 for at least a threshold amount of time T and provides the device attribute regarding unread notifications to the user if the intensity of the contact exceeds the hint intensity threshold $IT_H$ before the time threshold T is met.

In FIGS. 5A3 and 5A4, the device generates visual feedback and haptic feedback regarding the current value or state of a device attribute, namely, the presence of unread notifications, of the device, without changing the current value or state of the device attribute, because the intensity of the input by contact 506 has not exceeded a first intensity threshold (e.g., the light press intensity threshold $IT_L$). In some embodiments, when termination of the input by contact 506 (e.g., lift-off of contact 506 from input region 456) is detected without the intensity of contact 506 having exceeded the first intensity threshold, the device transitions back to the display-off state (e.g., following the state shown in FIG. 5A4) and notifications 502 and 504 maintains their unread statuses.

FIG. 5A5 illustrates that, before termination of the input by contact 506 is detected, intensity of contact 506 on input region 456 increases above the first intensity threshold (e.g., the light press intensity threshold $IT_L$). In response to detecting that the intensity of contact 506 has increased above the first intensity threshold, device 100 completes its transition to the display-on state, and displays notifications 502 and 504 on wake screen user interface 501. The device also changes the read/unread statuses of notifications 502 and 504 from "unread" to "read." In some embodiments, the device generates localized tactile output 510 (e.g., with a tactile output profile that is different from the tactile output profile for tactile outputs 508) to indicate the changes made to the read/unread statuses of notifications 502 and 504, and the change in the current state of the device parameter, namely, the presence/absence of unread notifications, from "Present" to "Not Present".

In some embodiments, if the unread notifications displayed on wake screen user interface 501 has corresponding long versions, when intensity of input by contact 506 increases above a second intensity threshold (e.g., a deep press intensity threshold $IT_D$), the device replaces notifications 502 and 504 with corresponding long versions 502' and 504' of the notifications, as shown in FIG. 5A6. The long versions of the notifications include additional content (e.g., an attached image, or a voicemail recording) or functionality (e.g., a playback button) that were not included in notifications 502 and 504. In some embodiments, the device optionally generates another localized tactile output 512 (e.g., with a tactile output profile that is distinct from the respective tactile output profiles of tactile outputs 508 and 510) at input region 456 in response to the intensity of the input by contact 512 exceeding the second intensity threshold.

FIG. 5A7 illustrates that, after a period of inactivity by the user, the device returns to the display-off state. The notifications 502 and 504 are cleared from the wake screen user interface (e.g., saved to notification history or cleared) because they are no longer "unread" notifications as a result of the interactions shown in FIGS. 5A5 and 5A6. FIG. 5A8 illustrates, that when another input by contact 514 is detected on input region 456, and the device-query criteria for providing the current value or state of the predefined device attribute (e.g., the presence/absence of unread notifications) of the device are met by the input by contact 514 (e.g., intensity of contact 514 exceeded the hint intensity threshold $IT_H$), the device responds by displaying the wake screen user interface without any unread notifications (e.g., the wake screen user interface 501 fades in by an amount in accordance with the intensity of contact 514), and by forgoing generation of any localized tactile outputs at input region 456, to indicate that there is currently no unread notifications present at the device. In some embodiments, the device provides a predefined failure tactile output (e.g., a weak tactile output with a distinct tactile output profile (e.g., a failure buzz)) to indicate that the current value of the predefined device attribute is "Not Present." When the current value of the predefined device attribute is "Not Present," the device does not change the value of the device attribute to "Present" in response to an increase in intensity of the input by contact 514 above the first intensity threshold (e.g., the light press intensity threshold). In some embodiments, for a different device attribute with a toggle state (e.g., the ringer ON/OFF state) or a continuously modifiable state (e.g., the volume level), the device toggles the current value or state of the device attribute (e.g., from ON to OFF, or from OFF to ON) or continues to change the current value of the device attribute (e.g., to increment the volume level by a respective amount) in response to an increase in intensity of the input by contact 514 above the first intensity threshold (e.g., the light press intensity threshold).

FIGS. 5B1-5B11 illustrate exemplary user interfaces for providing haptic and visual feedback for button interactions corresponding to modifying a device parameter in different manners in accordance with some embodiments. The user interfaces in these figures are used to illustrate the processes described below, including the processes in FIGS. 6A-6D 8A-8D and 12A-12E.

In FIG. 5B1, user interface 516 of a browser application is displayed on touch-screen 112. In FIG. 5B2, a touch input by contact 518 is detected on input region 456 (e.g., in this example, input regions 456 and 457 primarily serve as the volume up and volume down buttons of the device, respectively). In response to detecting the input by contact 518 on input region 456 (e.g., intensity of contact 518 exceeds the detection intensity threshold $IT_0$), and without requiring the intensity of the input by contact 518 to exceed a first intensity threshold (e.g., the light press intensity threshold $IT_L$), the device displays volume control 520 (e.g., a slider control) with indicator 522 (e.g., a slider indicator) indicating a current value of the device's volume setting. In some embodiments, the background user interface 516 is darkened and blurred underneath volume control 520, and the amount of darkening and blurring is changed (e.g., increased or decreased) dynamically in accordance with the current intensity of contact 518. In some embodiments, as the intensity of contact 518 remains below the first intensity threshold (e.g., the light press intensity threshold $IT_L$), the current value of the volume setting does not change. In other words, the light touch on input region 456 causes the device to provide the current value or state of a predefined device attribute (e.g., the device volume level), without changing the current value or state of the predefined device attribute. In some embodiments, the device displays visual feedback (e.g., an animated arrow pointing upward) that indicates the direction in which the device attribute will be changed if a press input is detected on the input region 456 that is currently touched by the user. In some embodiments, the device determines which device parameter (e.g., presence/absence of unread notification vs. device volume setting) is being queried by a particular light touch input on input region 456 in accordance with context information (e.g., if the device is in the display-off state, the device responds with notification status, and if the device is in the display-on state, the device responds with the current volume), without requiring presence of a focus selector on the display.

FIG. 5B3 illustrates that, when the intensity of input by contact 518 has increased above the first intensity threshold (e.g., the light press intensity threshold $IT_L$), the device increases the current volume of the device (e.g., because the input region 456 corresponds to the volume up function of the device) by a respective amount. In some embodiments, each time that the intensity of input by contact 518 increases above the first intensity threshold (e.g., a dynamic intensity threshold that is determined in accordance with the methods shown in FIGS. 4C-4E), the device increase the volume level of the device by a respective amount. In some embodiments, the exact amount of each increase is fixed. In some embodiments, the exactly amount of each increase is dynamically determined, for example, in accordance of one or more characteristics (e.g., the speed and the total amount) of the increase in intensity when the first intensity threshold is crossed. In some embodiments, a faster increase in intensity across the first intensity threshold or a longer duration of an intensity maintained above the first intensity threshold causes a greater amount of increase in the volume level of the device. In some embodiments, for each increment made to the volume level in response to the increase in intensity of contact 518 above the first intensity threshold, the device generates a respective tactile output (e.g., localized tactile output 524 (e.g., with a tactile output profile that is different from the tactile output profiles of tactile outputs 508, 510, and 512)). In some embodiments, the tactile output profile of tactile output 524 is optionally the same as the tactile output profile of tactile output 510, and corresponds to a light press input detected on input region 456. In some embodiments, as shown in FIG. 5B3, while the volume level is changed by the input by contact 524, indicator 522 moves up along volume control 520 to indicate the current volume level of the device. User interface 516 remains darkened and blurred underneath volume control 520 while contact 518 is continuously detected on input region 456. In some embodiments, volume control 520 remains displayed as long as contact 518 is detected on input region 456. In some embodiments, when lift-off of contact 518 is detected after volume level of the device has been changed, the device cease to display volume control 520 and appearance of user interface 516 is restored. The volume level of the device remains at the changed level after the volume control is no longer displayed.

FIG. 5B4 illustrates that, when intensity of contact 518 increases above the first intensity threshold for a number of times, or the intensity of contact 518 has been maintained above the first intensity threshold for an extended period of time, the device has increased the volume level of the device to a maximum value of the device volume. In response to the volume level of the device reaching the maximum value, the device generates localized tactile output 526 at input region 456 (e.g., the tactile output is synchronized with the increase of intensity above the first intensity threshold or the satisfaction of the time threshold for maintaining the intensity above the first intensity threshold) to indicate that a maximum value of the volume setting has been reached. In some embodiments, in addition to or in lieu of the localized tactile output 526 generated at input region 456, the device provides a whole device tactile output 528 to indicate that the maximum value of the volume level has been reached.

FIGS. 5B5 and 5B6 illustrate that, in some embodiments, if an additional press input by the same contact or a different contact (e.g., contact 530) is detected on input region 456, and the intensity of the contact (e.g., contact 530) exceeds the first intensity threshold, the device displays (e.g., redisplays) volume control 520 showing the current volume level at the maximum value, but forgoes generating at least one (e.g., one or both) of localized tactile output 526 and whole tactile output 528, to indicate that no further change has been made to the volume level in response to the light press input on input region 456. In some embodiments, the device generates a failure tactile output (e.g., a whole device failure buzz 532 as opposed to localized tactile output at input region 456) to indicate that no further change can be made to the volume level in response to the light press input on input region 456, as shown in FIG. 5B6.

FIG. 5B7 illustrates that, another input by contact 534 is detected on input region 457 (e.g., the input region currently corresponds to a volume down function of the device) after termination of the input by contact 518 or the input by contact 530. In response to the input by contact 534 on input region 457, the device displays volume control 520 without modifying the volume level when the intensity of the input by contact 534 has not exceeded the first intensity threshold, and decreases the volume level by a respective amount each time the intensity of the input by contact 534 increases above the first intensity threshold. In some embodiments, the device displays visual feedback (e.g., an animated arrow pointing downward) that indicates the direction in which the device attribute will be changed if a press input is detected on the input region 457 that is currently touched by the user. In FIG. 5B7, the device decreased the current device volume in response to detecting the increase of the intensity of contact 534 above the first intensity threshold. The device further generates a localized tactile output 536 at input region 457 to indicate that the criteria for decreasing the volume level has been met by the input, and that the volume level has been decreased accordingly. In some embodiments, the tactile output profile for localized tactile output 536 is different from the tactile output profile for localized tactile output 524 in FIG. 5B3, to reflect the difference in the direction of the changes in the volume level.

FIGS. 5B8-5B9 illustrates that, after a decrease in intensity of the input by contact 534 on input region 457 (as shown in FIG. 5B8), the intensity of the input by contact 534 increases above a second intensity threshold (e.g., a deep press intensity threshold $IT_D$). In response to detecting that the intensity of the input by contact 534 has exceeded the second intensity threshold, the device resets the volume level of the device to a preset value corresponding to input region 457 (e.g., a minimum value corresponding to muting the volume of the device), as shown in FIG. 5B9. In conjunction with resetting the volume level to mute, the device also generates a localized tactile output (e.g., tactile output 538 with a tactile output profile that is different from the tactile output profiles for tactile outputs 524, 536, and 526) at input region 457 to indicate that a minimum value of the volume level has been reached. In some embodiments, the device also generates a whole device tactile output 540 in conjunction with localized tactile output 538 to indicate that the volume has been muted in response to the deep press input by contact 534. FIG. 5B9 illustrates the scenario where the input is detected on the input region 457 that is used as volume down button. If the contact 534 had been detected on input region 456 (e.g., the input region used as the volume up button) instead, the device would reset the volume level of the device to a preset value corresponding to input region 456 (e.g., a maximum volume level), in response to detecting the intensity of the input exceeding the second intensity threshold, and the device would generate corresponding localized tactile output at input region 456 and whole device tactile output to indicate the abrupt resetting of the volume level. In some embodiments, in addition to or in lieu of a requirement that the intensity of the contact increases above the deep press intensity threshold in order to reset the volume level to a preset maximum or minimum value, the device requires that the contact intensity be maintained above the light press intensity threshold for at least a threshold amount of time T in order to reset the volume level to a preset maximum or minimum value.

FIGS. 5B10 and 5B11 illustrate that the same set of input regions 456 and 457 correspond to multiple device parameters (e.g., including at least the volume level setting and the screen brightness setting). The device toggles or switches the currently selected device parameter of the input regions to a next device parameter in the multiple device parameters in response to simultaneous press inputs detected on both input regions 546 and 457. In FIG. 5B10, after lift-off of contact 534 from input region 457 and upon initial touch down of two contacts 542 and 544 on input regions 456 and 457 (e.g., intensities of both contacts 542 and 544 are below the first intensity threshold (e.g., the light press intensity threshold $IT_L$)), respectively, the device redisplays volume control 520 on the display to indicate the currently selected device parameter for the input regions, and to indicate the current value of the device volume setting. In FIG. 5B11, upon detecting an increase in intensity of both contacts 542 and 544 above the first intensity threshold (e.g., the light press intensity threshold $IT_L$), the device switches the currently selected device parameter corresponding to the input regions 456 and 457 to the display brightness setting. In response to the simultaneous light press inputs by contact 542 and 544 on input regions 456 and 457, the device replaces the display of volume control 520 with display of brightness control 550. Brightness control 550 is a slider control with an indicator indicating the current brightness setting of the display. In conjunction with replacing display of volume control 520 with brightness control 550, the device generates localized tactile output 546 and 548 (e.g., with the same tactile output profile as each other, and different tactile output profile from those of tactile outputs 524, 526, 536, 538) at input regions 456 and 457, respectively, to indicating that the device has switched to another parameter of the multiple device parameters as the currently controlled device parameter for the input regions 456 and 457. After termination of the inputs by contacts 542 and 544, the device responds to press inputs on input regions 456 and 457 to adjust the brightness setting of the device in a manner similar to that described with respect to the volume setting in FIGS. 5B1-5B10. In response to another simultaneous light press inputs on input regions 456 and 457, the device switches the currently controlled device parameter for the input regions back to the volume setting (e.g., if the input regions only correspond to two device parameters) or switches to the next device parameter of the multiple device parameters.

FIGS. 5C1-5C20 illustrate exemplary user interfaces for providing haptic and visual feedback for different types of button interactions corresponding to presenting and interacting with a retractable menu in accordance with some embodiments. The user interfaces in these figures are used to illustrate the processes described below, including the processes in FIGS. 7A-7E and 12A-12E.

FIG. 5C1 illustrates device 100 displaying a user interface of a browser application. Device 100 includes input region 455 (e.g., a power button disposed on a peripheral side of the device adjacent to the edge of the display) that is coupled with a localized tactile output generator for generating localized tactile outputs at input region 455.

In FIG. 5C2, device 100 detects contact 552 on input region 455. In response to detecting contact 552 (e.g., intensity of contact 552 exceeds contact detection intensity threshold $IT_0$), the device displays precursor object 554 corresponding to a retractable menu next to input region 455. In some embodiments, precursor object 554 is animated (e.g., with movement or changing visual characteristic) to prompt the user to press harder on input region 455 (e.g., exerting more pressure in the direction toward the display). If the user simply rests his/her finger on input region 455, the device maintains display of precursor object 554, without displaying the menu. The device ceases to display precursor object 554 if lift-off of contact 552 is detected before the menu is revealed. In some embodiments, the device darkens and blurs the currently displayed user interface underneath precursor object 554 to focus the user's attention on precursor object 554.

FIGS. 5C3-5C5 illustrate that, as intensity of input by contact 552 increases and then decreases, the device reveals a menu with multiple selectable options by an amount that changes dynamically with the intensity of contact 552. As shown in FIG. 5C3, when intensity of input by contact 552 increases, a portion of menu 556 is revealed (e.g., sliding in onto the display from the side of the display adjacent to input region 455) showing a first selectable option 558 (e.g., an option to turn on/off the Do Not Disturb mode of the device). As the intensity of input by contact 552 continues to increase, additional portions of menu 556 is revealed (e.g., menu sliding in further in the direction of the force/pressure exerted by the user's finger on input region 455) showing a second selectable option 560 (e.g., an option to turn off the device). In FIG. 5C5, as the intensity of input by contact 552 decreases again, menu 556 retracts toward the edge of the display adjacent to input region 455. If lift-off of contact 552 is detected, menu 556 retracts completely and ceases to be displayed. In some embodiments, before menu 556 is fully expanded to show all available options on the menu, if a tap input (e.g., by another contact on the touch-screen) is detected on one of the options in the menu that are currently visible on the display, the selected option will be invoked, and the device performs an operation corresponding to the selected option (e.g., turn on "Do Not Disturb" mode, or turn off the device).

FIGS. 5C6-5C7 illustrate that, if before lift-off of contact 552, the device detects that the intensity of the input by contact 552 increases above a first intensity threshold (e.g., a light press intensity threshold $IT_L$), the device fully displays menu 556 and maintains display of menu 556 after lift-off of contact 552. The fully displayed menu 556 includes a third selectable option 562 (e.g., an option to use a payment function of the device). In some embodiments, the fully displayed menu 556 also includes indicator 5641 to indicate availability of additional functions through menu 556 with an enhanced press input (e.g., a deep press input or a long press input on input region 455). Examples of these additional functions are discussed with respect to FIGS. 5G1-5G5 and 5H1-5H5. As shown in FIG. 5C6, in conjunction with the detection of the light press input by contact 552 and full display of menu 556, the device generates localized tactile output 566 at input region 455. In some embodiments, localized tactile output 566 is synchronized with intensity of contact 552 reaching the first intensity threshold. In some embodiments, the menu overshoots and snaps back to its fully opened state after the first intensity threshold is reached, and the device synchronizes the tactile output 566 with the final settlement of the menu in its fully open state. FIG. 5C7 illustrates the fully opened state of menu 556 after lift-off of contact 552 has been detected. Each option in the fully displayed menu 556 is selectively activatable by a tap input at a location on the touch-screen corresponding to the option.

FIGS. 5C8-5C9 illustrate that, a tap input by contact 5661 on the first selectable option 558 causes the device to activate the "Do Not Disturb" mode of the device. In FIG. 5C9, the device generates a whole device tactile output (e.g., tactile output 5601) and displays a notification (e.g., notification 5621) to indicate to the user that "Do Not Disturb" mode has been turned on in response to the tap input by contact 5663. In this example, option 558 is a toggle button, and the device turns off the "Do Not Disturb" mode if option 558 is tapped again. The notification 5621 ceases to be displayed after a preset time period.

FIGS. 5C10-5C12 illustrate scrolling a selection indicator (e.g., selection indicator 568) through the multiple selectable options (e.g., options 558, 560, and 562) to change a currently selected option in menu 556. In FIG. 5C10, the device detects contact 564 on input region 455, and downward movement of contact 564 along the longitudinal direction of the elongated input region 455. In response to detecting the start of the downward swipe input by contact 564 on input region 455 (e.g., without requiring an intensity of the contact reaching a hint intensity threshold or a light press intensity threshold), the device displays selection indicator 568 at a location of the currently selected option (e.g., option 558) in menu 556. The selection indicator may take on different forms (e.g., as a spotlight, a highlight, a cursor, a special visual effect applied to a selected option, etc.) in different embodiments. In FIG. 5C11, as the downward swipe input by contact 564 on input region 455 continues, the device changes the currently selected option to the second option 560 in menu 556, and moves selection indicator 568 to the location of the second option 560. In FIG. 5C12, as the downward swipe input by contact 564 on input region 455 continues further, the device changes the currently selected option to the third option 562 in menu 556, and moves selection indicator 568 to the location of the third option 562. In FIGS. 5C10-5C12, the swipe input is provided by a continuously maintained contact 564. The same effect shown in FIGS. 5C10-5C12 can also be achieved using multiple consecutive short downward swipes on input region 455. As shown in FIGS. 5C10-5C12, the device generates localized tactile output 5663 on input region 455 during the swipe input by contact 564. In some embodiments, the localized tactile output is focused on the current location of the contact 564 along input region 455. In some embodiments, the localized tactile output is a continuous sequence of identical discrete tactile outputs with fixed durations, simulating a haptic feedback of a rough surface or the weight of a mechanical scroll wheel. In some embodiments, the switching from one selectable option to the next selectable option is triggered by the movement of contact 564 meeting preset movement criteria (e.g., a distance threshold), and the device generates a respective discrete tactile output in conjunction with satisfaction of the preset movement criteria and the switching of the currently selected option, to simulate a detent produced by a mechanical scroll wheel or dial. Although a downward swipe is used in the example shown in FIGS. 5C10-5C12, the device switches the currently selected option in the reverse direction in menu 556, in response to an upward swipe input on input region 455 and provides corresponding localized tactile outputs at input region 455.

In FIG. 5C13, while option 562 is the currently selected option in menu 556, the device detects a light press input (e.g., an input with an intensity exceeding a hint intensity threshold or light press intensity threshold) by contact 570 on input region 455. In response to the light press input, the device activates the function corresponding to the currently selected option 562 (e.g., a payment function). In response to detecting the light press input, the device generates localized tactile output 572 to indicate satisfaction of the intensity requirement and the activation of the selected option. In some embodiments, the device also highlights the selected option when it is activated. The tactile output 572 indicating activation of the selected option has a distinct tactile output profile from the tactile output 566 indicating switching of the selected option and/or the scrolling of the selection indicator.

FIGS. 5C14-5C17 illustrate scrolling through a number of selectable options in a menu of payment options (e.g., menu 574 including multiple selectable payment cards 576, 582, 588, etc.) using swipe inputs (e.g., upward and downward swipes) along the longitudinal direction of the elongated input region 455. As shown in FIG. 5C14, after the payment option 562 is activated by a light press input by contact 570, the device replaces display of menu 556 with display of menu 574. A default payment card 576 (e.g., the last used payment card) is the currently selected option in menu 574 before any additional input is detected. An enlarged image of the currently selected payment option (e.g., an image 578 of the currently selected card 576) is optionally displayed with menu 574. In FIG. 5C15, the device detects a downward swipe input by contact 580 along the longitudinal direction of input region 455, and in response to detecting the downward swipe input, the device scrolls forward in the list of payment options in menu 574 and selects the next payment card 582 in menu 574. The currently selected payment card 582 is enlarged, and an enlarged image 584 of the currently selected card is displayed. In FIG. 5C16, the device detects a continuation of the downward swipe input by contact 580 along the longitudinal direction of input region 455, and in response to detecting the continuation of the downward swipe input, the device scrolls forward in the list of payment options in menu 574 and selects the next payment card 588 in menu 574. The currently selected payment card 588 is enlarged, and an enlarged image 590 of the currently selected card is displayed. In some embodiments, the list of payment options is implemented as a circular list, and the user can continue to scroll through the list and return to the first payment option 574 by one or more additional downward swipes on input region 455. In FIG. 5C17, the device detects an upward swipe input by contact 580 (e.g., reversal of the downward movement by contact 580 along the longitudinal direction of the elongated input region 455). In response to the upward swipe input by contact 580, the device scrolls backward in the list of payment options in menu 574 and selects the previous payment card 582 in menu 574 again.

As shown in FIGS. 5C14-5C17, the device generates localized tactile output on input region 455 during the swipe inputs by contact 580. In some embodiments, the localized tactile outputs are focused on the current location of contact 580 along input region 455 (e.g., with most energy of each tactile output focused directly under the finger contact, and the focuses of a sequence of tactile outputs moving downward or upward with the finger contact during the downward or upward swipe). In some embodiments, the localized tactile output is a continuous sequence of identical discrete tactile outputs with fixed durations, simulating a haptic feedback of a rough surface or the weight of a mechanical scroll wheel. In some embodiments, the localized tactile output 586 provided during a downward swipe input and the localized tactile output 592 provided during an upward swipe have different tactile output profiles to indicate a difference in the swipe directions. For example, the tactile outputs provided in response to a downward swipe each include a pattern with a large peak followed by a small peak; while the tactile outputs provided in response to an upward swipe each includes a pattern with a small peak followed by a large peak. In some embodiments, the switching from one selectable option to the next selectable option is triggered by the movement of contact 564 meeting preset movement criteria (e.g., a distance threshold), and the device generates a respective discrete tactile output in conjunction with satisfaction of the preset movement criteria and the switching of the currently selected option, to simulate a detent produced by a mechanical scroll wheel or dial. Similarly, the device switches the currently selected option in the reverse direction in menu 574, in response to an upward swipe input on input region 455 and provides corresponding discrete localized tactile outputs (e.g., with a different tactile output profile from that of the discrete localized tactile outputs 586) at input region 455.

In FIG. 5C18, while payment option 582 is the currently selected payment option, a tap input on input region 455 confirms selection of payment option 582, e.g., as indicated by further highlighting of the payment card image 584 and payment option 582 in menu 574. In some embodiments, a tap input is not necessary (e.g., in the case of actions less critical than payment), and the currently selected option is usable directly without further confirmation. In some embodiments, the device generates localized tactile output 596 to indicate confirmation of the selection of the payment option 582.

In FIG. 5C19, while the payment option 582 is selected and confirmed, the device is brought into proximity with (e.g., within a preset distance of) a point of sale device (e.g., POS device 598) (e.g., with the user holding the device and making contact with the peripheral sides of the device at input regions 455, 456, and 457). In response to detecting POS device 598 within the preset distance, device 100 initiates a countdown (e.g., a countdown corresponding to a preset cancellation period) before the payment operation is executed using the currently selected payment card 582. During the countdown, if the device moves away from POS device 598, the payment operation is canceled. If the device is maintained within the preset distance of the POS device, the payment operation is executed at the end of the countdown. In some embodiments, if the actual execution of the payment operation takes a finite amount of time and is cancellable within a period of time after the execution of the payment operation is stated, the device optionally starts the execution of the payment operation at a time when cancellation of the payment operation can still be performed successfully before the end of the countdown. As shown in FIG. 5C19, the device displays a countdown in the form of a completion meter 593 (e.g., indicating 70% completion, or 30% remaining of the total cancellation period). In some embodiments, the device displays prompt 591 requiring the user to maintain the device within the preset threshold distance of the POS device 598 if the user wishes to complete the payment operation, rather than cancelling it.

In FIG. 5C19, the device provides a sequence of coordinated tactile outputs 597 during the countdown period where cancellation of the operation is still permitted. In some embodiments, the coordinated tactile outputs 597 are generated in repeated sequences around the input regions 455, 456, and 457. In some embodiments, the amplitudes of the tactile outputs 597 at the different input regions around the peripheral sides of the device indicates a respective direction (e.g., a clockwise direction, with input region 457 having the lowest tactile output strength (e.g., with localized tactile output 597-1), input region 456 having the intermediate tactile output strength (e.g., with localized tactile output 597-2), and input region 455 having the highest tactile output strength (e.g., with localized tactile output 597-3)). In some embodiments, the timing of the tactile outputs at the different input regions are also offset by different amounts from a common reference time (e.g., with the tactile output (e.g., localized tactile output 597-1) at input region 457 having the earliest start time, followed by the tactile output (e.g., localized tactile output 597-2) at input region 456, followed by the tactile output (e.g., localized tactile output 597-3) at input region 455). In some embodiments, the timing of the tactile outputs at the different input regions around the peripheral sides of the device corresponds to a respective direction (e.g., a clockwise direction, a rightward direction, etc.) relevant to the current usage scenario (e.g., corresponding to the movement direction of the countdown indicator). In some embodiments, the manner of coordination (e.g., in terms of relative strengths, timing, and tactile output patterns) between the individual tactile outputs 597 provided at the different input regions 455, 456, and 457 is specified in the tactile output profiles of the tactile outputs, and the coordination is controlled by a central controller (e.g., haptic feedback controller 161 in FIG. 1C). In some embodiments, in addition to the localized tactile outputs 597, the device also provides a whole device tactile output (e.g., a continuous tactile output (e.g., a continuous buzz)) that vibrates the whole device during the countdown, to alert the user that execution or completion of the payment operation is imminent, if not canceled in time. In some embodiments, the strength of the whole device tactile output increases monotonically with the progress of the countdown indicator to increase the urgency of the warning to the user.

FIG. 5C20 illustrates that, when the countdown is concluded, the device executes or completes the payment operation, and cancellation of the operation is no longer available by moving the device away from the POS device 598. In some embodiments, the device provides a whole device tactile output 595 to indicate execution or completion of the payment operation. A dismissal affordance 587 is optionally provided on the display to dismiss menu 574.

FIGS. 5D1-5D24 illustrate exemplary user interfaces for providing haptic and visual feedback for different types of button interactions corresponding to presenting and interacting with a retractable menu (e.g., a clipboard) in accordance with some embodiments. The user interfaces in these figures are used to illustrate the processes described below, including the processes in FIGS. 7A-7E and 12A-12E.

FIG. 5D1 illustrates a user interface (e.g., user interface 516) of an application (e.g., same as that shown in FIG. 5C1). Upon detection of contact 585 on input region 455, the device displays precursor object 554 that corresponds to retractable menu 556 (e.g., same as that shown in FIG. 5C2), as shown in FIG. 5D2. The device detects movement of contact 585 in a direction across the elongated input region 455 (e.g., from the display-side of the device to the backside of the device), as shown in FIGS. 5D2-5D3. In response to detecting the movement of contact 585 in the horizontal direction across the elongated input region 455, the device displays a different precursor object 583 corresponding to another retractable menu (e.g., a clipboard), as shown in FIG. 5D3. In addition, the device provides a localized tactile output 581 (e.g., with a tactile output profile that is different from the tactile output profiles of tactile outputs 508, 510, 512, 524, 526, 536, 538, 546, 548, 566, 5663, 572, 586, 592, 596, 597, and/or 589) in response to detecting the movement of contact 585 in the horizontal direction across input region 455, to indicate the toggling/switching of the menu currently controlled by the input region 455. In some embodiments, the device toggles the precursor object that is displayed (e.g., precursor object 554 for menu 556 and precursor object 583 for menu 577) in response to a horizontal swipe input on input region 455, regardless of the direction of the horizontal swipe input (e.g., from display-side to backside, or from backside to display-side) detected across the elongated input region 455. This is distinct from the behavior of a physical toggle button where only one swipe direction is effective for each toggle state of the button. In some embodiments, the input region 455 corresponds to a circular list of three or more menus, and the device scrolls through the respective precursor objects of the three or more menus in response to multiple horizontal swipes across the input region 455 and provides a corresponding localized tactile output (e.g., a tactile output with the same tactile output profile as tactile output 581) to indicate the switching of the precursor object and associated menu.

FIGS. 5D4-5D5 illustrate that, as intensity of the input by contact 579 increases, the device reveals increasing areas of menu 577 (e.g., a clipboard of objects such as content items (e.g., images, web links, documents, text, etc.) that now corresponds to input region 455. Menu 577 is displayed over user interface 516 without blurring and darkening of user interface 516 (e.g., in contrast to the case of menu 556 in FIG. 5C3). For a clipboard menu, the underlying user interface remains fully visible, such that the user can clearly see the objects and possible drop-off locations in the user interface during a copy and paste operation involving object(s) in the clipboard.

In FIGS. 5D6-5D8, while menu 577 remains partially revealed as a result of sustained contact 579 detected on input region 455 and before intensity of contact 579 increases above a first intensity threshold (e.g., the light press intensity threshold $IT_L$), contact 575 is detected at a location on the touch screen that corresponds to image 573 in user interface 516 (e.g., a location outside of menu 577). In response to detecting contact 575 meeting preset selection criteria (e.g., long press criteria based on a time threshold being met by contact 575, or light press criteria based on an intensity threshold being met by contact 575), the device selects image 573. Then, in accordance with subsequent movement of contact 575 across the touch-screen to a location within menu 577, a representation (e.g., thumbnail 571) of the selected image 573 is dragged into menu 577, as shown in FIG. 5D7.

In FIG. 5D8, after thumbnail 571 is dragged into menu 577, the device detects lift-off of contact 575. In response to detecting lift-off of contact 575, the device inserts thumbnail 571 into menu 577, and a copy of image 573 becomes an object in the clipboard corresponding to menu 577. In some embodiments, the device generates whole device tactile output 569 to indicate insertion of image 573 into the clipboard.

In FIG. 5D9, after image 573 is inserted into the clipboard by the drag and drop input by contact 575, the device detects lift-off of contact 579 before intensity of contact 579 ever increased above the first intensity threshold (e.g., the light press intensity threshold $IT_L$). In response to detecting the termination of input by contact 579, the device retracts menu 577, and user interface 516 is no longer obscured by menu 577. In the above process illustrated in FIGS. 5D3-5D9, an object is added into menu 577 without the menu being fully displayed. In some embodiments, an object can also be added to the menu by a drag and drop input when the menu has fully snapped opened due to a prior light press input.

In FIG. 5D10, another user interface 567 is displayed, e.g., as a result of launching another application (e.g., launched from the home screen or from an application-switcher user interface that had replaced display of user interface 516 in FIG. 5D9).

In FIGS. 5D11-5D12, an input by contact 565 is detected on input region 455. Upon detection of contact 565, precursor object 583 corresponding to menu 577 is displayed next to input region 455 (as shown in FIG. 5D11). When intensity of contact 565 increases, menu 577 gradually slides onto the display in the direction of the force/pressure exerted by the user's finger on input region 455. Thumbnail image 571 appears as the first item displayed in menu 577, as shown in FIG. 5D12.

FIGS. 5D13-5D14 illustrate that a drag input by contact 563 has selected and dragged a copy of thumbnail image 571 onto user interface 567. While contact 563 is maintained on touch screen 112 holding the copy of thumbnail image 571, lift-off of contact 565 is detected. In response to detecting lift-off of contact 565 from input region 455, the device ceases to display menu 577, while contact 563 continues to hold onto the copy of thumbnail image 571 over user interface 567.

In FIG. 5D15, when lift-off of contact 563 is detected, image corresponding to thumbnail 571 is dropped into a drop-off location selected in accordance with the lift-off position of contact 563 and available drop-off positions on user interface 567. In some embodiments, the device generates a whole device tactile output 559 to indicate settlement of the image into its final position on user interface 567.

FIGS. 5D16-5D17 illustrate that, a press input by contact 557 (e.g., with contact intensity exceeding the first intensity threshold (e.g., a light press intensity threshold $IT_L$)) is detected on input region 455, and as a result, the device fully expands menu 577 over user interface 567. When intensity of contact 557 exceeded the first intensity threshold and the menu is snapped open, the device generates localized tactile output 553 to indicate that menu-display criteria are met and that the menu display will be maintained after lift-off of contact 557 from input region 455. When menu 577 is fully open, scroll indicator 555 is displayed in menu 577 to indicate that additional items are in menu 577 which can be revealed in response to a scroll input.

FIGS. 5D18-5D19 illustrates that, after menu 577 is fully opened, two consecutive downward swipe inputs by contact 551 and 547, respectively, are detected on input region 455. In response to the downward swipe inputs detected on input region 455, menu 577 is scrolled in a direction corresponding to the direction of the swipe input (e.g., scrolling to the right when the swipe is downward, and scrolling to the left when the swipe is upward), as indicated by the movement of scroll indicator 555. In addition to the visual feedback, the device also generates localized tactile outputs 549 and 545, respectively, on input region 455, in response to detecting swipe inputs by contacts 551 and 547. The localized tactile outputs 549 and 545 have the same tactile output profile which is designed to simulate rotation of a scroll wheel in response to the swipe inputs and/or the roughness of the input region under the finger contact. In some embodiments, a selection indicator moves forward and backward through the list of selectable options (e.g., content items) in menu 577 to indicate a currently selected option in response to downward and upward swipe inputs detected on input region 455, and a tap input on input region activates the currently selected option indicated by the selection indicator.

In FIGS. 5D20-5D22, while menu 577 remains open after having been scrolled, the device detects contact 543 at a location corresponding to an object 541 in menu 577. In accordance with selection and dragging of object 541 by contact 543 across an edge of touch-screen 112 (e.g., outside of a permissible on-screen drop-off location), the device removes object 541 from menu 577. Upon lift-off of contact 543, the device generates whole device tactile output 539 to indicate that deletion of object 541 from menu 577 has been completed.

In FIGS. 5D23-5D24, a tap input by contact 537 is detected outside of menu 577, and the device dismisses menu 577 from over user interface 567.

FIGS. 5E1-5E5 illustrate exemplary user interfaces for providing haptic and visual feedback for guiding device movement to perform a respective task when the device is in a media capture mode of operation in accordance with some embodiments. The user interfaces in these figures are used to illustrate the processes described below, including the processes in FIGS. 9A-9C and 12A-12E.

In FIG. 5E1, user interface 535 is a camera user interface in a panorama capturing mode. The device detects presence of user's contact (e.g., contact 527 on the left side of the device, and contact 525 on the right side of the device) on all three input regions 455, 456, and 457 (e.g., the device is held in a user's hand, with the user making contact with input regions 455, 456, and 457). Although simultaneous contact with all input regions are shown in FIGS. 5E1-5E5, localized tactile outputs are generated on two or more of the input regions at various times during the process illustrated herein, even if contact is not maintained at all times with all input regions during the process. In addition, generation of tactile outputs at input regions 455, 456, and 457, in some cases, are in response to criteria being met by objects detected in the field of view of the camera, do not require touch inputs to be detected on input regions 455, 456, 457.

As shown in FIG. 5E1, at the beginning of the panorama capturing process, panel 533 displays a portion of the panorama image that has already been captured (e.g., partial image 529) and movement prompt 531 (e.g., an arrow) pointing in the direction of device movement required to complete the panorama image. Underneath panel 533, the currently field of view of the camera is displayed. The field of view of the camera is continuously updated during the panorama capturing based on the current location of the device relative to the outside environment.

In FIG. 5E2, as the device is moved rightward and the panorama capturing is in progress, the device detects that the device is deviating from horizontal movement, and the movement of the device needs to shift upward (e.g., the arrow is below the center line of panel 533), in order for the content of the panorama image captured at different points during movement of the device to line up properly (e.g., the top of the mountain in consecutive frames of the camera's image stream should occupy the same vertical location in the frames). In accordance with a determination that the device has deviated from horizontal movement, and that the device needs to be shifted upward to return objects in the field of view into proper positions for continuing the panorama image capturing, the device generates a coordinated tactile output (e.g., coordinated tactile output 523) using localized tactile output generators at input regions 456 and 457 on the left side of the device. In accordance with an extended tactile output profile for coordinated tactile output 523, the localized tactile output generator at input region 457 (e.g., the lower input region on the left side of the device) generates a sequence of discrete tactile outputs 523-1 with a first amplitude (e.g., a lower amplitude) and a gap between consecutive ones of the discrete tactile outputs 523-1 (e.g., as indicated by a series of small circular objects propagating from the lower input region, with each small circular object representing a respective discrete tactile output and with a distance of each respective small circular object from the lower input region corresponding an amount of time that has elapsed since a respective discrete tactile output represented by the respective small circular object was generated). Further in accordance with an extended tactile output profile for coordinated tactile output 523, the localized tactile output generator at input region 456 (e.g., the higher input region on the left side of the device) generates a sequence of discrete tactile outputs 523-2 with a second amplitude (e.g., a higher amplitude) and a gap between consecutive ones of the discrete tactile outputs (e.g., as indicated by a series of large circular objects propagating from the higher input region, with each large circular object representing a respective discrete tactile output and with a distance of each respective large circular object from the higher input region corresponding an amount of time that has elapsed since a respective discrete tactile output represented by the respective large circular object was generated). Further, in accordance with the extended tactile output profile, the device offsets the timing of localized tactile outputs 523-1 and localized tactile outputs 523-2 generated at the lower input region 457 and the higher input region 456, such that a coordinated sequence of discrete tactile outputs 523 are generated at the two input regions. For example, an example coordinated sequence is "$2_L$-$5_H$-$2_L$-$5_H$-$2_L$-$5_H$- . . . ", where "$2_L$" represents the lower strength (e.g., amplitude=2) tactile output generated at the lower input region 457, and "$5_H$" represents the higher strength tactile output (e.g., amplitude=5) generated at the higher input region 456. Based on the coordinated tactile output sequence 523, the device prompts the user to shift the device upward (e.g., in the direction going from the region with the weaker tactile output 523-1 to the region with the stronger tactile output 523-2). In some embodiments, the coordinated tactile output sequence is continuously generated at input regions 456 and 457 until the device ceases to detect the deviation in the downward direction (e.g., until the user has moved the device upward and the rightward horizontal movement of the device is restored).

In FIG. 5E3, as the device continues to move rightward and the panorama capturing progresses toward completion, the device detects that the device is deviating from horizontal movement, and the movement of the device needs to shift downward (e.g., the arrow is above the center line of panel 533), in order for the content of the panorama image captured at different points during movement of the device to line up properly (e.g., the top of the mountain in consecutive frames of the camera's image stream should occupy the same vertical location in the frames). In accordance with a determination that the device has deviated from horizontal movement, and that the device needs to be shifted upward to return objects in the field of view into proper positions for continuing the panorama image capturing, the device generates a coordinated tactile output (e.g., coordinated tactile output 521) using localized tactile output generators at input regions 456 and 457 on the left side of the device. In accordance with an extended tactile output profile for the coordinated tactile output 521, the localized tactile output generator at input region 457 (e.g., the lower input region on the left side of the device) generates a sequence of discrete tactile outputs 521-1 with a third amplitude (e.g., a higher amplitude) and a gap between consecutive ones of the discrete tactile outputs 521-1 (e.g., as indicated by a series of large circular objects propagating from the lower input region, with each large circular object representing a respective discrete tactile output and with a distance of each respective large circular object from the lower input region corresponding an amount of time that has elapsed since a respective discrete tactile output represented by the respective large circular object was generated). Further in accordance with an extended tactile output profile for the coordinated tactile output 521, the localized tactile output generator at input region 456 (e.g., the higher input region on the left side of the device) generates a sequence of discrete tactile outputs 521-2 with a fourth amplitude (e.g., a lower amplitude) and a gap between consecutive ones of the discrete tactile outputs (e.g., as indicated by a series of small circular objects propagating from the higher input region, with each small circular object representing a respective discrete tactile output and with a distance of each respective small circular object from the higher input region corresponding an amount of time that has elapsed since a respective discrete tactile output represented by the respective small circular object was generated). Further in accordance with the extended tactile output profile, the device offsets the timing of the localized tactile outputs 521-1 and the localized tactile outputs 521-2 generated at the lower input region 457 and the higher input region 456, such that a coordinated sequence of discrete tactile outputs are generated at the two input regions. For example, an example tactile output sequence is "$2_H$-$5_L$-$2_H$-$5_L$-$2_H$-$5_L$ . . . ", where "$2_H$" represents the lower strength (e.g., amplitude=2) tactile output generated at the higher input region 456, and "$5_L$" represents the higher strength tactile output (e.g., amplitude=5) generated at the lower input region 457. Based on the coordinated tactile output sequence 521, the device prompts the user to shift the device downward (e.g., in the direction going from the region with the weaker tactile output 521-2 to the region with the stronger tactile output 521-1). In some embodiments, the coordinated tactile output sequence is continuously generated at input regions 456 and 457 until the device ceases to detect the deviation in the upward direction (e.g., until the user has moved the device downward and the rightward horizontal movement of the device is restored).

In FIG. 5E4, as the device continues to move rightward and the device detects that panorama capturing is close to completion (e.g., the horizontal movement of the device meets a predefined near-completion linear or angular displacement threshold). The device detects that the horizontal movement is stalled and/or that the device needs to move further rightward in order to complete the panorama image. In accordance with a determination that the device has deviated required rightward movement, and that the device needs to be moved rightward to continuing the panorama image capturing, the device generates a coordinated tactile output (e.g., coordinated tactile output 519) using localized tactile output generators at input region 456 on the left side of the device and input region 455 on the right side of the device. In accordance with an extended tactile output profile for coordinated tactile output 519, the localized tactile output generator at input region 456 (e.g., the upper input region on the left side of the device) generates a sequence of discrete tactile outputs 519-1 with a fifth amplitude (e.g., a lower amplitude) and a gap between consecutive ones of the discrete tactile outputs 519-1 (e.g., as indicated by a series of small circular objects propagating from the input region 456 on the left side of the device, with each small circular object representing a respective discrete tactile output and with a distance of each respective small circular object from the input region 456 corresponding an amount of time that has elapsed since a respective discrete tactile output represented by the respective small circular object was generated). Further in accordance with an extended tactile output profile for coordinated tactile output 519, the localized tactile output generator at input region 455 (e.g., the input region on the right side of the device) generates a sequence of discrete tactile outputs 519-2 with a sixth amplitude (e.g., a higher amplitude) and a gap between consecutive ones of the discrete tactile outputs (e.g., as indicated by a series of large circular objects propagating from the right input region 455, with each large circular object representing a respective discrete tactile output and with a distance of each respective large circular object from the right input region 455 corresponding an amount of time that has elapsed since a respective discrete tactile output represented by the respective larger circular object was generated). Further, in accordance with the extended tactile output profile, the device offsets the timing of localized tactile outputs 519-1 and localized tactile outputs 519-2 generated at the left input region 456 and the right input region 455, such that a coordinated sequence of discrete tactile outputs is generated at the two input regions. For example, an example tactile output sequence is "$2_L$-$5_R$-$2_L$-$5_R$-$2_L$-$5_R$ . . . ", where "$2_L$" represents the lower strength (e.g., amplitude=2) tactile output generated at the left input region 456, and "$5_R$" represents the higher strength tactile output (e.g., amplitude=5) generated at the right input region 455. Based on the coordinated tactile output sequence 519, the device prompts the user to shift the device rightward (e.g., in the direction going from the region with the weaker tactile output 519-1 to the region with the stronger tactile output 519-2). In some embodiments, the coordinated tactile output sequence is continuously generated at input regions 456 and 455 until the device's rightward motion is restored and/or the panorama is completed.

In FIG. 5E5, once the device has been moved rightward by the required amount, panorama capturing is completed. In response to detecting completion of the panorama image, the device ceases to display panel 533 over the field of view of the camera in the camera user interface 535. The panorama image 515 is saved into the photo library. In addition, the device optionally generates localized tactile output 517 (e.g., not part of the coordinated tactile output 519) at input region 455 to indicate that panorama capturing is completed.

FIGS. 5F1-5F6 illustrate exemplary user interfaces for providing haptic and visual feedback for guiding device movement to perform a respective task when the device is in a media capture mode of operation in accordance with some embodiments. The user interfaces in these figures are used to illustrate the processes described below, including the processes in FIGS. 9A-9C and 12A-12E.

In FIG. 5F1, a camera user interface 513 is displayed, with a field of view of the camera capturing three subjects dancing (e.g., a man, a woman, and a girl). In FIG. 5F2, while the user holds the device (e.g., with contacts 511 and 509 on input regions 455, 456, and 457), the device detects a light press input by contact 509 (e.g., contact intensity exceeding a first intensity threshold (e.g., a hint intensity threshold $IT_H$)) on input region 455 (e.g., also serving as a power button of the device). In response to detecting the light press input by contact 509 on input region 455, the device initiates a face detection and/or autofocus function of the camera application, and displays three indicators 505-1, 505-2, 505-3 around the faces of the three subjects that have been identified in the field of view of the camera. In addition, in conjunction with the face detection and autofocus function being activated, the device generates localized tactile output 507 (e.g., a series of weak taps) at input region 455 to indicate that autofocus and face detection has been triggered and ongoing as long as the intensity of contact 509 is maintained above the first intensity threshold (e.g., the hint intensity threshold $IT_H$).

In FIG. 5F3, the device detects an increase in intensity of contact 509 above a second intensity threshold (e.g., the light press intensity threshold $IT_L$) that is greater than the first intensity threshold (e.g., the hint intensity threshold $IT_H$). In response to detecting the intensity of contact 509 increasing above the second intensity threshold, the device activates a video capturing function of the camera application, e.g., as indicated by the change in button 503. Face detection and autofocus continue in the field of view of the camera on user interface 513 as the subjects and the camera move around relative to one another. In response to detecting the intensity of contact 509 exceeding the second intensity threshold, the device generates localized tactile output 625 at input region 455 to indicate activation of the input region by contact 509 and activation the video capturing function of the camera as a result.

FIGS. 5F4-5F5 illustrate that, during the video capturing process, the device continuously monitors the location of the faces that are identified in the field of view, and generates a warning when the detected faces are about to move out of the field of view. Although simultaneous contact (e.g., contact 511 and 509) with all input regions are shown in FIGS. 5F4-5F6, localized tactile outputs are generated on two or more of the input regions at various times during the process illustrated herein, even if contact is not maintained at all times with all input regions during the process. In addition, generation of tactile outputs at input regions 455, 456, and 457, in some cases, are in response to criteria being met by objects detected in the field of view of the camera, do not require touch inputs to be detected on input regions 455, 456, 457.

In FIG. 5F4, when the device detects that one of the subjects' face (e.g., the girl's face) has moved to the left edge of the field of view of the camera, the device generates a coordinated tactile output (e.g., coordinated tactile output 601) using the lower input region 457 on the left side of the device and the input region 455 on the right side of the device. In accordance with a determination that an object on the lower left side of the field of view is about to go out of frame, and that the device needs to be shifted leftward to move the object away from the left edge of the field of view to continue the video capturing, the device generates a coordinated tactile output in accordance with an extended tactile output profile for coordinated tactile output 601. In accordance with the extended tactile output profile for coordinated tactile output 601, the localized tactile output generator at input region 457 (e.g., the lower input region on the left side of the device) generates a sequence of discrete tactile outputs 601-2 with a first amplitude (e.g., a higher amplitude) and a gap between consecutive ones of the discrete tactile outputs 601-2 (e.g., as indicated by a series of large circular objects propagating from the lower input region 457, with each large circular object representing a respective discrete tactile output and with a distance of each respective large circular object from the lower left input region corresponding an amount of time that has elapsed since a respective discrete tactile output represented by the respective large circular object was generated). Further in accordance with an extended tactile output profile for coordinated tactile output 601, the localized tactile output generator at input region 455 (e.g., the input region on the right side of the device) generates a sequence of discrete tactile outputs 601-1 with a second amplitude (e.g., a lower amplitude) and a gap between consecutive ones of the discrete tactile outputs (e.g., as indicated by a series of small circular objects propagating from the right input region, with each small circular object representing a respective discrete tactile output and with a distance of each respective small circular object from the right input region corresponding an amount of time that has elapsed since a respective discrete tactile output represented by the respective small circular object was generated). Further, in accordance with the extended tactile output profile, the device offsets the timing of localized tactile outputs 601-1 and localized tactile outputs 601-2 generated at the right input region 455 and the lower left input region 457, such that a coordinated sequence of discrete tactile outputs is generated at the two input regions. For example, an example tactile output sequence is "$2_R$-$5_{LL}$-$2_R$-$5_{LL}$-$2_R$-$5_{LL}$ . . . ", where "$2_R$" represents the lower strength (e.g., amplitude=2) tactile output generated at the right input region 455, and "$5_{LL}$" represents the higher strength tactile output (e.g., amplitude=5) generated at the lower left input region 457. Based on the coordinated tactile output sequence 601, the device prompts the user to shift the device leftward (e.g., in the direction going from the region with the weaker tactile output 601-1 to the region with the stronger tactile output 601-2). In some embodiments, the coordinated tactile output sequence is continuously generated at input regions 455 and 457 until the device detects that the object corresponding to indicator 505-3 is no longer near the left edge of the field of view of the camera (e.g., the object is completely off the screen, or is moved back in frame) (e.g., due to movement of the device and/or movement of the object corresponding to indicator 505-3).

In FIG. 5F5, when the device detects that one of the subjects' face (e.g., the woman's face) has moved to the right edge of the field of view of the camera, the device generates a coordinated tactile output (e.g., coordinated tactile output 603) using the upper input region 456 on the left side of the device and the input region 455 on the right side of the device. In accordance with a determination that an object on the upper right side of the field of view is about to go out of frame, and that the device needs to be shifted rightward to move the object away from the right edge of the field of view to continue the video capturing, the device generates a coordinated tactile output in accordance with an extended tactile output profile for the coordinated tactile output 603. In accordance with the extended tactile output profile for coordinated tactile output 603, the localized tactile output generator at input region 455 (e.g., the input region on the right side of the device) generates a sequence of discrete tactile outputs 603-1 with a first amplitude (e.g., a higher amplitude) and a gap between consecutive ones of the discrete tactile outputs 603-1 (e.g., as indicated by a series of large circular objects propagating from the right input region 455, with each large circular object representing a respective discrete tactile output and with a distance of each respective large circular object from the right input region corresponding an amount of time that has elapsed since a respective discrete tactile output represented by the respective large circular object was generated). Further in accordance with an extended tactile output profile for coordinated tactile output 603, the localized tactile output generator at input region 456 (e.g., the upper input region on the left side of the device) generates a sequence of discrete tactile outputs 603-2 with a second amplitude (e.g., a lower amplitude) and a gap between consecutive ones of the discrete tactile outputs (e.g., as indicated by a series of small circular objects propagating from the upper left input region, with each small circular object representing a respective discrete tactile output and with a distance of each respective small circular object from the upper left input region corresponding an amount of time that has elapsed since a respective discrete tactile output represented by the respective small circular object was generated). Further in accordance with the extended tactile output profile, the device offsets the timing of the localized tactile outputs 603-1 and the localized tactile outputs 603-2 generated at the right input region 455 and the upper left input region 456, such that a coordinated sequence of discrete tactile outputs are generated at the two input regions. For example, an example tactile output sequence is "$2_{UL}$-$5_R$-$2_{UL}$-$5_R$-$2_{UL}$-$5_R$ . . . ", where "$2_{UL}$" represents the lower strength (e.g., amplitude=2) tactile output generated at the upper left input region 456, and "$5_R$" represents the higher strength tactile output (e.g., amplitude=5) generated at the right input region 455. Based on the coordinated tactile output sequence 603, the device prompts the user to shift the device rightward (e.g., in the direction going from the region with the weaker tactile output 603-2 to the region with the stronger tactile output 603-1). In some embodiments, the coordinated tactile output sequence is continuously generated at input regions 455 and 456 until the device detects that the object corresponding to indicator 505-2 is no longer near the right edge of the field of view of the camera (e.g., the object is completely off the screen, or is moved back in frame) (e.g., due to movement of the device and/or movement of the object corresponding to indicator 505-2).

FIG. 5F6 illustrates that, when all of the detected subjects are well in frame, video capturing continues (e.g., with user's finger resting on the input regions 455, 456, and 457) and the device does not generate any coordinated tactile output to prompt movement of the device.

FIGS. 5G1-5G5 illustrate exemplary user interfaces for providing haptic and visual feedback for warning a user of impending performance of an operation in accordance with some embodiments. The user interfaces in these figures are used to illustrate the processes described below, including the processes in FIGS. 10A-10C and 12A-12E.

In FIG. 5G1, menu 556 has been displayed in response to a prior light press input (e.g., in accordance with a process analogous to that shown in FIGS. 5C1-5C7). As show in FIG. 5G1, in addition to multiple selectable options (e.g., options 558, 560, and 562), indicator 5641 is displayed in menu 556 to indicate availability of an additional function (e.g., an emergency calling function) that can be triggered in response to an enhanced press input (e.g., a press input with an enhanced duration and/or intensity requirement).

In FIG. 5G2, as intensity of contact 605 on input region 455 increases above a light press intensity threshold $IT_L$ and continues to increase toward a deep press intensity threshold $IT_D$, the device generates first localized tactile output 607 (e.g., a sequence of weak clicks) to indicate that a threshold intensity for triggering an emergency calling function of the device is about to be reached. In some embodiments, the strength of the localized tactile output is dynamically changed in accordance with a current intensity of the input by contact 605. In some embodiments, the device also changes the appearance of the indicator 5641 to indicate that the intensity of contact 605 is increasing toward the threshold intensity for triggering the emergency calling function.

In FIG. 5G3, the device detects that an intensity of the input by contact 605 has increased above the deep press intensity threshold ITS (e.g., warning-initiation criteria have been met). In response to detecting that the intensity of the input by contact 605 has exceeded the deep press intensity threshold $IT_D$, the device starts a countdown for the emergency calling function and generates a first coordinated tactile output (e.g., coordinated tactile output 609) using localized tactile output generators located at input regions 455, 456, and 457, as a warning to the user that emergency services will be called at the end of the countdown (e.g., the countdown corresponding to a cancellation period) if a cancellation input is not received before the end of the countdown. In some embodiments, the coordinated tactile output 609 generated at the different input regions (e.g., localized tactile outputs 609-1, 609-2, and 609-3) are identical and synchronized. In some embodiments, the localized tactile outputs generated at the different input regions are offset in timing, to create a cycle of movement around the device. In some embodiments, the amplitudes of the tactile outputs continuously increase over time during the countdown period. As shown in FIG. 5G3, after the warning-initiation criteria are met by the increase in intensity of contact 605 above the deep press intensity threshold, notification 611 is displayed to indicate that emergency calling will be performed at the end of a 5 seconds countdown, and that intensity of the input needs to be maintained above the deep press intensity threshold ITS during the countdown period (e.g., a combined threshold of an intensity threshold and a time threshold need to be satisfied) in order to meet the operation-execution criteria to perform the emergency calling function. If the intensity threshold is not met or if the input terminates before the end of the countdown period, the emergency calling operation will not be performed and the warning tactile outputs will be stopped. In some embodiments, the appearance of indicator 5641 is changed (e.g., flashes or pulsates) to indicate that operation-execution criteria are about to be met and emergency calling function is about to be performed. In some embodiments, in addition to the localized tactile outputs and the visual feedback for indicating the impending performance of the emergency calling function, the device also generates a continuous and escalating (e.g., with increasing amplitudes) whole device tactile output (e.g., tactile output 613) to further enhance the effect of the warning.

In FIG. 5G4, when the countdown period is over and the operation-execution criteria for performing the emergency calling function are met (e.g., the combined intensity and duration threshold is met by the input by contact 605), the device stops generating the warning feedback (e.g., localized tactile outputs 609, notification 611, and whole device tactile output 613), and makes the call to emergency services. As shown in FIG. 5G4, notification 617 indicates that the emergency call is in progress. In some embodiments, the device generates a whole device tactile output (e.g., tactile output 615) to indicate that the emergency calling function is performed and in progress. At this point, cancellation of the emergency call operation is no longer permitted.

In FIG. 5G5, the call is connected, and the device ceases to generate any tactile output. Notification 619 is displayed to indicate that the call is connected, and a call termination affordance (e.g., button 621) is displayed. A tap input by contact 623 on the call termination affordance terminates the emergency call, and the user interface is restored to the state shown in FIG. 5G1.

FIGS. 5H1-5H5 illustrate exemplary user interfaces for providing haptic and visual feedback for warning a user of impending performance of an operation (e.g., activating a voice-based digital assistant) in accordance with some embodiments. The user interfaces in these figures are used to illustrate the processes described below, including the processes in FIGS. 10A-10C and 12A-12E.

In FIG. 5H1, a user interface (e.g., wake screen user interface 501) is displayed. In FIG. 5H2, menu 556 has been displayed in response to a light press input by contact 627 (e.g., in accordance with a process analogous to that shown in FIGS. 5C1-5C7). A localized tactile output (e.g., localized tactile output 629) is generated to indicate that the light press intensity threshold has been met by the input. As show in FIG. 5H2, in addition to multiple selectable options (e.g., options 558, 560, and 562), indicator 5641 is displayed in menu 556 to indicate availability of an additional function (e.g., a digital assistant function) that can be triggered in response to an enhanced press input (e.g., a press input with an enhanced duration and/or intensity requirement).

In FIG. 5H3, when the intensity of the input by contact 627 is maintained above the light press intensity threshold $IT_L$ for at least a threshold amount of time T, the device generates a coordinated tactile output (e.g., tactile output 631) using localized tactile output generators at input regions 455 and 456. In some embodiments, the localized tactile output 631-1 and 631-2 are each a sequence of discrete tactile outputs, and the timing of the two sequences of discrete tactile outputs are slightly offset (e.g., by an amount corresponding to the gap between two consecutive discrete tactile outputs in one of the sequences) from each other. In some embodiments, in response to detecting that the intensity of the input by contact 627 is maintained above the light press intensity threshold $IT_L$ for at least a threshold amount of time T, the device starts to gather the computing resources to start the digital assistant.

In some embodiments, before the digital assistant is fully ready to accept and respond to voice input, the device displays visual feedback 633 and 637 (e.g., text greetings (e.g., "What can I help you with?" "Go ahead, I am listening . . . "), an animation (e.g., animated waveforms), etc.) to indicate that the digital assistant is getting ready, as shown in FIGS. 5H3 and 5H4. In FIG. 5H4, before the digital assistant is fully ready to receive voice input and provide voice-based responses, the device continues to generate the localized tactile outputs 631 on the input regions 455 and 456. In some embodiments, the user does not need to maintain the intensity of the input above the light press intensity threshold $IT_L$ after the digital assistant has been triggered and the tactile outputs 631 are generated. In some embodiments, if a cancellation input (e.g., lift-off of contact 627) is detected before the digital assistant is fully activated and ready to respond to user's voice input, the device cease to generate the localized tactile outputs 631, and restores the user interface 501.

FIG. 5H5, the device detects that no cancellation input is detected before the digital assistant is fully activated and ready to respond to user's voice input, the device cease to generate the localized tactile outputs 631 and displays the digital assistant user interface 639. In some embodiments, in response to detecting that the digital assistant is fully activated and ready to respond to user's voice input and that no cancellation input is detected before the digital assistant is fully activated and ready to respond to user's voice input, the device ceases to generate localized tactile outputs 631, and generates whole device tactile output 641 to indicate that the digital assistant is fully ready to respond to the user's voice input.

FIGS. 5I1-5I6 illustrate providing, for each respective type of button interaction, tactile outputs that have varying tactile output profiles depending on the presence an interstitial material between the input region and the user's finger in accordance with some embodiments. These figures are used to illustrate the processes described below, including the processes in FIGS. 11A-11B.

For illustrative purposes, only two types of materials (e.g., material of case 643, and material of case 645) are used as example interstitial materials in FIGS. 5I1-5I6. In actual usage scenarios, many different types of interstitial materials are possible, and each correspond to respective ways of modifying the tactile output profile of a base tactile output (e.g., the tactile output generated when there is no interstitial material present) to produce consistent (e.g., nearly identical) haptic sensations on the user's finger through the different types of interstitial materials.

In some embodiments, depending on the actual material (e.g., the material category (e.g., leather, plastic, silicone, fabric, etc.), or actual properties of the material (e.g., elasticity, density, thickness, stiffness, etc.)) that is present between the input region and the user's finger, the type of input (e.g., the actual intensity of the input, or whether the input is a finger-rest input, a light press input, a deep press input, a horizontal swipe input, or a vertical swipe input on the input region) that is detected, and/or the type of tactile output (e.g., the waveform, the amplitude, the frequency, etc.) that is generated, the device uses different strategies to modify the tactile output profiles of the tactile outputs that are to be generated at the corresponding input regions with presence of an interstitial material (e.g., a case, or a glove, or clothing). FIGS. 5I1-5I6 illustrate qualitative modifications to the tactile output profiles for different interstitial materials, different types of inputs, and different types of tactile outputs. These qualitative modifications are not meant to be exhaustive and may be varied in various embodiments, depending on the actual usage scenario.

In FIG. 5I1, a press input with an intensity exceeding a hint intensity threshold $IT_H$ is detected on input region 455, and the device generates a localized tactile output in response to detecting the press input. In the left portion of FIG. 5I1, tactile output 649 is generated. The tactile output profile (e.g., a sequence of two discrete waveforms) of the tactile output 649 is provided in the bottom of the left portion of FIG. 5I1. In response to this press input, the device optionally performs an operation (e.g., displaying unread notifications on a darkened wake screen user interface as shown in FIG. 5A4, selecting an item in a menu as shown in FIG. 5C13, autofocusing on detected faces as shown in FIG. 5F2) in conjunction with generating the localized tactile output at input region 455.

In the middle portion of FIG. 5I1, device 100 (e.g., including input region 455) is covered by case 643. The device detects the same press input provided by the user (e.g., the intensity of the input is optionally determined while taking into consideration of the presence of the interstitial material between the user's finger and the input region 455) on the input region 455. In response to detecting the same press input, the device performs the same operation regardless of whether an interstitial material is present. But in accordance with a determination that an interstitial material (e.g., material one) is present, the device generates localized tactile output 653 with a modified tactile output profile. The modified tactile output profile of tactile output 653 is shown at the bottom of the middle portion of FIG. 5I1. In this example, the amplitude of the two discrete waveforms in the tactile output profile are modified (e.g., amplitude is increased by 50%) to overcome the dampening effect of the case 643, and to produce movement on the interstitial material over the input region on that is substantially similar to the movement of the input region caused by the tactile output 649 without presence of the interstitial material 643.

In the right portion of FIG. 5I1, device 100 (e.g., including input region 455) is covered by case 645. The device detects the same press input provided by the user (e.g., the intensity of the input is optionally determined while taking into consideration of the presence of the interstitial material between the user's finger and the input region 455) on the input region 455. In response to detecting the same press input, the device performs the same operation regardless of whether an interstitial material is present. But in accordance with a determination that an interstitial material (e.g., material two) is present, the device generates localized tactile output 657 with a modified tactile output profile. The modified tactile output profile of tactile output 657 is shown at the bottom of the right portion of FIG. 5I1. In this example, the amplitude of the two discrete waveforms in the tactile output profile are modified (e.g., amplitude is increased by 50%) to overcome the dampening effect of the case 645. In addition, a secondary waveform is generated with a slight time offset from the original waveform is added to the original waveform in the modified tactile output profile, to overcome the blurring effect of the fluffy material of the case. Based on the modified tactile output profile, the tactile output 657 produces movement on the interstitial material over the input region that is substantially similar to the movement of the input region caused by the tactile output 649 without presence of the interstitial material.

In the examples shown in FIG. 5I2, the interstitial materials are wrapped around the user's finger instead of being wrapped around the device. In the left portion of FIG. 5I2, there is no interstitial material present between the user's finger and the input region of the device. When the device detects a press input by contact 665 with an intensity above the hint intensity threshold, the device generates tactile output 667, with the same tactile output profile as that of tactile output 649 in FIG. 5I1. In the middle portion of FIG. 5I2, the same interstitial material used in case 643 is wrapped around the user's finger. As a result, when the device detects the same press input made by contact 669 through the interstitial material, the device generates a tactile output 671 with a modified tactile output profile to compensate for damping and distortion of the tactile output due to the presence of the interstitial material. In this example, the modified tactile output profile is the same as the tactile output profile of tactile output 653 that was generated when the same interstitial material was used in the case 643. In the right portion of FIG. 5I2, the same interstitial material used in case 645 is wrapped around the user's finger. As a result, when the device detects the same press input made by contact 673 through the interstitial material, the device generates a tactile output 675 with a modified tactile output profile to compensate for damping and distortion of the tactile output due to the presence of the interstitial material. In this example, the modified tactile output profile is the same as the tactile output profile of tactile output 657 that was generated when the same interstitial material was used in the case 645. In some embodiments, the tactile output profile of a tactile output is optionally modified differently depending on whether the interstitial material is used in a case wrapped around the device or used in a glove wrapped around the user's finger.

In FIG. 5I3, a press input with an intensity exceeding a light press intensity threshold $IT_L$ is detected on input region 455, and the device generates a localized tactile output in response to detecting the light press input. In the left portion of FIG. 5I3, tactile output 679 is generated. The tactile output profile (e.g., a sequence of two discrete waveforms (e.g., a stronger waveform followed by a weaker waveform)) of the tactile output 679 is provided in the bottom of the left portion of FIG. 5I3. In response to this light press input, the device optionally performs an operation (e.g., modifies read/unread status of notifications on wake screen user interface as shown in FIG. 5A5, modifying a value of a device parameter as shown in FIGS. 5B3 and 5B7, switching to a different parameter control as shown in FIG. 5B11, fully displaying a menu as shown in FIGS. 5C6 and 5D17, activating a video capturing mode as shown in FIG. 5F3, activating a digital assistant as shown in FIG. 5H3) in conjunction with generating the localized tactile output at input region 455.

In the middle portion of FIG. 5I3, device 100 (e.g., including input region 455) is covered by case 643. The device detects the same light press input provided by the user (e.g., the intensity of the input is optionally determined while taking into consideration of the presence of the interstitial material between the user's finger and the input region 455) on the input region 455. In response to detecting the same light press input, the device performs the same operation regardless of whether an interstitial material is present. But in accordance with a determination that an interstitial material (e.g., material one) is present, the device generates a localized tactile output 683 with a modified tactile output profile. The modified tactile output profile of tactile output 683 is shown at the bottom of the middle portion of FIG. 5I3. In this example, the amplitudes of the two discrete waveforms in the tactile output profile are modified differently (e.g., amplitude of waveform one is increased by 50%, amplitude of waveform two is increased by 40%) to overcome the dampening effect of the case 643, and to produce movement on the interstitial material over the input region on that is substantially similar to the movement of the input region caused by the tactile output 679 with presence of the interstitial material.

In the right portion of FIG. 5I3, device 100 (e.g., including input region 455) is covered by case 645. The device detects the same press input provided by the user (e.g., the intensity of the input is optionally determined while taking into consideration of the presence of the interstitial material between the user's finger and the input region 455) on the input region 455. In response to detecting the same press input, the device performs the same operation regardless of whether an interstitial material is present. But in accordance with a determination that an interstitial material (e.g., material two) is present, the device generates localized tactile output 687 with a modified tactile output profile. The modified tactile output profile of tactile output 687 is shown at the bottom of the right portion of FIG. 5I3. In this example, the amplitudes of the two discrete waveforms in the tactile output profile are modified differently (e.g., amplitude of the first waveform is modified by 45% and the amplitude of the second waveform are both increased by 40%) to overcome the dampening effect of the case 645. In addition, a secondary waveform is generated with a slight time offset from the original waveform is added to the original waveform in the modified tactile output profile, to overcome the blurring effect of the fluffy material of the case. Based on the modified tactile output profile, the tactile output 687 produces movement on the interstitial material over the input region that is substantially similar to the movement of the input region caused by the tactile output 679 without presence of the interstitial material.

In some embodiments, the tactile output profile of a tactile output is optionally modified the same way regardless of whether the interstitial material is used in a case wrapped around the device or used in a glove wrapped around the user's finger. In some embodiments, the tactile output profile of a tactile output is optionally modified differently depending on whether the interstitial material is used in a case wrapped around the device or used in a glove wrapped around the user's finger.

In FIG. 5I4, a press input with an intensity exceeding a deep press intensity threshold ITS is detected on input region 455, and the device generates a localized tactile output in response to detecting the deep press input. In the left portion of FIG. 5I4, tactile output 693 is generated. The tactile output profile (e.g., a discrete waveform with a stronger segment in the middle flanked by two weaker segments) of the tactile output 693 is provided in the bottom of the left portion of FIG. 5I4. In response to this deep press input, the device optionally performs an operation (e.g., displaying expanded versions of notifications on wake screen user interface as shown in FIG. 5A6, resetting a device parameter as shown in FIG. 5B9, starting a warning period of making an emergency call as shown in FIG. 5G3) in conjunction with generating the localized tactile output at input region 455.

In the middle portion of FIG. 5I4, device 100 (e.g., including input region 455) is covered by case 643. The device detects the same deep press input provided by the user (e.g., the intensity of the input is optionally determined while taking into consideration of the presence of the interstitial material between the user's finger and the input region 455) on the input region 455. In response to detecting the same deep press input, the device performs the same operation regardless of whether an interstitial material is present. But in accordance with a determination that an interstitial material (e.g., material one) is present, the device generates localized tactile output 697 with a modified tactile output profile. The modified tactile output profile of tactile output 697 is shown at the bottom of the middle portion of FIG. 5I4. In this example, the amplitude and the shape of the waveform in the tactile output profile are modified (e.g., amplitude of the central portion of the waveform is increased by 60%, amplitude of the side portions of the waveform is increased by 40%, and a secondary waveform is added to the central portion of the original waveform and is slightly offset from the original waveform) to overcome the dampening effect of the case 643, and to produce movement on the interstitial material over the input region on that is substantially similar to the movement of the input region caused by the tactile output 697 without presence of the interstitial material.

In the right portion of FIG. 5I4, device 100 (e.g., including input region 455) is covered by case 645. The device detects the same deep press input provided by the user (e.g., the intensity of the input is optionally determined while taking into consideration of the presence of the interstitial material between the user's finger and the input region 455) on the input region 455. In response to detecting the same deep press input, the device performs the same operation regardless of whether an interstitial material is present. But in accordance with a determination that an interstitial material (e.g., material two) is present, the device generates localized tactile output 701 with a modified tactile output profile. The modified tactile output profile of tactile output 701 is shown at the bottom of the right portion of FIG. 5I4. In this example, the amplitude and the shape of the waveform in the tactile output profile are modified (e.g., amplitude of the first waveform is increased by 40% and the amplitude of the second waveform is increased by 60%, and a secondary waveform is added to the entire original waveform and is slightly offset from the original waveform) to overcome the dampening effect of the case 645. Based on the modified tactile output profile, the tactile output 687 produces movement on the interstitial material over the input region that is substantially similar to the movement of the input region caused by the tactile output 693 without presence of the interstitial material.

In some embodiments, the tactile output profile of a tactile output is optionally modified the same way regardless of whether the interstitial material is used in a case wrapped around the device or used in a glove wrapped around the user's finger. In some embodiments, the tactile output profile of a tactile output is optionally modified differently depending on whether the interstitial material is used in a case wrapped around the device or used in a glove wrapped around the user's finger.

In FIG. 5I5, a long press input with an intensity exceeding a light press intensity threshold $IT_L$ and a duration of at least T is detected on input region 455, and the device generates a localized tactile output in response to detecting the long press input. In the left portion of FIG. 5I5, tactile output 705 is generated. The tactile output profile (e.g., a sequence of three discrete waveforms) of the tactile output 705 is provided in the bottom of the left portion of FIG. 5I5. In response to this long press input, the device optionally performs an operation (e.g., activating a digital assistant as shown in FIG. 5H3) in conjunction with generating the localized tactile output at input region 455.

In the middle portion of FIG. 5I5, device 100 (e.g., including input region 455) is covered by case 643. The device detects the same long press input provided by the user (e.g., the intensity of the input is optionally determined while taking into consideration of the presence of the interstitial material between the user's finger and the input region 455) on the input region 455. In response to detecting the same long press input, the device performs the same operation regardless of whether an interstitial material is present. But in accordance with a determination that an interstitial material (e.g., material one) is present, the device generates localized tactile output 709 with a modified tactile output profile. The modified tactile output profile of tactile output 709 is shown at the bottom of the middle portion of FIG. 5I5. In this example, the amplitude of the waveform in the tactile output profile are modified (e.g., amplitude of the three discrete waveforms is increased by 50%) to overcome the dampening effect of the case 643, and to produce movement on the interstitial material over the input region on that is substantially similar to the movement of the input region caused by the tactile output 705 without presence of the interstitial material.

In the right portion of FIG. 5I5, device 100 (e.g., including input region 455) is covered by case 645. The device detects the same long press input provided by the user (e.g., the intensity of the input is optionally determined while taking into consideration of the presence of the interstitial material between the user's finger and the input region 455) on the input region 455. In response to detecting the same long press input, the device performs the same operation regardless of whether an interstitial material is present. But in accordance with a determination that an interstitial material (e.g., material two) is present, the device generates a localized tactile output 713 with a modified tactile output profile. The modified tactile output profile of tactile output 713 is shown at the bottom of the right portion of FIG. 5I5. In this example, the amplitude and the shape of the waveform in the tactile output profile are modified (e.g., amplitude of the three discrete waveforms is increased by 50%) to overcome the dampening effect of the case 645. In addition, a secondary sequence of three discrete waveforms with lower amplitude (e.g., 30% strength) is added to the original sequence in the original tactile output profile. Based on the modified tactile output profile, the tactile output 713 produces movement on the interstitial material over the input region that is substantially similar to the movement of the input region caused by the tactile output 705 without presence of the interstitial material.

In some embodiments, the tactile output profile of a tactile output is optionally modified the same way regardless of whether the interstitial material is used in a case wrapped around the device or used in a glove wrapped around the user's finger. In some embodiments, the tactile output profile of a tactile output is optionally modified differently depending on whether the interstitial material is used in a case wrapped around the device or used in a glove wrapped around the user's finger.

In FIG. 5I6, a long finger-rest input with an intensity below the hint intensity threshold $IT_H$ and a duration of at least T is detected on input region 455, and the device generates a localized tactile output in response to detecting the long finger-rest input. In the left portion of FIG. 5I6, tactile output 717 is generated. The tactile output profile (e.g., a sequence of three discrete waveforms with increasing amplitudes) of the tactile output 717 is provided in the bottom of the left portion of FIG. 5I6. In response to this long finger-rest input, the device optionally performs an operation (e.g., checking the presence/absence of unread notifications without modifying the status of the notifications as shown in FIG. 5A3) in conjunction with generating the localized tactile output at input region 455.

In the middle portion of FIG. 5I6, device 100 (e.g., including input region 455) is covered by case 643. The device detects the same long finger-rest input provided by the user (e.g., the intensity of the input is optionally determined while taking into consideration of the presence of the interstitial material between the user's finger and the input region 455) on the input region 455. In response to detecting the same long finger-rest input, the device performs the same operation regardless of whether an interstitial material is present. But in accordance with a determination that an interstitial material (e.g., material one) is present, the device generates localized tactile output 721 with a modified tactile output profile. The modified tactile output profile of tactile output 721 is shown at the bottom of the middle portion of FIG. 5I6. In this example, the amplitude of the waveform in the tactile output profile are modified by different amounts (e.g., amplitudes of the three discrete waveforms are increased by 40%, 50%, and 60%, respectively) to overcome the dampening effect of the case 643, and to produce movement on the interstitial material over the input region on that is substantially similar to the movement of the input region caused by the tactile output 717 without presence of the interstitial material.

In the right portion of FIG. 5I6, device 100 (e.g., including input region 455) is covered by case 645. The device detects the same long finger-rest input provided by the user (e.g., the intensity of the input is optionally determined while taking into consideration of the presence of the interstitial material between the user's finger and the input region 455) on the input region 455. In response to detecting the same long finger-rest input, the device performs the same operation regardless of whether an interstitial material is present. But in accordance with a determination that an interstitial material (e.g., material two) is present, the device generates localized tactile output 725 with a modified tactile output profile. The modified tactile output profile of tactile output 725 is shown at the bottom of the right portion of FIG. 5I6. In this example, the amplitude and the shape of the waveform in the tactile output profile are modified (e.g., amplitudes of the three discrete waveforms are increased by 50%, 60%, and 50%, respectively, and the frequencies of the waveforms are doubled) to overcome the dampening effect of the case 645. Based on the modified tactile output profile, the tactile output 725 produces movement on the interstitial material over the input region that is substantially similar to the movement of the input region caused by the tactile output 717 without presence of the interstitial material.

In some embodiments, the tactile output profile of a tactile output is optionally modified the same way regardless of whether the interstitial material is used in a case wrapped around the device or used in a glove wrapped around the user's finger. In some embodiments, the tactile output profile of a tactile output is optionally modified differently depending on whether the interstitial material is used in a case wrapped around the device or used in a glove wrapped around the user's finger.

In the examples above, the inputs detected on the input region do not include movement of the contacts. However, in various embodiments, when an interstitial material is present between the user's finger and the input region of the device, and the device generates a localized tactile output in response to a swipe input detected on the input region (e.g., in the horizontal direction across the input region, or in the vertical direction along the input region), the device makes corresponding modifications to tactile output profiles of localized tactile outputs generated at the input region. The modifications are determined based on the characteristics of the original tactile output profile and the characteristics of the interstitial material, such that the movement of the interstitial material (e.g., a portion of the interstitial material proximate to or adjacent to the input region) generated by the modified tactile output is substantially similar to movement of the input region on the device generated by the original tactile output without presence of the interstitial material (e.g., the modified tactile output produces a similar haptic sensation (e.g., as measured by vibration strengths, frequencies, etc.) on the finger through the interstitial material as that produced by the original tactile output directly on the finger).

FIGS. 6A-6D are flow diagrams illustrating a method 6000 of querying and modifying a device attribute in accordance with some embodiments.

Method 6000 provides a mechanism for a user to query the device regarding a current state of a preset attribute of the device by a touch input without altering the attribute of the device, while preserving the option to alter the attribute with a continuation of the current input. In particular, the device generates an output to indicate the current state of the preset attribute (e.g., a current volume level, whether the ringer is on, whether there are unread notifications, etc.) without altering the current state of the attribute in response to an initial portion of a touch input on an off-display input region of the device (e.g., a side-button region) when device-query criteria are met, and proceeds to alter the current state of the preset attribute when a continuation of the input meets device-adjustment criteria. Providing a lightweight mechanism for a user to obtain a current state of a device attribute without altering the device attribute and allowing the user to directly alter the device attribute by continuing the same input (e.g., with an increase in contact intensity) after seeing the current state of the device attribute enhances the operability of the device and makes the user-device interface more efficient (e.g., by helping the user to provide inputs required to achieve an intended outcome and reducing user mistakes when operating/interacting with the device, and by reducing the number of steps to perform an action), which, additionally, reduces power usage and improves battery life of the device by enabling the user to use the device more quickly and efficiently. In some embodiments, the current state of the device attribute is provided via a tactile output without unnecessarily powering up the display and/or other functions of the device, which further reduces power usage and improves the battery life of the device when the user frequently checks the current state of the device attribute without intending to alter the device attribute.

The method 6000 is performed at an electronic device (e.g., device 300, FIG. 3, or portable multifunction device 100, FIGS. 1A and 4A) with a display (e.g., a display that is disposed on a front-side of the device), and a first input region (e.g., input regions 455, 456, or 457) that is separate from the display (e.g., a depressible button, a solid state button, or a touch-sensitive region that is configured to respond to inputs in place of a button). In some embodiments, the device is a tablet-shaped device that has a flat front-side (e.g., display-side), a flat back-side (e.g., backside), and one or more flat, beveled, or curved peripheral-sides (e.g., four narrow flat faces joined by sharp straight edges, four narrow flat faces joined by rounded edges, or a continuous curved surface) that join the front and back sides, with sharp or rounded edges. In some embodiments, the display is a touch-screen display and the touch-sensitive surface is on or integrated with the display. In some embodiments, the display is separate from the touch-sensitive surface. In some embodiments, the first input region is a touch-sensitive surface that detects intensity of a contact with the touch-sensitive surface, e.g., based on capacitive and/or resistive touch sensing technologies. In some embodiments, the first input region is a touch-sensitive surface that detects presence of a contact and/or pressing of an input object (e.g., a finger) based on force, pressure, and/or vibration sensors coupled to the surface. In some embodiments, the first input region is a surface that is coplanar with the display (e.g., a touch-screen display). In some embodiments, the first input region is a surface (e.g., a protruding region, a recessed region, or a region that is flush with the surrounding surface) that is disposed on a peripheral-side of the device adjacent to the front-side of the device (e.g., a left edge, a right edge, a top edge, or a bottom edge, or along two or more of those edges). In some embodiments, the electronic device further includes one or more first sensors to detect presence and/or intensities of contacts with the display of the device (e.g., capacitive and/or resistive sensors to detect intensities of a contact on the touch-screen display), and one or more second sensors to detect presence and/or intensities of contacts with the first input region of the device, (e.g., capacitive, resistive, pressure, force, and/or vibration sensors to detect presence, activation, and, optionally, intensities of contact with the first input region (e.g., the side "button" region)). In some embodiments, the device further includes one or more tactile output generators for generating tactile outputs (e.g., button actuators for generating localized tactile outputs at the first input region, and/or one or more internal actuators for generating whole-device tactile outputs, etc.). In some embodiments, the method 6000 is governed by instructions that are stored in a computer-readable storage medium (e.g., a non-transitory computer readable storage medium) and that are executed by one or more processors of the electronic device, such as the one or more processors 122 of device 100 (FIGS. 1A and 4A). For ease of explanation, the following describes method 6000 as performed by the device 100. Some operations in method 6000 are, optionally, combined and/or the order of some operations is, optionally, changed.

Figure 6A:
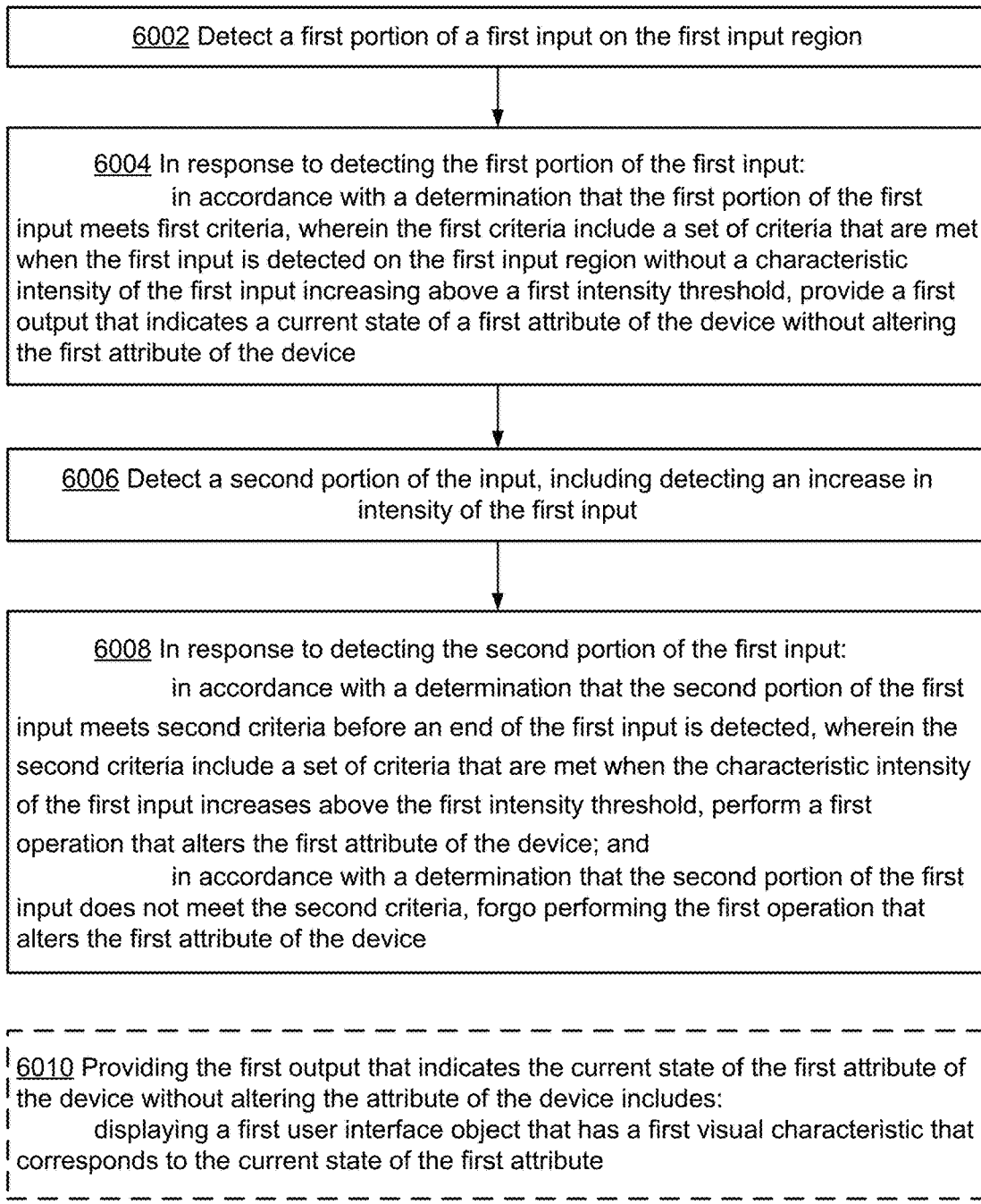

In accordance with method 6000 and with reference to FIG. 6A, the device detects (6002) a first portion of a first input on the first input region (e.g., detecting a contact on the first input region (e.g., detecting touch-down of a contact on the touch-sensitive side button of the device)).

In accordance with method 6000 and with reference to FIG. 6A, in response to detecting the first portion of the first input (6004): in accordance with a determination that the first portion of the first input meets first criteria (e.g., device-query criteria), wherein the first criteria include a set of criteria that are met when the first input is detected on the first input region without a characteristic intensity of the first input increasing above a first intensity threshold (e.g., in accordance with detecting that a characteristic intensity of the contact is above a first intensity threshold (e.g., a contact detection intensity threshold, or a light press intensity threshold that is above the contact detection intensity threshold and below a deep press intensity threshold (or button activation intensity threshold))), the device provides a first output (e.g., displaying a user interface object on the display (e.g., a notification, a volume adjuster, etc.) or providing a tactile output to indicate availability of a new notification without displaying the notification or activating the display) that indicates a current state of a first attribute of the device (e.g., a current volume level, whether the ringer is on, whether there are unread notifications, etc.) without altering the first attribute of the device. This is illustrated in FIGS. 5A1-5A3, where the device provides tactile output 508 to indicate the presence of unread notifications in response to input by contact 506, for example. This is further illustrated in FIG. 5A4, where the device provides tactile output 508 and displays a shaded version of wake screen user interface 501 to indicate the presence of unread notifications in response to input by contact 506, for example. This is further illustrated in FIG. 5B2, where the device displays control 520 and indicator 522 to indicate the current volume level of the device, for example.

In some embodiments, in response to detecting the first portion of the first input by the contact and in accordance with a determination that the first portion of the first input by the contact does not meet the first criteria, the device forgoes providing the first output. For example, when a user rests a finger on the side button or lightly presses on the side button, the display is lit and a user interface object corresponding to the attribute of the device, e.g., a volume control, a ringer control, or a notification summary for unread notifications, is displayed. The attribute of the device has multiple possible states (e.g., discrete configurations, values, and/or statuses, or values in a continuous range of values) that the device can take on in accordance automated device adjustments, triggered by external events, and/or in accordance with user's prior manual adjustments. In some embodiments, the user interface object is optionally an interactive control object that can react to user inputs, e.g., a swipe input or press input to adjust a slider or toggle a button shown on the user interface object. In some embodiments, the user interface object merely displays a visual indication of the state of the attribute. In some embodiments, in addition to or instead of the visual indication of the state of the attribute, the device output a local tactile output at the side button using the local tactile output generators located at the side button, or a whole-device tactile output using the internal actuators located inside of the device. When the first output that indicates the current state of the first attribute of the device, the current state of the first attribute is not altered, e.g., when the volume control is initially displayed in response to the first portion of the input, the volume control shows the current volume level without altering the current volume level; when the ringer control is displayed, the current ringer on/off setting is not altered; when the notification summary is initially displayed, it shows the number of unread notifications and optionally the senders of the notifications without content of the notifications; when a tactile output is generated to indicate that there are one or more unread notifications, the read/unread status of the unread notifications are not altered and the number of unread notifications at the device is not changed. In some embodiments, when the device has at least one unread notification, the device generates a tactile output with a first tactile output pattern (e.g., a double buzz, or a buzz with a tactile output profile that corresponds to the total number of unread notifications) in response to the first portion of the input, and when the device has no unread notification, the device generates no tactile output, or a tactile output with a second tactile output pattern (e.g., a single buzz or a lighter buzz). In some embodiments, the tactile output is generated without activating the display if the display is off at the time that the first portion of the input is detected.

In accordance with method 6000 and with reference to FIG. 6A, the device detects (6006) a second portion of the input, including detecting an increase in intensity of the first input (and optionally, including detecting lift-off of the contact). In accordance with method 6000 and with reference to FIG. 6A, in response to detecting the second portion of the first input (6008): in accordance with a determination that the second portion of the first input meets second criteria (e.g., device-adjustment criteria) before an end of the first input is detected, wherein the second criteria include a set of criteria that are met when the characteristic intensity of the first input increases above the first intensity threshold (e.g., the second criteria are met when the device detects an increase of the characteristic intensity of the first input above the first intensity threshold after presenting the first output and/or while continuing to display the first output), the device performs a first operation that alters the first attribute of the device (e.g., adjusting the current volume, toggling the ringer on/off control, or turning on the display to show the content of the unread notifications (and changing the read/unread status of at least one or all of the unread notifications from "unread" to "read" or changing the presence of unread notifications at the device from YES to NO.), etc.); and in accordance with a determination that the second portion of the first input does not meet the second criteria (e.g., the first input does not meet the second criteria when the characteristic intensity of the contact remains below the first intensity threshold before the end of the first input is detected), the device forgoes performing the first operation that alters the first attribute of the device (and optionally, ceasing to providing the first output, if the first output is still being provided at this time). This is illustrated in FIG. 5A5, for example, where the device displays the unread notifications on wakes screen user interface and changes the unread status of the notifications to read, when the intensity of the press input by contact 506 exceeded the light press intensity threshold $IT_L$. This is further illustrated in FIG. 5B3, where the device increases the volume level when the intensity of the press input by contact exceeded the light press intensity threshold $IT_L$, for example. In some embodiments, the second criteria (e.g., the device-adjustment criteria) are not based on intensity of the contact.). For example, in some embodiments, the first criteria are met when presence of the contact is detected on the first input region, when a light press input is detected on the first input region, or when a tap input is detected on the first input region, and the second criteria are met when a touch-hold input is detected on the first input region. In some embodiments, the second criteria are met by a separate input that is detected after the first criteria are met by the first portion of the first input and, optionally, while the first output is still being provided by the device. For example, when the first criteria are met by a tap input or a light press input and a tactile output is generated to indicate presence of unread notifications without switching the device from a display-off state to a display-on state, a touch-hold input on the side button that is detected after termination of the tap input or light press input meets the second criteria, and causes the device to turn on the display and display the unread notifications.

In accordance with method 6000 and with reference to FIG. 6A, providing the first output that indicates the current state of the first attribute of the device without altering the attribute of the device includes (6010): displaying a first user interface object (e.g., a volume slider control, a ringer toggle control, a brightness slider control) that has a first visual characteristic (e.g., length, width, an indicator position on a slider or dial control, an indicator position on a toggle control, etc.) that corresponds to the current state of the first attribute (e.g., the current volume level, the current brightness level, the current ringer on/off setting, etc.). This is illustrated in FIG. 5A4, where the presence of unread notification is illustrated by the presence of notifications on the darkened wake screen user interface. This is further illustrated in FIG. 5B2, where the control 520 and indicator 522 indicates the current volume level of the device, for example. In some embodiments, the first visual characteristic has a first value when the current state of the first attribute is a first state of multiple possible states of the first attribute, and the first visual characteristic has a second value when the current state of the first attribute is a second state of the multiple possible states that is distinct from the first state. In some embodiments, the display is off before the first input is detected, and the first portion of the first input causes the screen to switch from a display-off state to a display-on state, and the first user interface object to appear on the display (e.g., over the lock screen, or the wake screen, or a dark or blurred screen without other user interface objects. In some embodiments, the current user interface shown on the display is darkened or blurred when the first user interface appears on top of the darkened or blurred user interface. Displaying a user interface object with a first visual characteristic that corresponds to the current state of the first attribute enhances the operability of the device (e.g., by offering visual feedback to reduce user mistakes when operating/interacting with the device), which, additionally, reduces power usage and improves battery life of the device by enabling the user to use the device more quickly and efficiently.

In accordance with method 6000 and with reference to FIG. 6B, providing the first output that indicates the current state of the first attribute of the device without altering the attribute of the device includes (6012): generating a first tactile output (e.g., localized tactile output 508 in FIGS. 5A3 and 5A4) (e.g., a whole-device tactile output produced by an internal actuator of the device, or a localized tactile output that is produced by a tactile output generator (e.g., oscillators) located on/at the side button of the device) that has a first tactile output profile (e.g., amplitudes, frequency, modulating frequency, number of output bursts, characteristics of the accompanying audio outputs, etc.) that corresponds to the current state of the first attribute (e.g., the battery level (e.g., low, medium, high), the presence of unread notifications (present/none, or the count of unread notifications), the presence of unread voicemails (e.g., present/none, or the count of unread voicemails), the ringer on/off state, the mute switch on/off state, etc.). In some embodiments, the device forgoes outputting the first tactile output for a predefined one of multiple possible states of the first attribute (e.g., when the current battery level is high, or when there are no unread notifications at the current time). In some embodiments, each of the multiple possible states of the first attribute has a corresponding tactile output with a respective tactile output profile. In some embodiments, the first tactile output is synchronized with display of the first user interface object on the display. Generating a tactile output with a tactile output profile that corresponds to the current state of the first attribute provides additional information about a state of the device in the absence of or in addition to audio and visual feedback. Providing improved feedback (e.g., with the first tactile output) enhances the operability of the device (e.g., by reducing user mistakes when operating/interacting with the device), which, additionally, reduces power usage and improves battery life of the device by enabling the user to use the device more quickly and efficiently.

In accordance with method 6000 and with reference to FIG. 6B, providing the first tactile output includes (6014): in accordance with a determination that the display is not active when the first portion of the first input is detected, generating the first tactile output without activating the display (e.g., in FIG. 5A3, the display is not activated when tactile output 508 is provided). In some embodiments, the device outputs a predefined tactile output (e.g., a "failure" buzz) when there is no unread notification, and does not turn on the display if the display is not already active when the first portion of the first input is detected. In some embodiments, in accordance with a determination that there is at least one unread notification, the device activates the display to show a badge indicating the count of unread notifications while generating the first tactile output to indicate presence of unread notifications at the device. Providing device attribute information using a tactile output without turning on the display reduces power usage and improves battery life of the device (e.g., by eliminating the need to power up the display each time the user checks the device attribute) and enhances the operability of the device (e.g., by reducing visual distraction caused by displayed information, and improving user privacy by forgoing turning on the display).

In accordance with method 6000 and with reference to FIG. 6B, the device includes (6016) a first tactile output generator that resides locally at the first input region (e.g., a surface oscillator that rocks back and forth around a fixed pivot underneath the first input region or other tactile output generator that is capable of generating tactile outputs that are directed specifically toward the first input region) and that provides localized tactile outputs, including the first tactile output, at the first input region. In some embodiments, the device further includes a second tactile output generator located within the device (e.g., a mass that is moved back and forth around a central rest location) and that provide whole-device tactile outputs that create tactile outputs in many different locations on the device at the same time, such as a tactile output generator that is coupled to a housing of the device. In some embodiments, the internal tactile output generator provides whole-device vibrations that are sensed by the user's hand holding the device. In some embodiments, the whole-device tactile outputs generated by the internal tactile output generator corresponds to visual feedback that is displayed in response to touch-inputs detected on the touch-screen display, as opposed to inputs detected on the side button. In some embodiments, the first tactile output generator provides localized vibrations at the side button region but not the device as a whole. The localized vibrations have varying amplitudes at different locations on the device with greater amplitudes on the side button region where a user's finger will typically rest while operating the side button region and with lower amplitudes at other places outside of the side button region where a user's hand will not typically rest while operating the side button region. In some embodiments, the localized tactile outputs generated by the first tactile output generator corresponds to visual feedback that is displayed in response to inputs detected on the first input region (e.g., the side button). Generating a localized tactile output at the first input region with a localized tactile output generator improves location correlation between the user's input and the haptic feedback received by the user, making the feedback more immediate and intuitive to the user. Providing improved feedback enhances the operability of the device (e.g., by reducing user mistakes when operating/interacting with the device), which, additionally, reduces power usage and improves battery life of the device by enabling the user to use the device more quickly and efficiently.

In accordance with method 6000 and with reference to FIG. 6B, generating a first tactile output that has a first tactile output profile that corresponds to the current state of the first attribute includes (6018): in accordance with a determination that the current state of the first attribute is a first state of multiple possible states of the first attribute (e.g., a normal battery level, a ringer off state, or non-urgent notifications present, a first number of unread notifications, etc.), generating the first tactile output with a first amplitude or first pattern (e.g., first amplitude and/or first frequency, or a first number of repeated outputs); and in accordance with a determination that the current state of the first attribute is a second state (e.g., low battery level, ringer on state, urgent notifications present, a second number of unread notifications, etc.) of the multiple possible states that is distinct from the first state, generating the first tactile output with a second amplitude or second pattern that is distinct from the first amplitude or first pattern (e.g., a higher amplitude than the first amplitude and/or a higher frequency than the first frequency, or a second number of repeated outputs). For example, the amplitude and/or pitch of the tactile output increases with increasing values (or alternatively, decreasing values) of the first attribute (e.g., count of unread notifications or unread voicemails, importance of unread messages, battery drainage level, etc.) In another example, the number of repeated outputs (buzzes) corresponds to the number of unread notifications. Utilizing an amplitude or pattern of the tactile output to convey the current state of the first attribute is a quick and intuitive way to providing information to the user. Providing improved feedback enhances the operability of the device (e.g., by reducing user mistakes when operating/interacting with the device), which, additionally, reduces power usage and improves battery life of the device by enabling the user to use the device more quickly and efficiently.

In accordance with method 6000 and with reference to FIG. 6B, the first portion of the first output is (6020) detected in accordance with outputs of one or more capacitive touch sensors, and the first intensity threshold is based on a capacitance threshold (e.g., as opposed to a threshold physical movement or deformation of the first input region under the touch). Utilizing capacitive touch sensors to determine the intensity of the input and using a capacitance threshold as an intensity threshold enhance the operability of the device (e.g., by making the device easily configurable and adaptable to individual users' usage habit via software means), which, additionally, reduces power usage and improves battery life of the device by enabling the user to use the device more comfortably, quickly, and efficiently.

In accordance with method 6000 and with reference to FIG. 6C, the first portion of the first output is (6022) detected in accordance with outputs of one or more force sensors, and the first intensity threshold is based on a force threshold (e.g., as opposed to a threshold physical movement or deformation of the first input region in the direction of the force input). Utilizing force sensors to determine the intensity of the input and using a force threshold as an intensity threshold enhance the operability of the device (e.g., by making the device easily configurable and adaptable to individual users' usage habit via software means), which, additionally, reduces power usage and improves battery life of the device by enabling the user to use the device more comfortably, quickly, and efficiently.

In accordance with method 6000 and with reference to FIG. 6C, the first criteria further include (6024) a set of criteria that are met when the first input is detected on the first input region for more than a threshold amount of time (e.g., with less than a threshold amount of movement across the first input region). Utilizing a time threshold as a condition for an input meeting the criteria for querying the device for the current state of the device attribute enhances the operability of the device and makes the user-device interface more efficient (e.g., by avoiding accidental triggering of the device's response, and reducing user mistakes when operating/interacting with the device), which, additionally, reduces power usage and improves battery life of the device by enabling the user to use the device more comfortably, quickly, and efficiently.

In accordance with method 6000 and with reference to FIG. 6C, detecting the second portion of the first input includes detecting termination of the first input (e.g., including detecting lift-off of the contact from the side button (e.g., the intensity of contact falls below a predefined contact detection threshold)), and wherein the method includes (6026): in response to detecting the termination of the first input and in accordance with a determination that the second portion of the first input does not meet the second criteria before the termination of the first input: ceasing to provide the first output that indicates the current state of the first attribute of the device. For example, providing the first output includes displaying a first user interface object on the display (e.g., after first switching on the display), and ceasing to provide the first output includes ceasing to display the first user interface object (and, optionally, restore the original user interface that was displayed before the first portion of the first input, or turning off the display if the display was switched on). Automatically ceasing to provide the output that indicates the current state of the first attribute when the input terminates without meeting the device-adjustment criteria enhances the operability of the device and makes the user-device interface more efficient (e.g., by reducing the number of inputs required to achieve an intended outcome), which, additionally, reduces power usage and improves battery life of the device by enabling the user to use the device more quickly and efficiently.

In accordance with method 6000 and with reference to FIG. 6C, the first attribute of the device includes (6028) a presence/absence of unread notifications at the device. Providing the output that indicates the current state of the first attribute without altering the first attribute of the device includes displaying an indicator of the unread notifications (e.g., displaying a badge with a numerical count of the unread notifications, or forgoing display of the badge or displaying a different indicator to indicate absence of unread notifications at the device). Performing the first operation that alters the first attribute of the device includes: displaying content (e.g., expanded notification showing full content of text message) of at least one of the unread notifications (e.g., displaying a listing of the unread notifications with sender name and a summary or excerpt from the notifications); and changing a read/unread status of at least one of the unread notifications (e.g., from "unread" to "read"). This is illustrated in FIGS. 5A1-5A8, for example. In some embodiments, providing the output that indicates the current state of the first attribute without altering the first attribute of the device includes providing a tactile output indicating presence/count of the unread notification without altering the read/unread statuses of the unread notifications and without activating the display of the device, and performing the first operation includes activating the display, displaying content from at least one of the unread notifications, and changing the read/unread status of the at least one of the unread notifications. The heuristic for displaying an indicator of presence/absence of unread notifications without altering the read/unread attribute of the notifications in response to a first portion of the input that meets first criteria, and displaying content and changing the read/unread status of at least one of the notifications in response to a second portion of the input that meets second criteria, enhances the operability of the device and makes the user-device interface more efficient (e.g., by reducing the number of inputs required to achieve an intended result) which, additionally reduces power usage and improves battery life of the device by enabling the user to use the device more quickly and efficiently.

In accordance with method 6000 and with reference to FIG. 6D, the first attribute of the device includes (6030) an adjustable control (e.g., a volume setting, a ringer on/off setting, a mute/unmute setting, a brightness setting, etc.) at the device. Providing the output that indicates the current state of the first attribute without altering the first attribute of the device includes displaying a control object corresponding to the adjustable control, wherein the control object includes an indicator of a current value of the adjustable control (e.g., a volume slider control that shows the current volume level, a ringer toggle control that shows the current on/off setting of the ringer, a mute/unmute toggle control that shows the current mute/unmute state of the control, a brightness dial control that shows the current brightness level, etc.). Performing the first operation that alters the first attribute of the device includes changing the current value of the adjustable control. This is illustrated in FIGS. 5B1-5B7, for example. In some embodiments, the first input region includes two or more sub-regions, and a direction of change in the current value of the adjustable control is based on which of the two or more sub-regions are touched. For example, if an upper portion of the first input region is touched, the value is increased; and if the lower portion of the first input region, the value of is decreased. The heuristic for displaying a control object with an indicator of a current value of the control without altering the current value of the control in response to a first portion of the input that meets first criteria, and changing the current value of the control in response to a second portion of the input that meets second criteria, enhances the operability of the device and makes the user-device interface more efficient (e.g., by reducing the number of inputs required to achieve an intended result) which, additionally reduces power usage and improves battery life of the device by enabling the user to use the device more quickly and efficiently.

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 7000, 8000, 9000, 10000, 11000, and 12000) are also applicable in an analogous manner to method 6000 described above with respect to FIGS. 6A-6D. For example, the contacts, gestures, user interface objects, tactile outputs, audio outputs, intensity thresholds, time thresholds, focus selectors, and animations described above with reference to method 6000 optionally have one or more of the characteristics of the contacts, gestures, user interface objects, tactile outputs, audio outputs, intensity thresholds, time thresholds, focus selectors, and animations described herein with reference to other methods described herein (e.g., methods 7000, 8000, 9000, 10000, 11000, and 12000). For brevity, these details are not repeated here.

FIGS. 7A-7E are flow diagrams illustrating a method 7000 of presenting and interacting with a retractable menu in accordance with some embodiments.

Method 7000 relates to displaying a precursor (e.g., a visual indicator) of a user interface object with multiple selectable options (e.g., a menu) in response to a first portion of a touch input (e.g., with a low intensity) detected on an off-screen input region, and revealing the user interface object by a varying amount that corresponds to varying intensity of the touch input during a second portion of the touch input once the intensity of the input has increased above an intensity threshold. Displaying the precursor object before the intensity reaches the intensity threshold and revealing varying amount of the user interface object in accordance with the varying intensity of the input enhance the operability of the device and make the user-device interface more efficient (e.g., by providing dynamic visual feedback that directly corresponds to the intensity of the user's input, and helping the user to provide inputs required to achieve an intended outcome and reducing user mistakes when operating/interacting with the device), which, additionally, reduces power usage and improves battery life of the device by enabling the user to use the device more quickly and efficiently.

The method 7000 is performed at an electronic device (e.g., device 300, FIG. 3, or portable multifunction device 100, FIGS. 1A and 4A) with a display (e.g., a display that is disposed on a front-side of the device), and a first input region (e.g., input region 455, 456, or 457) that is separate from the display (e.g., a depressible button, a solid state button, or a touch-sensitive region that is configured to respond to inputs in place of a button). In some embodiments, the first input region is a touch-sensitive surface that detects intensity of a contact with the touch-sensitive surface, e.g., based on capacitive and/or resistive touch sensing technologies. In some embodiments, the first input region is a touch-sensitive surface that detects presence of a contact and/or pressing of an input object (e.g., a finger) based on force, pressure, and/or vibration sensors coupled to the surface. In some embodiments, the first input region is a surface that is coplanar with the display (e.g., a touch-screen display). In some embodiments, the first input region is a surface (e.g., a protruding region, a recessed region, or a region that is flush with the surrounding surface) that is disposed on a peripheral-side of the device adjacent to the front-side of the device (e.g., a left edge, a right edge, a top edge, or a bottom edge, or along two or more of those edges). In some embodiments, the electronic device further includes one or more first sensors to detect presence and/or intensities of contacts with the display of the device (e.g., capacitive and/or resistive sensors to detect intensities of a contact on the touch-screen display), and one or more second sensors to detect presence and/or intensities of contacts with the first input region of the device, (e.g., capacitive, resistive, pressure, force, and/or vibration sensors to detect presence, activation, and, optionally, intensities of contact with the first input region (e.g., the side "button" region)). In some embodiments, the device further includes one or more tactile output generators for generating tactile outputs (e.g., button actuators for generating localized tactile outputs at the first input region, and/or one or more internal actuators for generating whole-device tactile outputs, etc.).

In accordance with method 7000 and with reference to FIG. 7A, the device detects (7002) a first portion of a first input on the first input region (e.g., detecting a contact on the first input region (e.g., detecting touch-down of a contact on the touch-sensitive side button of the device)). This is illustrated in FIG. 5C2, where an input by contact 552 is detected on input region 455. This is further illustrated in FIG. 5D3, where an input by contact 585 is detected on input region 455.

In accordance with method 7000 and with reference to FIG. 7A, in response to detecting the first portion of the first input on the first input region: in accordance with a determination that the first portion of the first input meets first criteria (e.g., preview-display criteria), wherein the first criteria include a set of criteria that are met when the first input is detected on the first input region without a characteristic intensity of the first input increasing above a first intensity threshold (e.g., in accordance with detecting that a characteristic intensity of the contact is above a first intensity threshold (e.g., a contact detection intensity threshold, a light press intensity threshold (or preview intensity threshold) that is above the contact detection intensity threshold and below a deep press intensity threshold (or button activation intensity threshold))), the device displays (7004), on the display, a precursor object (e.g., precursor object 554 in FIG. 5C2 and precursor object 583 in FIG. 5D3) (e.g., a preview or an indicator that does not include selectable options) of a user interface object that includes one or more selectable options (e.g., a menu with two or more selectable options, a clipboard for storing one or more copied objects, etc.). In some embodiments, in response to detecting the first portion of the first input and in accordance with a determination that the first portion of the first input does not meet the first criteria, the device forgoes displaying the precursor object. In some embodiments, the display is off before the first portion of the first input is detected, and the display is turned on in response to the first portion of the first input being detected and in accordance with the determination that the first criteria are met by the first portion of the first input. In some embodiments, the first portion of the first input is detected while a wake screen user interface or a lock screen user interface is shown on the display. In some embodiments, the first portion of the first input is detected while a home screen or springboard user interface is shown on the display. A home screen or springboard user interface displays application launch icons corresponding to different applications installed on the device. When a respective application launch icon on the home screen is activated (e.g., by a tap input), the device launches the application that corresponds to the respective application launch icon. The home screen or springboard user interface replaces a currently displayed user interface when a home button (e.g., hardware, solid state, or virtual home button) of the device is activated (e.g., by a press input), or when a predefined home gesture (e.g., an upward swipe gesture that start from the bottom edge of the touch-screen) is detected. The home screen or springboard user interface optionally includes multiple pages each including respective application launch icons for a respective subset of all applications installed on the device. In some embodiments, in additional to a home screen user interface, the device also provides a mini application object user interface which includes mini application objects (e.g., widgets, plug-ins) corresponding to a selected subset of all applications installed on the device. The mini application objects, distinct from application launch icons, each provide a subset of content and/or functions available in their corresponding full applications, and optionally launch the corresponding full applications when activated in a preset manner (e.g., by a tap input). In some embodiments, the first portion of the first input is detected while a user interface of an application is shown on the display. In some embodiments, the precursor object has the same appearance regardless of what was being shown on the display when the first portion of the first input was detected.

In accordance with method 7000 and with reference to FIG. 7A, while displaying the precursor object (e.g., precursor object 554 in FIG. 5C2 and precursor object 583 in FIG. 5D3) on the display, the device detects (7006) a second portion of the first input on first input region (e.g., input by contact 552 in FIGS. 5C3-5C4, and input by contact 579 in FIGS. 5D4-5D5), including detecting an increase in intensity of the first input above the first intensity threshold (e.g., the first portion and the second portion of the first input are provided by the same contact on the first input region with the contact being maintained throughout the first and second portion of the first input).

In accordance with method 7000 and with reference to FIG. 7A, in response to detecting the increase in intensity of the first input during the second portion of the first input, the device reveals (7008) the user interface object on the display by an amount that varies in accordance with a current intensity of the first input. This is illustrated in FIGS. 5C3-5C5 and FIGS. 5D4-5D6, for example, where the menus 556 and 577 are revealed by a respective amount that is dynamically changed in accordance with a current intensity of the input on input region 455. In some embodiments, as the intensity of the contact increases on the first input region (e.g., the side button), the first user interface object (e.g., a menu, a clipboard) slides gradually onto the display from the edge of the display that is adjacent to the first input region (e.g., the side button). In some embodiments, as the intensity of the first contact increases on the first input region (e.g., the side button), the first user interface object (e.g., the menu or the clipboard) fades in gradually onto the display. In some embodiments, the amount by which the user interface object is visible on the display is variable as the intensity of the contact varies (e.g., increases and/or decreases) before reaching a second intensity threshold that is greater than the first intensity threshold. Once the intensity of the contact increases above a second intensity threshold, the user interface object is fully displayed. In some embodiments, the direction in which the user interface slides onto the display is the same as or parallel to the direction of the force/pressure exerted by the finger on the first input region during the second portion of the first input.

In accordance with method 7000 and with reference to FIG. 7A, after detecting the second portion of the first input, the device detects (7010) a third portion of the first input on the first input region, including detecting a continued increase in intensity of the first input (e.g., while a portion of the user interface object is revealed in response to the second portion of the first input). In response to detecting the continued increase in intensity of the first input: in accordance with a determination that the third portion of the first input meets second criteria, wherein the second criteria include a set of criteria that are met when a characteristic intensity of the first input increases above a second intensity threshold that is greater than the first intensity threshold (e.g., in accordance with a determination that the characteristic intensity of the contact increases above a second intensity threshold that is higher than the first intensity threshold, and optionally, in accordance with a determination that the first contact is maintained substantially stationary (e.g., touch-hold with less than a threshold amount of movement) for more than a threshold amount of time (e.g., a long-press time threshold) after the first contact is detected) before an end of the first input is detected (e.g., detecting an end of the first input includes detecting a release input such as a liftoff of the contact from the first input region or detecting a decrease in a characteristic intensity of the contact that decreases below a release intensity threshold): the device displays the user interface object that includes the one or more selectable options on the display (e.g., the menu or clipboard snaps open when the second criteria are met, and remains displayed in the fully open state after the intensity of the first input decreases and the first input eventually terminates). This is illustrated in FIG. 5C6 and FIG. 5D17, where menus 556 and 577 are fully opened and remain displayed when the intensity of the input on input region 455 exceeded the light press intensity threshold. In some embodiments, in accordance with a determination that the third portion of the first input does not meet the second criteria (e.g., in accordance with a determination that the characteristic intensity of the contact remains below the second intensity threshold before the end of the first input is detected), the device forgoes fully displaying the user interface object (and ceases to display the precursor object of the user interface object and any currently revealed portion of the user interface object upon termination of the first input). Displaying the menu after the intensity of the input increases above the second intensity threshold enhances the operability of the device and makes the user-device interface more efficient (e.g., by helping the user to provide inputs required to achieve an intended outcome, and by reducing the number of inputs required to achieve an intended outcome) which, additionally reduces power usage and improves battery life of the device by enabling the user to use the device more quickly and efficiently.

In accordance with method 7000 and with reference to FIG. 7B, after detecting the third portion of the first input, the device detects (7012) a fourth portion of the first input on the first input region, including detecting a decrease in intensity of the first input (e.g., detecting the intensity of the first input decreases to or below the first intensity threshold or detecting lift-off of the contact): in accordance with a determination that the second criteria were met before detecting the fourth portion of the first input (e.g., the second criteria were met by the third portion of the first input), the device maintains display of the user interface object (e.g., as shown in FIG. 5D17) without altering an amount by which the user interface object is currently displayed (e.g., menu or clipboard remains fully open); and in accordance with a determination that the second criteria were not met before detecting the fourth portion of the first input (e.g., the second criteria were not met by the third portion of the first input), the device decreases an amount by which the user interface object is revealed on the display in accordance with a current intensity of the first input (and optionally, ceasing to display the user interface object (e.g., as shown in FIG. 5D9) when the current intensity of the first input drops below the first intensity threshold). Maintaining display of the menu or decreasing the amount by which the menu is revealed in accordance with a reduction of intensity of the input, depending on whether the second criteria have been met by earlier portions of the input, enhances the operability of the device and makes the user-device interface more efficient (e.g., by reducing the number of inputs required to achieve an intended outcome) which, additionally reduces power usage and improves battery life of the device by enabling the user to use the device more quickly and efficiently.

In accordance with method 7000 and with reference to FIG. 7B, in response to detecting the continued increase in intensity of the first input: in accordance with a determination that the third portion of the first input meets the second criteria: the device generates (7014) a first tactile output (e.g., a whole-device tactile output produced by an internal actuator of the device, or a localized tactile output that is produced by a tactile output generator (e.g., oscillators) located on/at the side button of the device) (e.g., a tactile output that has a first tactile output profile (e.g., amplitudes, frequency, modulating frequency, number of output bursts, characteristics of the accompanying audio outputs, etc.) (e.g., a tactile output that is synchronized with the full display of the user interface object when the second criteria are met). This is illustrated in FIG. 5C6 and FIG. 5D17, for example, where the device generates tactile outputs 566 and 553, respectively, when the menus 556 and 577 snapped open in response to the light press input detected on input region 455. Generating a tactile output in response to satisfaction of the second criteria (which also leads to full display of the menu) enhances the operability of the device and makes the user-device interface more efficient (e.g., by providing improved feedback and reducing user mistakes when operating/interacting with the device) which, additionally reduces power usage and improves battery life of the device by enabling the user to use the device more quickly and efficiently.

In accordance with method 7000 and with reference to FIG. 7B, the device includes (7016) a first tactile output generator that resides locally at the first input region and that provides localized tactile outputs, including the first tactile output, at the first input region. For example, the first tactile output generator is a surface oscillator that rocks back and forth around a fixed pivot underneath the first input region or other tactile output generator that is capable of generating tactile outputs that are directed specifically toward the first input region. In some embodiments, the device further includes a second tactile output generator located within the device (e.g., a mass that is moved back and forth around a central rest location) that creates tactile outputs in many different locations on the device at the same time, such as a tactile output generator that is coupled to a housing of the device. In some embodiments, the internal tactile output generator provides whole-device vibrations that are sensed by the user's hand holding the device. In some embodiments, the whole-device tactile outputs generated by the internal tactile output generator corresponds to visual feedback that is displayed in response to touch-inputs detected on the touch-screen display, as opposed to inputs detected on the side button. In some embodiments, the first tactile output generator provides localized vibrations at the side button region but not the device as a whole. The localized vibrations have varying amplitudes at different locations on the device with greater amplitudes on the side button region where a user's finger will typically rest while operating the side button region and with lower amplitudes at other places outside of the side button region where a user's hand will not typically rest while operating the side button region. In some embodiments, the localized tactile outputs generated by the first tactile output generator corresponds to visual feedback that is displayed in response to inputs detected on the first input region (e.g., the side button).} {Providing a localized tactile output at the first input region in response to satisfaction of the second criteria by an input detected on the first input region enhances the operability of the device and makes the user-device interface more efficient (e.g., by providing improved feedback and reducing user mistakes when operating/interacting with the device) which, additionally reduces power usage and improves battery life of the device by enabling the user to use the device more quickly and efficiently.

In accordance with method 7000 and with reference to FIG. 7B, the generation of the first tactile output is (7018) synchronized with satisfaction of the second criteria by the first input. Synchronizing generation of the localized tactile output at the first input region with satisfaction of the second criteria by an input detected on the first input region enhances the operability of the device and makes the user-device interface more efficient (e.g., by providing improved feedback and reducing user mistakes when operating/interacting with the device) which, additionally reduces power usage and improves battery life of the device by enabling the user to use the device more quickly and efficiently.

In accordance with method 7000 and with reference to FIG. 7B, the generation of the first tactile output is (7020) synchronized with initial full-display of the user interface object on the display. Synchronizing generation of the first tactile output with full-display of the user interface object on the display after satisfaction of the second criteria by the input enhances the operability of the device and makes the user-device interface more efficient (e.g., by providing improved feedback and reducing user mistakes when operating/interacting with the device) which, additionally reduces power usage and improves battery life of the device by enabling the user to use the device more quickly and efficiently.

In accordance with method 7000 and with reference to FIG. 7C, the device includes (7022) a touch-sensitive surface that is distinct from the first input region (e.g., the touch-sensitive surface is integrated with the display in a touch-screen display). The method 7000 includes: while displaying the user interface object including the one or more selectable options on the display (e.g., while the user interface object is partially and/or fully revealed on the display), detecting a second input on the touch-sensitive surface (e.g., a touch input by a contact that is distinct from the contact on the first input region in the first input) at a location that corresponds to a first selectable option of the one or more selectable options in the user interface object; and in response to detecting the second input: in accordance with a determination that the second input meets selection criteria (e.g., the selection criteria are met by a tap input on the first selectable option), selecting the first selectable option (e.g., visually indicating selection of the first selectable option by highlighting the first selectable option relative to other selectable options in the user interface object). This is illustrated in FIG. 5D13, where thumbnail image 571 is selected by contact 563. In addition, options in menu 556 is selectable by tap input. After the menu is displayed in response to an input detected on the off-screen input region, another input detected on the touch-sensitive surface (e.g., the touch screen) is used to select an icon on the menu. Allowing selection of a selectable option on the menu using a touch-sensitive surface distinct from the input region enhances the operability of the device and makes the user-device interface more efficient (e.g., by allowing user to interact with the device with multiple input interfaces (e.g., without shuffling the device between two hands or adjusting the hand grip) and reducing user mistakes when operating/interacting with the device) which, additionally reduces power usage and improves battery life of the device by enabling the user to use the device more quickly and efficiently.

In accordance with method 7000 and with reference to FIG. 7C, in response to detecting the second input: in accordance with a determination that the second input meets selection-confirmation criteria (e.g., detecting the second input further includes detecting lift-off of the contact in the second input from the touch-sensitive surface (e.g., the touch-screen display) from the location that corresponds to the first selectable option), the device performs (7024) a first operation that corresponds to the first selectable option. This is illustrated in FIGS. 5C8 and 5C9, where the Do Not Disturb function in menu 556 is activated by a tap input on option 558, for example. In some embodiments the selection-confirmation criteria are met with respect to the first selectable option by a tap input on the first selectable option. In another example, a swipe input across multiple selectable options changes the currently selectable option, and the finally selected option is activated upon lift-off of the contact from the touch-screen display. In some embodiments, the user interface object is a listing of payment cards, and tapping on a first payment card in the listing of payment cards or lifting-off while the first payment card is selected causes the first payment card to be selected for a payment transaction. In another example, the user interface object is a menu of power-related functions, including shutdown, restart, sleep, turn-off display, turn on low-power mode, etc., and tapping on a first power-related function in the menu or lifting-off while the first power-related function is selected causes the corresponding power-related function to be turned on. Performing an operation that corresponds to a selected option after lift-off of the input that selected the option enhances the operability of the device and makes the user-device interface more efficient (e.g., by reducing the number of inputs required to achieve an intended result)

which, additionally reduces power usage and improves battery life of the device by enabling the user to use the device more quickly and efficiently.

In accordance with method 7000 and with reference to FIG. 7C, in response to detecting the second input: in accordance with a determination that the second input meets drag criteria (e.g., the drag criteria are met by a selection of the first selectable option followed by movement of the first selectable option by a tap-hold input on the first selectable option followed by a drag input), the device displays (7026) a representation of the first selectable option outside of the user interface object (e.g., at a location on the display that corresponds to a current location of the contact on the touch-sensitive surface.). This is illustrated in FIGS. 5D13-5D15, where image 571 is dragged from menu 577 and dropped in user interface 567, for example. In some embodiments, the user interface object is a listing of visual effects or filters, and dragging a first visual effect or filter away from the user interface object to a portion of the user interface outside of the user interface object shows a preview of effect of the visual effect or filter (e.g., a preview of a saturation filter on a currently displayed image), or applies the visual effect or filter to a portion of a displayed image (e.g., a magnifier object magnifies a portion of the displayed image that corresponds to a location of the contact on the display, or a blur object blurs a portion of the displayed image that corresponds to the location of the contact on the display). In another example, a representation of the first selectable option is an insertion cursor that indicates where the first selectable option will be inserted if lift-off of the contact with the touch-screen is detected. Dragging the selected option out of the user interface object in accordance with a determination that the input that selected the option also meets drag criteria enhances the operability of the device and makes the user-device interface more efficient (e.g., by reducing the number of user inputs required to achieve an intended result) which, additionally reduces power usage and improves battery life of the device by enabling the user to use the device more quickly and efficiently.

In accordance with method 7000 and with reference to FIG. 7C, in response to detecting the second input: in accordance with a determination that the second input meets drop criteria (e.g., the drop criteria are met by a release of the contact that is detected after a tap-hold input on the first selectable option followed by a drag input), the device displays (7028) a copy of the first selectable option outside of the user interface object. This is illustrated in FIGS. 5D13-5D15, where image 571 is dragged from menu 577 and dropped in user interface 567, for example. In some embodiments, the user interface object is a clipboard including one or more copied objects (e.g., images, links, text, etc.). When a first object is dragged out of the user interface object by a touch-hold input followed by a drag input, an insertion cursor or icon that indicates where the first object will be inserted is shown on the user interface, and when lift-off of the contact is detected and drop criteria are met, a copy of the first object is displayed in the user interface at a final location indicated by the insertion cursor or icon. After the selected option is dragged out of the user interface object in accordance with a determination that the input that selected the option also meets drag criteria, a copy of the selected option (e.g., an image or item) is dropped at a location outside of the user interface object in accordance with a determination that the input also meets drop criteria. The dropping of the selected option when the input meets drop criteria enhances the operability of the device and makes the user-device interface more efficient (e.g., by reducing the number of user inputs required to achieve an intended result) which, additionally reduces power usage and improves battery life of the device by enabling the user to use the device more quickly and efficiently.

In accordance with method 7000 and with reference to FIG. 7C, the second input is detected (7030) while the user interface object is partially revealed on the display, without the second criteria being met by the first input. This is illustrated in FIG. 5D13, where image 563 is selected before menu 577 is fully open. In some embodiments, objects in the menu are selectable before the menu is fully opened (e.g., the user can select or drag an object from the menu when the menu is only partially on the display). In some embodiments, objects in the menu are not selectable before the menu is fully opened. For example, for clipboard, the objects are not selectable before the clipboard is fully open because the user needs to be able to see the stored objects fully before making a correct selection. In contrast, for the menu of power-related functions, the functions are selectable before the menu is fully open, because the menu is relatively fixed and users are familiar with the functions. Making the selectable options selectable before the user interface object is fully revealed enhances the operability of the device and makes the user-device interface more efficient (e.g., by reducing the time and the number of user inputs required to achieve an intended result) which, additionally reduces power usage and improves battery life of the device by enabling the user to use the device more quickly and efficiently.

In accordance with method 7000 and with reference to FIG. 7D, while displaying the user interface object including the one or more selectable options on the display (e.g., while the user interface object is partially and/or fully revealed on the display), the device detects (7032) a third input on the first input region (e.g., a touch input by a contact that is distinct from the contact on the first input region in the first input, or a touch input by a contact that is the same continuous contact as the contact on the first input region in the first input), wherein the third input includes movement of a contact across the first input region (e.g., a movement in a direction along a longitudinal direction of the first input region (e.g., vertically upward or downward)). In response to detecting the third input, the device scrolls a selection indicator (e.g., selection indicator 568 in FIGS. 5C10-5C12) through the one or more selectable options on the display in accordance with the movement of the contact in the third input (e.g., scroll the selection indicator downward through the listing of selectable options in the menu or clipboard when the movement is a downward swipe along the first input region, and scroll the selection indicator upward through the listing of selectable options in the menu or clipboard when the movement is an upward swipe along the first input region). This is illustrated, for example, in FIGS. 5C10-5C12, where a selection indicator is moved through selectable options in menu 556 in response to swipe input by contact 564 detected on input region 455. In some embodiments, the menu becomes scrollable through a swipe input on the first input region after the menu is fully open (e.g., in response to a press input on the first input region). Scrolling a selection indicator through the selectable options in the user interface object in response to a swipe input across the first input region after the user interface object is fully displayed in response to a press input on the first input region enhances the operability of the device and makes the user-device interface more efficient (e.g., by reducing the number of selectable options concurrently displayed on screen, and providing additional selectable options without cluttering the user interface) which, additionally reduces power usage and improves battery life of the device by enabling the user to use the device more quickly and efficiently.

In accordance with method 7000 and with reference to FIG. 7D, while the selection indicator is moved to a first selectable option of the one or more selectable options on the display in accordance with the movement of the contact in the third input on the first input region, the device detects (7034) a fourth input on the first input region that meets selection-confirmation criteria (e.g., the selection-confirmation criteria are met when lift-off of the contact on the first input region is detected, or when an increase in a characteristic intensity of the contact on the first input region above a predefined confirmation intensity threshold (e.g., the second intensity threshold) is detected). In some embodiments, the selection-confirmation criteria are met by detecting a press input by a contact followed by detecting lift-off of the contact from the first input region. This is illustrated in FIG. 5C13, for example. In some embodiments, the selection-confirmation criteria are met by detecting a contact followed by detecting lift-off of the contact from the first input region without requiring the characteristic intensity of the contact to increase above the predefined confirmation intensity threshold first. In response detecting the fourth input that meets the selection-confirmation criteria, the device performs an operation corresponding to the first selectable options (e.g., if the first selectable option is a filter, apply the filter to a currently displayed image. If the first selectable option is a power-related function for shutting down the device, start a process to shut down the device. If the first selectable option is a music track, starting playback of the music track, etc.). Performing an operation that corresponds to a currently selected option in response to a selection confirmation input (e.g., a press input or lift-off of the press input) on the first input region enhances the operability of the device and makes the user-device interface more efficient (e.g., by reducing user mistakes when operating/interacting with the device) which, additionally reduces power usage and improves battery life of the device by enabling the user to use the device more quickly and efficiently.

In accordance with method 7000 and with reference to FIG. 7D, the device includes (7036) a touch-sensitive surface that is distinct from the first input region (e.g., the touch-sensitive surface is integrated with the display in a touch-screen display). The method 7000 includes: while displaying the user interface object including the one or more selectable options on the display (e.g., while the user interface object is partially and/or fully revealed on the display), detecting a fifth input on the touch-sensitive surface, including: detecting touch-down of a contact on the touch-sensitive surface (e.g., a touch input by a contact that is distinct from the contact on the first input region in the first input) at a location that corresponds to a second user interface object that is displayed outside of the user interface object, detecting movement of the contract across the touch-sensitive surface to a location within the user interface object (e.g., the fifth input is a drag gesture that drags the second user interface object from outside of the menu or clipboard to the menu or clipboard), and detecting lift-off of the contact from the touch-sensitive surface while the second user interface is within the user interface object. In response to detecting the fifth input, the device adds the second user interface object as a new selectable option in the user interface object. This is illustrated in FIGS. 5D5-5D8, where image 571 is added to menu 577 in response to input by contact 575. Allowing selection an object from outside of the user interface object (e.g., a menu or clipboard), dragging the selected object into the user interface object, and adding the selected object into the user interface object as a new selectable option in the user interface object, in response to an input (e.g., a touch-drag-drop input) on the touch-sensitive surface (e.g., a touch-screen) that is distinct from the first input region, enhances the operability of the device and makes the user-device interface more efficient (e.g., by reducing the number of inputs required to achieve an intended result) which, additionally reduces power usage and improves battery life of the device by enabling the user to use the device more quickly and efficiently.

In accordance with method 7000 and with reference to FIG. 7E, the device includes (7038) a touch-sensitive surface that is distinct from the first input region (e.g., the touch-sensitive surface is integrated with the display in a touch-screen display). The method 7000 includes: while displaying the user interface object including the one or more selectable options on the display (e.g., while the user interface object is partially and/or fully revealed on the display), detecting a sixth input on the touch-sensitive surface, including: detecting touch-down of a contact on the touch-sensitive surface (e.g., a touch input by a contact that is distinct from the contact on the first input region in the first input) at a location that corresponds to a respective selectable option that is displayed within the user interface object, detecting movement of the contract across the touch-sensitive surface to a location outside of the user interface object (e.g., the sixth input is a drag gesture that drags the respective selectable option from within the menu or clipboard to outside of the menu or clipboard), and detecting lift-off of the contact from the touch-sensitive surface while the respective selectable option is dragged outside of the user interface object. In response to detecting the sixth input, the device removes the respective selectable option from the user interface object (e.g., deleted from the user interface object (e.g., dropped onto the user interface outside of the user interface object when the input meets object-move criteria, or cleared without being dropped onto the user interface outside of the user interface object when the input meets object-deletion criteria)). This is illustrated, for example, in FIGS. 5D20-5D22, where image 541 is removed from menu 577 in response to input by contact 543. Dragging a selectable option out of the user interface object to remove or delete it from the user interface object in response to an input (e.g., a touch-drag-drop input) on the touch-sensitive surface (e.g., a touch-screen) that is distinct from the first input region enhances the operability of the device and makes the user-device interface more efficient (e.g., by reducing the number of inputs required to achieve an intended result) which, additionally reduces power usage and improves battery life of the device by enabling the user to use the device more quickly and efficiently.

It should be understood that the particular order in which the operations in FIGS. 7A-7E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000, 8000, 9000, 10000, 11000, and 12000) are also applicable in an analogous manner to method 7000 described above with respect to FIGS. 7A-7E. For example, the contacts, gestures, user interface objects, tactile outputs, audio outputs, intensity thresholds, time thresholds, focus selectors, and animations described above with reference to method 7000 optionally have one or more of the characteristics of the contacts, gestures, user interface objects, tactile outputs, audio outputs, intensity thresholds, time thresholds, focus selectors, and animations described herein with reference to other methods described herein (e.g., methods 6000, 8000, 9000, 10000, 11000, and 12000). For brevity, these details are not repeated here.

FIGS. 8A-8D are flow diagrams illustrating a method 8000 of modifying a device parameter in different manners in accordance with some embodiments.

Method 8000 relates to modifying a parameter of the device in one of two distinct manners (e.g., a first manner and a second manner distinct from the first manner) in response to a press input on an off-display input region (e.g., a side button region) in accordance with whether the input is detected on a first sub-region or a second sub-region of the input region. Modifying the parameter in different manners in accordance with a determination of which one of two sub-regions of the input region is activated by the press input enhances the operability of the device and makes the user-device interface more efficient (e.g., by reducing number of inputs required to achieve an intended result), which, additionally, reduces power usage and improves battery life of the device by enabling the user to use the device more quickly and efficiently. In addition, forgoing modifying the parameter in the different manners in accordance with a determination of the input on the input region did not meet the intensity threshold (e.g., the input is not a press input) enhances the operability of the device and makes the user-device interface more efficient (e.g., by reducing user mistakes when operating/interacting with the device), which, additionally, reduces power usage and improves battery life of the device by enabling the user to use the device more quickly and efficiently.

The method 8000 is performed an electronic device (e.g., device 300, FIG. 3, or portable multifunction device 100, FIGS. 1A and 4A) with a display, and an input region that is distinct from the display and includes a first sub-region (e.g., upper input region 456 on the left side of the device 100) and a second sub-region (e.g., lower input region 457 on the left side of the device 100) (e.g., the input region is a depressible button, a solid state button, or a touch-sensitive region that is configured to respond to inputs in place of a button, and the first sub-region and the second sub-region are an upper region and a lower region of the input region). In some embodiments, the first sub-region and the second sub-region are continuous and connected to each other. In some embodiments, the first sub-region and the second sub-region are separate and discrete from each other. In some embodiments, the first sub-region and the second sub-region are configured to move independently of each other and/or have sensors to detect inputs independently of each other. In some embodiments, the first input region (and, optionally, each of its sub-regions) is a touch-sensitive surface that detects intensity of a contact with the touch-sensitive surface, e.g., based on capacitive and/or resistive touch sensing technologies. In some embodiments, the first input region (and, optionally, each of its sub-regions) is a touch-sensitive surface that detects presence of a contact and/or pressing of an input object (e.g., a finger) based on force, pressure, and/or vibration sensors coupled to the surface. In some embodiments, the first input region (and, optionally, each of its sub-regions) is a surface that is coplanar with the display (e.g., a touch-screen display). In some embodiments, the first input region (and, optionally, each of its sub-regions) is a surface (e.g., a protruding region, a recessed region, or a region that is flush with the surrounding surface) that is disposed on a peripheral-side of the device adjacent to the front-side of the device (e.g., a left edge, a right edge, a top edge, or a bottom edge, or along two or more of those edges). In some embodiments, the electronic device further includes one or more first sensors to detect presence and/or intensities of contacts with the display of the device (e.g., capacitive and/or resistive sensors to detect intensities of a contact on the touch-screen display), and one or more second sensors to detect presence and/or intensities of contacts with the first input region (and, optionally, each of its sub-regions) of the device, (e.g., capacitive, resistive, pressure, force, and/or vibration sensors to detect presence, activation, and, optionally, intensities of contact with the first input region (e.g., the side "button" region)). In some embodiments, the device further includes one or more tactile output generators for generating tactile outputs (e.g., button actuators for generating localized tactile outputs at the first input region (and, optionally, each of its sub-regions), and/or one or more internal actuators for generating whole-device tactile outputs, etc.).

In accordance with method 8000 and with reference to FIG. 8A, the device detects (8002) an input on the input region (e.g., input by contact 518 on upper input region 456 in FIG. 5B2, or input by contact 534 on lower input region 547 in FIG. 5B7) (e.g., detecting a contact on the first input region (e.g., detecting touch-down of a contact on the touch-sensitive side button of the device)).

In accordance with method 8000 and with reference to FIG. 8A, in response to detecting the input on the input region (8004), and in accordance with a determination that the input (e.g., light press input by contact 518 on the upper input region 456 in FIG. 5B3) meets first criteria (e.g., first button activation criteria), wherein the first criteria require an increase in intensity of the input above a first intensity threshold (e.g., a light press intensity threshold that is above the contact detection intensity threshold and below a deep press intensity threshold) while the input is detected in the first sub-region (e.g., upper input region 456 in FIG. 5B3) of the input region, in order for the first criteria to be met, the device modifies (8006) a first parameter of the device in a first manner (e.g., increase the volume level (e.g., as illustrated in FIG. 5B3), or scroll upward). In response to detecting the input (e.g., light press input by contact 534 on the lower input region 457 in FIG. 5B7) on the input region (8004), and in accordance with a determination that the input meets second criteria (e.g., second button activation criteria) that are distinct from the first criteria, wherein the second criteria require an increase in intensity of the input above the first intensity threshold while the input is detected in the second sub-region (e.g., the lower input region 457 in FIG. 5B7) of the input region that is distinct from the first sub-region, in order for the second criteria to be met, the device modifies (8008) the first parameter of the device in a second manner (e.g., lower the volume (e.g., as illustrated in FIG. 5B7) or scroll downward) that is distinct from the first manner. In some embodiments, the first and second criteria require that the contact is maintained substantially stationary (e.g., touch-hold with less than a threshold amount of movement) for more than a threshold amount of time (e.g., a long-press time threshold) after the contact is detected, without requiring the intensity to rise above the light press intensity threshold. In response to detecting the input on the input region (8004), and in accordance with a determination that the input did not increase above the first intensity threshold (e.g., the input did not increase above the first intensity threshold before lift-off of the contact is detected), the device forgoes (8010) modifying the first parameter of the device in the first manner and forgoing modifying the first parameter of the device in the second manner (e.g., the device does not change the first parameter in any way).

In accordance with method 8000 and with reference to FIG. 8A, the device includes (8012) one or more first tactile output generators that are located at the input region (e.g., one or more surface oscillators that rock back and forth around respective fixed pivots underneath the input region) and that provide localized tactile outputs at the input region. The method 8000 includes: in accordance with a determination that the input (e.g., input by contact 518 on the upper input region 456 in FIG. 5B3) meets the first criteria, generating a first tactile output (e.g., tactile output 524 in FIG. 5B3) with a first tactile output profile; and in accordance with a determination that the input (e.g., input by contact 534 on lower input region 457 in FIG. 5B7) meets the second criteria, generating a second tactile output (e.g., tactile output 536 in FIG. 5B7) with a second tactile output profile. In some embodiments, the first tactile output and the second tactile output have the same tactile output profiles and different accompanying audio outputs (e.g., one with a higher frequency than the other). In some embodiments, the first tactile output and the second tactile outputs have distinct tactile output profiles (e.g., frequencies, patterns, amplitudes, etc.). In some embodiments, the first tactile output and the second tactile output are generated by the same localized tactile output generator at the input region (e.g., the side button region), and the tactile outputs are sensed on the input region at any location that the user is making contact with the input region. In some embodiments, separate localized tactile output generators are used to generate localized tactile outputs at each of the first sub-region and the second sub-region of the input region. In some embodiments, in accordance with a determination that the input did not increase above the first intensity threshold, the device forgoes generating the first and second tactile outputs. In some embodiments, the device generates a tactile output to indicate the locations of the first sub-region and the second sub-region to the user. For example, a third tactile output is generated by the first tactile output generator when the user's finger is resting on the first sub-region, and a fourth tactile output is generated by the first tactile output generator when the user's finger is resting on the second sub-region, where the third tactile output and the fourth tactile output have different tactile output patterns from each other, and from the first and second tactile outputs. Providing a localized tactile output in the input region where the input is detected, when the criteria for modifying the parameter are met by the input, enhances the operability of the device and makes the user-device interface more efficient (e.g., by providing improved feedback and reducing user mistakes when operating/interacting with the device) which, additionally reduces power usage and improves battery life of the device by enabling the user to use the device more quickly and efficiently.

In accordance with method 8000 and with reference to FIG. 8B, in accordance with a determination that the input meets the first criteria, the device selects (8014) the first tactile output profile for the first tactile output in accordance with a current value of the first parameter. Similarly, in some embodiments, in accordance with a determination that the input meets the second criteria, the device selects the second tactile output profile for the second tactile output in accordance with a current value of the first parameter. In some embodiments, the device continuously and dynamically adjusts the first/second tactile output profile when adjusting the first parameter in accordance with the input. In some embodiments, in accordance with a determination that the input meets the first/second criteria, the device selects the audio output profiles for audio outputs that accompanies the first/second tactile outputs, in accordance with a current value of the first parameter. In some embodiments, the device continuously and dynamically adjusts the audio output profile when adjusting the first parameter in accordance with the input. Providing localized tactile output in the input region with a tactile output profile that corresponds to a current value of the parameter that is being modified by the input enhances the operability of the device and makes the user-device interface more efficient (e.g., by providing improved feedback and reducing user mistakes when operating/interacting with the device) which, additionally reduces power usage and improves battery life of the device by enabling the user to use the device more quickly and efficiently.

In accordance with method 8000 and with reference to FIG. 8B, in accordance with a determination that the current value of the first parameter has reached an end of a value range of the first parameter (e.g., volume value reaching maximum volume value in FIG. 5B4), the device generates (8016) an end tactile output (e.g., tactile output 526 in FIG. 5B4) with a respective tactile output profile that is distinct from the first (and, optionally, the second) tactile output profile. For example, when the value of the first parameter reaches a maximum or minimum in a value range of the first parameter, the tactile output has a quality that is discrete and distinct from the series of tactile outputs that have been generated when the value of the first parameter is continuously adjusted in response to the input on the first/second sub-regions of the input region. In some embodiments, the end tactile output has a different tactile output pattern from the first tactile output. In some embodiments, the end tactile output has a different accompanying audio output from the audio output accompanying the first tactile output. In some embodiments, before reaching the end of the value range of the first parameter and generating the end tactile output, the device continuously adjusts a characteristic (e.g., frequency, number of cycles, amplitude) of the first tactile output profile in accordance with a continuous change of the current value of the first parameter within the value range of the first parameter. In some embodiments, no tactile output is generated when the current value of the first parameter was already at an end of the value range for the first parameter before the first criteria are met by the input. For example, an end tactile output is generated when the device increases a current value of the first parameter to an end of the value range in response to a press input, but the device forgoes generating additional tactile outputs when the user presses the input region one or more additional times, because no change in parameter value is made by the additional press inputs. A localized tactile output with a distinct tactile output profile is provided when an end value of the parameter is reached. The tactile output profile for the tactile output corresponding to the end value of the parameter is different from the tactile output profile used for tactile outputs generated in conjunction with arriving at other values of the parameter prior to reaching the end value. Using a distinct tactile output profile to indicate that the end value of the parameter has been reached enhances the operability of the device and makes the user-device interface more efficient (e.g., by providing improved feedback and reducing user mistakes when operating/interacting with the device) which, additionally reduces power usage and improves battery life of the device by enabling the user to use the device more quickly and efficiently.

In accordance with method 8000 and with reference to FIG. 8B, in accordance with a determination that the current value of the first parameter has reached an end of a value range of the first parameter, the device forgoes (8018) generating the first (and, optionally, the second) tactile output profile. Providing differentiated feedback for modification of a device parameter in response to an input, including providing a tactile output in conjunction with reaching a new value that is not an end value of the parameter, and forgoing provision of the tactile output when an end value of the parameter is reached in response to the input enhances the operability of the device and makes the user-device interface more efficient (e.g., by providing improved feedback and reducing user mistakes when operating/interacting with the device) which, additionally reduces power usage and improves battery life of the device by enabling the user to use the device more quickly and efficiently.

In accordance with method 8000 and with reference to FIG. 8B, in accordance with a determination that the input did not increase above the first intensity threshold: in accordance with a determination that the input is detected in the first sub-region of the input region, the device generates (8020) first feedback (e.g., a first visual feedback and/or a third tactile output with a third tactile output pattern) indicating that the input is detected in the first sub-region of the input region; and in accordance with a determination that the input is detected in the second sub-region of the input region, the device generating second feedback that is distinct from the first feedback (e.g., a second visual feedback and/or a fourth tactile output with a fourth tactile output pattern) indicating that the input is detected in the second sub-region of the input region. In some embodiments, the first visual feedback includes highlighting a first region of a user interface object (e.g., an upper portion of a slider control, or an upward arrow), and the second visual feedback includes highlighting a second region of the user interface object (e.g., a lower portion of the slider control, or a downward arrow). In some embodiments, the third and fourth tactile outputs have the same tactile output profiles and different accompanying audio outputs (e.g., one with a higher frequency than the other). In some embodiments, the third tactile output and the fourth tactile outputs have distinct tactile output profiles (e.g., frequencies, patterns, amplitudes, etc.). In some embodiments, the third tactile output and the fourth tactile output are generated by the same localized tactile output generator at the input region (e.g., the side button region), and the tactile outputs changes depending on the location that the user is making contact with the input region. In some embodiments, separate localized tactile output generators are used to generate localized tactile outputs at each of the first sub-region and the second sub-region of the input region. Providing differentiated feedback to indicate which one of two sub-regions of the input region is being touched before the sub-region is activated by a press input enhances the operability of the device and makes the user-device interface more efficient (e.g., by providing improved feedback and reducing user mistakes when operating/interacting with the device) which, additionally reduces power usage and improves battery life of the device by enabling the user to use the device more quickly and efficiently.

In accordance with method 8000 and with reference to FIG. 8C, modifying the first parameter of the device in the first manner includes (8022) modifying the first parameter of the device in a first direction (e.g., an upward direction, a direction with increasing values, a clockwise direction, a leftward direction, etc.); and modifying the first parameter of the device in the second manner includes modifying the first parameter of the device in a second direction that is distinct from (e.g., opposite of) the first direction (e.g., a downward direction, a direction with decreasing values, a counter-clockwise direction, a rightward direction, etc.). This is illustrated in FIGS. 5B1-5B10, where volume level is increased by press input detected on the upper input region 456, and volume level is decreased by press input detected on the lower input region 457. For example, for each press input (e.g., as defined by a duration of the contact or a rise-and fall of the intensity across an intensity threshold) detected on the upper region of the input region, the device increases the first parameter (volume, brightness, or other control parameter of the device) by a fixed amount; and for each press input detected on the lower region of the input region, the device decreases the first parameter by the fixed amount. In some embodiments, the amount that is changed for each press input is adjusted by maximum intensity of the press input (e.g., a higher intensity corresponds to a larger multiplier for the change in the first parameter of the device). Modifying the parameter in two distinct directions depending on which one of two sub-regions of the input region is being activated by a press input enhances the operability of the device and makes the user-device interface more efficient (e.g., by reducing the number of inputs required to achieve an intended result) which, additionally reduces power usage and improves battery life of the device by enabling the user to use the device more quickly and efficiently.

In accordance with method 8000 and with reference to FIG. 8C, modifying the first parameter of the device in the first manner includes (8024) modifying the first parameter of the device by a first amount (e.g., a first multiplier of the input, a first absolute amount, etc.); and modifying the first parameter of the device in the second manner includes modifying the first parameter of the device by a second amount that is distinct from (e.g., greater than, or smaller than, or a predefined multiple of) the first amount (e.g., a second multiplier of the input, a second absolute amount, etc.). For example, for each press input (e.g., as defined by a duration of the contact or a rise-and fall of the intensity across an intensity threshold) detected on a first upper region of the input region, the device increases the first parameter (volume, brightness, or other control parameter of the device) by a first fixed amount; and for each press input detected on a second upper region of the input region below the first upper region, the device increases the first parameter by a second fixed amount (e.g., 5% at a time, or 5 times at a time, etc.) that is smaller than the first fixed amount (e.g., 10% at a time, or 10 times at a time, etc.). In some embodiments, for each press input detected on a first lower region of the input region, the device decreases the first parameter (volume, brightness, or other control parameter of the device) by a third fixed amount; and for each press input detected on a second lower region of the input region below the first lower region, the device decreases the first parameter by a fourth fixed amount (e.g., 10% at a time, or 10 times at a time, etc.) that is greater than the first fixed amount (e.g., 5% at a time, or 5 times at a time, etc.). In some embodiments, the amount that is changed for each press input is adjusted by maximum intensity of the press input (e.g., a higher intensity corresponds to a larger multiplier for the change in the first parameter of the device). Modifying the parameter by two distinct amounts depending on which one of two sub-regions of the input region is being activated by a press input enhances the operability of the device and makes the user-device interface more efficient (e.g., by reducing the number of inputs required to achieve an intended result) which, additionally reduces power usage and improves battery life of the device by enabling the user to use the device more quickly and efficiently.

In accordance with method 8000 and with reference to FIG. 8C, modifying the first parameter of the device in the first manner includes (8026): dynamically adjusting a first rate by which the first parameter of the device is modified, in accordance with a characteristic intensity of the input (e.g., an amount by which the intensity of the input exceeds the first intensity threshold) that is detected at the first sub-region of the input region; and modifying the first parameter of the device in the second manner includes: dynamically adjusting a second rate by which the first parameter of the device is modified, in accordance with a characteristic intensity of the input (e.g., an amount by which the intensity of the input exceeds the first intensity threshold) that is detected at the second sub-region of the input region. Dynamically adjusting a rate by which the parameter is adjusted in response to the input in accordance with a characteristic intensity of the input enhances the operability of the device and makes the user-device interface more efficient (e.g., by reducing the number of inputs required to achieve an intended result) which, additionally reduces power usage and improves battery life of the device by enabling the user to use the device more quickly and efficiently.

In accordance with method 8000 and with reference to FIG. 8C, the first parameter is (8028) a control parameter for operating a hardware component of the device (e.g., a volume for speaker (e.g., by operating control 520 in FIG. 5B7), a brightness for display (e.g., by operating control 550 in FIG. 5B11), or flashlight, etc.). Modifying a control parameter for a hardware component of the device in different manners in accordance with a determination of which one of two sub-regions of the input region is activated by the press input enhances the operability of the device and makes the user-device interface more efficient (e.g., by reducing number of inputs required to achieve an intended result), which, additionally, reduces power usage and improves battery life of the device by enabling the user to use the device more quickly and efficiently.

In accordance with method 8000 and with reference to FIG. 8C, the first parameter is (8030) an operation control parameter for moving through content (e.g., scrolling up and down in a content item, scanning through a listing of objects (e.g., images, media objects, etc.), paging up and down paginated content, playback or scrubbing through a media object (e.g., a music clip, a video file, etc.)). Moving through content (e.g., scrolling up and down, or scrubbing through media content or a list) in different manners in accordance with a determination of which one of two sub-regions of the input region is activated by the press input enhances the operability of the device and makes the user-device interface more efficient (e.g., by reducing number of inputs required to achieve an intended result), which, additionally, reduces power usage and improves battery life of the device by enabling the user to use the device more quickly and efficiently.

In accordance with method 8000 and with reference to FIG. 8C, in accordance with a determination that the input meets the first criteria a first number of times (e.g., the device detects that the intensity of the input rises and falls, and crosses the first intensity threshold the first intensity threshold multiple times), the device modifies (8032) the first parameter of the device in the first manner a second number of times (e.g., each time by the first amount, and for each increase above the first intensity threshold) that corresponds to the first number of times. For example, in FIGS. 5B2-5B4, volume levels are increased multiple times in response to multiple consecutive press input detected on input region 456. Similarly, in accordance with a determination that the input meets the second criteria a third number of times (e.g., the device detects that the intensity of the input rises and falls, and crosses the first intensity threshold the first intensity threshold multiple times), the device modifies the first parameter of the device in the second manner a fourth number of times (e.g., each time by the first amount, and for each increase above the first intensity threshold) that corresponds to the third number of times. Modifying the parameter in a respective manner by a number of times that corresponds to the number of times that the input meets the first criteria enhances the operability of the device and makes the user-device interface more efficient (e.g., by reducing user mistakes when operating/interacting with the device), which, additionally, reduces power usage and improves battery life of the device by enabling the user to use the device more quickly and efficiently.

In accordance with method 8000 and with reference to FIG. 8D, in response to detecting the input on the input region: in accordance with a determination that the input meets third criteria (e.g., first enhanced button activation criteria), wherein the third criteria require an increase in intensity of the input above a second intensity threshold that is above the first intensity threshold (e.g., a deep press intensity threshold that is above the contact detection intensity threshold and the light press intensity threshold) while the input is detected in the first sub-region of the input region, in order for the third criteria to be met, the device resets (8034) a first parameter of the device to a first predetermined value (e.g., maximize the volume level (e.g., as illustrated in FIGS. 5B8-5B9), or scroll to the top, without going through the intermediate values). In some embodiments, in response to detecting the input on the input region: in accordance with a determination that the input meets fourth criteria (e.g., second enhanced button activation criteria), wherein the fourth criteria require an increase in intensity of the input above the second intensity threshold while the input is detected in the second sub-region of the input region, in order for the fourth criteria to be met, resetting the first parameter of the device to a second predetermined value that is distinct from the first predetermined value. For example, when scrollable content (e.g., scrollable document) or scrub-able content (e.g., music clip) is displayed, a deep press on the upper portion of the side button causes the device to skip to the beginning of content, while a deep press on the lower portion of the side button causes the device to skip to the end of the content. When a list of items are displayed, a deep press on the upper portion of the side button causes the device to skips to the first item in the list, and a deep press on the lower portion of the side button causes the device to skip to the last item in the list. When a slider control is presented, a deep press on the upper portion of the side button causes the device to reset the indicator to the beginning of the slider control, and a deep press on the lower portion of the side button causes the device to reset the indicator to the end of the slider control. When a filter is being applied, a deep press on the upper portion of the side button causes a maximum value of a range of filter values to be applied, and a deep press on the lower portion of the side button causes a minimum value of the range of filter values to be applied. Resetting the parameter to a predetermined value when the input meets an enhanced intensity requirement (e.g., as required by the third criteria) while forgoing adjusting the parameter in the usual manner (e.g., the manner of adjustment made in response to a press input that does not meet the enhanced intensity requirement) enhances the operability of the device and makes the user-device interface more efficient (e.g., by reducing the number of inputs required to achieve an intended result), which, additionally, reduces power usage and improves battery life of the device by enabling the user to use the device more quickly and efficiently.

In accordance with method 8000 and with reference to FIG. 8D, in response to detecting the input (e.g., the input by contact 518 on upper input region 456 in FIG. 5B2) on the input region: the device displays (8036) a first user interface object (e.g., volume control 520 in FIG. 5B2) that corresponds to the first parameter (e.g., device volume) that is modifiable through a required input on the input region (e.g., the user interface object is a scroll bar, a volume control, a brightness control, a scrubber, a selection indicator that can move through a list of items), wherein the user interface object is displayed without requiring an intensity of the input to exceed the first intensity threshold. In some embodiments, the first user interface object was not displayed before detecting the input. In some embodiments, the first user interface object is displayed in a first manner before the input is detected on the input region, and displayed in a second manner (e.g., highlighted or selected) after the input is detected on the input region. Displaying a user interface object that corresponds to the parameter that is to be modified in response to a touch input detected on the input region without requiring an intensity of the touch input to exceed the intensity threshold for actually modifying the parameter enhances the operability of the device and makes the user-device interface more efficient (e.g., by providing improved feedback and reducing user mistakes when operating/interacting with the device), which, additionally, reduces power usage and improves battery life of the device by enabling the user to use the device more quickly and efficiently.

In accordance with method 8000 and with reference to FIG. 8D, in response to detecting the input on the input region: in accordance with a determination that the input (e.g., input by contacts 542 and 544 in FIGS. 5B10-5B11) meets fifth criteria (e.g., parameter switching criteria), the device switches (8038) a current selected parameter that is modifiable through a required input on the input region from the first parameter (e.g., volume control as shown in FIG. 5B10) to a second parameter (e.g., brightness control as shown in FIG. 5B11) that is distinct from the first parameter. For example, initially, the currently selected parameter that is modifiable by pressing on the input region is the volume of the device. In response to detecting a press input on both the upper and lower portions of the input region simultaneously, the currently selected parameter that is modifiable by pressing on the input region becomes the brightness of the display. In some embodiments, a listing of parameters are controllable through press inputs on the input region, and the device cycles through the list to select the parameter that is currently modifiable each time that the device detects both the upper portion and the lower portion of the input region are pressed simultaneously. In some embodiments, the device also displays the user interface object that corresponds to the currently selected parameter that is controlled by the input region. Switching the parameter that is to be modified in response to a touch input detected on the input region that meet preset criteria (e.g., parameter switching criteria) enhances the operability of the device and makes the user-device interface more efficient (e.g., by providing additional control options without cluttering the user interface and reducing the number of inputs required to achieve an intended result), which, additionally, reduces power usage and improves battery life of the device by enabling the user to use the device more quickly and efficiently.

In accordance with method 8000 and with reference to FIG. 8D, the fifth criteria require (8040) an increase in intensity of the input above the first intensity threshold (e.g., a light press intensity threshold that is above the contact detection intensity threshold and below a deep press intensity threshold) while the input is concurrently detected in the first sub-region and the second sub-region of the input region, in order for the fifth criteria to be met. This is illustrated in FIGS. 5B10-5B11. In some embodiments, instead of requiring a press input on both the upper and the lower portion of the input region simultaneously, the device switches the parameter that that input region controls in response to a swipe input on the input region (e.g., a downward swipe or an upward swipe along the longitudinal direction of the input region). Switching the parameter that is to be modified in response to a press input concurrently detected on both sub-regions of the input region enhances the operability of the device and makes the user-device interface more efficient (e.g., by providing additional control options without cluttering the user interface, and by reducing user mistakes when operating/interacting with the device), which, additionally, reduces power usage and improves battery life of the device by enabling the user to use the device more quickly and efficiently.

It should be understood that the particular order in which the operations in FIGS. 8A-8D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000, 7000, 9000, 10000, 11000, and 12000) are also applicable in an analogous manner to method 8000 described above with respect to FIGS. 8A-8D. For example, the contacts, gestures, user interface objects, tactile outputs, audio outputs, intensity thresholds, time thresholds, focus selectors, and animations described above with reference to method 8000 optionally have one or more of the characteristics of the contacts, gestures, user interface objects, tactile outputs, audio outputs, intensity thresholds, time thresholds, focus selectors, and animations described herein with reference to other methods described herein (e.g., methods 6000, 7000, 9000, 10000, 11000, and 12000). For brevity, these details are not repeated here.

FIGS. 9A-9C are flow diagrams illustrating a method 9000 of guiding device movement in accordance with some embodiments.

Method 9000 relates providing localized tactile outputs using tactile output generators located at different locations of the device to guide and prompt movement of the device in order to continue performance of a respective task (e.g., completing a panorama picture, navigating to a destination, searching for an object), where the respective task is performed during a media capturing mode of operation of the device, and the tactile output generators are selectively activated to prompt the movement of the device in a respective direction in accordance with a direction by which one or more objects in the field of view of the camera need to be shifted in order to continue performance of the task. Using localized tactile outputs to guide and prompt the user to move the device in a respective direction based on the direction by which an object in the field of view of the camera needs to be shifted to continue performance of the task enhances the operability of the device and makes the user-device interface more efficient (e.g., by providing improved feedback to help the user to provide required inputs to achieve an intended outcome, and by reducing user mistakes when operating/interacting with the device), which, additionally, reduces power usage and improves battery life of the device by enabling the user to use the device more quickly and efficiently.

The method 9000 is performed at an electronic device (e.g., device 300, FIG. 3, or portable multifunction device 100, FIGS. 1A and 4A) with a display, one or more cameras, and a plurality of tactile output generators including a first tactile output generator at a first location in the device (e.g., on or underneath a first edge of the device (e.g., right edge, or top edge)) and a second tactile output generator at a second location in the device (e.g., on or underneath a second edge of the device (e.g., left edge, or bottom edge)). In some embodiments, the first tactile output generator and the second tactile output generator are located in separate sections along the same edge of the device.

In accordance with method 9000 and with reference to FIG. 9A, while the device is in a media capture mode of operation (e.g., a panorama capturing mode in FIG. 5E1, or video recording mode in FIG. 5F3) (e.g., continuously capturing video or still images using the one or more cameras), the device performs (9002) a respective task (e.g., capturing a panorama image, providing turn by turn navigation instructions on a vehicle, searching for a particular object in the surrounding environment (e.g., pairing smart home devices), capturing an image of an object or person with predefined framing and alignment requirements (e.g., for biometric authentication, for certain artistic composition), providing vehicle steering guidance (e.g., reverse parking, releasing/pickup load on target, etc.), providing guidance for remote navigation control for controlling unmanned vehicles (e.g., an aerial drone), providing guidance for camera-assisted surgery, etc.).

While performing the respective task, the device detects (9006) that one or more objects (e.g., predefined objects, visual markers, features, landmarks, etc.) in a field of view of the one or more cameras of the device meet first criteria (e.g., device-shifting criteria). For example, in FIGS. 5E2 and 5E3, the mountains in field of view deviate from horizontal movement. In FIG. 5E4, movement of the mountains in the field of view is stalled or stopped before completion of the panorama image. In FIGS. 5F4 and 5F5, faces 505-3 and 505-3 are about to move out of frame. In some embodiments, the first criteria are used to determine whether movement of the field of view of the cameras is required in order to satisfy the requirements for performing the respective task. Depending on the respective task, the requirements may be different. For example, when capturing a panorama image, the requirement is for the field of view to shift horizontally (e.g., parallel to the ground), and the first criteria are met when the device detects a deviation from the horizontal movement as determined based on changing positions of one or more objects in the field of view of the camera. In another example, when providing turn-by-turn navigation instructions on a vehicle, one of the requirements is to have the field of view of the camera on a correct lane based on the next turn (e.g., right lane for an upcoming right turn, and left lane for an upcoming left turn), and the first criteria are met when the device detects that vehicle is not in the correct lane (e.g., based on the road markings identified in the field of view of the cameras). In another example, when capturing an image for a photo ID, the requirement is that a subject's head needs to fit within a predefined box in the image; and the first criteria are met when the device detects that the subjects head is not within the predefined box (e.g., off-center or too large) in the field of view of the camera.

In response to detecting that the one or more objects in the field of view of the one or more cameras meet the first criteria (9006), the device generates, with one or more of the plurality of tactile output generators, a tactile output (e.g., tactile output 523 in FIG. 5E2, tactile output 524 in FIG. 5E3, tactile output 519 in FIG. 5E4, tactile output 601 in FIG. 5F4, tactile output 603 in FIG. 5F5) prompting movement of the field of view of the one or more cameras in a respective direction (e.g., through moving (e.g., translation in 2D, translation in 3D, rotation, panning, pivoting, tilting, or combinations of the above, etc.) the device as a whole or a part of the device that includes the camera(s)), wherein generating the tactile output prompting movement of the field of view of the one or more cameras in the respective direction includes: in accordance with a determination, based on the one or more objects in the field of view of the camera, that the field of view of the camera needs to be shifted in a first direction (e.g., leftward, clockwise, upward, forward, in the northwest direction, closer to user, or a combination of two or more of the above, etc.) to continue performing the respective task (e.g., to continue capturing of the panorama image, to continue providing turn by turn navigation instructions on the vehicle, to continue searching for the particular object in the surrounding environment (e.g., pairing smart home devices), to continue capturing of the image of the object or person with the predefined framing and alignment requirements (e.g., for biometric authentication, for certain artistic composition), to continue providing vehicle steering guidance (e.g., reverse parking, releasing/pickup load on target, etc.), to continue providing guidance for remote navigation control for controlling unmanned vehicles (e.g., an aerial drone), to continue providing guidance for camera-assisted surgery, etc.), generating a first tactile output (e.g., the first tactile output is provided by the first tactile output generator, and is localized at the first location of in the device (e.g., a left edge of the device)) that prompts movement of the field of view of the one or more cameras in the first direction (e.g., tactile output 523 in FIG. 5E2 upward prompts movement of the field of view; or tactile output 601 in FIG. 5F4 prompts leftward movement of the field of view); and in accordance with a determination, based on the one or more objects in the field of view of the camera, that the field of view of the camera needs to be shifted in a second direction (e.g., rightward, counter-clockwise, downward, backward, in the southeast direction, farther away from the user, or a combination of two or more of the above, etc.), different from the first direction, to continue performing the respective task, generating a second tactile output (e.g., the second tactile output is provided by the second tactile output generator, and is localized at the second location of in the device (e.g., a right edge of the device)), different from the first tactile output, that prompts movement of the field of view of the one or more cameras in the second direction (e.g., tactile output 521 in FIG. 5E3 prompts downward movement of the field of view and tactile output 519 in FIG. 5E4 prompts forward movement of the field of view; or tactile output 603 in FIG. 5F5 prompts rightward movement of the field of view).

In accordance with method 9000 and with reference to FIG. 9A, generating the first tactile output includes (9008) generating the first tactile output using the first tactile output generator at the first location in the device (e.g., on or underneath a first edge of the device (e.g., right edge, or top edge)); and generating the second tactile output includes generating the second tactile output generator using the second tactile output generator at the second location in the device (e.g., on or underneath a second edge of the device (e.g., left edge, or bottom edge)). In some embodiments, the first tactile output generator and the second tactile output generator are located in separate sections along the same edge of the device. In some embodiments, for a respective task, each of a plurality of directions relevant to the task are associated with a respective subset (e.g., one or more) of the plurality of tactile output generators based on the respective locations of the tactile output generators in the device; and the device selectively activates a subset of the tactile output generators in accordance with the direction that the field of view of the camera(s) need to be moved to continue performing the respective task. In some embodiments, the first and second tactile outputs have the same tactile output profiles (e.g., frequency, amplitude, pattern, accompanying audios, etc.), but provide different prompt to the user because they are generated by different tactile output generators located at different locations in the device and are localized at different portions on the surface of the device. Using tactile output generators located at different locations on the device to produce respective localized tactile outputs to prompt the user to move the device in difference directions enhances the operability of the device and makes the user-device interface more efficient (e.g., by helping the user to provide required inputs to achieve an intended outcome, and by reducing user mistakes when operating/interacting with the device), which, additionally, reduces power usage and improves battery life of the device by enabling the user to use the device more quickly and efficiently.

In accordance with method 9000 and with reference to FIG. 9B, generating the first tactile output (e.g., for prompting clockwise movement) includes (9010) generating the first tactile output using the first tactile output generator and the second tactile output generator in accordance with a first output sequence (e.g., the first sequence includes the first tactile output generator followed by the second tactile output generator). Generating the second tactile output (e.g., for prompting counterclockwise movement) includes generating the second tactile output using the first tactile output generator and the second tactile output generator in accordance with a second output sequence that is distinct from the first output sequence (e.g., the second sequence includes the second tactile output generator followed by the first tactile output generator). This is illustrated in FIGS. 5E2, 5E3, and 5E4, where coordinated tactile outputs 523, 521, and 519 are each generated using a pair of tactile output generators located at different input regions in accordance with different output sequences, for example. This is further illustrated in FIGS. 5F4 and 5F5, where coordinated tactile outputs 601 and 603 are each generated using a pair of tactile output generators located at different input regions in accordance with different output sequences. In some embodiments, the first tactile output generator and the second tactile output generator are located in separate sections along the same edge of the device, or on different edges of the device. In some embodiments, for a respective task, each of a plurality of directions relevant to the task are associated with a respective operation sequence for all or a selected subset of the plurality of tactile output generators based on the respective locations of the tactile output generators in the device; and the device activates all or the selected subset of the tactile output generators in accordance with the operation sequence that corresponds to the direction that the field of view of the camera(s) need to be moved to continue performing the respective task. In some embodiments, the first sequence includes a respective tactile output generator only once (e.g., for movement in the first direction, the sequence is one output by the first tactile output generator followed by one output by the second tactile output generator, and then optionally repeat the first sequence one or more times with a predetermined delay between each repeat to separate the sequences; and for movement in the second direction, the second sequence includes one output by the second tactile output generator followed by one output by the first tactile output generator, and then optionally repeat the second sequence one or more times with a predetermined delay between each repeat to separate the sequences). In some embodiments, the sequence may call for a respective tactile output generator multiple times (e.g., for the movement in the first direction, the first sequence includes two consecutive outputs by the first tactile output generator followed by one output by the second tactile output generator, and then optionally repeat the first sequence one or more times with a predetermined delay between each repeat to separate sequences; and for the movement in the second direction, the second sequence includes two consecutive outputs by the second tactile output generator followed by one output by the first tactile output generator, then optionally repeat the second sequence one or more times with a predetermined delay between each repeat to separate the sequences. Operating a set of tactile output generators located at different locations on the device in accordance with different output sequences to prompt the user to move the device in difference directions enhances the operability of the device and makes the user-device interface more efficient (e.g., by helping the user to provide required inputs to achieve an intended outcome, and by reducing user mistakes when operating/interacting with the device), which, additionally, reduces power usage and improves battery life of the device by enabling the user to use the device more quickly and efficiently.

In accordance with method 9000 and with reference to FIG. 9B, generating the first tactile output (e.g., for prompting clockwise movement) includes (9012) generating the first tactile output using the first tactile output generator and the second tactile output generator in accordance with a first power ratio (e.g., the first power ratio includes the first tactile output generator operating with 20% power of the second tactile output generator). Generating the second tactile output (e.g., for prompting counterclockwise movement) includes generating the second tactile output using the first tactile output generator and the second tactile output generator in accordance with a second power ratio that is distinct from the first power ratio (e.g., the second power ratio includes the second tactile output generator operating with 20% of the first tactile output generator). This is illustrated in FIGS. 5E2 and 5E3, where coordinated tactile outputs 523, 521, and 519 are each generated using a pair of tactile output generators located at different input regions in accordance with different power ratios, for example. In some embodiments, the first tactile output generator and the second tactile output generator are located in separate sections along the same edge of the device, or on different edges of the device. In some embodiments, for a respective task, each of a plurality of directions relevant to the task are associated with a respective power ratio for all or a selected subset of the plurality of tactile output generators based on the respective locations of the tactile output generators in the device; and the device activates all or the selected subset of the tactile output generators in accordance with the power ratio that corresponds to the direction that the field of view of the camera(s) need to be moved to continue performing the respective task. Operating a set of tactile output generators located at different locations on the device in accordance with different output power ratios to prompt the user to move the device in difference directions enhances the operability of the device and makes the user-device interface more efficient (e.g., by helping the user to provide required inputs to achieve an intended outcome, and by reducing user mistakes when operating/interacting with the device), which, additionally, reduces power usage and improves battery life of the device by enabling the user to use the device more quickly and efficiently.

In accordance with method 9000 and with reference to FIG. 9B, detecting that one or more objects in the field of view of the one or more cameras of the device meet first criteria includes (9014): identifying a first object (e.g., faces 505-1, 505-2, and 505-3 in FIG. 5F3) (e.g., a subject's head, a predefined road marking, a target, etc.) in the field of view of the one or more cameras of the device in accordance with predefined object identification criteria (e.g., based on image processing, feature extraction, and object recognition techniques); and detecting that a current position or movement of the first object in the field of view of the one or more cameras deviates from a predefined position or movement path (e.g., a center of the field of view, a predefined navigation path projected on the field of view) in the field of view of the one or more cameras (e.g., face 505-3 is within a threshold distance of a left edge of the field of view in FIG. 5F4 and face 505-2 is within a threshold distance of a right edge of the field of view in FIG. 5F5). For example, when performing the task of taking a photo ID, the device detects that the first criteria are met by the user's head in the field of view of the cameras when detecting that the user's head is off-center in the field of view. In another example, when providing indoor navigation guidance, the device detects that the first criteria are met by an entrance in the field of view of the cameras when the device detects that the entrance is offset from a central region of the field of view by more than a threshold distance. In yet another example, when providing obstacle avoidance guidance, the device detects that the first criteria are met by a moving obstacle when the device detects that the movement path of the moving obstacle has deviated from a predicted movement path, requiring an adjustment of the existing obstacle avoidance maneuver. In yet another example, when capturing a panorama image, the device detects that the first criteria are met by the scene currently in the field of view of the camera when the device detects that the positions of previously captured portion of the scene is shifted up or down relative to their previously imaged positions. Using deviation of an object in the field of view of the camera from a predefined position or movement path as the basis for prompting the user to move the device in a respective direction enhances the operability of the device and makes the user-device interface more efficient (e.g., by helping the user to provide required inputs to achieve an intended outcome, and by reducing user mistakes when operating/interacting with the device), which, additionally, reduces power usage and improves battery life of the device by enabling the user to use the device more quickly and efficiently.

In accordance with method 9000 and with reference to FIG. 9B, detecting that one or more objects in the field of view of the one or more cameras of the device meet first criteria includes (9016): identifying a first object (e.g., a tracked moving object, such as a bird, a shooting start, a moving target, etc., or a stationary object, such as a fixed target, a subject of a portrait, etc.) in the field of view of the one or more cameras of the device in accordance with predefined object identification criteria (e.g., based on image processing, feature extraction, and object recognition techniques); and detecting that at least a portion of the first object is outside of the field of view of the one or more cameras. In some embodiments, when tracking a moving target, the device detects that the moving object in the field of view of the cameras met the first criteria when the device detects that the moving object is moving out of the field of view of the camera. Prompting the user to move the device in a respective direction in accordance with a determination that at least a portion of a predefined object in the field of view of the camera has moved out of the field of view of the camera enhances the operability of the device and makes the user-device interface more efficient (e.g., by helping the user to provide required inputs to achieve an intended outcome, and by reducing user mistakes when operating/interacting with the device), which, additionally, reduces power usage and improves battery life of the device by enabling the user to use the device more quickly and efficiently.

In accordance with method 9000 and with reference to FIG. 9C, detecting that one or more objects in the field of view of the one or more cameras of the device meet first criteria includes (9018): identifying a first object (e.g., an object in a partial scene in a panorama, etc.) in the field of view of the one or more cameras of the device in accordance with predefined object identification criteria (e.g., based on comparison between the current field of view and previously captured portions of the panorama image); and detecting that movement speed of the first object is outside of a predefined speed range (e.g., as shown in FIG. 5E4 where the mountain in the field of view is moving too slowly relative to the device (e.g., because the device movement is stalled)) (e.g., too fast or too slow to take a clear panorama image). In some embodiments, when tracking a moving target, the device detects that the moving object in the field of view of the cameras met the first criteria when the device detects that the moving object is moving faster or slower that the device by a threshold speed difference. Prompting the user to move the device in a respective direction in accordance with a determination that a predefined object in the field of view of the camera is moving with a speed that is outside of a predefined speed range enhances the operability of the device and makes the user-device interface more efficient (e.g., by helping the user to provide required inputs to achieve an intended outcome, and by reducing user mistakes when operating/interacting with the device), which, additionally, reduces power usage and improves battery life of the device by enabling the user to use the device more quickly and efficiently.

In accordance with method 9000 and with reference to FIG. 9C, the device detects (9020) that the first criteria are met while the device is stationary (e.g., the object(s) moves in the field of view as a result of motion by objects alone (e.g., when the device remains stationary in the physical environment)). Prompting the user to move the device in accordance with a determination that a predefined object in the field of view of the camera meets the first criteria while the device is stationary enhances the operability of the device and makes the user-device interface more efficient (e.g., by helping the user to provide required inputs to achieve an intended outcome, and by reducing user mistakes when operating/interacting with the device), which, additionally, reduces power usage and improves battery life of the device by enabling the user to use the device more quickly and efficiently.

In accordance with method 9000 and with reference to FIG. 9C, the device detects (9022) that the first criteria are met while the device is in motion (e.g., the object(s) moves in the field of view as a result of motion by the device alone (e.g., when the object(s) remain stationary in the physical environment)). Prompting the user to move the device in accordance with a determination that a predefined object in the field of view of the camera meets the first criteria while the device is in motion enhances the operability of the device and makes the user-device interface more efficient (e.g., by helping the user to provide required inputs to achieve an intended outcome, and by reducing user mistakes when operating/interacting with the device), which, additionally, reduces power usage and improves battery life of the device by enabling the user to use the device more quickly and efficiently.

In accordance with method 9000 and with reference to FIG. 9C, the device detects (9024) that the first criteria are met while the device and the object are both in motion (e.g., the object(s) moves in the field of view as a result of relative motion between the device and the object(s) (e.g., due to their different speeds)). Prompting the user to move the device in accordance with a determination that a predefined object in the field of view of the camera meets the first criteria while both the device and the object are in motion enhances the operability of the device and makes the user-device interface more efficient (e.g., by helping the user to provide required inputs to achieve an intended outcome, and by reducing user mistakes when operating/interacting with the device), which, additionally, reduces power usage and improves battery life of the device by enabling the user to use the device more quickly and efficiently.

In accordance with method 9000 and with reference to FIG. 9C, in response to detecting that the one or more objects in the field of view of the one or more cameras meet the first criteria, the device displaying a visual indicator prompting movement of the field of view of the one or more cameras in the respective direction (e.g., through moving (e.g., translation in 2D, translation in 3D, rotation, panning, pivoting, tilting, or combinations of the above, etc.) the device as a whole or a part of the device that includes the camera(s)), wherein generating the visual indicator prompting movement of the field of view of the one or more cameras in the respective direction includes (9026): in accordance with a determination, based on the one or more objects in the field of view of the camera, that the field of view of the camera needs to be shifted in the first direction (e.g., leftward, clockwise, upward, forward, in the northwest direction, closer to user, or a combination of two or more of the above, etc.) to continue performing the respective task, providing the visual indicator with a first visual characteristic (e.g., a first motion pattern, direction, shape, animation sequence, etc.) that prompts movement of the field of view of the one or more cameras in the first direction; and in accordance with a determination, based on the one or more objects in the field of view of the camera, that the field of view of the camera needs to be shifted in the second direction (e.g., rightward, counter-clockwise, downward, backward, in the southeast direction, farther away from the user, or a combination of two or more of the above, etc.) to continue performing the respective task, generating the visual indicator with a second visual characteristic (e.g., a second motion pattern, direction, shape, animation sequence, etc.), different from the first visual characteristic, that prompts movement of the field of view of the one or more cameras in the second direction. Providing visual feedback in conjunction with the tactile output prompting the user to move the device in a respective direction, and providing the visual feedback with a visual characteristic corresponding to the respective direction enhance the operability of the device and make the user-device interface more efficient (e.g., by helping the user to provide required inputs to achieve an intended outcome, and by reducing user mistakes when operating/interacting with the device), which, additionally, reduces power usage and improves battery life of the device by enabling the user to use the device more quickly and efficiently.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000, 7000, 8000, 10000, 11000, and 12000) are also applicable in an analogous manner to method 9000 described above with respect to FIGS. 9A-9C. For example, the contacts, gestures, user interface objects, tactile outputs, audio outputs, intensity thresholds, time thresholds, focus selectors, and animations described above with reference to method 9000 optionally have one or more of the characteristics of the contacts, gestures, user interface objects, tactile outputs, audio outputs, intensity thresholds, time thresholds, focus selectors, and animations described herein with reference to other methods described herein (e.g., methods 6000, 7000, 8000, 10000, 11000, and 12000). For brevity, these details are not repeated here.

FIGS. 10A-10C are flow diagrams illustrating a method 10000 of generating warning feedback for an impending operation in accordance with some embodiments.

Method 10000 relates to generating a warning tactile output when first criteria are met by an input on an input region but second criteria are not met by the input, and performing an operation when the second criteria (e.g., with an enhanced requirement relative to the first criteria) are met by the input. Providing the warning tactile output using a tactile output generator associated with the input region before the second criteria are met enhances the operability of the device and makes the user-device interface more efficient (e.g., by helping the user to provide required inputs to achieve an intended outcome, and reducing user mistakes when operating/interacting with the device), which, additionally, reduces power usage and improves battery life of the device by enabling the user to use the device more quickly and efficiently. In addition, forgoing generating the tactile output when the first criteria are not met, and forgoing performing the operation when a cancellation input is detected before the second criteria are met enhance the operability of the device and make the user-device interface more efficient (e.g., by reducing user mistakes when operating/interacting with the device), which, additionally, reduces power usage and improves battery life of the device by enabling the user to use the device more quickly and efficiently.

The method 10000 is performed at an electronic device (e.g., device 300, FIG. 3, or portable multifunction device 100, FIGS. 1A and 4A) with a display, and an input region that is associated with a tactile output generator (e.g., a localized tactile output generator that is located at an edge of the device (e.g., a side button region) and that generates localized tactile outputs as opposed to whole-device tactile outputs). In some embodiments, the localized tactile output generator is a surface oscillator that rocks back and forth around a fixed pivot underneath the input region or other tactile output generator that is capable of generating tactile outputs that are directed specifically toward the input region. In some embodiments, the localized tactile output generator provides localized vibrations at the input region but not the device as a whole. The localized vibrations have varying amplitudes at different locations on the device with greater amplitudes on the input region where a user's finger will typically rest while operating the input region and with lower amplitudes at other places outside of the input region where a user's hand will not typically rest while operating the input region. In some embodiments, the device further includes a whole-device tactile output generator (e.g., a mass located within the device and is moved back and forth around a central rest location) that generates whole-device tactile outputs. In some embodiments, the whole-device tactile output generator creates tactile outputs in many different locations on the device at the same time, such as a tactile output generator that is coupled to a housing of the device. In some embodiments, the localized tactile output generator provides tactile outputs that correspond to operations that are performed and/or visual feedback that is generated in response to touch/press inputs detected on the input region. In some embodiments, in conjunction with or independent of the localized tactile outputs, the device further utilizes the whole-device tactile output generator to generate whole device tactile outputs that correspond to operations that are performed and/or visual feedback that is generated in response to touch/press inputs detected on the touch-screen user interface, as opposed to touch/press inputs detected on the input region.

In accordance with method 10000 and with reference to FIG. 10A, the device detects (10002) an input on the input region (e.g., a touch-input by a contact on the touch-screen display or the touch-sensitive side button).

In accordance with method 10000 and with reference to FIG. 10A, in response to detecting the input on the input region: in accordance with a determination that first criteria (e.g., warning-initiation criteria) are met by the input on the input region, wherein the first criteria include a requirement that is met when a first input metric (e.g., a time characteristic of the input, an intensity characteristic of the input, a motion characteristic of the input, and/or a hybrid time/intensity/motion characteristic of the input) exceeds a first threshold in order for the first criteria to be met (e.g., the warning-initiation criteria are met by the input when the input meets the criteria for initiating performance of an operation, or the input is about to meet the criteria for initiating performance of an operation if the input continues in its current course), the device generates (10006) a first tactile output with the tactile output generator associated with the input region (e.g., the first tactile output is an escalating tactile output with an increasing value for at least one of the characteristic parameters (e.g., amplitude, frequency, accompanying audio volume, accompanying audio frequency, etc.) of its tactile output profile). This is illustrated in FIG. 5G2, where an intensity of an input by contact 605 has exceeded a light press intensity threshold; and the device generates tactile output 607 to indicate that emergency calling function will be triggered with continued increase in intensity of the input. Alternatively, this is illustrated in FIG. 5G3, where an intensity of an input by contact 605 has exceeded a deep press intensity threshold and a negligible duration requirement, and the device starts a countdown period, and generates tactile output 609 (including input region 455) to indicate that emergency calling function will be triggered at the end of the countdown period. This is also illustrated in FIG. 5H3, where an input by contact 627 has met a light press intensity threshold and a time threshold T; and the device generates tactile output 631 to indicate that digital assistant will soon become available to respond to user input. After generating the first tactile output: in accordance with a determination that the input meets second criteria (e.g., operation-execution criteria), wherein the second criteria include a requirement that is met when the first input metric (e.g., a time characteristic of the input, an intensity characteristic of the input, a motion characteristic of the input, and/or a hybrid time/intensity/motion characteristic of the input) exceeds a second threshold that is greater than the first threshold in order for the second criteria to be met, the device performs an operation (e.g., executing a payment operation, making an emergency call, activating the voice-based digital assistant, shut-down the device, etc.); and in accordance with a determination that a cancellation input (e.g., lift-off of the contact from the input region, movement of the contact on the input region, selection of a cancel button on the displayed user interface, etc.) has been detected prior to the input meeting the second criteria, the device forgoes performance of the operation. This is illustrated in FIG. 5G3, where the intensity of the input by contact 605 has exceeded a deep press intensity threshold greater than the light press intensity threshold; and the device generates tactile output 609 to indicate that a countdown period for making an emergency call has been started. If the input had been terminated before reaching the deep press intensity threshold, the device treats the lift-off of contact 605 as a cancellation input, and does not start the countdown period. Alternatively, this is illustrated in FIG. 5G4, where the intensity of the input by contact 605 is maintained above the deep press intensity threshold for more than a threshold amount of time T (e.g., the countdown period), and the device completes the countdown period and makes the emergency call. If the input had been terminated or if the intensity of the input had dropped below the deep press intensity threshold before the end of the countdown period, the device will not make the emergency call. This is also illustrated in FIG. 5H5, where the intensity of the input by contact 627 is maintained above the light press intensity threshold for an additional time period required for the digital assistant to be ready, the device presents the fully functional digital assistant when it is fully ready. If a cancellation input is detected before the digital assistant is fully ready, the device does not present the digital assistant user interface as shown in FIG. 5H5. In response to detecting the input on the input region and in accordance with a determination that the first criteria (e.g., warning-initiation criteria) are not met by the input on the input region, the device forgoes (10008) generating the first tactile output.

In accordance with method 10000 and with reference to FIG. 10A, after generating the first tactile output: in accordance with a determination that the input meets the second criteria (e.g., operation-execution criteria), the device generates (10010) a second tactile output (e.g., tactile output 609 to indicate start of the countdown in FIG. 5G3, or tactile output 615 to indicate making the emergency call in FIG. 5G4, or tactile output 641 to indicate that the digital assistant is ready in FIG. 5H5) indicating performance of the operation (e.g., entering a phase of the operation performance that is no longer cancellable). For example, a whole-device tactile output is generated by the internal tactile output generator that is distinct from the tactile output generated with the input region to indicate execution of the payment operation, dialing the emergency call, activation of the voice-based digital assistant, starting the shut-down of the device, at which point, the operation is no longer cancellable. In some embodiments, the device does not require lift-off of the contact from the input region in order for the second criteria to be met. In some embodiments, the first and second criteria are based on metrics that are distinct from a movement distance of the contact (e.g., the first and second criteria are not met by a swipe input crossing different distance thresholds on the display, but are met by the inputs meeting intensity-based or time-based criteria instead.). Generating a tactile output in conjunction with satisfaction of the second criteria which leads to performance of the operation enhances the operability of the device and makes the user-device interface more efficient (e.g., by providing improved feedback and helping the user to provide required inputs to achieve an intended outcome), which, additionally, reduces power usage and improves battery life of the device by enabling the user to use the device more quickly and efficiently.

In accordance with method 10000 and with reference to FIG. 10A, after generating the first tactile output: in accordance with a determination that a cancellation input has been detected prior to the input meeting the second criteria, the device ceases (10012) to generate the first tactile outputs. For example, while the input is continuously detected on the input region and/or continues to meet the first criteria, and/or before the cancellation input is detected, the device continues to generate the first tactile output. The device ceases to generate the first tactile output when the second criteria are met or when the cancellation input is detected. Ceasing to generate the first tactile outputs (e.g., the warning tactile outputs) when a cancellation input has been detected before the second criteria are met (e.g., before the performance of the action is initiated and irreversible) enhances the operability of the device and makes the user-device interface more efficient (e.g., by providing improved feedback and helping the user to provide required inputs to achieve an intended outcome), which, additionally, reduces power usage and improves battery life of the device by enabling the user to use the device more quickly and efficiently.

In accordance with method 10000 and with reference to FIG. 10B, generating the first tactile output includes (10014) generating a continuous tactile output that is sustained (e.g., tactile output 609 in FIG. 5G3, or tactile output 631 in FIGS. 5H3 and 5H4) until the second criteria are met or when the cancellation input is detected. In some embodiments, a press input that does not meet the first criteria causes the tactile output generator at the input region to generate a button-press tactile output (e.g., a weak down-click tactile output) that is discrete and non-continuous, and a press input that meets the first criteria causes the tactile output generator at the input region to generate a warning tactile output (e.g., a strong, sustained warning tactile output) that is continuous and the device forgoes generating the discrete and noncontiguous tactile output. Generating a continuous tactile output (e.g., the warning tactile outputs) that is sustained until the second criteria are met (e.g., when performance of the operation is initiated and irreversible) or when a cancellation input has been detected before the second criteria are met (e.g., before the performance of the action is initiated and irreversible) enhances the operability of the device and makes the user-device interface more efficient (e.g., by providing improved feedback and helping the user to provide required inputs to achieve an intended outcome), which, additionally, reduces power usage and improves battery life of the device by enabling the user to use the device more quickly and efficiently.

In accordance with method 10000 and with reference to FIG. 10B, generating the continuous tactile output includes (10016) monotonically changing (e.g., monotonically increasing, or monotonically decreasing) at least one aspect of a tactile output profile corresponding to the first tactile output (e.g., increasing amplitude, increasing peak amplitude, increasing frequency, increasing volume for accompanying audio, increasing frequency for accompanying audio, etc.). For example, when the criteria for triggering warning for initiating an emergency call are met by an input (e.g., a press input or a touch-hold input) on the side button, the tactile output generator located at the side button generates a continuous tactile output that has a sequence of vibrations with increasing amplitudes and constant frequency, along with an accompanying audio that has increasing frequency and increasing volume. In another example, when the criteria for triggering warning for activating the voice-based digital assistant are met by an input on the side button, the tactile output generator located at the side button generates a tactile output with a sequence of vibrations with an increasing amplitude and a decreasing frequency, until the second criteria are met or when a cancellation input is detected. Generating a continuous and monotonically changing (e.g., escalating) tactile output (e.g., the warning tactile outputs) that is sustained until the second criteria are met (e.g., when performance of the operation is initiated and irreversible) or when a cancellation input has been detected before the second criteria are met (e.g., before the performance of the action is initiated and irreversible) enhances the operability of the device and makes the user-device interface more efficient (e.g., by providing improved feedback and helping the user to provide required inputs to achieve an intended outcome), which, additionally, reduces power usage and improves battery life of the device by enabling the user to use the device more quickly and efficiently.

In accordance with method 10000 and with reference to FIG. 10B, the first criteria include (10018) a requirement that is met when a characteristic intensity of the input exceeds a first intensity threshold in order for the first criteria to be met (e.g., the warning-initiation criteria are met by a light press input by a contact on the side button or on an affordance on the touch-sensitive display). In some embodiments, the first criteria further include a requirement that the contact on the input region is kept substantially stationary (e.g., has less than a threshold amount of movement within a threshold amount of time) during the time when the contact is initially detected on the input region until the first criteria are met. Generating a warning tactile output when an intensity-based requirement of the first criteria are met by an input on an input region but second criteria are not met by the input enhances the operability of the device and makes the user-device interface more efficient (e.g., by helping the user to provide required inputs to achieve an intended outcome, and reducing user mistakes when operating/interacting with the device), which, additionally, reduces power usage and improves battery life of the device by enabling the user to use the device more quickly and efficiently.

In accordance with method 10000 and with reference to FIG. 10B, the second criteria include (10020) a requirement that is met when the characteristic intensity of the input exceeds a second intensity threshold that is greater than the first intensity threshold in order for the second criteria to be met. For example, the input is provided by a contact with the input region, the device further requires that the input includes less than a threshold amount of movement of the contact (e.g., same contact) for more than a threshold amount of time (e.g., the contact is substantially stationary when the input is evaluated against the first and second criteria). Generating a warning tactile output when an intensity-based requirement of the first criteria are met by an input on an input region but an intensity-based second criteria (e.g., with an enhanced intensity requirement relative to the first criteria) are not met by the input enhances the operability of the device and makes the user-device interface more efficient (e.g., by helping the user to provide required inputs to achieve an intended outcome, and reducing user mistakes when operating/interacting with the device), which, additionally, reduces power usage and improves battery life of the device by enabling the user to use the device more quickly and efficiently.

In accordance with method 10000 and with reference to FIG. 10B, the first criteria include (10022) a requirement that is met when the input is maintained for at least a first threshold amount of time with less than a threshold amount of movement in order for the first criteria to be met (e.g., the warning-initiation criteria are met by a touch-hold input (e.g., either with a concurrent intensity requirement or without a concurrent intensity requirement) by a contact on the side button or on an affordance on the touch-sensitive display). Generating a warning tactile output when a time-based requirement (e.g., a touch-hold requirement) of the first criteria are met by an input on an input region but second criteria are not met by the input enhances the operability of the device and makes the user-device interface more efficient (e.g., by helping the user to provide required inputs to achieve an intended outcome, and reducing user mistakes when operating/interacting with the device), which, additionally, reduces power usage and improves battery life of the device by enabling the user to use the device more quickly and efficiently.

In accordance with method 10000 and with reference to FIG. 10B, the second criteria include (10024) a requirement that is met when the input is maintained for at least a second threshold amount of time that is longer than the first threshold amount of time with less than the threshold amount of movement in order for the second criteria to be met. For example, the operation-execution criteria are met by a long touch-hold input (e.g., either with a concurrent intensity requirement or without a concurrent intensity requirement) by a contact on the side button or on an affordance on the touch-sensitive display). Generating a warning tactile output when a time-based requirement (e.g., a touch-hold requirement) of the first criteria are met by an input on an input region but a time-based second criteria (e.g., with an enhanced time requirement relative to the first criteria) are not met by the input enhances the operability of the device and makes the user-device interface more efficient (e.g., by helping the user to provide required inputs to achieve an intended outcome, and reducing user mistakes when operating/interacting with the device), which, additionally, reduces power usage and improves battery life of the device by enabling the user to use the device more quickly and efficiently.

In accordance with method 10000 and with reference to FIG. 10C, the tactile output generator that is associated with the input region resides (10026) at the input region and produces localized tactile outputs at the input region. The device further includes a second tactile output generator that does not reside at the input region and produces whole-device tactile outputs (e.g., tactile outputs that vibrates the entire device and are not localized at the whole-device tactile output generator). The method 10000 includes: in response to detecting the input on the input region: in accordance with a determination that the first criteria are met by the input on the input region, generating a third tactile output by the second tactile output generator that is not localized at the input region (e.g., a whole-device tactile output that is detectable anywhere on the device), in addition to the first tactile output that is localized at the input region. Generating tactile outputs using both a localized tactile output generator and a whole-device tactile output generator when first criteria are met by an input on an input region but second criteria (e.g., with an enhanced requirement relative to the first criteria) are not met by the input enhances the operability of the device and makes the user-device interface more efficient (e.g., by providing improved feedback to help the user provide required inputs to achieve an intended outcome, and reducing user mistakes when operating/interacting with the device), which, additionally, reduces power usage and improves battery life of the device by enabling the user to use the device more quickly and efficiently.

In accordance with method 10000 and with reference to FIG. 10C, the first tactile output is (10028) a discrete tactile output that simulates actuation of the input region by the input; and wherein the third tactile output is a continuous tactile output that provides sustained warning feedback until the second criteria are met by the input or the cancellation input is detected. For example, the first tactile output simulates a button click when the first criteria are met by a press input on the side button, and the third tactile output is a vibration that is sustained and extends to the entire device (e.g., can be detected by the user's hand holding the device at locations outside of the side button region). For example, when the operation is making an emergency call, after the user has pressed on the side button with the required intensity (e.g., at least the light press intensity) for a required period of time (e.g., 5 seconds), the warning-initiation criteria are met by the input on the side button and the localized tactile output generator at the side button generates a button-click tactile output (e.g., on initial press, a light click tactile output is generated at the side button, and upon satisfaction of the warning-initiation criteria, a strong click tactile output is generated at the side button). In addition to the button-click tactile outputs generated by the localized tactile output generated at the side button, a sustained whole-device warning tactile output (e.g., sustained, strong vibrations) with increasing amplitude is generated by the internal tactile output generator, accompanied by a siren sound effect. Generating both a localized tactile output to simulate actuation of the input region by the input and a sustained whole-device tactile output as a warning for an impending operation when first criteria are met by an input on an input region but second criteria (e.g., with an enhanced requirement relative to the first criteria) are not met by the input enhances the operability of the device and makes the user-device interface more efficient (e.g., by providing improved feedback to help the user provide required inputs to achieve an intended outcome, and reducing user mistakes when operating/interacting with the device), which, additionally, reduces power usage and improves battery life of the device by enabling the user to use the device more quickly and efficiently.

In accordance with method 10000 and with reference to FIG. 10C, in response to detecting the input on the input region: in accordance with a determination that first criteria (e.g., warning-initiation criteria) are met by the input on the input region, the device displays (10030) an indication (e.g., an animation, a count-down timer, a burning fuse, a progress or intensity bar with a threshold indicator for triggering performance of the operation, etc.) that the operation will be performed when the input on the input region meets additional criteria (e.g., with increased intensity, or be maintained for a longer time). For example, when the operation is activating the voice-based digital assistant, after the user has pressed on the side button with the required intensity (e.g., at least the light press intensity) for a required period of time (e.g., 1.5 seconds), the warning-initiation criteria are met by the input on the side button and the localized tactile output generator at the side button generates a long press button-click tactile output (e.g., on initial press, a light click tactile output is generated at the side button, and upon satisfaction of the warning-initiation criteria, a strong click tactile output is generated at the side button). In addition to the long press button-click tactile outputs generated by the localized tactile output generated at the side button, a sound and an onscreen animation are generated indicating that the digital assistant will become available with additional criteria being met by the input (e.g., an intensity meter that dynamically updates to reflect the current contact intensity relative to the intensity threshold required to activate the digital assistant). Displaying an indication that the operation will be performed when the input on the input region meets additional criteria after the first criteria are met by the input enhances the operability of the device and makes the user-device interface more efficient (e.g., by providing improved feedback to help the user provide required inputs to achieve an intended outcome, and reducing user mistakes when operating/interacting with the device), which, additionally, reduces power usage and improves battery life of the device by enabling the user to use the device more quickly and efficiently.

It should be understood that the particular order in which the operations in FIGS. 10A-10C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000, 7000, 8000, 9000, 11000, and 12000) are also applicable in an analogous manner to method 10000 described above with respect to FIGS. 10A-10C. For example, the contacts, gestures, user interface objects, tactile outputs, audio outputs, intensity thresholds, time thresholds, focus selectors, and animations described above with reference to method 10000 optionally have one or more of the characteristics of the contacts, gestures, user interface objects, tactile outputs, audio outputs, intensity thresholds, time thresholds, focus selectors, and animations described herein with reference to other methods described herein (e.g., methods 6000, 7000, 8000, 9000, 11000, and 12000). For brevity, these details are not repeated here.

FIGS. 11A-11B are flow diagrams illustrating a method 11000 of adjusting tactile outputs for an input on an input region depending on whether there is an interstitial material present between the input region and a user's finger detected on the input region in accordance with some embodiments.

Method 11000 relates to changing characteristics of a tactile output (e.g., embodied in a tactile output profile of the tactile output, including amplitude, pattern, frequency, accompanying audio, coordination between other concurrently generated tactile outputs, etc.) in accordance with whether there is an interstitial material present between the input object (e.g., the user's finger) and the input region of the device on which the input is detected. Changing the characteristics of the tactile output in accordance with presence/absence of the interstitial material and, optionally, in accordance with the properties of the interstitial material enables the device to provide consistent haptic feedback to the user when the device is operated under a variety conditions (e.g., wrapped in various types of cases, operated by gloved fingers, or operated through clothing). Providing consistent haptic feedback under different operating conditions enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.}

The method 11000 is performed at an electronic device (e.g., device 300, FIG. 3, or portable multifunction device 100, FIGS. 1A and 4A) (e.g., a tablet-shaped device that has a flat front-side (e.g., display-side), a flat back-side (e.g., back-side), and one or more flat, beveled, or curved peripheral-sides (e.g., four narrow flat faces joined by sharp straight edges, four narrow flat faces joined by rounded edges, or a continuous curved surface) that join the front and back sides, with sharp or rounded edges) with a display (e.g., a touch-screen display that is disposed on a front-side of the device) (e.g., a touch-screen display that occupies substantially the entire front-side of the device), an input region that is distinct from the display (e.g., the input region is the side button xxx that is disposed on one or more peripheral-sides of the device adjacent to a front-side of the device (e.g., the peripheral-sides include one or more of a left peripheral-side, a right peripheral-side, a top peripheral-side, or a bottom peripheral-side of the device)), and one or more tactile output generators for generating tactile outputs. In some embodiments, the input region is a touch-sensitive surface that detects intensity of a contact with the touch-sensitive surface, e.g., based on capacitive and/or resistive touch sensing technologies. In some embodiments, the input region is a touch-sensitive surface that detects presence of a contact and/or pressing of an input object (e.g., a finger) based on force, pressure, and/or vibration sensors coupled to the surface. In some embodiments, the input region is a surface that is coplanar with the display (e.g., a touch-screen display). In some embodiments, the input region is a surface (e.g., a protruding region, a recessed region, or a region that is flush with the surrounding surface) that is disposed on a peripheral-side of the device adjacent to the front-side of the device (e.g., a left edge, a right edge, a top edge, or a bottom edge, or along two or more of those edges). In some embodiments, the electronic device further includes one or more first sensors to detect presence and/or intensities of contacts with the display of the device (e.g., capacitive and/or resistive sensors to detect intensities of a contact on the touch-screen display), and one or more second sensors to detect presence and/or intensities of contacts with first input region of the device, (e.g., capacitive, resistive, pressure, force, and/or vibration sensors to detect presence, activation, and, optionally, intensities of contact with the first input region (e.g., the side "button" region)). In some embodiments, the device further includes one or more tactile output generators for generating tactile outputs (e.g., button actuators for generating localized tactile outputs at the first input region, and/or one or more internal actuators for generating whole-device tactile outputs, etc.).

In accordance with method 11000 and with reference to FIG. 11A, the device detects (11002) a press input on the input region with a finger. In accordance with method 11000 and with reference to FIG. 11A, in response to detecting the press input (e.g., detecting an increase in intensity of the contact by the finger above a first intensity threshold (e.g., the contact detection threshold, a light press intensity threshold that is greater than the contact detection threshold, and a deep press intensity threshold that is greater than the light press intensity threshold)) on the input region (11004): in accordance with a determination that the input region is not separated from the finger by an interstitial material (e.g., when the input region is directly exposed to the skin of the finger, without a case or clothing (e.g., made of fabric, plastic, leather, silicone, wool, wood, metal, etc.) separating the portion of the device that includes the input region from the skin of the finger), the device generates a first tactile output (e.g., tactile output 649 in FIG. 5I1, tactile output 667 in FIG. 5I2, tactile output 679 in FIG. 5I3, tactile output 693 in FIG. 5I4, etc.); and in accordance with a determination that the input region is separated from the finger by a first interstitial material (e.g., a first fabric, plastic, leather, silicone, wood, metal, etc. that is used in a case encasing the portion of the device that includes the input region or in a glove encasing the finger), the device generates a second tactile output (e.g., tactile outputs 653 and 657 in FIG. 5I1, tactile outputs 671 and 675 in FIG. 5I2, tactile outputs 683 and 687 in FIG. 5I3, tactile outputs 697 and 701 in FIG. 5I4, respectively) that is different from the first tactile output (e.g., tactile output 649 in FIG. 5I1, tactile output 667 in FIG. 5I2, tactile output 679 in FIG. 5I3, tactile output 693 in FIG. 5I4, respectively) (e.g., the second tactile output is adapted to create a similar haptic sensation on the user's finger through the interstitial material of the case or glove).

In accordance with method 11000 and with reference to FIG. 11A, in response to detecting the press input on the input region, the device performs (11006) an operation that corresponds to the press input (e.g., displaying a menu of selectable options on the display, providing a device status for a first attribute of the device (e.g., ringer volume, availability of unread notifications, etc.)). Performing the same operation in response to the press input on the input region, in conjunction with generating a respective tactile output with a tactile output profile that is selected in accordance with whether there is an interstitial material present between the input region and the finger on the input region, enhances the operability of the device and makes the device-user interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 11000 and with reference to FIG. 11A, generation of the first and second tactile outputs is performed in accordance with a determination that a characteristic intensity of the press input exceeds a first intensity threshold (e.g., a light press intensity threshold); and the method further includes (11008): in response to detecting the press input: in accordance with a determination that the characteristic intensity of the press input does not exceed the first intensity threshold, forgoing generation of the first tactile output and forgoing generation of the second tactile output (e.g., the device does not generate any tactile output in response to the press input before the first intensity threshold is met, and does not perform the operation that corresponds to the press input). Forgoing generation of the tactile output when the characteristic intensity of the input does not exceed the first intensity threshold enhances the operability of the device and makes the device-user interface more efficient (e.g., by reducing unnecessary distraction to the user, helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 11000 and with reference to FIG. 11A, the device selects (11010) a second tactile output profile for the second tactile output profile such that the movement of the first interstitial material (e.g., a portion of the first interstitial material proximate to or adjacent to the input region) generated by the second tactile output is substantially similar to movement of the input region on the device generated by the first tactile output (e.g., the second tactile output produces a similar haptic sensation (e.g., as measured by vibration strengths, frequencies, etc.) on the finger through the first interstitial material as that produced by the first tactile output directly on the finger). By selecting the tactile output profile for a tactile output generated with the presence of an interstitial material in a such a way that results in consistent haptic sensations on the user's finger (e.g., that results in movement of the interstitial material over the input region that is substantially similar to the movement of the input region without the presence of the interstitial material) enhances the operability of the device and makes the device-user interface more efficient (e.g., by providing improved feedback to help the user provide required inputs to achieve an intended outcome, and reducing user mistakes when operating/interacting with the device), which, additionally, reduces power usage and improves battery life of the device by enabling the user to use the device more quickly and efficiently.

In accordance with method 11000 and with reference to FIG. 11A, selecting the second tactile output profile for the second tactile output profile includes (11012) selecting a respective material-specific tactile output profile (e.g., different second tactile output profiles for the second tactile output depending on the first interstitial material (e.g., leather vs. plastic vs. silicone)) based on the first interstitial material and a first tactile output profile that corresponds to the first tactile output. In some embodiments, the material is determined by the device based on sensors on the device that sense characteristics of the first interstitial material. In some embodiments, the material is determined by the device based on information encoded in the first interstitial material (e.g., a barcode, QR code, or RFID or NFC information embedded in the first interstitial material). In some embodiments, the material is determined based on user inputs at the device (e.g., selection of a type of device case material from a list of options in the user interface). Selecting the tactile output profile for a tactile output generated with the presence of an interstitial material in accordance with the interstitial material and the tactile output profile for a tactile output generated without the interstitial material allows the device to provide consistent haptic feedback to the user under a variety of operating conditions (e.g., with different case materials and glove materials between the input region and the user's finger), which enhances the operability of the device and makes the device-user interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 11000 and with reference to FIG. 11B, selecting the second tactile output profile for the second tactile output profile includes (11014) selecting different tactile output profiles in accordance with a determination of whether the first interstitial material is in a case enclosing at least a portion of the device including the input region or the first interstitial material is in a glove enclosing the finger on the input region. This is illustrated in FIGS. 5I1 and 5I2, for example. Selecting the tactile output profile for a tactile output generated with the presence of an interstitial material in accordance with whether the interstitial material is a case over the device or a glove over a user's finger allows the device to provide consistent haptic feedback to the user under a variety of operating conditions (e.g., with case or with glove between the input region and the user's finger), which enhances the operability of the device and makes the device-user interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 11000 and with reference to FIG. 11B, the first tactile output and the second tactile output are (11016) generated by a first tactile output generator of the one or more tactile output generators that resides at the input region and produces localized tactile outputs at the input region (e.g., as opposed to creating tactile outputs in many different locations on the device at the same time, such as via a tactile output generator that is coupled to a housing of the device). In some embodiments, the first tactile output generator is a surface oscillator that rocks back and forth around a fixed pivot underneath the input region or other tactile output generator that is capable of generating tactile outputs that are directed specifically toward the input region. In some embodiments, the first tactile output generator provides localized vibrations at the side button region and not the device as a whole. The localized vibrations have varying amplitudes at different locations on the device with greater amplitudes on the side button region where a user's finger will typically rest while operating the side button region and with lower amplitudes at other places outside of the side button region where a user's hand will not typically rest while operating the side button region. Generating localized tactile output using a tactile output generator that resides at the input region as feedback for a press input on the input region allows the device to provide consistent haptic feedback to directly to the user's finger under a variety of operating conditions (e.g., with case or with glove between the input region and the user's finger), which enhances the operability of the device and makes the device-user interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 11000 and with reference to FIG. 11B, the first material includes (11018) a material of a case that encases at least a portion of the device that includes the input region. This is illustrated in FIG. 5I1, for example. Providing consistent haptic feedback with or without a case encasing the device enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 11000 and with reference to FIG. 11B, the first material includes (11020) a material of a glove that encases the finger that is on the input region. This is illustrated in FIG. 5I2, for example. Providing consistent haptic feedback with or without a glove over the user's finger on the input region enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 11000 and with reference to FIG. 11B, the device determines (11022) whether there is an interstitial material between the input region and the finger in accordance with a settings parameter specified by a user. Utilizing a settings parameter specified by a user is a simple and accurate way of determining whether there is an interstitial material between the input region and the user's finger. Accurate and adaptable determination of the presence of an interstitial material that is widely applicable to indefinite number of user's usage scenarios of their devices enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 11000 and with reference to FIG. 11B, the device determines (11024) whether there is an interstitial material between the input region and the finger in accordance with a capacitance characteristic of the press input provided by one or more sensors located at the input region. Utilizing a capacitance characteristic of the press input to determine whether there is an interstitial material present between the input region and the user's finger is automatic and easily adaptable to a wide variety of interstitial material types. Utilizing the capacitance characteristic of the press input to determine whether there is an interstitial material between the input region and the finger enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

It should be understood that the particular order in which the operations in FIGS. 11A-11B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000, 7000, 8000, 9000, 10000, and 12000) are also applicable in an analogous manner to method 11000 described above with respect to FIGS. 11A-11B. For example, the contacts, gestures, user interface objects, tactile outputs, audio outputs, intensity thresholds, time thresholds, focus selectors, and animations described above with reference to method 11000 optionally have one or more of the characteristics of the contacts, gestures, user interface objects, tactile outputs, audio outputs, intensity thresholds, time thresholds, focus selectors, and animations described herein with reference to other methods described herein (e.g., methods 6000, 7000, 8000, 9000, 10000, and 12000). For brevity, these details are not repeated here.

FIGS. 12A-12E are flow diagrams illustrating a method 12000 of providing different tactile outputs for distinct types of inputs detected on an off-display input region disposed on a peripheral side of the device in accordance with some embodiments.

Method 12000 relates to generating tactile outputs with different tactile output profiles in responds to different types of touch inputs detected on an off-screen input region on a peripheral-side of the device adjacent to the display, including a press input on the input region and a swipe input across the input region (e.g., a swipe input in a horizontal direction across an elongated input region or a swipe input in a vertical direction along the elongated input region). Providing different haptic feedback (via tactile outputs with different tactile output profiles) in response to different types of inputs detected on the input region enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.}

The method 12000 is performed at an electronic device (e.g., device 300, FIG. 3, or portable multifunction device 100, FIGS. 1A and 4A) (e.g., a tablet-shaped device that has a flat front-side (e.g., display-side), a flat back-side (e.g., back-side), and one or more flat, beveled, or curved peripheral-sides (e.g., four narrow flat faces joined by sharp straight edges, four narrow flat faces joined by rounded edges, or a continuous curved surface) that join the front and back sides, with sharp or rounded edges) with a display that is disposed on a front-side of the device (e.g., a touch-screen display that occupies substantially the entire front-side of the device, a touch-screen display that includes a touch-sensitive surface that is coplanar with the display), an input region (e.g., the side button 455, 456, and/or 457) that is disposed on one or more peripheral-sides of the device adjacent to the front-side of the device (e.g., the peripheral-sides include one or more of a left peripheral-side, a right peripheral-side, a top peripheral-side, or a bottom peripheral-side of the device), and one or more tactile output generators for generating tactile outputs (e.g., button actuators for generating localized tactile outputs at the first input region, and/or one or more internal actuators for generating whole-device tactile outputs, etc.). In some embodiments, the input region is a touch-sensitive surface that detects intensity of a contact with the touch-sensitive surface, e.g., based on capacitive and/or resistive touch sensing technologies. In some embodiments, the input region is a touch-sensitive surface that detects presence of a contact and/or pressing of an input object (e.g., a finger) based on force, pressure, and/or vibration sensors coupled to the surface. In some embodiments, the input region is a surface that is coplanar with the display (e.g., a touch-screen display). In some embodiments, the input region is a surface (e.g., a protruding region, a recessed region, or a region that is flush with the surrounding surface) that is disposed on a peripheral-side of the device adjacent to the front-side of the device (e.g., a left edge, a right edge, a top edge, or a bottom edge, or along two or more of those edges). In some embodiments, the electronic device further includes one or more first sensors to detect presence and/or intensities of contacts with the display of the device (e.g., capacitive and/or resistive sensors to detect intensities of a contact on the touch-screen display), and one or more second sensors to detect presence and/or intensities of contacts with first input region of the device, (e.g., capacitive, resistive, pressure, force, and/or vibration sensors to detect presence, activation, and, optionally, intensities of contact with the first input region (e.g., the side "button" region)).

In accordance with method 12000 and with reference to FIG. 12A, the device detects (12002) an input on the input region (e.g., detecting an input by a contact on the input region). For example, the input is one of a press input (e.g., input by contact 506, input by contact 518, input by contact 530, input by contact 534, input by contacts 542 and 544, input by contact 552, input by contact 570, input by contact 594, input by contact 579, input by contact 565, input by contact 557, input by contact 509, input by contact 605, input by contact 627), a horizontal swipe input (e.g., input by contact 585), or a vertical swipe input (e.g., input by contact 564, input by contact 580, input by contact 551, input by contact 547), as illustrated in FIGS. 5A1-5A8, 5B1-5B11, 5C1-5C20, 5D1-5D24, 5E1-5E5, 5F1-5F6, 5G1-5G5, and 5H1-5H5.

In response to detecting the input on the input region (12004): in accordance with a determination that the input by the contact (e.g., light press input by contact 506 in FIG. 5A5, light press input by contact 518 in FIG. 5B3, light press input by contact 534 in FIG. 5B7, light press input by contact 552 in FIG. 5C6, light press input by contact 557 in FIG. 5D17, light press input by contact 509 in FIG. 5F3, or light press input by contact 627 in FIG. 5H2) on the input region meets first criteria (e.g., button-press criteria), wherein the first criteria (e.g., the button-press criteria) require an increase in intensity of the input above a first intensity threshold (e.g., a light press intensity threshold that is greater than a contact detection threshold and less than a deep press intensity threshold) in order for the first criteria to be met, the device performs a first operation (e.g., displaying a menu of selectable options, displaying a control object for controlling a device parameter (e.g., volume, ringer setting, etc.)) and generating a first tactile output (e.g., tactile output 510 in FIG. 5A5, tactile output 524 in FIG. 5B3, tactile output 536 in FIG. 5B7, tactile output 566 in FIG. 5C6, tactile output 553 in FIG. 5D17, tactile output 625 in FIG. 5F3, or tactile output 629 in FIG. 5H2) with a first tactile output profile (e.g., to simulate actuation of a button in a direction perpendicular to a region of input region at the contact location). In some embodiments, the first tactile output is generated during a down-press phase of the input. In some embodiments, the first tactile output is generated during a release phase of the input. In some embodiments, a pair of tactile outputs are generated, one for the down-press and one for the release.

In response to detecting the input on the input region (12004): in accordance with a determination that the input on the input region (e.g., input by contact 585 in FIGS. 5D2-5D3, input by contact 564 in FIGS. 5C10-5C12, input by contact 580 in FIG. 5C15-5C17, input by contact 551 in FIGS. 5D18-5D19, input by contact 547) meets second criteria that are distinct from the first criteria (e.g., the second criteria are one of button-toggle criteria or button-slide criteria), wherein the second criteria (e.g., one of button-toggle criteria or button-slide criteria) require that the input includes movement of a contact along a first direction across the input region (e.g., in a direction across an elongated touch-sensitive region on the peripheral-side of the device (for button-toggle criteria), or in a direction along the elongated touch-sensitive region on the peripheral-side of the device (for button-slide criteria)) in order for the second criteria to be met, the device performs a second operation (e.g., turning on/off the ringer) different from the first operation and generating a second tactile output (e.g., tactile output 581 in FIG. 5D3, tactile output 5663 in FIGS. 5C10-5C12, tactile outputs 586 and 592 in FIGS. 5C15-5C17, tactile outputs 549 and 545 in FIGS. 5D18-5D19) with a second tactile output profile that is distinct from the first tactile output profile (e.g., a tactile output to simulate toggling of a switch that toggles in response to lateral movement or force (e.g., in a button-toggle input), or a tactile output to simulate sliding of a slider that moves in response to lateral movement or force (e.g., in a button slide input)).

In accordance with method 12000 and with reference to FIG. 12A, in response to detecting the input on the input region: in accordance with a determination that the input on the input region (e.g., input by contact 585 in FIGS. 5D2-5D3, input by contact 564 in FIGS. 5C10-5C12, input by contact 580 in FIG. 5C15-5C17, input by contact 551 in FIGS. 5D18-5D19, input by contact 547) meets third criteria that are distinct from the first criteria and the second criteria (e.g., the third criteria are the other one of the button-toggle criteria or button-slide criteria), wherein the third criteria require that the input includes movement of a contact along a second direction distinct from (e.g., orthogonal to) the first direction across the input region in order for the third criteria to be met, the device performs (12006) a third operation (e.g., turning on/off the display, activating voice-based digital assistant, start a shut-down process) that is distinct from the first operation and the second operation, and the device generates a third tactile output (e.g., tactile output 581 in FIG. 5D3, tactile output 5663 in FIGS. 5C10-5C12, tactile outputs 586 and 592 in FIGS. 5C15-5C17, tactile outputs 549 and 545 in FIGS. 5D18-5D19) with a third tactile output profile that is distinct from the first tactile output profile and the second tactile output profile (e.g., a tactile output to simulate the other one of the button toggle or button slide). Providing different haptic feedback (via tactile outputs with different tactile output profiles) in response to different types of inputs detected on the input region (including a press input, a swipe input along the input region, and a swipe input across the input region) enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 12000 and with reference to FIG. 12A, in response to detecting the input on the input region: in accordance with a determination that the input on the input region (e.g., deep press input by contact 506 in FIG. 5A6, or deep press input by contact 534 in FIG. 5B9) meets fourth criteria (e.g., deep press criteria) that are distinct from the first criteria and the second criteria (and the third criteria), wherein the fourth criteria (e.g., deep press criteria) require an increase in intensity of the input above a second intensity threshold (e.g., a deep press intensity threshold) that is greater than the first intensity threshold (e.g., the light press intensity threshold) in order for the fourth criteria to be met, the device performs (12008) a fourth operation (e.g., start a warning for an impending operation) that is distinct from the first operation and the second operation (and the third operation), and the device generates a fourth tactile output (e.g., tactile output 512 in FIG. 5A6, or tactile output 538 in FIG. 5B9) with a fourth tactile output profile that is distinct from the first tactile output profile and the second tactile output profile (and the third tactile output profile) (e.g., the fourth tactile output is a tactile output to simulate a stronger button click than the regular button click triggered by a light press input). Providing different haptic feedback (via tactile outputs with different tactile output profiles) in response to different types of inputs detected on the input region (including a press input, a deep press input, and a swipe input) enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 12000 and with reference to FIG. 12B, in response to detecting the input on the input region: in accordance with a determination that the input on the input region (e.g., input by contact 506 in FIG. 5A3) meets fifth criteria (e.g., button-touch criteria) that are distinct from the first criteria and the second criteria (and the third criteria and the fourth criteria), wherein the fifth criteria (e.g., button-touch criteria) require an intensity of the input remain below the first intensity threshold (e.g., a light press intensity threshold) (e.g., the fifth criteria are met when the user simply rest his/her finger on the input region so that the contact intensity is above the contact detection intensity threshold) in order for the fifth criteria to be met, the device performs (12010) a fifth operation (e.g., show a hint of a menu) that is distinct from the first operation and the second operation (and the third operation and the fourth operation), and (optionally) the device generates a fifth tactile output (e.g., tactile output 508 in FIG. 5A3) with a fifth tactile output profile that is distinct from the first tactile output profile and the second tactile output profile (and the third tactile output profile and the fourth tactile output profile) (e.g., the fifth tactile output is a tactile output to simulate a texture for the user to know where the input region is located). In some embodiments, the device forgoes generation of the fifth tactile output when the fifth criteria are met. Providing different haptic feedback (via tactile outputs with different tactile output profiles) in response to different types of inputs detected on the input region (including a press input, a swipe input, and a light touch input or finger rest input) enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 12000 and with reference to FIG. 12B, in response to detecting the input on the input region: in accordance with a determination that the input on the input region (e.g., input by contact 518 in FIG. 5B3) meets sixth criteria (e.g., upper-button-press criteria) that are distinct from the first criteria and the second criteria (and the third criteria, the fourth criteria, and the fifth criteria), wherein the sixth criteria require that a contact is maintained at a first predefined region of the input region (e.g., an upper half of the side button) and that an intensity of the contact increases above the first intensity threshold (e.g., the light press intensity threshold) in order for the sixth criteria to be met, the device performs (12012) a sixth operation (e.g., increasing a value of a control parameter (e.g., volume, brightness, etc.)) that is distinct from the first operation and the second operation (and the third operation, the fourth operation, and the fifth operation), and the device generates a sixth tactile output (e.g., tactile output 524 in FIG. 5B3) with a sixth tactile output profile that is distinct from the first tactile output profile and the second tactile output profile (and the third tactile output profile, the fourth tactile output profile, and the fifth tactile output profile) (e.g., the sixth tactile output is a tactile output to simulate pressing on an upper portion of a rocker switch that ratchets up). In accordance with a determination that the input on the input region (e.g., input by contact 534 in FIG. 5B7) meets seventh criteria (e.g., lower-button-press criteria) that are distinct from the first criteria, the second criteria, (the third criteria, the fourth criteria, the fifth criteria) and the sixth criteria, wherein the seventh criteria require that a contact is maintained at a second predefined region of the input region that is below the first predefined region (e.g., the second predefined region is a lower half of the side button) and that an intensity of the contact increases above the first predefined intensity threshold (e.g., the light press intensity threshold) in order for the seventh criteria to be met, the device performs a seventh operation (e.g., decreasing a value of the control parameter (e.g., volume, brightness, etc.)) that is distinct from the first operation and the second operation, (the third operation, the fourth operation, and the fifth operation) and the sixth operation, and the device generates a seventh tactile output (e.g., tactile output 536 in FIG. 5B7) with a seventh tactile output profile that is distinct from the first tactile output profile and the second tactile output profile (and the third, fourth, fifth tactile output profile, and optionally, the sixth tactile output profile) (e.g., the seventh tactile output is a tactile output to simulate pressing on a lower portion of a rocker switch that ratchets down). For example, pressing on the top portion of the side button causes the volume to increase, and generation of a series of tactile output that increases in magnitude in accordance with the increasing volume values; while pressing on the bottom portion of the side button causes the volume to decrease, and generation of a series of tactile output that decreases in magnitude in accordance with the decreasing volume values. Providing different haptic feedback (via tactile outputs with different tactile output profiles) in response to touch inputs detected on different sub-regions of the input region enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 12000 and with reference to FIG. 12C, in response to detecting the input on the input region: in accordance with a determination that the input on the input region (e.g., input by contacts 542 and 544 in FIGS. 5B10-5B11) meets eighth criteria (e.g., simultaneous-button-press criteria) that are distinct from the first criteria and the second criteria (and the third criteria, the fourth criteria, the fifth criteria), and the sixth criteria and the seventh criteria, wherein the eighth criteria require that a first contact is maintained at the first predefined region of the input region (e.g., an upper half of the side button) with an intensity of the first contact above the first intensity threshold (e.g., the light press intensity threshold), while a second contact is maintained at the second predefined region of the input region with an intensity of the second contact above the first predefined intensity threshold (e.g., the light press intensity threshold) in order for the eighth criteria to be met, the device performs (12014) an eighth operation (e.g., switching to controlling a different parameter using the side button) that is distinct from the first operation, the second operation, (the third operation, the fourth operation, the fifth operation,) and the sixth operation and the seventh operation, and the device generates an eight tactile output (e.g., tactile outputs 546 and 548 in FIG. 5B11) with an eighth tactile output profile that is distinct from the first tactile output profile and the second tactile output profile (and the third, fourth, fifth tactile output profile, and the sixth and seventh tactile output profiles) (e.g., the eighth tactile output is a tactile output to simulate pressing on two buttons together). Providing different haptic feedback (via tactile outputs with different tactile output profiles) in response to respective press inputs detected on different sub-regions of the input region and a press input concurrently detected on both sub-regions of the input region enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 12000 and with reference to FIG. 12C, in response to detecting the input on the input region: in accordance with a determination that the input (e.g., input by contact 506 in FIG. 5A3 or input by contact 627 in FIG. 5H3) on the input region meets ninth criteria (e.g., long-press criteria) that are distinct from the first criteria and the second criteria (and the third, fourth, fifth, sixth, seventh, and eight criteria), wherein the ninth criteria (e.g., long-press criteria) require that a contact is maintained on the input region for at least a threshold amount of time (e.g., 3 seconds) with less than a threshold amount of movement (e.g., the ninth criteria are met by a touch-hold gesture on the side button) in order for the ninth criteria to be met, the device performs (12016) a ninth operation (e.g., activating a voice-based digital assistant) that is distinct from the first operation and the second operation (and the third, fourth, fifth, sixth, seventh, and eighth operations), and the device generates a ninth tactile output (e.g., tactile output 508 in FIG. 5A3, or tactile output 631 in FIG. 5H3) with a ninth tactile output profile that is distinct from the first tactile output profile and the second tactile output profile (and the third, fourth, fifth, sixth, seventh, and eighth tactile output profiles). Providing different haptic feedback (via tactile outputs with different tactile output profiles) in response to different types of inputs detected on the input region (including a press input, a swipe input, and a long press input) enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 12000 and with reference to FIG. 12C, the device detects (12018) termination of the input on the input region. In response to detecting the termination of the input: in accordance with a determination that a tactile output has been generated in response to the input based on satisfaction of one or more intensity-based criteria (e.g., button-activation criteria, deep-press criteria, long-press criteria, simultaneous-button-press criteria, etc.) by the input, the device generates a respective button-release tactile output with a respective button-release tactile output profile. In some embodiments, different button-release tactile output profiles are used for different tactile outputs that were generated in response to the input. For example, the button-release tactile output profile for a deep press input is different from the button-release tactile output profile for a light press input on the side button. Generating a respective button-release tactile output in accordance with a determination that a tactile output has been generated based on satisfaction of one or more intensity-based criteria (e.g., for a finger rest input, a light press input, a deep press input, a two-finger press input, etc.) enhances the operability of the device and makes the user-device interface more efficient (e.g., by notifying the user that a termination of the input has been detected, helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 12000 and with reference to FIG. 12D, detecting the input on the input region includes detecting an increase in the intensity of the input prior to detecting the intensity of the input increasing above the first intensity threshold, and wherein the method includes (12020): in response to detecting the increase in the intensity of the input prior to detecting the intensity of the input increasing above the first intensity threshold: displaying a visual feedback on the display with at least one visual characteristic (e.g., visibility of wake screen user interface 501 in FIG. 5A4, amount of menu 556 that is revealed in FIGS. 5C3-5C5) that varies by an amount in accordance with a current intensity of the input on the input region (e.g., revealing a user interface object on the display by an amount that varies in accordance with a current intensity of the first input). In some embodiments, as the intensity of the contact increases on the first input region (e.g., the side button), the first user interface object (e.g., a menu, a clipboard) slides gradually onto the display from the edge of the display that is adjacent to the first input region (e.g., the side button). In some embodiments, as the intensity of the first contact increases on the first input region (e.g., the side button), the first user interface object (e.g., the menu or the clipboard) fades in gradually onto the display. In some embodiments, the amount by which the user interface object is visible on the display is variable as the intensity of the contact varies (e.g., increases and/or decreases) before reaching a second intensity threshold that is greater than the first intensity threshold. Once the intensity of the contact increases above a second intensity threshold, the user interface object is fully displayed. In some embodiments, the direction in which the user interface slides onto the display is the same as or parallel to the direction of the force/pressure exerted by the finger on the first input region. Providing dynamic visual feedback that changes in accordance an intensity of the input on the input region before the input meets the intensity threshold of the first criteria enhances the operability of the device and makes the user-device interface more efficient (e.g., by providing improved feedback to help the user provide required inputs to achieve an intended outcome, and reducing user mistakes when operating/interacting with the device), which, additionally, reduces power usage and improves battery life of the device by enabling the user to use the device more quickly and efficiently.

In accordance with method 12000 and with reference to FIG. 12D, displaying the visual feedback on the display includes (12022) revealing a user interface object (e.g., menu 556 that is revealed in FIGS. 5C3-5C5, or menu 577 in FIGS. 5D4-5D5) with movement of the user interface object onto the display in a direction that corresponds to a direction of force exerted on the input region (e.g., the direction in which the user interface slides onto the display is the same as or parallel to the direction of the force/pressure exerted by the finger on the first input region. Revealing a user interface object with movement of the user interface object onto the display in a direction that corresponds to a direction of force exerted on the input region enhances the operability of the device and makes the user-device interface more efficient (e.g., by providing improved feedback to help the user provide required inputs to achieve an intended outcome, and reducing user mistakes when operating/interacting with the device), which, additionally, reduces power usage and improves battery life of the device by enabling the user to use the device more quickly and efficiently.

In accordance with method 12000 and with reference to FIG. 12D, in accordance with a determination that the input meets the second criteria (e.g., button toggle criteria or button-slide criteria), performing the second operation and generating the second tactile output with the second tactile output profile, includes (12024): determining whether the second operation is for changing a value for a device attribute from a first value to a second value that is distinct from the first value (e.g., from ON to OFF, from a low value to a high value, etc.), or from the second value to the first value (e.g., from OFF to ON, from a high value to a low value, etc.); and in accordance with a determination that the second operation is for changing the value for the device attribute from the first value to the second value (e.g., from ON to OFF, or increasing the value of the device attribute), selecting a first set of parameter values (e.g., first frequency, first amplitude, first pattern, etc.) for the second tactile output profile; and in accordance with a determination that the second operation is for changing the value for the device attribute from the second value to the first value (e.g., from OFF to ON, or decreasing the value of the device attribute), selecting a second set of parameter values (e.g., second frequency, second amplitude, second pattern, etc.) for the second tactile output profile. For example, a similar tactile output is used to simulate the haptic sensation produced by a toggling switch that is flipped; but depending on the actual state of the controlled device attribute that is changed, some (not all) aspects of the second tactile output are changed (e.g., amplitude, but not pattern; or pattern but not amplitude) in accordance with the direction that the state is changed by the input. In another example, a similar tactile output is used to simulate the haptic sensation produced by mechanical slider that is moved; but depending on the actual direction that the value of the controlled device attribute is changed, some (not all) aspects of the second tactile output are changed (e.g., amplitude, but not pattern; or pattern but not amplitude) in accordance with the direction that the value is changed by the input. Providing different haptic feedback (via tactile outputs with different tactile output profiles) depending on the direction of change in a device attribute value (e.g., from value 1 to value to vs. from value 2 to value 1) resulted from a swipe input (e.g., a swipe in one direction vs. a swipe in an opposite direction) enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 12000 and with reference to FIG. 12D, the device includes (12026) intensity sensors (e.g., capacitive, resistive, force, pressure, and/or vibration sensors) for detecting intensities of contacts on the input region, wherein detection of the intensities is made even before actuation of the input region is detected (e.g., actuation of the input region is not dependent upon a completion of a circuit by collapsing a physical mechanism that provides resistance such as a dome switch or other mechanical switch mechanism). For example, the increase in intensity of the contact does not actuate the surface of the side button in the direction of the press input, and detecting the intensity relative to an intensity threshold does not depend on a comparison between a physical movement of the surface of the side button to a movement threshold. The generation of the first tactile output in response to the press input is not in accordance with a movement threshold being met by the movement of the surface of the as a result of the press input. Using intensity sensors to detect intensities of contacts on the input region even before physical actuation of the input region is detected allows the device to detect inputs on the input region more quickly and more accurately, and makes the device more responsive to user inputs. Utilizing input regions with these intensity sensors (instead of physically actuated hardware buttons) to detect inputs enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 12000 and with reference to FIG. 12E, the device includes (12028) movement sensors (e.g., capacitive, resistive, force, pressure, and/or vibration sensors) for detecting movement of contacts on the input region, wherein detection of the movement of the contacts is made before actuation of the input region is detected (e.g., actuation of the input region is not dependent upon a completion of a circuit by collapsing a physical mechanism that provides resistance such as a dome switch or other mechanical switch mechanism). For example, the movement of the contact along the first direction is relative to the input region, and does not cause corresponding displacement of the input region in the first direction in accordance with the movement of the contact in the first direction. The generation of the second tactile output is not in accordance with a movement threshold being met by the displacement of any part of the input region as a result of the movement of the contact. Using movement sensors to detect movement of contacts on the input region even before physical actuation of the input region is detected allows the device to detect inputs on the input region more quickly and more accurately, and makes the device more responsive to user inputs. Utilizing input regions with these movement sensors (instead of physically actuated joysticks or trackballs) to detect inputs enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 12000 and with reference to FIG. 12E, the device includes (12030) movement sensors (e.g., capacitive, resistive, force, pressure, and/or vibration sensors) for detecting movement of contacts on the input region, wherein the first and second tactile outputs (and other localized button tactile outputs) are generated by movement of at least a portion of the input region with a movement pattern that is distinct from the movement of the contacts. For example, the amplitude of the movement of the button is much smaller than the movement of the contact. The button oscillates, and the movement by the contact does not oscillate or oscillate at a much lower frequency. Using movement sensors to detect movement of contacts on the input region which has a different movement pattern from the movement pattern of the physical actuation of the input region allows the device to detect inputs on the input region more quickly and more accurately, and makes the device more responsive to user inputs. Utilizing input regions with these movement sensors (instead of physically actuated joysticks or trackballs) to detect inputs enhances the operability of the device and makes the user-device interface more efficient (e.g., by helping the user provide required inputs to achieve an intended outcome, and reducing user mistakes when operating/interacting with the device), which, additionally, reduces power usage and improves battery life of the device by enabling the user to use the device more quickly and efficiently.

In accordance with method 12000 and with reference to FIG. 12E, the first criteria and the second criteria (and the third criteria) are met (12032) without requiring a focus selector (e.g., a cursor or finger) being concurrently present on the display. Operating the device using inputs detected on the input region without requiring a focus selector being concurrently present on the display reduces clutter on the user interface, and free up screen space for additional functionalities and controls. Thus, utilizing an off-display input region that is operated without requiring concurrently presence of a focus selector (e.g., a contact or a cursor) on the display enhances the operability of the device and makes the user-device interface more efficient (e.g., by providing additional control options without cluttering the user interface with additional displayed controls or finger contacts), which, additionally, reduces power usage and improves battery life of the device by enabling the user to use the device more quickly and efficiently.

In accordance with method 12000 and with reference to FIG. 12E, the first and second tactile outputs (and the other localized button tactile outputs) are (12034) localized on the peripheral-side of the device (e.g., generated by the button actuators located on or proximate to the peripheral-side of the device, as opposed to being propagated from an internal actuator inside of the device to locations outside of the input region (e.g., throughout the device.)). Providing localized tactile outputs on the peripheral side of the device in response to inputs detected on the input region on the peripheral-size of the device enhances the operability of the device and makes the user-device interface more efficient (e.g., by providing improved feedback to help the user provide required inputs to achieve an intended outcome, and by reducing user mistakes when operating/interacting with the device), which, additionally, reduces power usage and improves battery life of the device by enabling the user to use the device more quickly and efficiently.

It should be understood that the particular order in which the operations in FIGS. 12A-12E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000, 7000, 8000, 9000, 10000, and 11000) are also applicable in an analogous manner to method 6000 described above with respect to FIGS. 12A-12E. For example, the contacts, gestures, user interface objects, tactile outputs, audio outputs, intensity thresholds, time thresholds, focus selectors, and animations described above with reference to method 12000 optionally have one or more of the characteristics of the contacts, gestures, user interface objects, tactile outputs, audio outputs, intensity thresholds, time thresholds, focus selectors, and animations described herein with reference to other methods described herein (e.g., methods 6000, 7000, 8000, 9000, 10000, and 11000). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device with a display, and a first input region that is separate from the display:
      detecting a first portion of a first input on the first input region that is near an edge portion of the display;
      in response to detecting the first portion of the first input on the first input region:
         in accordance with a determination that the first portion of the first input meets first criteria, wherein the first criteria include a set of criteria that are met when the first input is detected on the first input region without a characteristic intensity of the first input increasing above a first intensity threshold, displaying, on the display, a precursor object corresponding to a user interface object that includes one or more selectable options on the edge portion of the display that is near the first input region;
      while displaying the precursor object on the display, detecting a second portion of the first input on the first input region, including detecting an increase in intensity of the first input above the first intensity threshold; and
      in response to detecting the increase in intensity of the first input during the second portion of the first input, revealing the user interface object on the display by an amount that varies in accordance with a current intensity of the first input, including expanding the user interface object from the edge portion of the display that is near the first input region toward an opposite edge of the display by an amount that varies in accordance with a current intensity of the first input.

2. The method of claim 1, including:
   after detecting the second portion of the first input, detecting a third portion of the first input on the first input region, including detecting a continued increase in intensity of the first input;
   in response to detecting the continued increase in intensity of the first input:
      in accordance with a determination that the third portion of the first input meets second criteria, wherein the second criteria include a set of criteria that are met when a characteristic intensity of the first input increases above a second intensity threshold that is greater than the first intensity threshold before an end of the first input is detected: displaying the user interface object that includes the one or more selectable options on the display.

3. The method of claim 2, including:
   after detecting the third portion of the first input, detecting a fourth portion of the first input on the first input region, including detecting a decrease in intensity of the first input:
      in accordance with a determination that the second criteria were met before detecting the fourth portion of the first input, maintaining display of the user interface object without altering an amount by which the user interface object is currently displayed; and
      in accordance with a determination that the second criteria were not met before detecting the fourth portion of the first input, decreasing an amount by which the user interface object is revealed on the display in accordance with a current intensity of the first input.

4. The method of claim 2, including:
   in response to detecting the continued increase in intensity of the first input:
      in accordance with a determination that the third portion of the first input meets the second criteria: generating a first tactile output.

5. The method of claim 4, wherein the device includes a first tactile output generator that resides locally at the first input region and that provides localized tactile outputs, including the first tactile output, at the first input region.

6. The method of claim 4, wherein the generation of the first tactile output is synchronized with satisfaction of the second criteria by the first input.

7. The method of claim 4, wherein the generation of the first tactile output is synchronized with initial full-display of the user interface object on the display.

8. The method of claim 2, wherein the device includes a touch-sensitive surface that is distinct from the first input region, and wherein the method includes:
   while displaying the user interface object including the one or more selectable options on the display, detecting a second input on the touch-sensitive surface at a location that corresponds to a first selectable option of the one or more selectable options in the user interface object; and
   in response to detecting the second input:
      in accordance with a determination that the second input meets selection criteria, selecting the first selectable option.

9. The method of claim 8, including:
in response to detecting the second input:
in accordance with a determination that the second input meets selection-confirmation criteria, performing a first operation that corresponds to the first selectable option.

10. The method of claim 8, including:
in response to detecting the second input:
in accordance with a determination that the second input meets drag criteria, displaying a representation of the first selectable option outside of the user interface object.

11. The method of claim 10, including:
in response to detecting the second input:
in accordance with a determination that the second input meets drop criteria, displaying a copy of the first selectable option outside of the user interface object.

12. The method of claim 8, wherein the second input is detected while the user interface object is partially revealed on the display, without the second criteria being met by the first input.

13. The method of claim 2, including:
while displaying the user interface object including the one or more selectable options on the display, detecting a third input on the first input region, wherein the third input includes movement of a contact across the first input region; and
in response to detecting the third input, scrolling a selection indicator through the one or more selectable options on the display in accordance with the movement of the contact in the third input.

14. The method of claim 13, including:
while the selection indicator is moved to a first selectable option of the one or more selectable options on the display in accordance with the movement of the contact in the third input on the first input region, detecting a fourth input on the first input region that meets selection-confirmation criteria; and
in response detecting the fourth input that meets the selection-confirmation criteria, performing an operation corresponding to the first selectable options.

15. The method of claim 2, wherein the device includes a touch-sensitive surface that is distinct from the first input region, and wherein the method includes:
while displaying the user interface object including the one or more selectable options on the display, detecting a fifth input on the touch-sensitive surface, including:
detecting touch-down of a contact on the touch-sensitive surface at a location that corresponds to a second user interface object that is displayed outside of the user interface object,
detecting movement of the contact across the touch-sensitive surface to a location within the user interface object, and
detecting lift-off of the contact from the touch-sensitive surface while the second user interface object is within the user interface object; and
in response to detecting the fifth input, adding the second user interface object as a new selectable option in the user interface object.

16. The method of claim 2, wherein the device includes a touch-sensitive surface that is distinct from the first input region, and wherein the method includes:
while displaying the user interface object including the one or more selectable options on the display, detecting a sixth input on the touch-sensitive surface, including:
detecting touch-down of a contact on the touch-sensitive surface at a location that corresponds to a respective selectable option that is displayed within the user interface object,
detecting movement of the contact across the touch-sensitive surface to a location outside of the user interface object, and
detecting lift-off of the contact from the touch-sensitive surface while the respective selectable option is dragged outside of the user interface object; and
in response to detecting the sixth input, removing the respective selectable option from the user interface object.

17. An electronic device, comprising:
a display;
a first input region that is separate from the display;
one or more processors;
memory; and
one or more programs, wherein the one or more programs are stored in the memory and configured to be executed by the one or more processors, the one or more programs including instructions for:
detecting a first portion of a first input on the first input region that is near an edge portion of the display;
in response to detecting the first portion of the first input on the first input region:
in accordance with a determination that the first portion of the first input meets first criteria, wherein the first criteria include a set of criteria that are met when the first input is detected on the first input region without a characteristic intensity of the first input increasing above a first intensity threshold, displaying, on the display, a precursor object corresponding to a user interface object that includes one or more selectable options on the edge portion of the display that is near the first input region;
while displaying the precursor object on the display, detecting a second portion of the first input on the first input region, including detecting an increase in intensity of the first input above the first intensity threshold; and
in response to detecting the increase in intensity of the first input during the second portion of the first input, revealing the user interface object on the display by an amount that varies in accordance with a current intensity of the first input, including expanding the user interface object from the edge portion of the display that is near the first input region toward an opposite edge of the display by an amount that varies in accordance with a current intensity of the first input.

18. The electronic device of claim 17, wherein the one or more programs include instructions for:
after detecting the second portion of the first input, detecting a third portion of the first input on the first input region, including detecting a continued increase in intensity of the first input;
in response to detecting the continued increase in intensity of the first input:
in accordance with a determination that the third portion of the first input meets second criteria, wherein the second criteria include a set of criteria that are met when a characteristic intensity of the first input increases above a second intensity threshold that is greater than the first intensity threshold before an end of the first input is detected: displaying the user interface object that includes the one or more selectable options on the display.

19. The electronic device of claim 18, wherein the one or more programs include instructions for:
after detecting the third portion of the first input, detecting a fourth portion of the first input on the first input region, including detecting a decrease in intensity of the first input:
in accordance with a determination that the second criteria were met before detecting the fourth portion of the first input, maintaining display of the user interface object without altering an amount by which the user interface object is currently displayed; and
in accordance with a determination that the second criteria were not met before detecting the fourth portion of the first input, decreasing an amount by which the user interface object is revealed on the display in accordance with a current intensity of the first input.

20. The electronic device of claim 18, wherein the one or more programs include instructions for:
in response to detecting the continued increase in intensity of the first input:
in accordance with a determination that the third portion of the first input meets the second criteria: generating a first tactile output.

21. The electronic device of claim 20, wherein the device includes a first tactile output generator that resides locally at the first input region and that provides localized tactile outputs, including the first tactile output, at the first input region.

22. The electronic device of claim 20, wherein the generation of the first tactile output is synchronized with satisfaction of the second criteria by the first input.

23. The electronic device of claim 20, wherein the generation of the first tactile output is synchronized with initial full-display of the user interface object on the display.

24. The electronic device of claim 18, wherein the device includes a touch-sensitive surface that is distinct from the first input region, and wherein the one or more programs include instructions for:
while displaying the user interface object including the one or more selectable options on the display, detecting a second input on the touch-sensitive surface at a location that corresponds to a first selectable option of the one or more selectable options in the user interface object; and
in response to detecting the second input:
in accordance with a determination that the second input meets selection criteria, selecting the first selectable option.

25. The electronic device of claim 24, wherein the one or more programs include instructions for:
in response to detecting the second input:
in accordance with a determination that the second input meets selection-confirmation criteria, performing a first operation that corresponds to the first selectable option.

26. The electronic device of claim 24, wherein the one or more programs include instructions for:
in response to detecting the second input:
in accordance with a determination that the second input meets drag criteria, displaying a representation of the first selectable option outside of the user interface object.

27. The electronic device of claim 26, wherein the one or more programs include instructions for:

in response to detecting the second input:
in accordance with a determination that the second input meets drop criteria, displaying a copy of the first selectable option outside of the user interface object.

28. The electronic device of claim 24, wherein the second input is detected while the user interface object is partially revealed on the display, without the second criteria being met by the first input.

29. The electronic device of claim 18, wherein the one or more programs include instructions for:
while displaying the user interface object including the one or more selectable options on the display, detecting a third input on the first input region, wherein the third input includes movement of a contact across the first input region; and
in response to detecting the third input, scrolling a selection indicator through the one or more selectable options on the display in accordance with the movement of the contact in the third input.

30. The electronic device of claim 29, wherein the one or more programs include instructions for:
while the selection indicator is moved to a first selectable option of the one or more selectable options on the display in accordance with the movement of the contact in the third input on the first input region, detecting a fourth input on the first input region that meets selection-confirmation criteria; and
in response detecting the fourth input that meets the selection-confirmation criteria, performing an operation corresponding to the first selectable options.

31. The electronic device of claim 18, wherein the device includes a touch-sensitive surface that is distinct from the first input region, and wherein the one or more programs include instructions for:
while displaying the user interface object including the one or more selectable options on the display, detecting a fifth input on the touch-sensitive surface, including:
detecting touch-down of a contact on the touch-sensitive surface at a location that corresponds to a second user interface object that is displayed outside of the user interface object,
detecting movement of the contact across the touch-sensitive surface to a location within the user interface object, and
detecting lift-off of the contact from the touch-sensitive surface while the second user interface object is within the user interface object; and
in response to detecting the fifth input, adding the second user interface object as a new selectable option in the user interface object.

32. The electronic device of claim 18, wherein the device includes a touch-sensitive surface that is distinct from the first input region, and wherein the one or more programs include instructions for:
while displaying the user interface object including the one or more selectable options on the display, detecting a sixth input on the touch-sensitive surface, including:
detecting touch-down of a contact on the touch-sensitive surface at a location that corresponds to a respective selectable option that is displayed within the user interface object,
detecting movement of the contact across the touch-sensitive surface to a location outside of the user interface object, and detecting lift-off of the contact from the touch-sensitive surface while the respective selectable option is dragged outside of the user interface object; and in response to detecting the sixth input, removing the respective selectable option from the user interface object.

33. A non-transitory computer readable storage medium storing one or more programs, the one or more programs comprising instructions, which when executed by an electronic device with a display, a first input region that is separate from the display, one or more processors, and memory, cause the device to:

detect a first portion of a first input on the first input region that is near an edge portion of the display;

in response to detecting the first portion of the first input on the first input region:

in accordance with a determination that the first portion of the first input meets first criteria, wherein the first criteria include a set of criteria that are met when the first input is detected on the first input region without a characteristic intensity of the first input increasing above a first intensity threshold, display, on the display, a precursor object corresponding to a user interface object that includes one or more selectable options on the edge portion of the display that is near the first input region;

while displaying the precursor object on the display, detect a second portion of the first input on the first input region, including detecting an increase in intensity of the first input above the first intensity threshold; and in response to detecting the increase in intensity of the first input during the second portion of the first input, reveal the user interface object on the display by an amount that varies in accordance with a current intensity of the first input, including expanding the user interface object from the edge portion of the display that is near the first input region toward an opposite edge of the display by an amount that varies in accordance with a current intensity of the first input.

34. The non-transitory computer readable storage medium of claim 33, wherein the instructions, which when executed by an electronic device with a display and a touch-sensitive surface, cause the device to:

after detecting the second portion of the first input, detect a third portion of the first input on the first input region, including detecting a continued increase in intensity of the first input;

in response to detecting the continued increase in intensity of the first input:

in accordance with a determination that the third portion of the first input meets second criteria, wherein the second criteria include a set of criteria that are met when a characteristic intensity of the first input increases above a second intensity threshold that is greater than the first intensity threshold before an end of the first input is detected: display the user interface object that includes the one or more selectable options on the display.

35. The non-transitory computer readable storage medium of claim 34, wherein the instructions, which when executed by an electronic device with a display and a touch-sensitive surface, cause the device to:

after detecting the third portion of the first input, detect a fourth portion of the first input on the first input region, including detecting a decrease in intensity of the first input:

in accordance with a determination that the second criteria were met before detecting the fourth portion of the first input, maintain display of the user interface object without altering an amount by which the user interface object is currently displayed; and in accordance with a determination that the second criteria were not met before detecting the fourth portion of the first input, decrease an amount by which the user interface object is revealed on the display in accordance with a current intensity of the first input.

36. The non-transitory computer readable storage medium of claim 34, wherein the instructions, which when executed by an electronic device with a display and a touch-sensitive surface, cause the device to:

in response to detecting the continued increase in intensity of the first input:

in accordance with a determination that the third portion of the first input meets the second criteria: generate a first tactile output.

37. The non-transitory computer readable storage medium of claim 36, wherein the device includes a first tactile output generator that resides locally at the first input region and that provides localized tactile outputs, including the first tactile output, at the first input region.

38. The non-transitory computer readable storage medium of claim 36, wherein the generation of the first tactile output is synchronized with satisfaction of the second criteria by the first input.

39. The non-transitory computer readable storage medium of claim 36, wherein the generation of the first tactile output is synchronized with initial full-display of the user interface object on the display.

40. The non-transitory computer readable storage medium of claim 34, wherein the device includes a touch-sensitive surface that is distinct from the first input region, and wherein the instructions, which when executed by an electronic device with a display and a touch-sensitive surface, cause the device to:

while displaying the user interface object including the one or more selectable options on the display, detect a second input on the touch-sensitive surface at a location that corresponds to a first selectable option of the one or more selectable options in the user interface object; and in response to detecting the second input:

in accordance with a determination that the second input meets selection criteria, select the first selectable option.

41. The non-transitory computer readable storage medium of claim 40, wherein the instructions, which when executed by an electronic device with a display and a touch-sensitive surface, cause the device to:

in response to detecting the second input:

in accordance with a determination that the second input meets selection-confirmation criteria, perform a first operation that corresponds to the first selectable option.

42. The non-transitory computer readable storage medium of claim 40, wherein the instructions, which when executed by an electronic device with a display and a touch-sensitive surface, cause the device to:

in response to detecting the second input:

in accordance with a determination that the second input meets drag criteria, display a representation of the first selectable option outside of the user interface object.

43. The non-transitory computer readable storage medium of claim 42, wherein the instructions, which when executed by an electronic device with a display and a touch-sensitive surface, cause the device to:
   in response to detecting the second input:
      in accordance with a determination that the second input meets drop criteria, display a copy of the first selectable option outside of the user interface object.

44. The non-transitory computer readable storage medium of claim 40, wherein the second input is detected while the user interface object is partially revealed on the display, without the second criteria being met by the first input.

45. The non-transitory computer readable storage medium of claim 34, wherein the instructions, which when executed by an electronic device with a display and a touch-sensitive surface, cause the device to:
   while displaying the user interface object including the one or more selectable options on the display, detect a third input on the first input region, wherein the third input includes movement of a contact across the first input region; and
   in response to detecting the third input, scroll a selection indicator through the one or more selectable options on the display in accordance with the movement of the contact in the third input.

46. The non-transitory computer readable storage medium of claim 45, wherein the instructions, which when executed by an electronic device with a display and a touch-sensitive surface, cause the device to:
   while the selection indicator is moved to a first selectable option of the one or more selectable options on the display in accordance with the movement of the contact in the third input on the first input region, detect a fourth input on the first input region that meets selection-confirmation criteria; and
   in response detecting the fourth input that meets the selection-confirmation criteria, perform an operation corresponding to the first selectable options.

47. The non-transitory computer readable storage medium of claim 34, wherein the device includes a touch-sensitive surface that is distinct from the first input region, and wherein the instructions, which when executed by an electronic device with a display and a touch-sensitive surface, cause the device to:
   while displaying the user interface object including the one or more selectable options on the display, detect a fifth input on the touch-sensitive surface, including:
      detecting touch-down of a contact on the touch-sensitive surface at a location that corresponds to a second user interface object that is displayed outside of the user interface object,
      detecting movement of the contact across the touch-sensitive surface to a location within the user interface object, and
      detecting lift-off of the contact from the touch-sensitive surface while the second user interface object is within the user interface object; and
   in response to detecting the fifth input, add the second user interface object as a new selectable option in the user interface object.

48. The non-transitory computer readable storage medium of claim 34, wherein the device includes a touch-sensitive surface that is distinct from the first input region, and wherein the instructions, which when executed by an electronic device with a display and a touch-sensitive surface, cause the device to:
   while displaying the user interface object including the one or more selectable options on the display, detect a sixth input on the touch-sensitive surface, including:
      detecting touch-down of a contact on the touch-sensitive surface at a location that corresponds to a respective selectable option that is displayed within the user interface object,
      detecting movement of the contact across the touch-sensitive surface to a location outside of the user interface object, and
      detecting lift-off of the contact from the touch-sensitive surface while the respective selectable option is dragged outside of the user interface object; and
   in response to detecting the sixth input, remove the respective selectable option from the user interface object.

* * * * *

UNITED STATES PATENT AND TRADEMARK OFFICE
CERTIFICATE OF CORRECTION

PATENT NO. : 10,955,956 B2  
APPLICATION NO. : 16/403329  
DATED : March 23, 2021  
INVENTOR(S) : Gleeson et al.

Page 1 of 1

It is certified that error appears in the above-identified patent and that said Letters Patent is hereby corrected as shown below:

On the Title Page

Item (72) Inventors, please delete "Brian T. Gleeson, Mountain View, CA (US); Brigit E. Lamberson, San Francisco, CA (US); Camille Moussette, Los Gatos, CA (US); Madeleine S. Cordier, San Francisco, CA (US); Megan A. McClain, San Francisco, CA (US); Michael J. Beyhs, San Francisco, CA (US); Thayne M. Miller, San Jose, CA (US) Jacob L. Matlick, San Francisco, CA (US); Jean-Pierre M. Mouilleseaux, San Francisco, CA (US); Peter C. Tsoi, San Jose, CA (US); David H. Bloom, San Francisco, CA (US); Miao He, Sunnyvale, CA (US)" and add -- Brian T. Gleeson, Mountain View, CA (US); Brigit E. Lamberson, San Francisco, CA (US); Camille Moussette, Los Gatos, CA (US); Madeleine S. Cordier, San Francisco, CA (US); Megan A. McClain, San Francisco, CA (US); Michael J. Beyhs, San Francisco, CA (US); Thayne M. Miller, San Jose, CA (US) Jacob L. Matlick, San Francisco, CA (US); Jean-Pierre M. Mouilleseaux, San Francisco, CA (US); Peter C. Tsoi, San Jose, CA (US); David H. Bloom, San Francisco, CA (US); Miao He, Sunnyvale, CA (US); Max L.L. McCarthy, San Francisco, CA (US) --.

Signed and Sealed this  
Sixteenth Day of September, 2025

Coke Morgan Stewart  
*Acting Director of the United States Patent and Trademark Office*